United States Patent [19]
Kikuchi et al.

[11] Patent Number: 5,182,673
[45] Date of Patent: Jan. 26, 1993

[54] ZOOM LENS HAVING HIGH VARIABLE MAGNIFICATION

[75] Inventors: Shuichi Kikuchi, Yokohama; Masami Itoh, Higashi-Kurume, both of Japan

[73] Assignee: Ricoh Company, Ltd., Tokyo, Japan

[21] Appl. No.: 706,579

[22] Filed: May 28, 1991

[30] Foreign Application Priority Data

| May 28, 1990 | [JP] | Japan | 2-137520 |
| Jun. 14, 1990 | [JP] | Japan | 2-156241 |
| Jun. 14, 1990 | [JP] | Japan | 2-156242 |
| Jun. 15, 1990 | [JP] | Japan | 2-158104 |
| Sep. 13, 1990 | [JP] | Japan | 2-243210 |
| Sep. 19, 1990 | [JP] | Japan | 2-249288 |
| Oct. 5, 1990 | [JP] | Japan | 2-268015 |
| Oct. 11, 1990 | [JP] | Japan | 2-272936 |
| Apr. 5, 1991 | [JP] | Japan | 3-73229 |

[51] Int. Cl.$^5$ .................................. G02B 15/177
[52] U.S. Cl. .......................... 359/691; 359/682; 359/689; 359/740
[58] Field of Search ............ 359/680, 681, 682, 689, 359/691, 740

[56] References Cited

U.S. PATENT DOCUMENTS

| 4,198,127 | 4/1980 | Itoh | 359/689 X |
| 4,828,372 | 5/1989 | Betensky et al. | 359/691 X |
| 4,838,668 | 6/1989 | Betensky et al. | 359/689 |
| 5,042,926 | 8/1991 | Kikuchi | 359/689 X |

Primary Examiner—Scott J. Sugarman
Attorney, Agent, or Firm—Fish & Richardson

[57] ABSTRACT

In a zoom lens having a high variable magnification, first and second lens groups and respectively having negative and positive focal lengths are sequentially arranged from an object side of the zoom lens to an image side thereof. A combined focal length of an entire lens system is charged by changing a distance between the first and second lens groups while the position of an image surface is constantly held. The zoom lens is constructed such that the second lens group is constructed by front and rear lens groups respectively having positive and negative focal lengths.

22 Claims, 136 Drawing Sheets

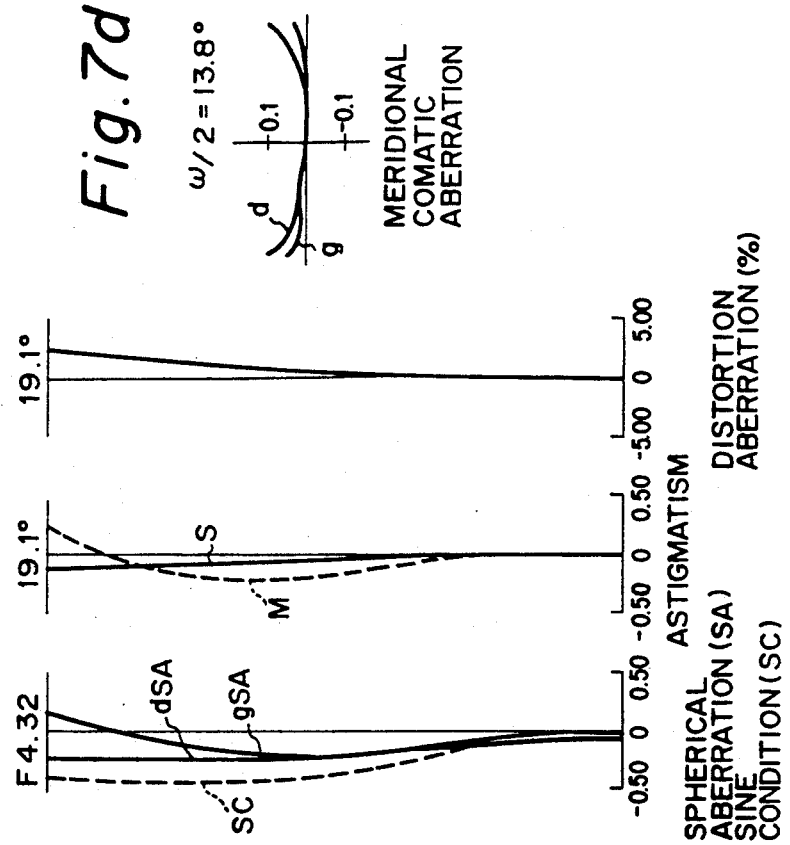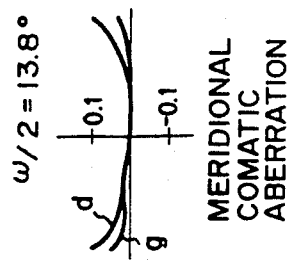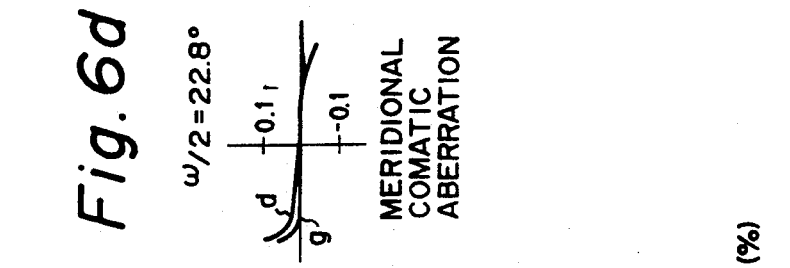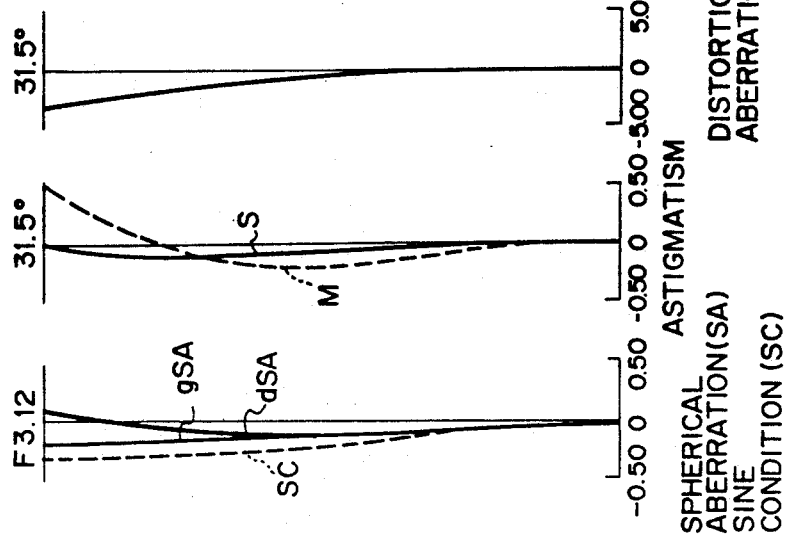

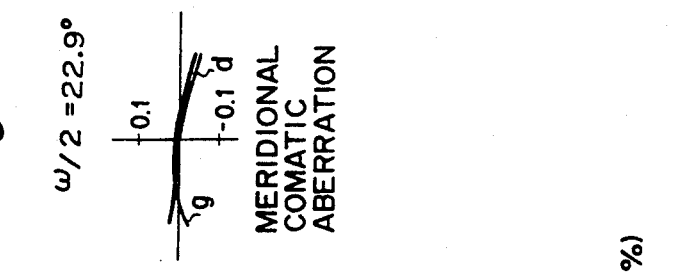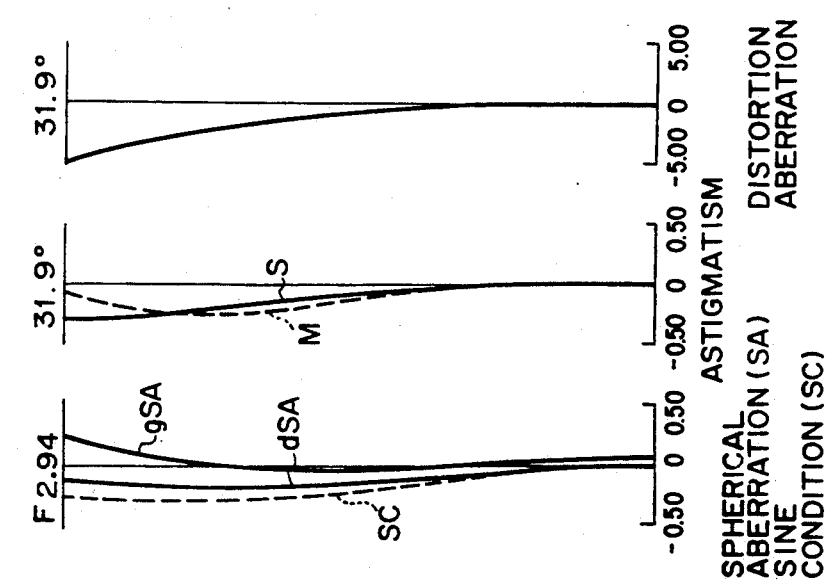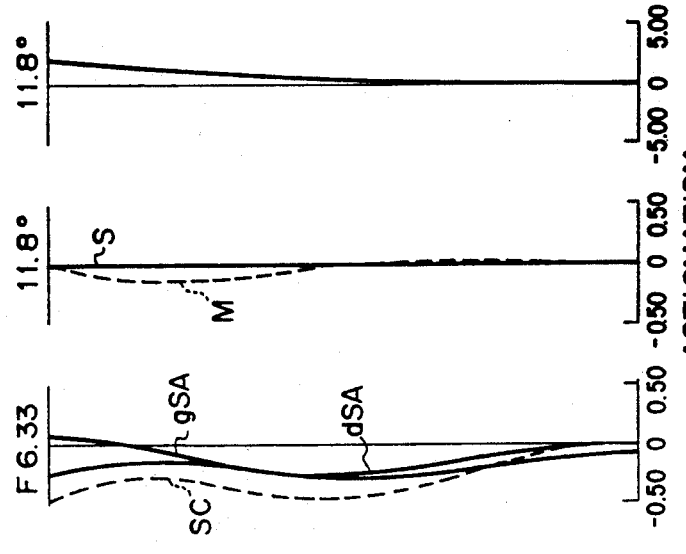

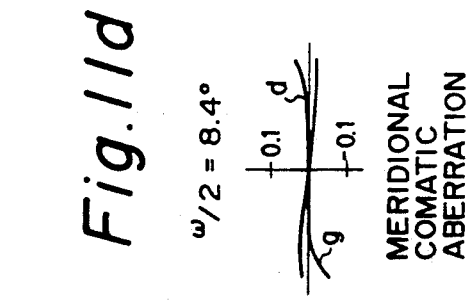
Fig.11d
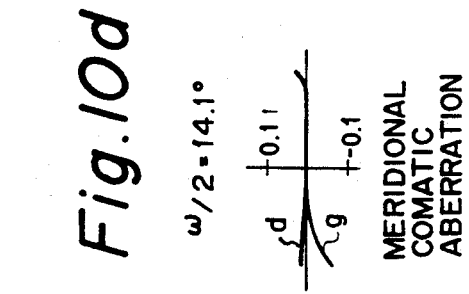
Fig.11a  Fig.11b  Fig.11c
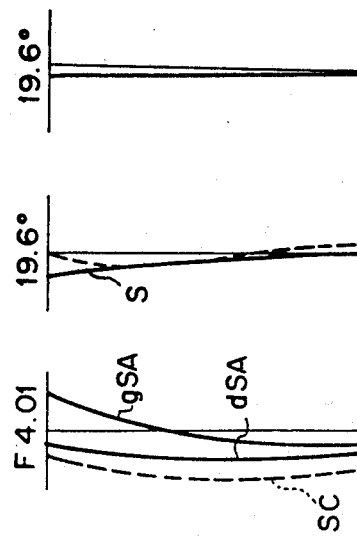
Fig.10d
Fig.10a  Fig.10b  Fig.10c

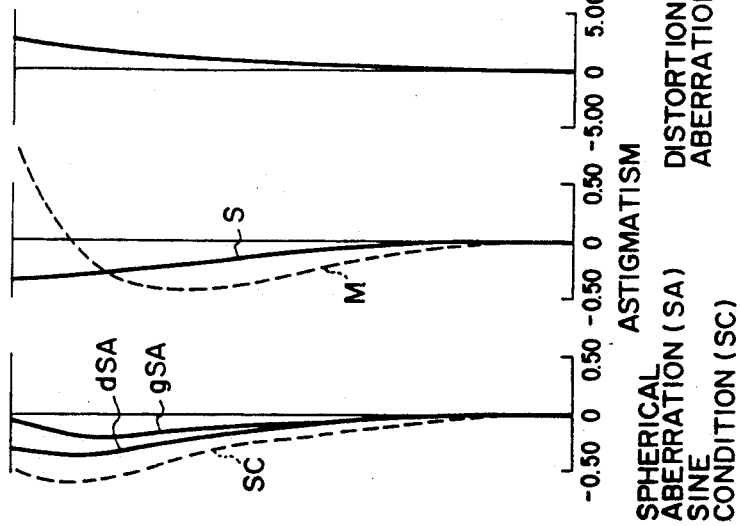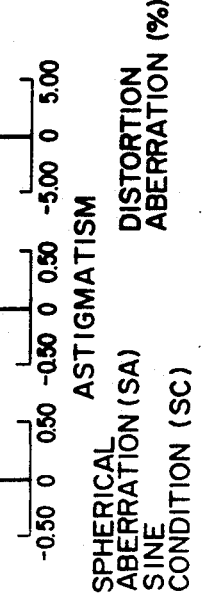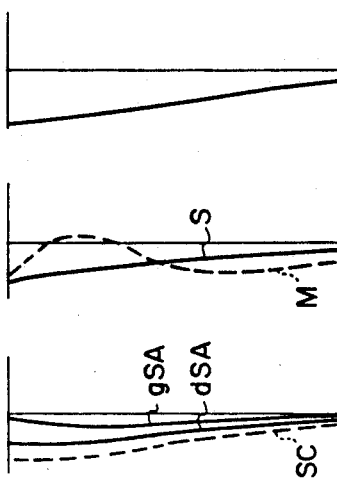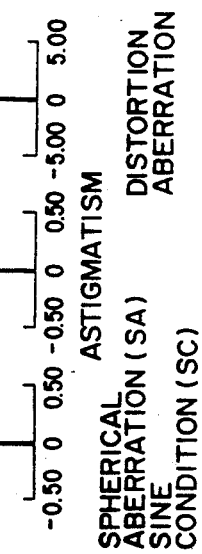

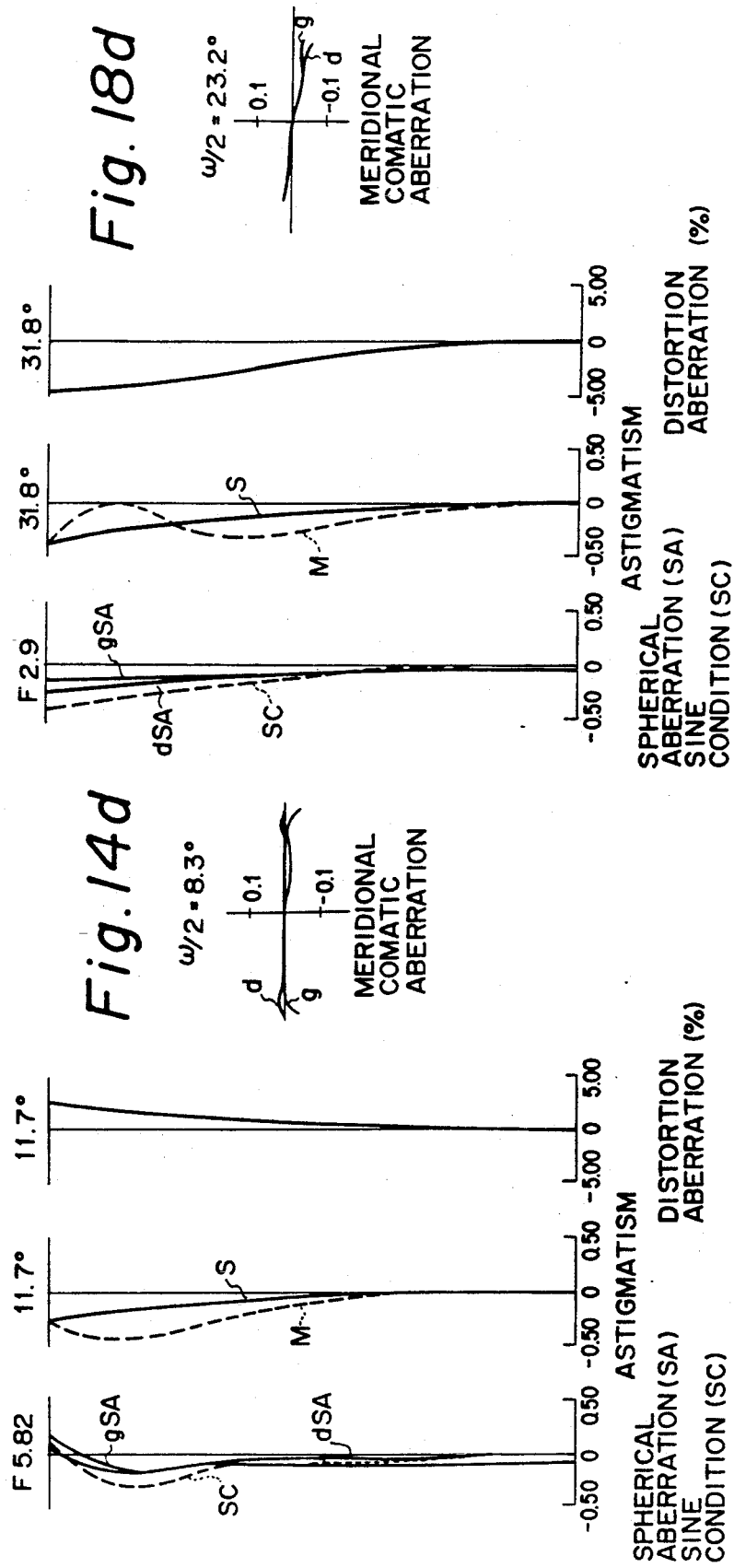

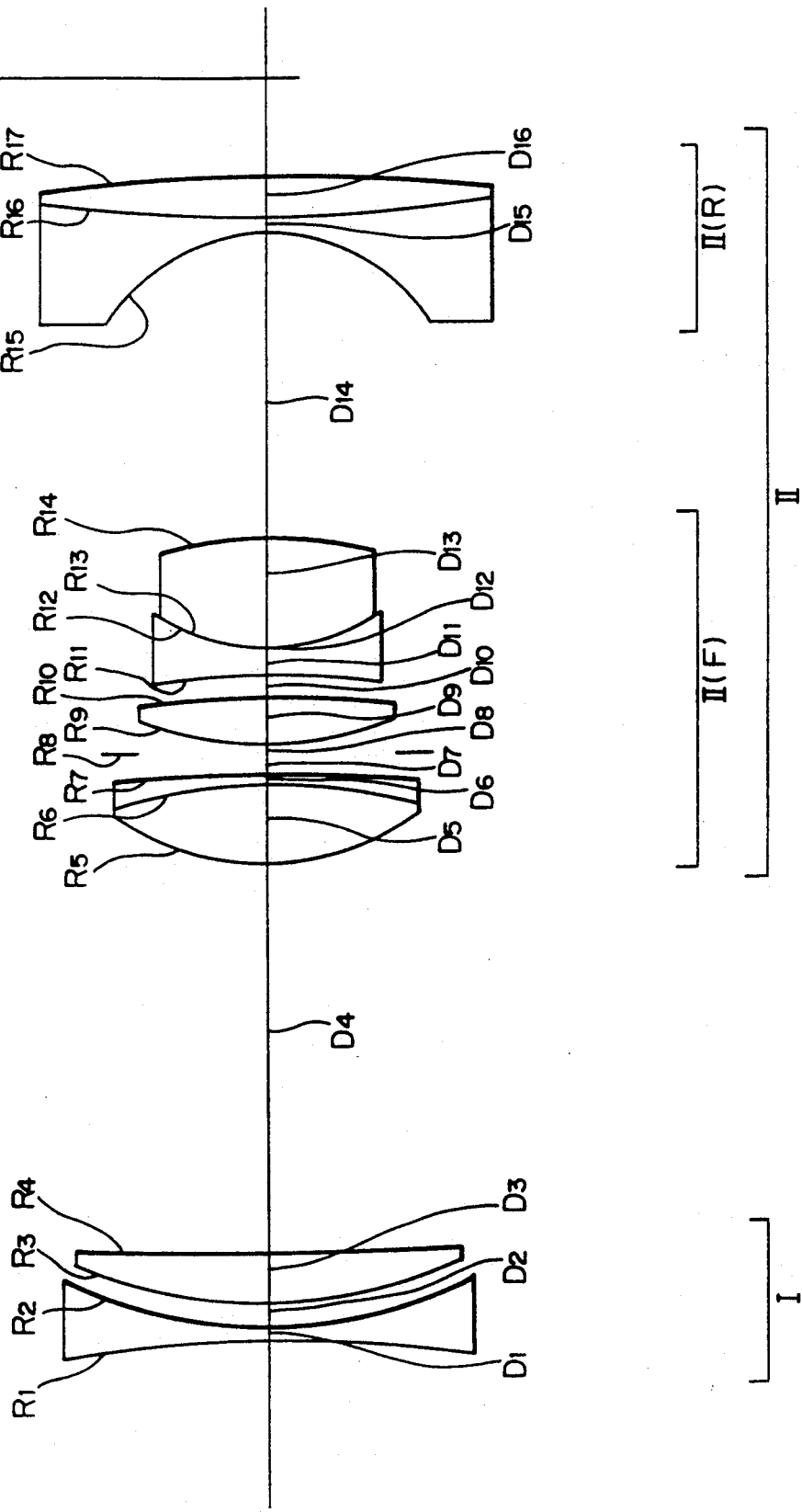

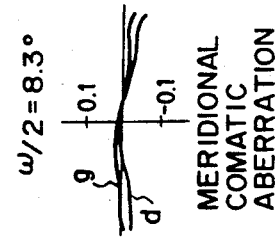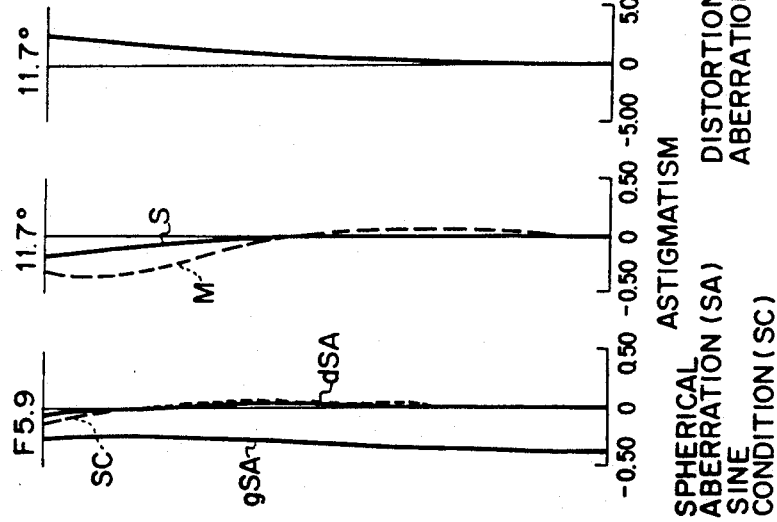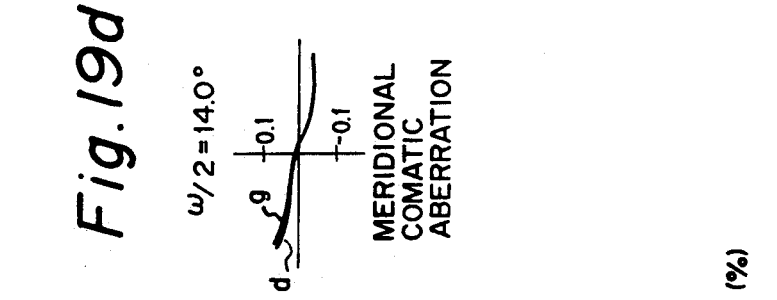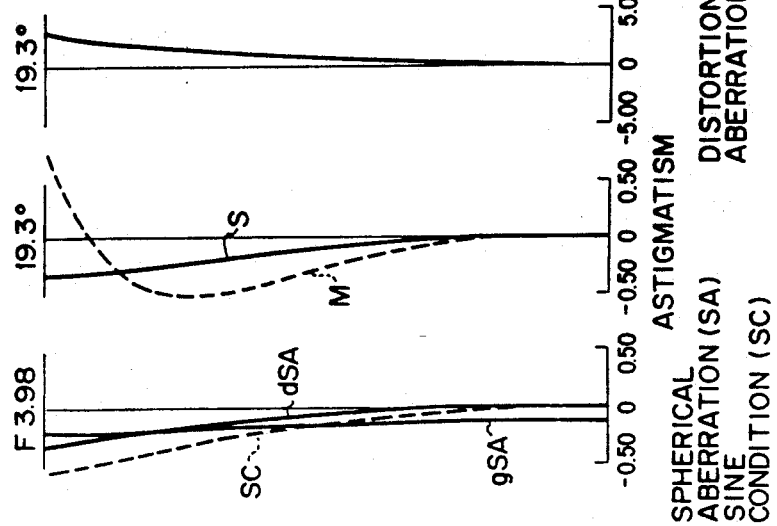

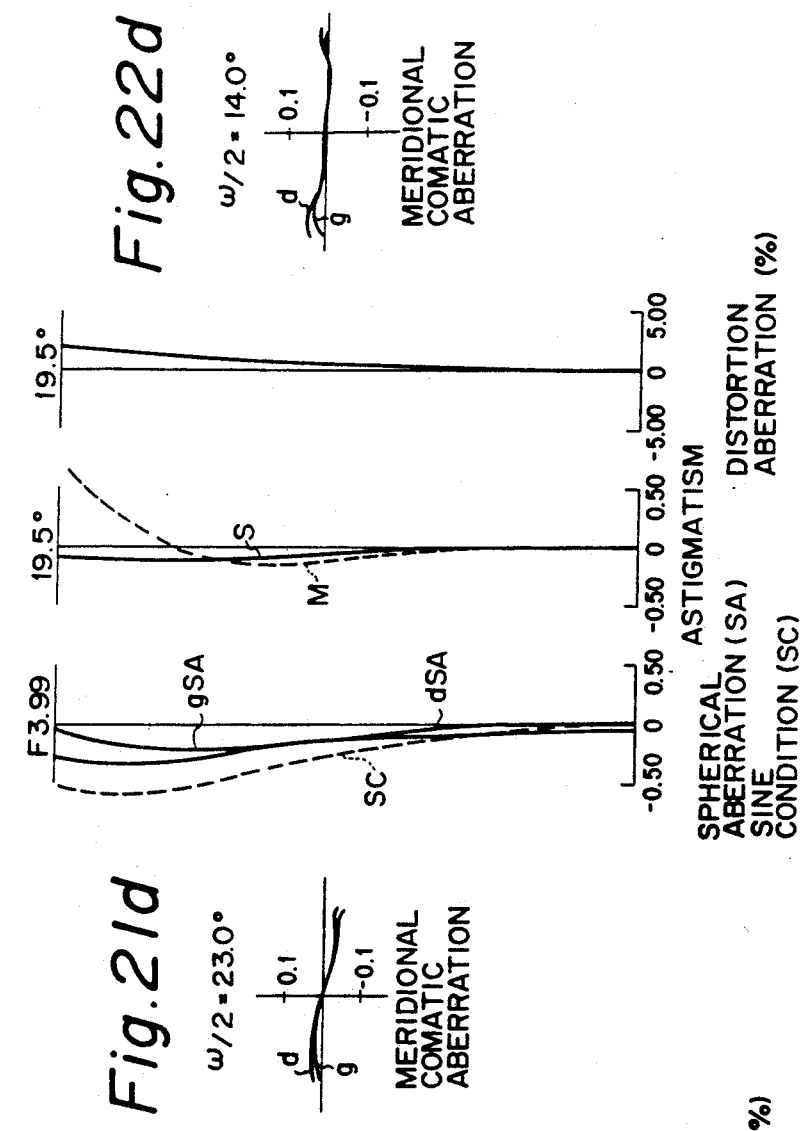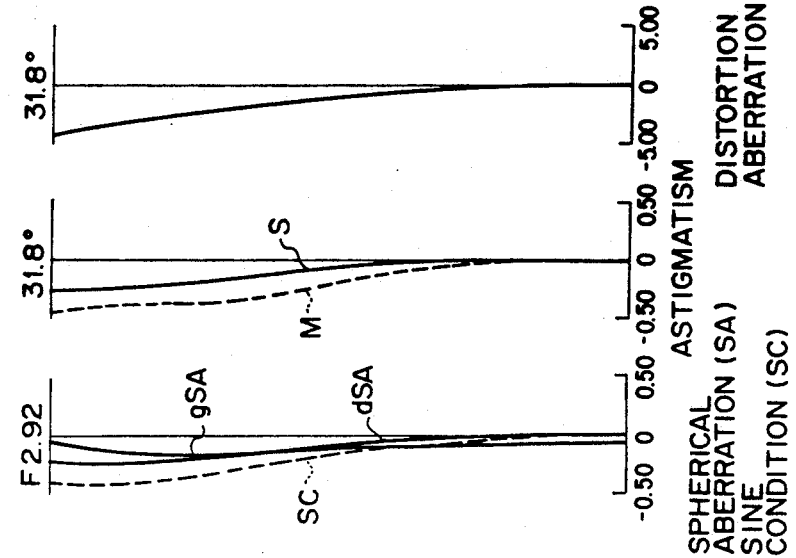

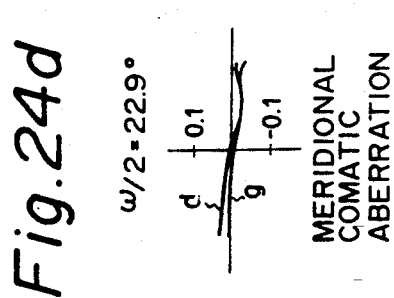
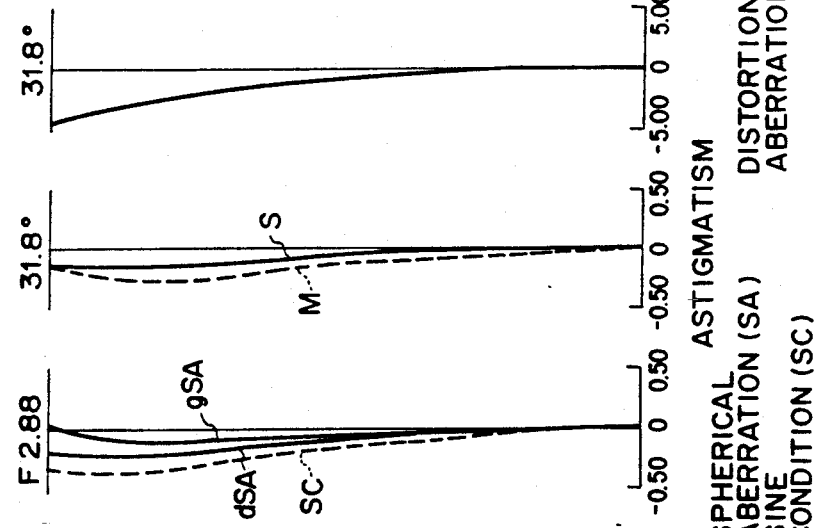
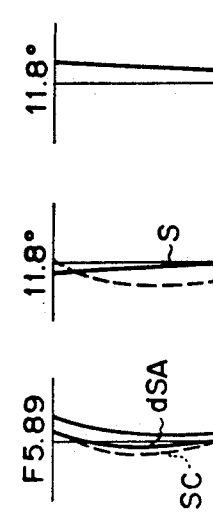
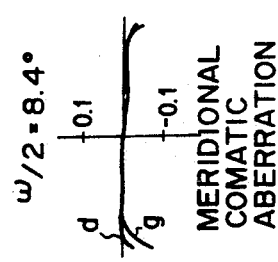
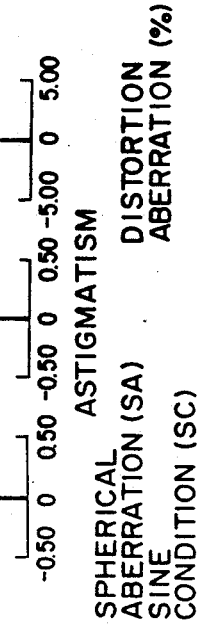
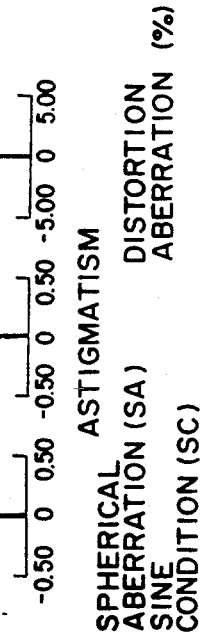

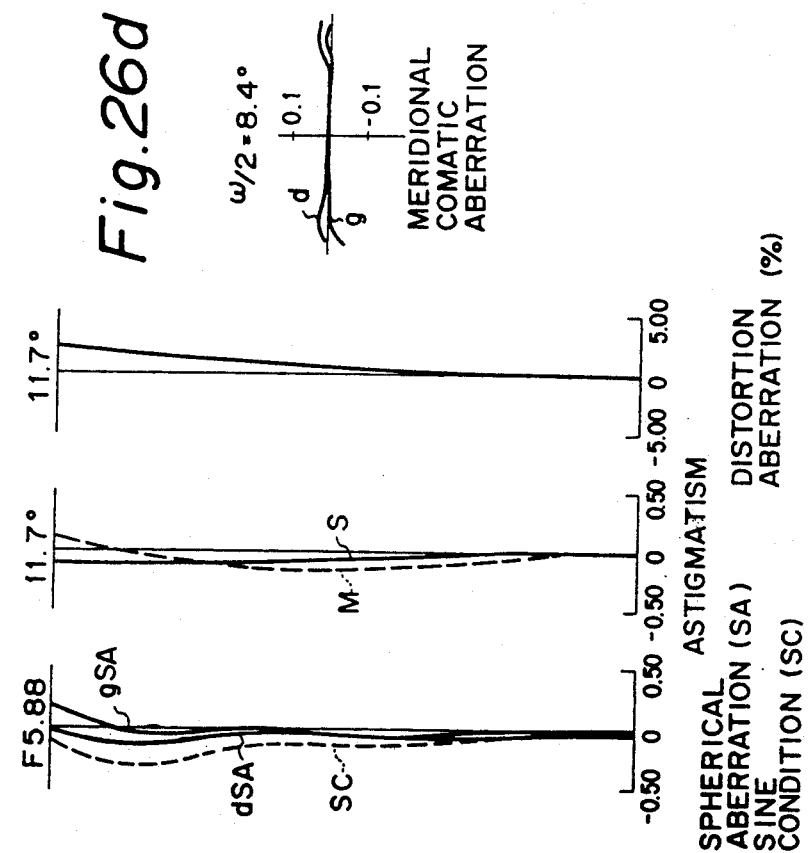
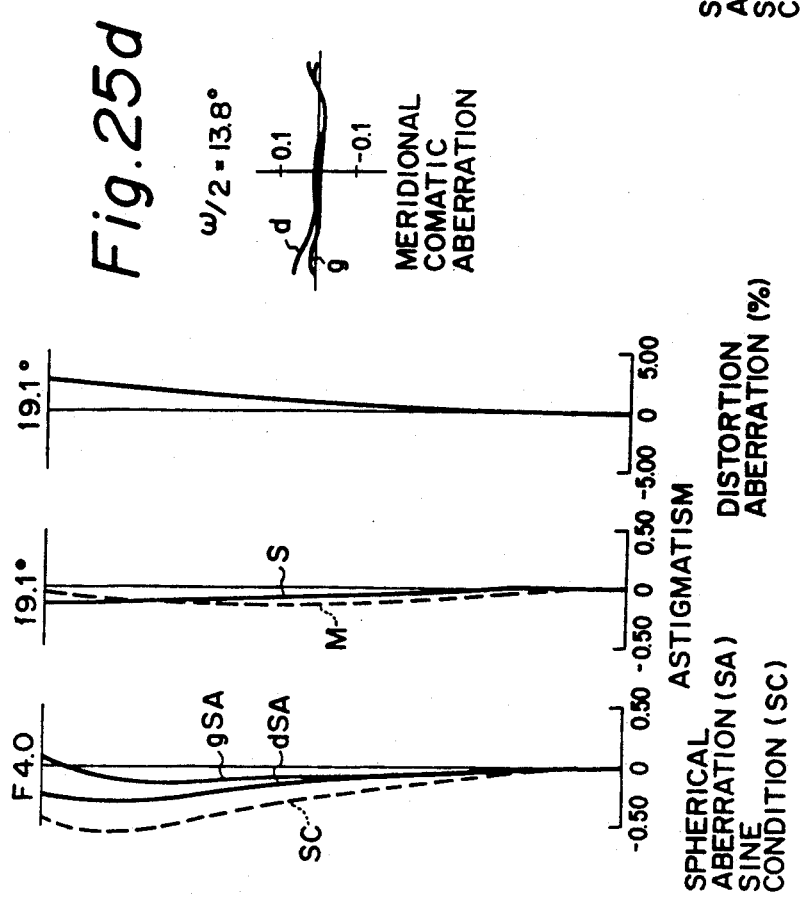

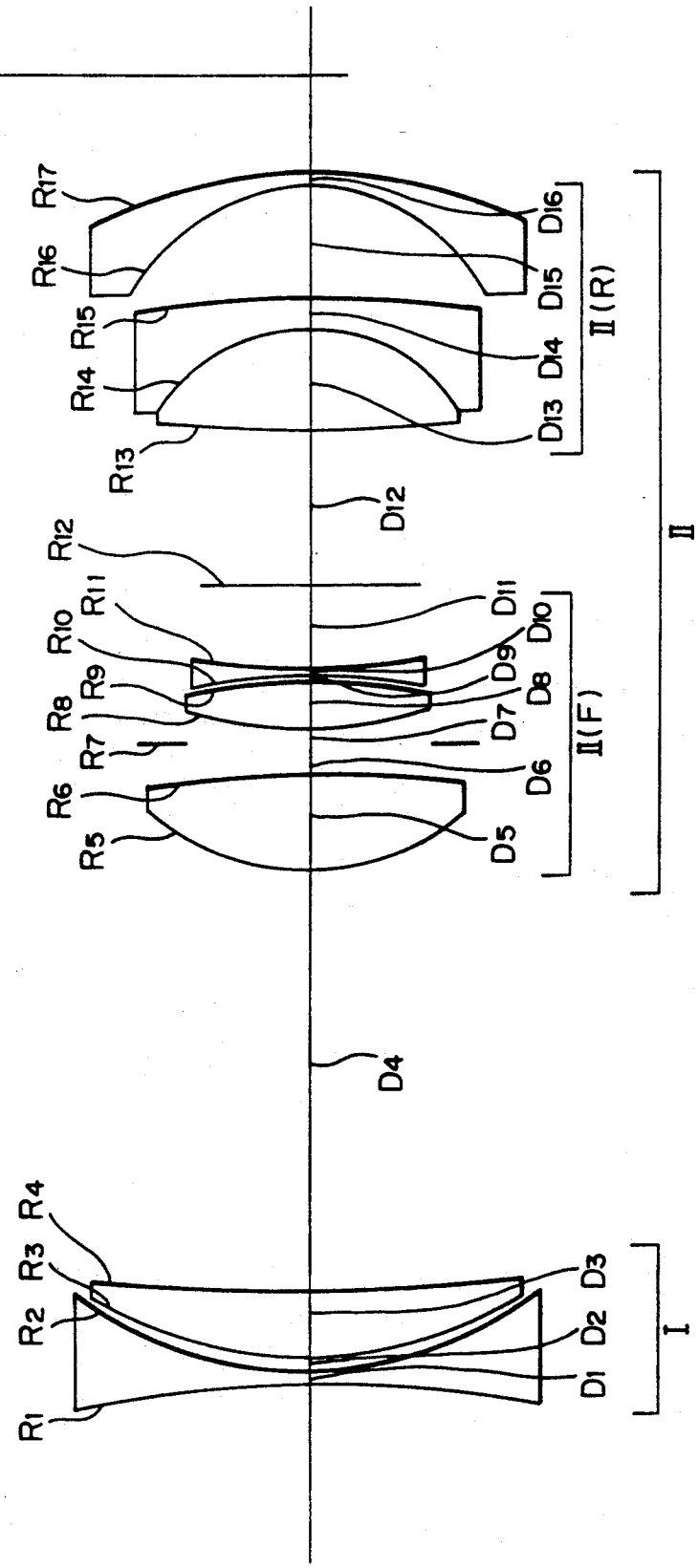

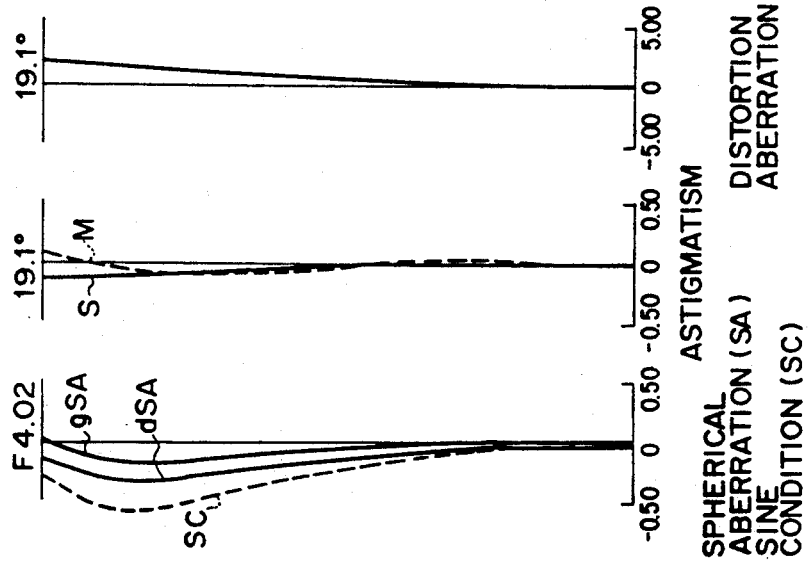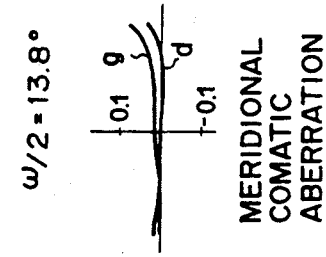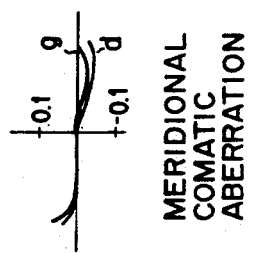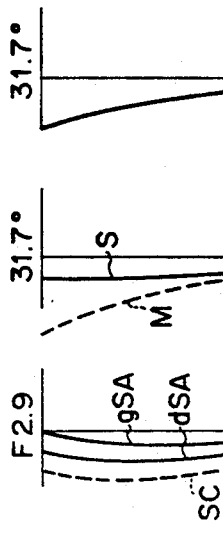

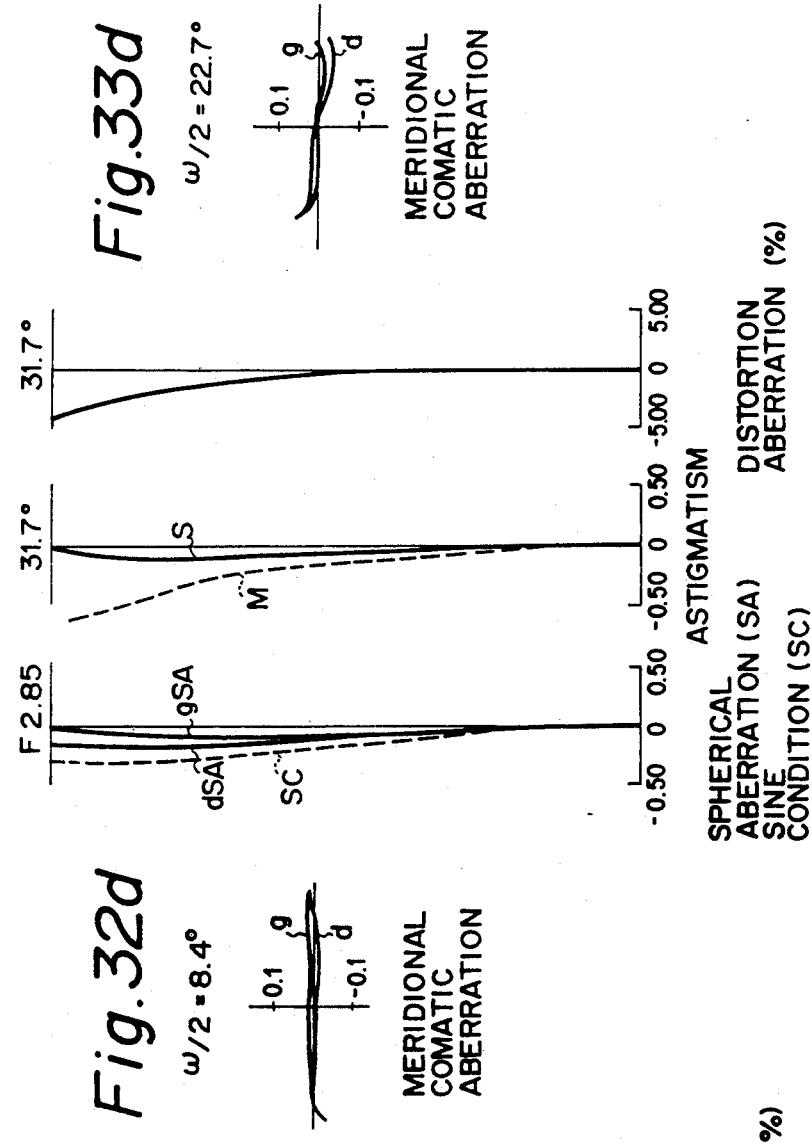

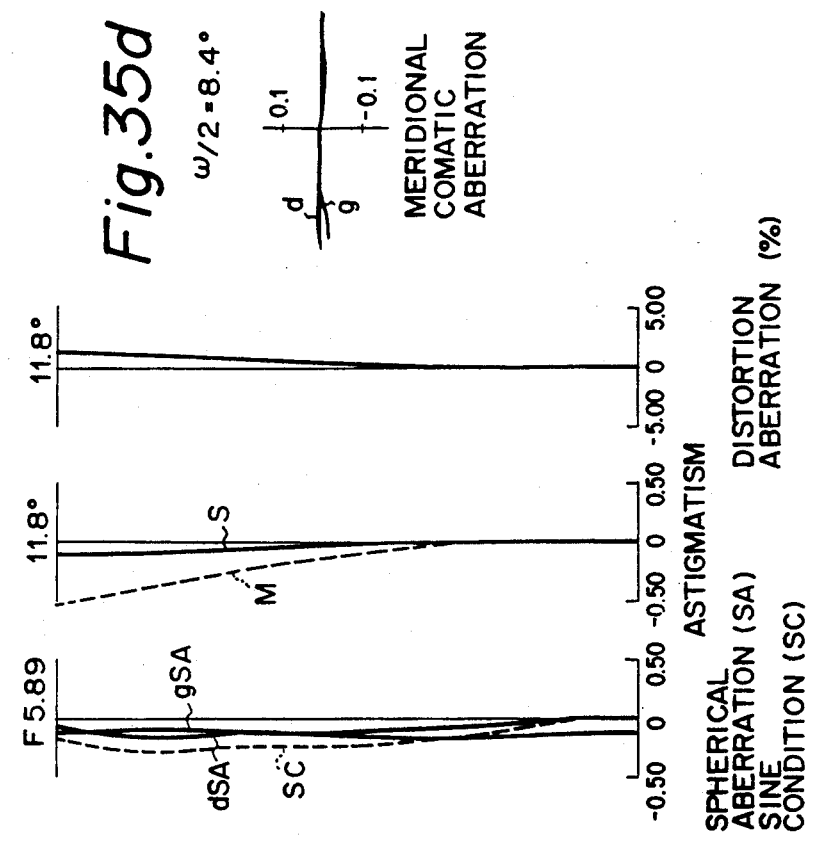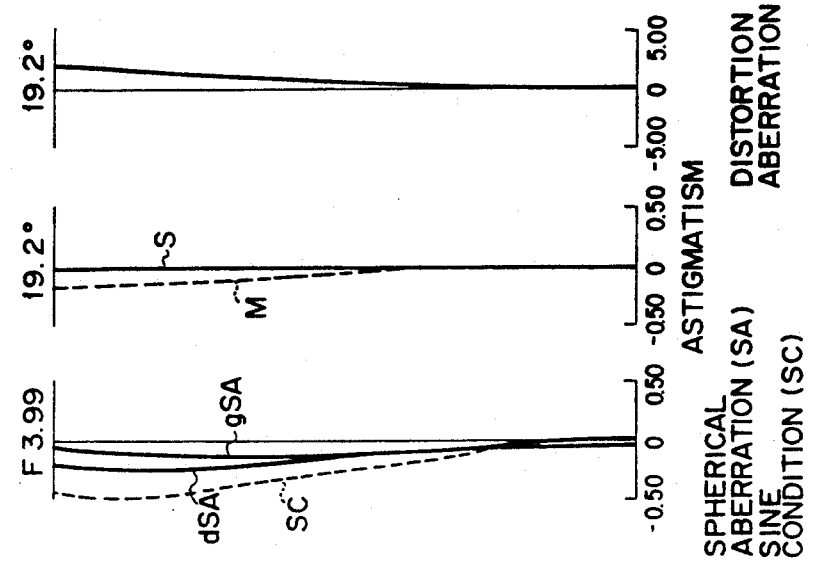

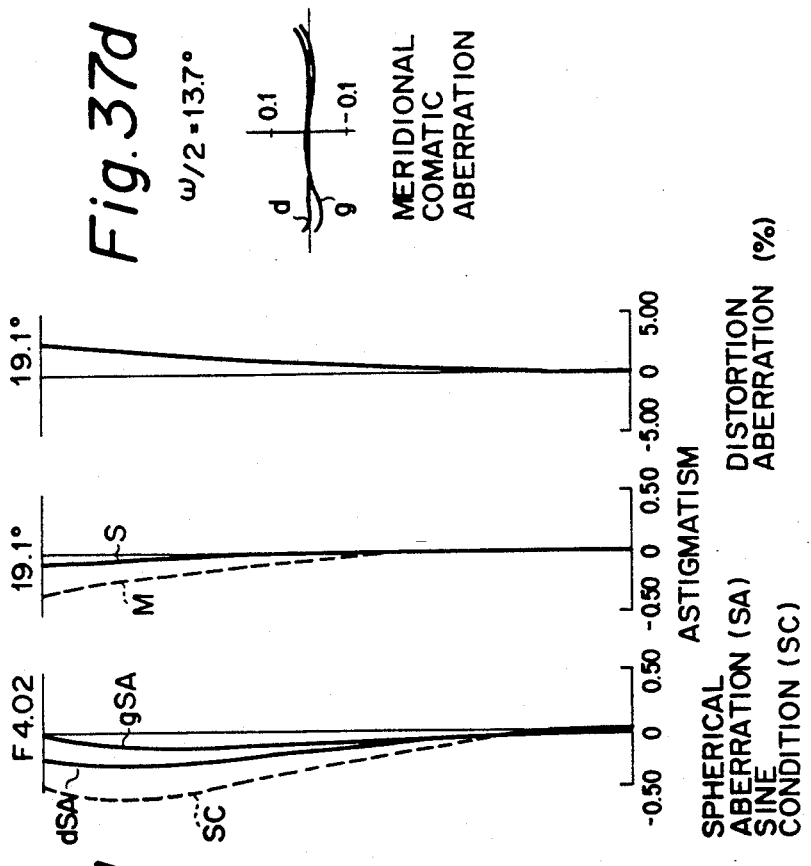

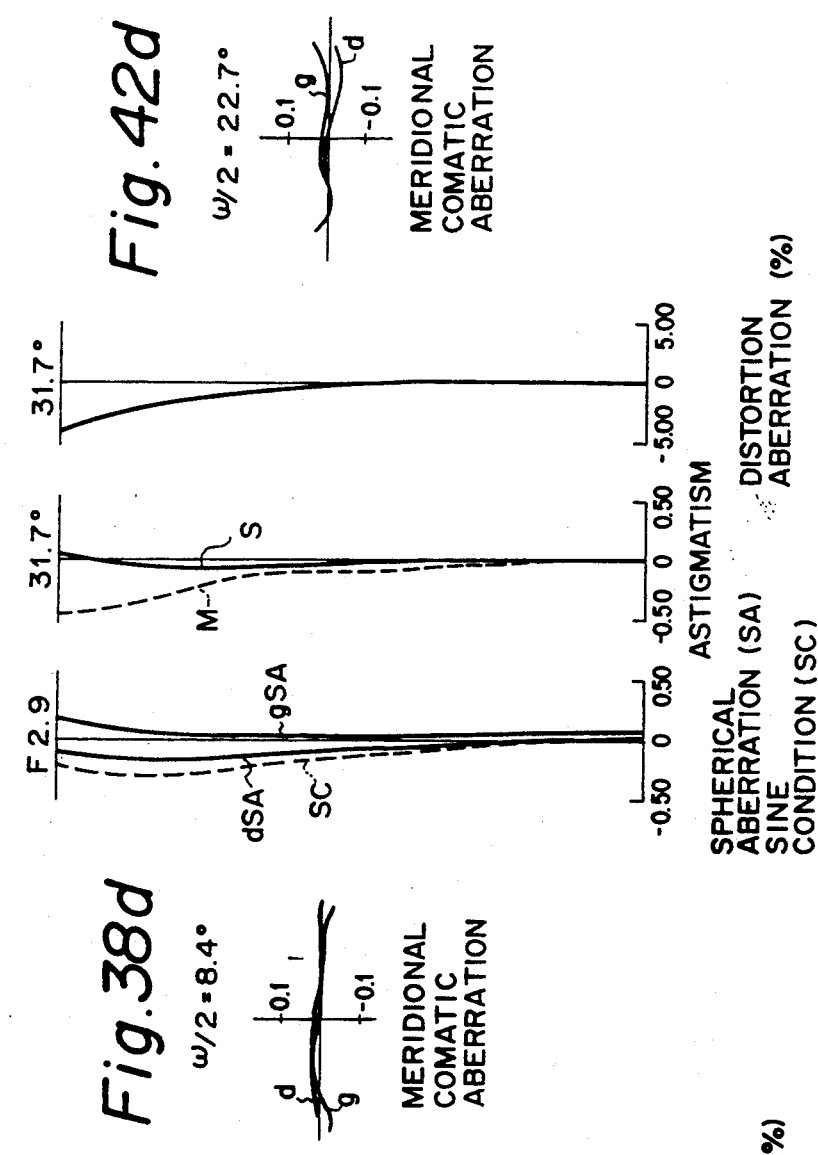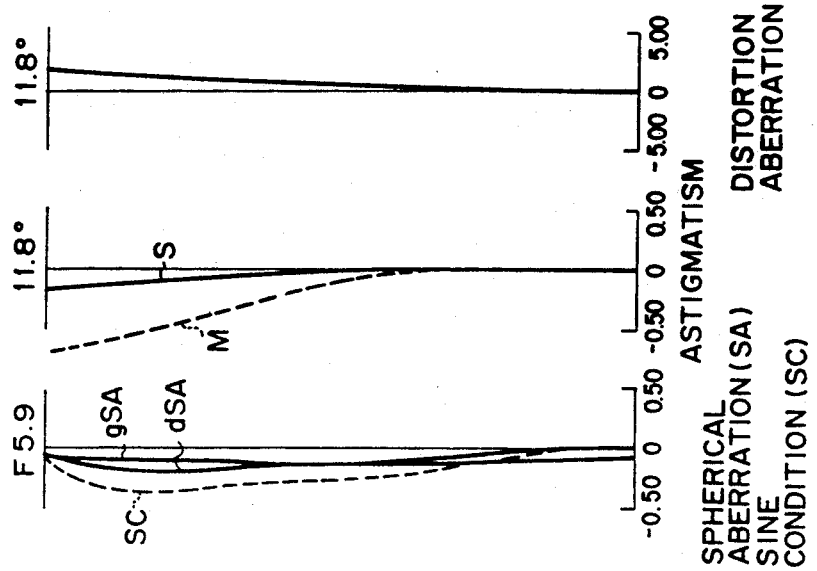

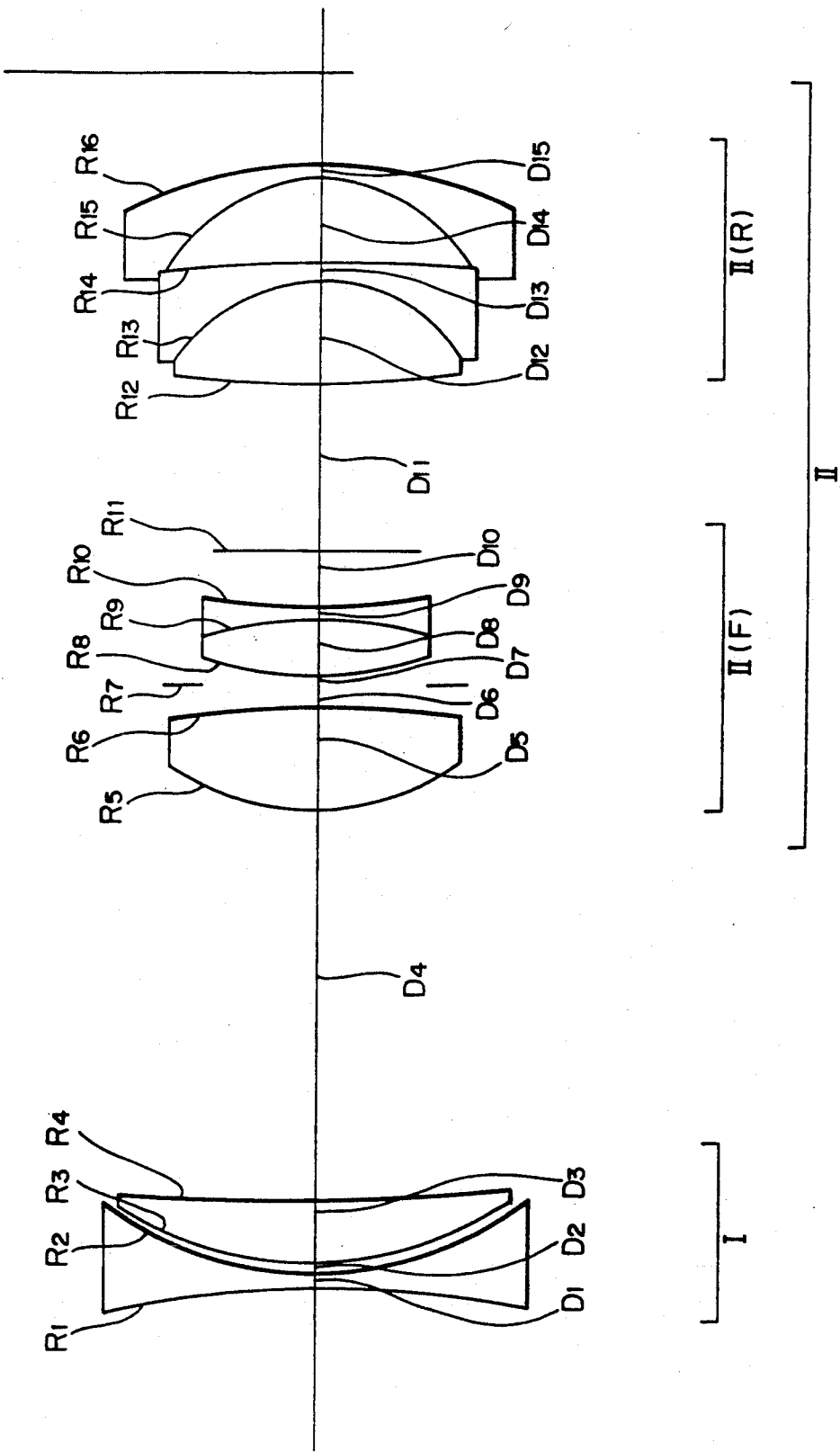

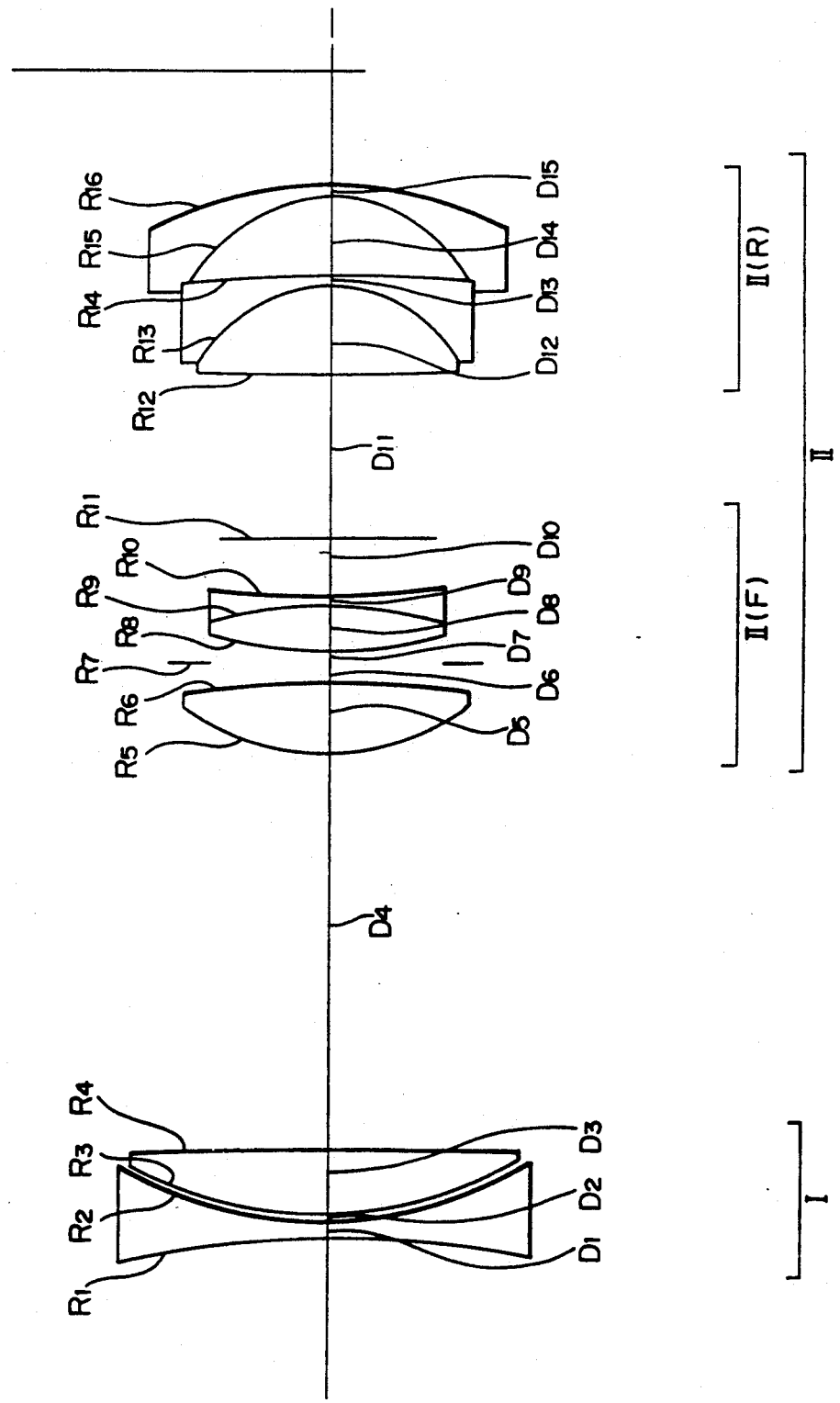

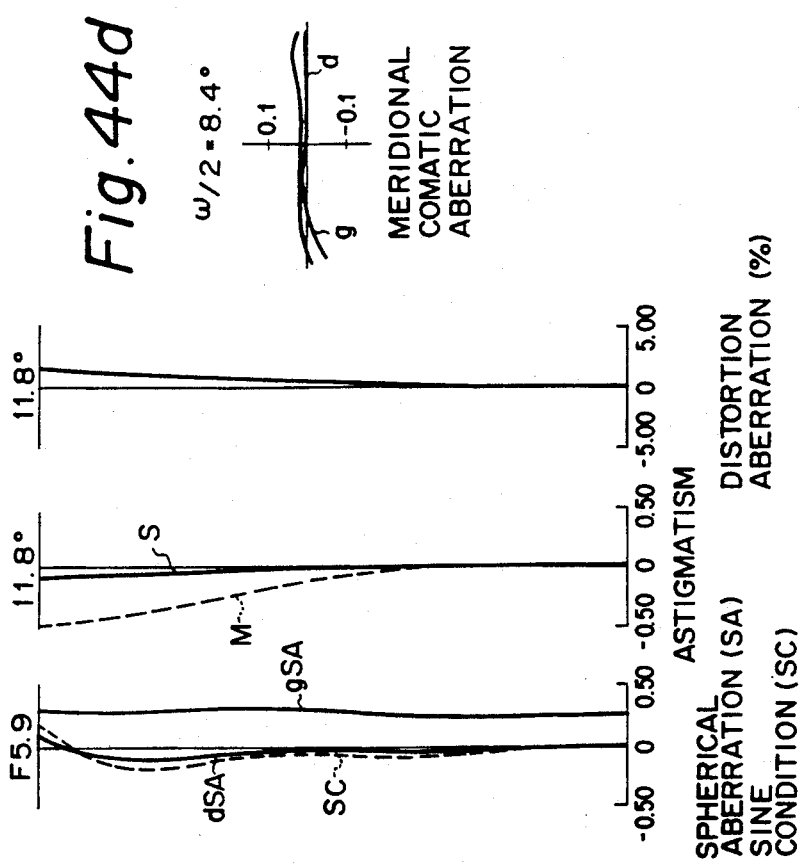
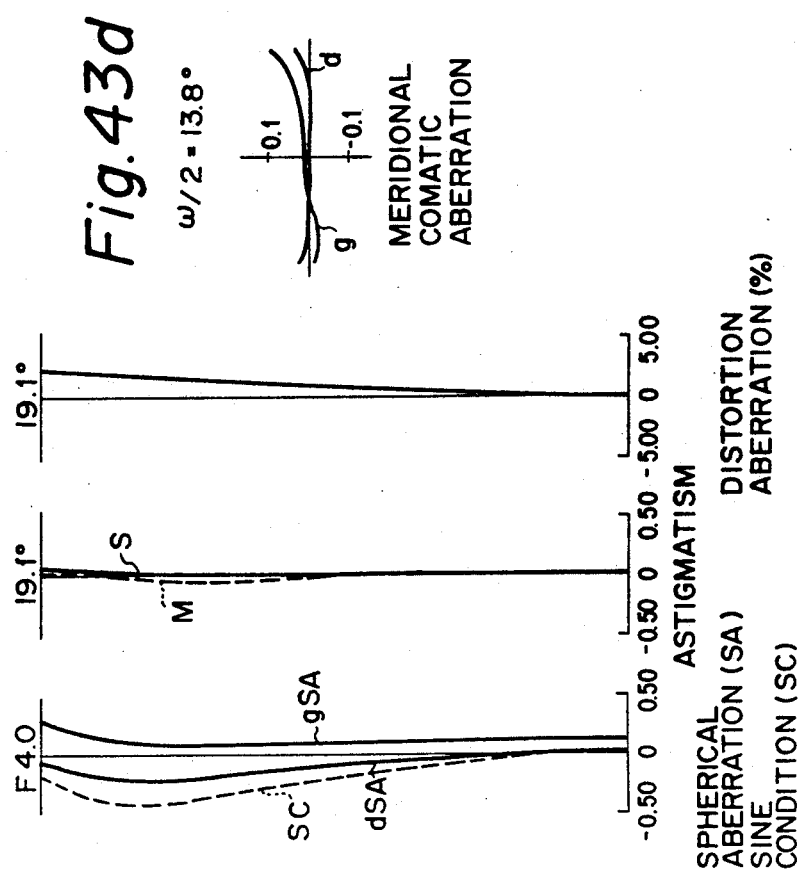

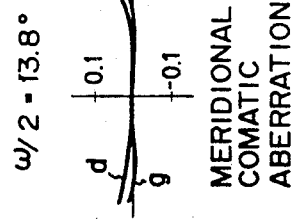
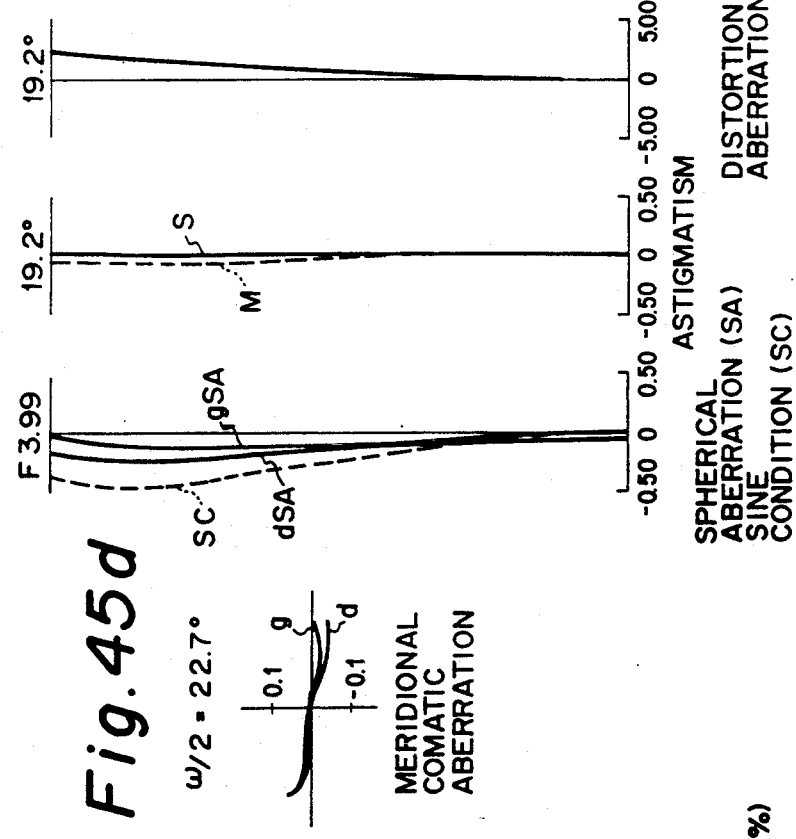
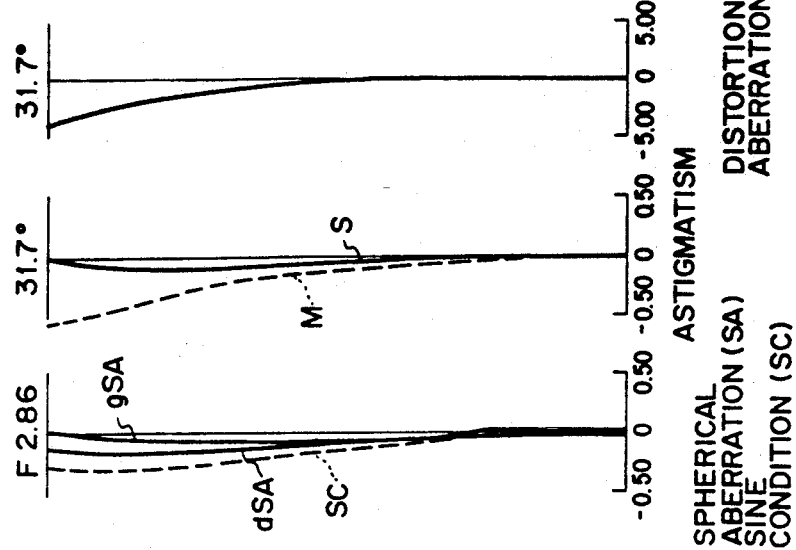

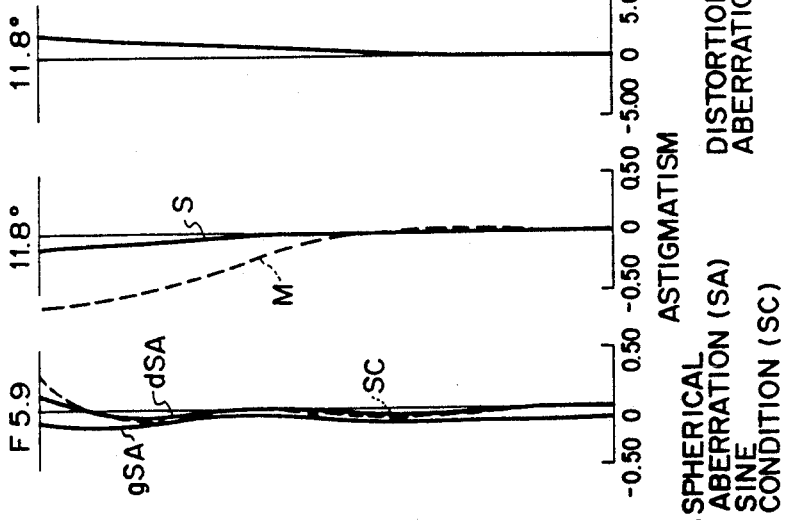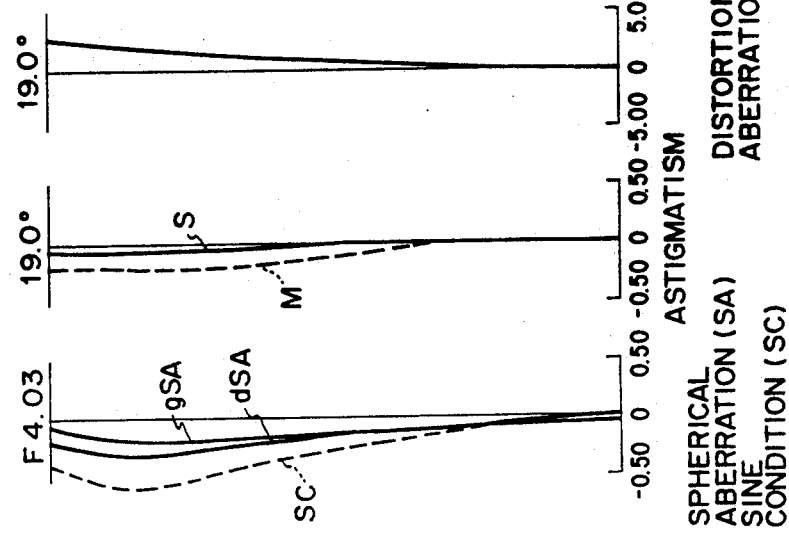

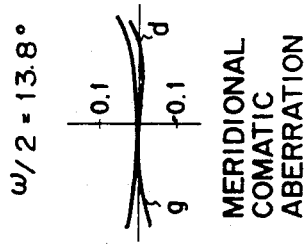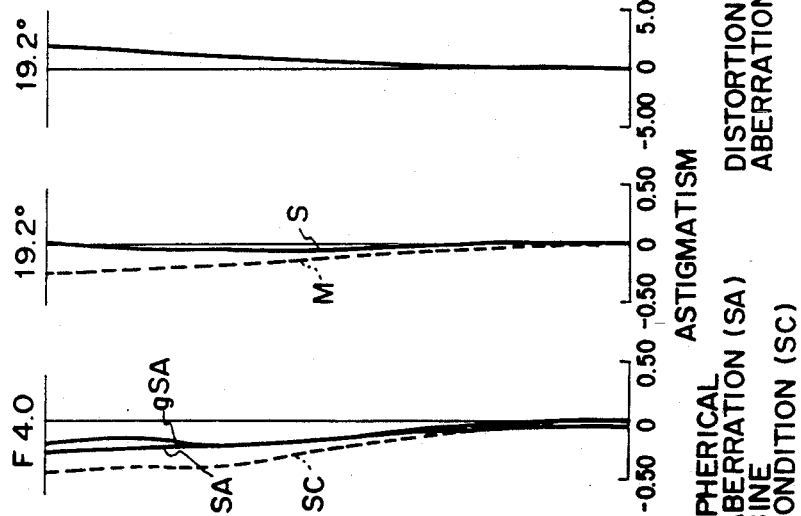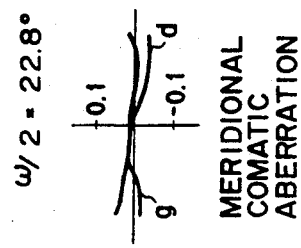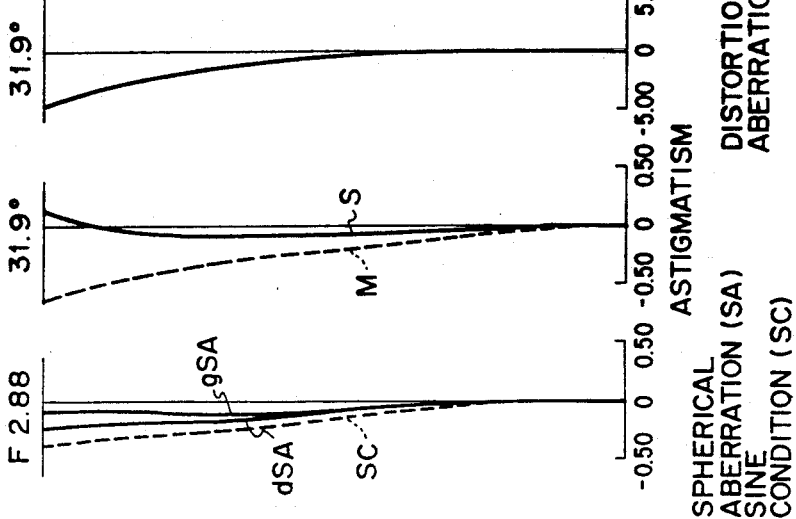

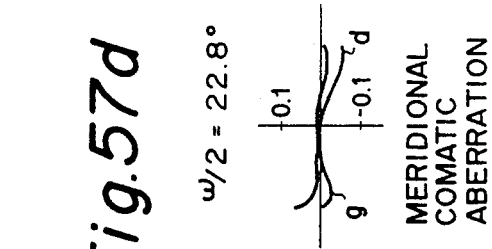
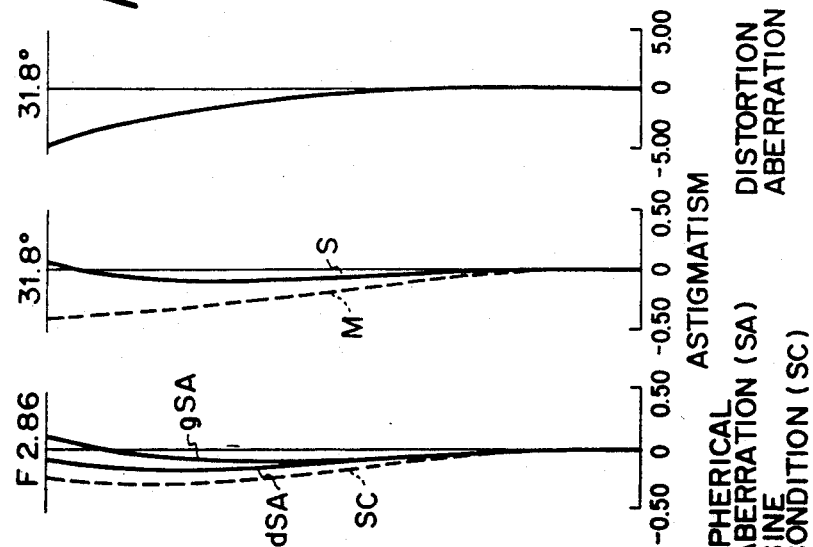
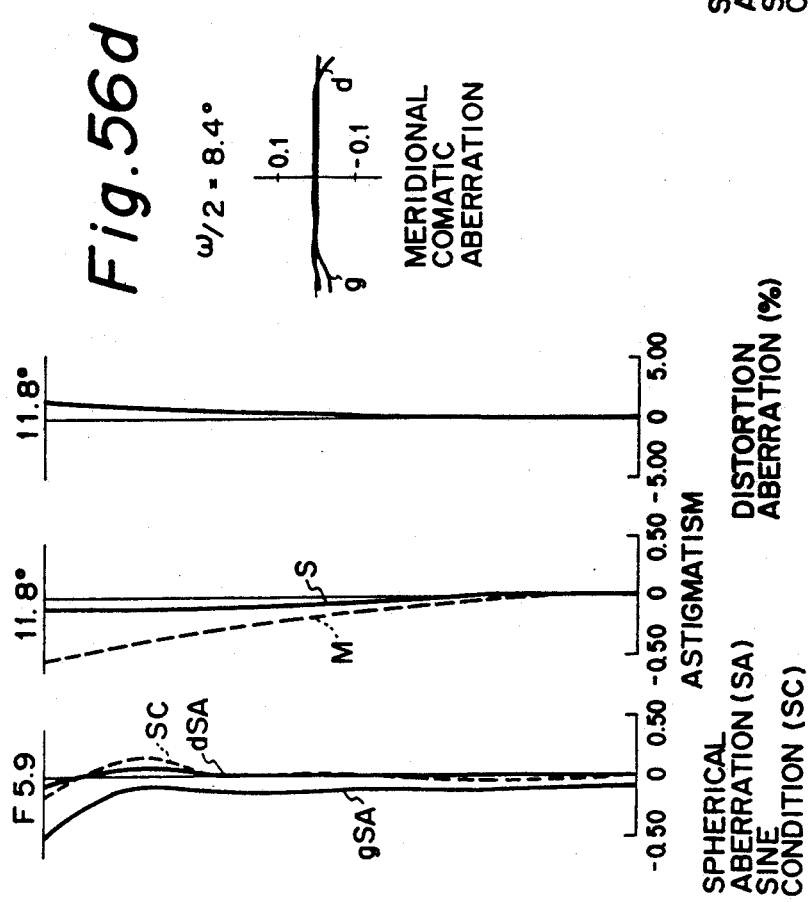

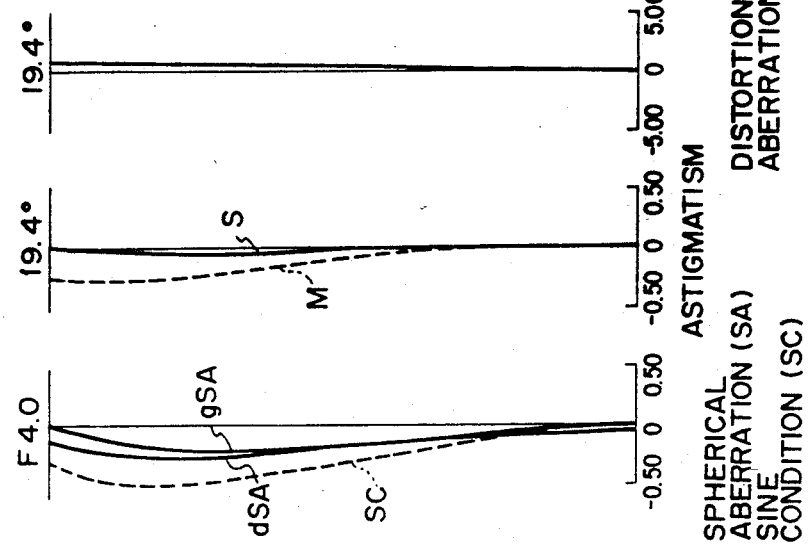
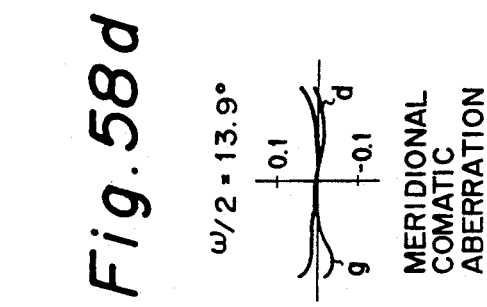
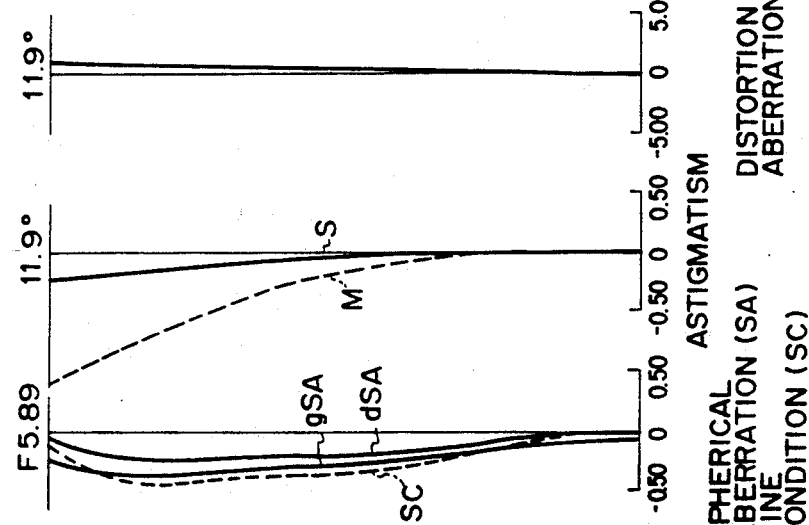
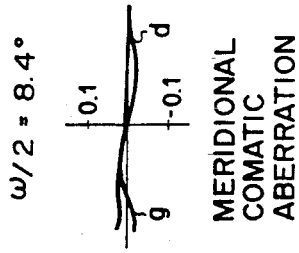
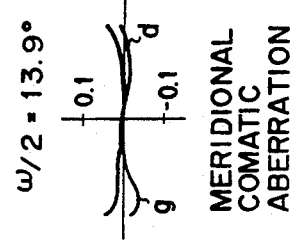

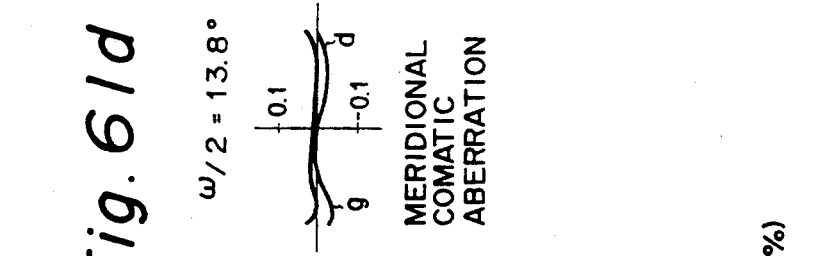
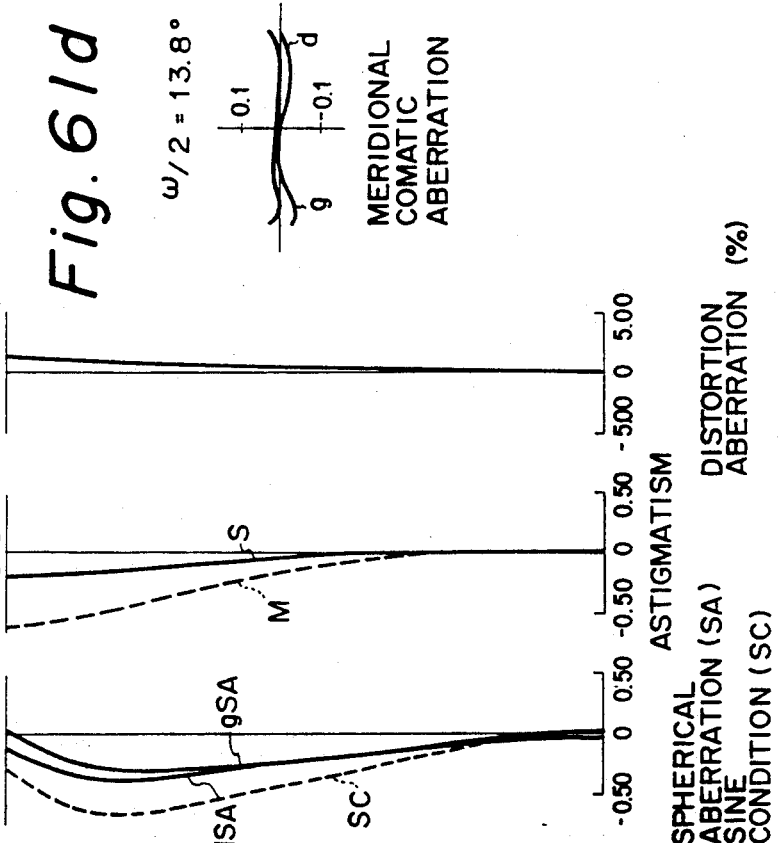
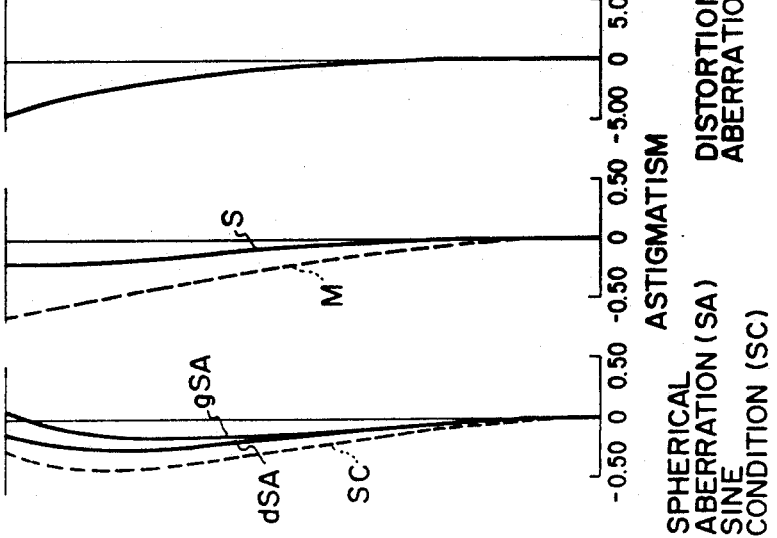

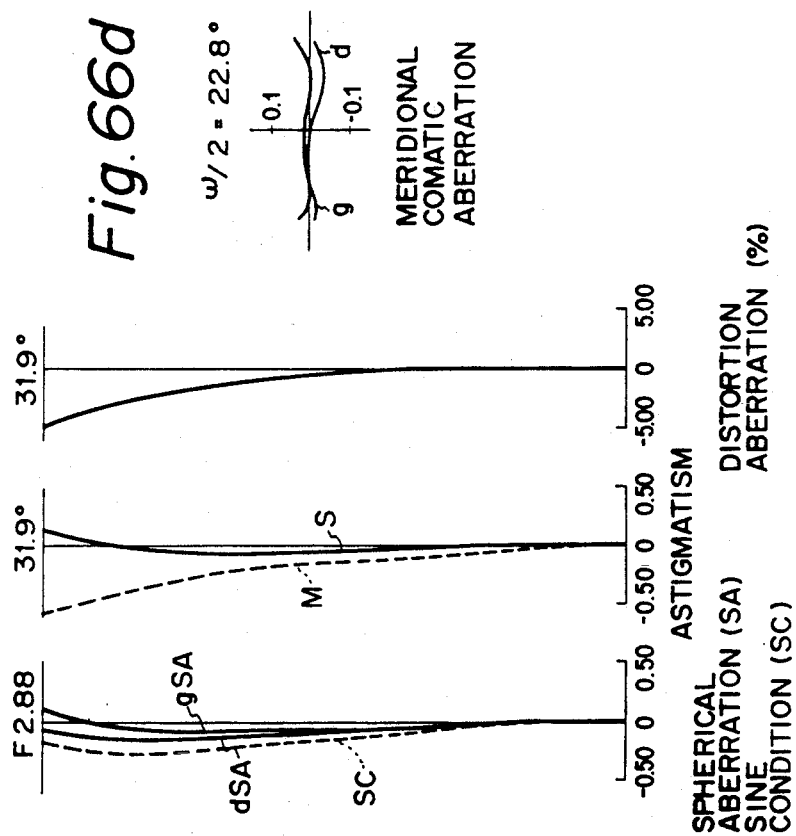
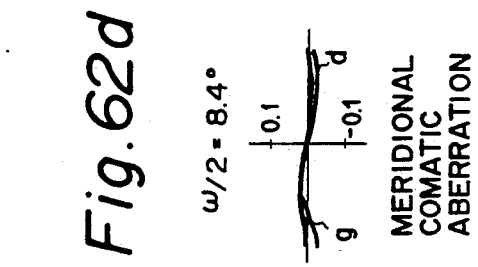
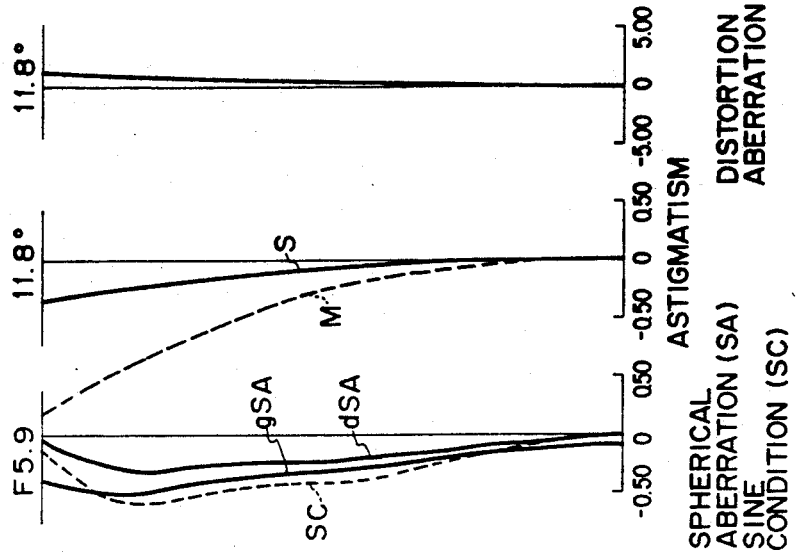

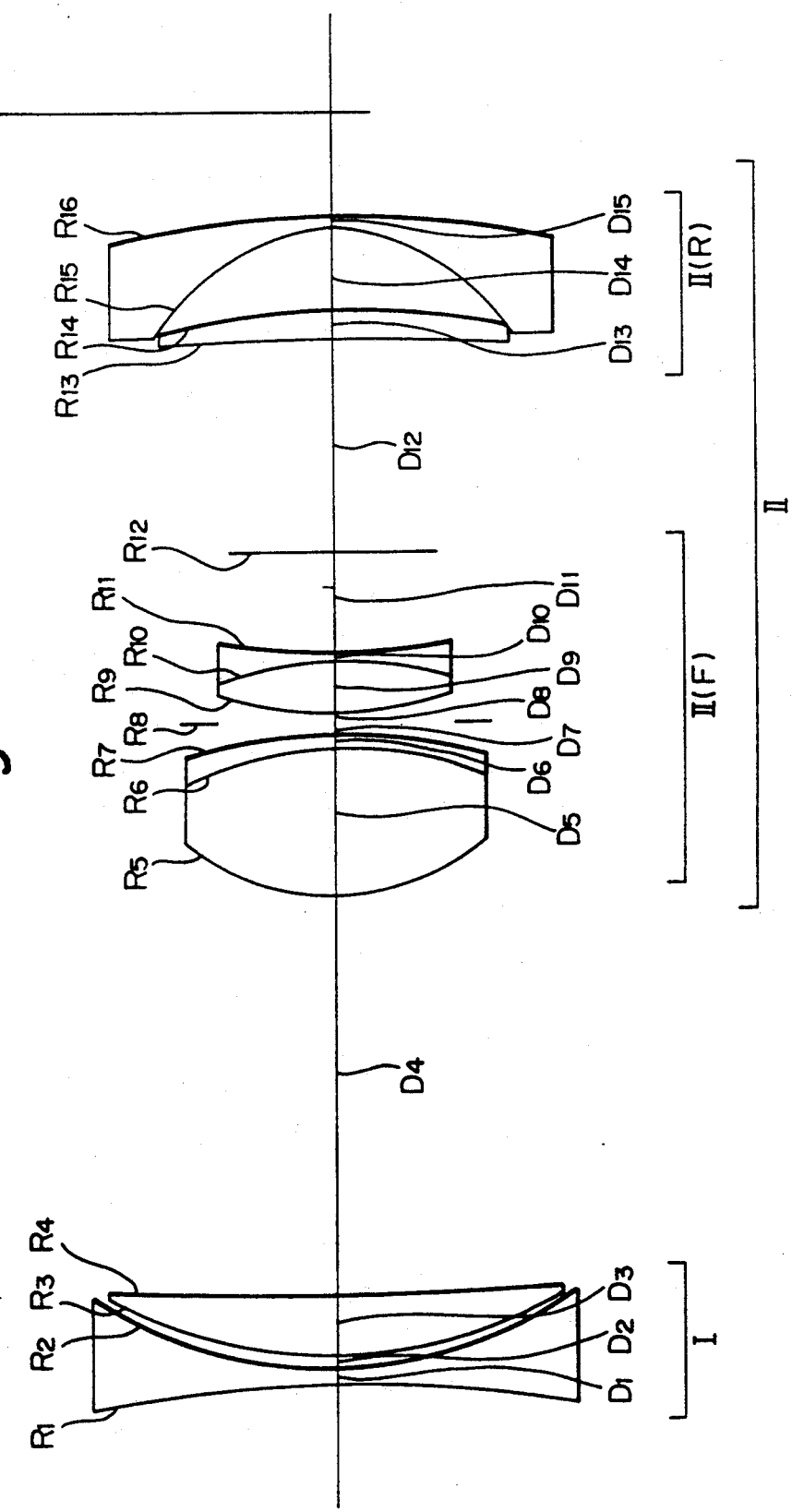

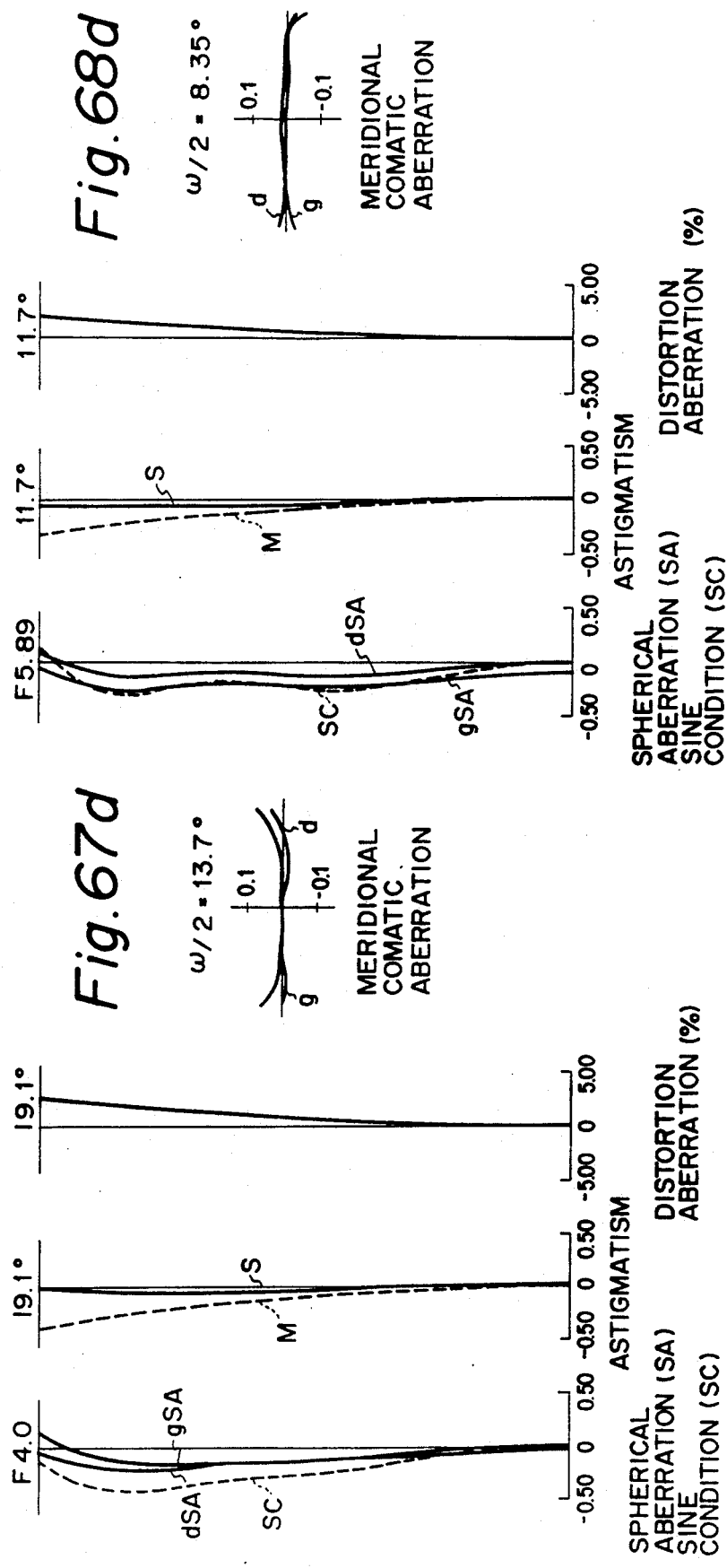

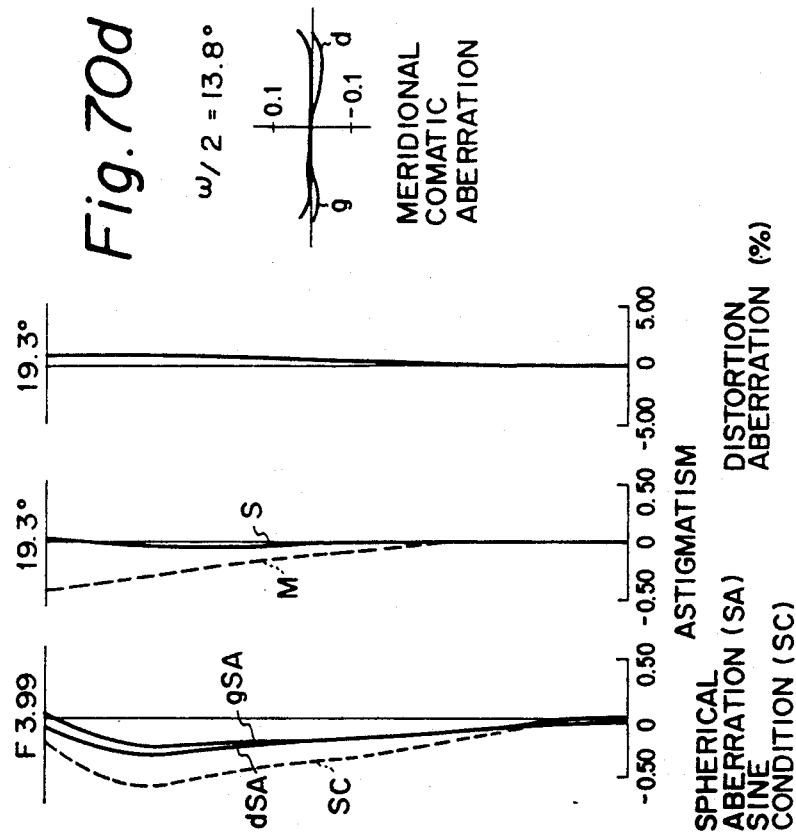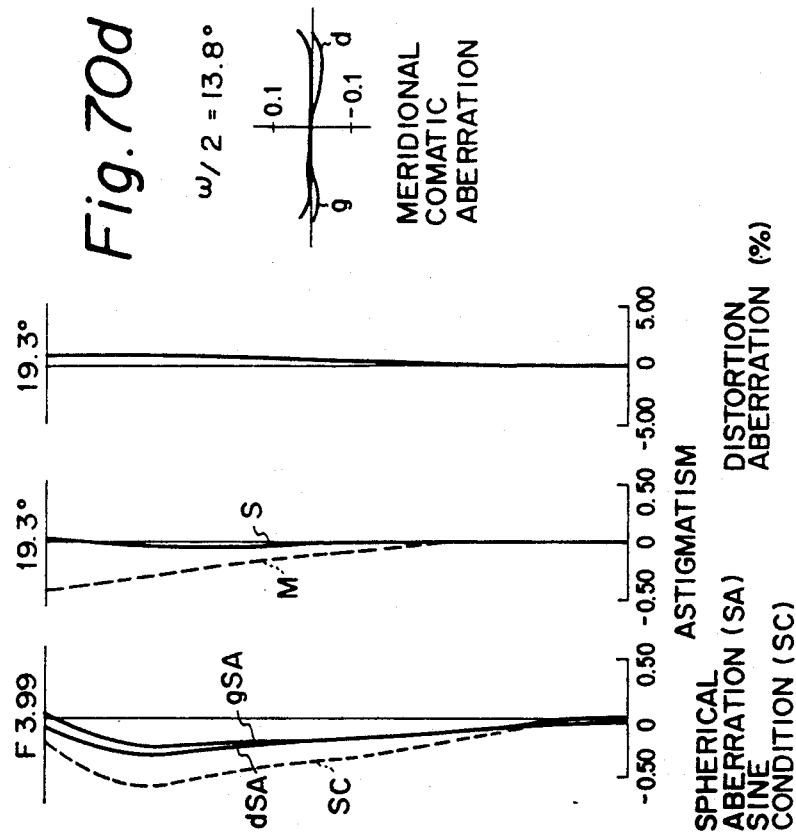

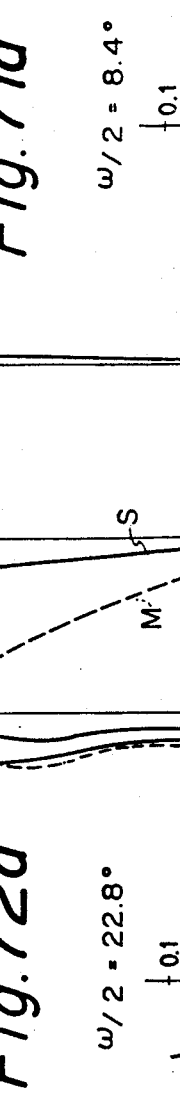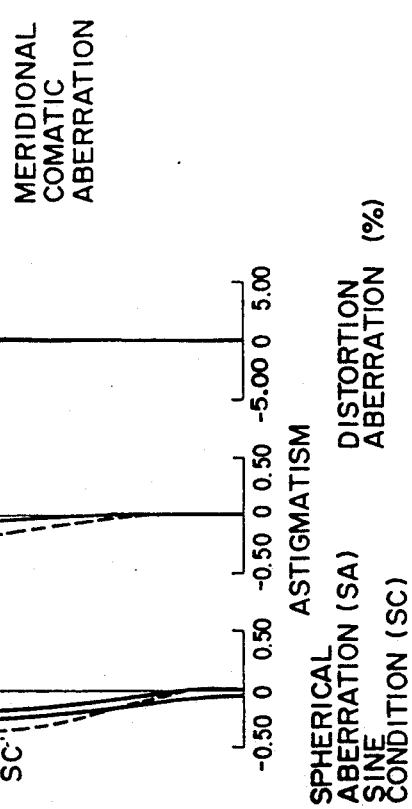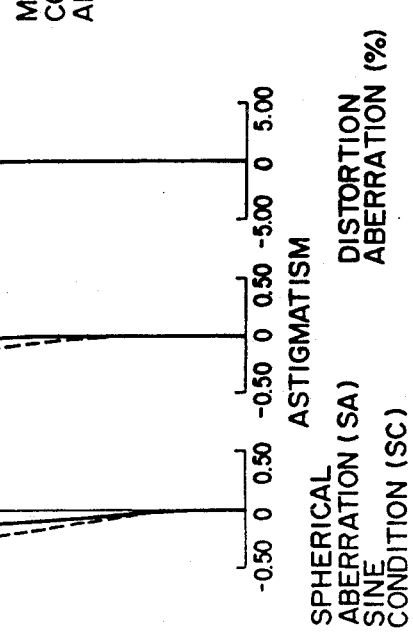

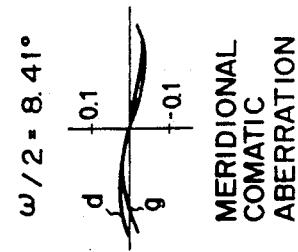
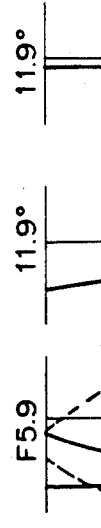
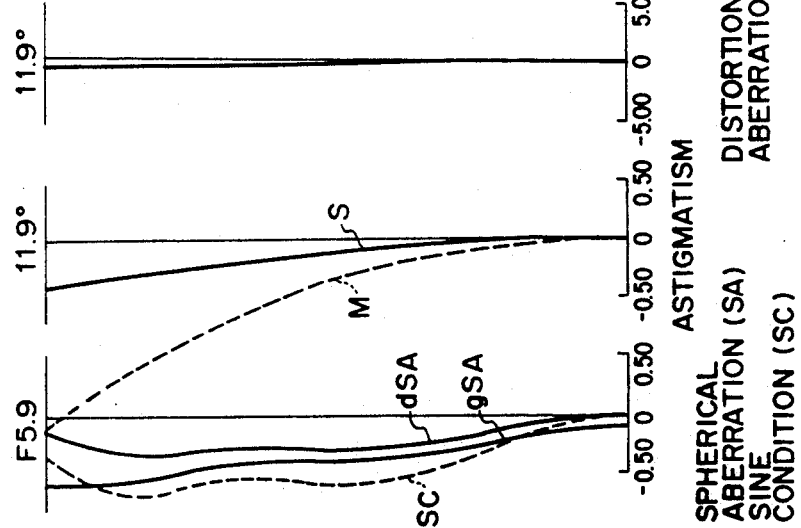
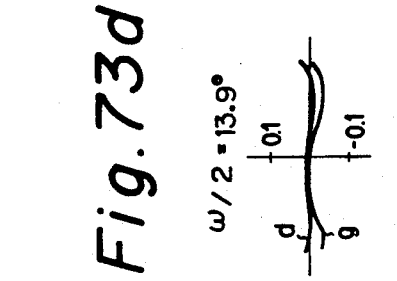
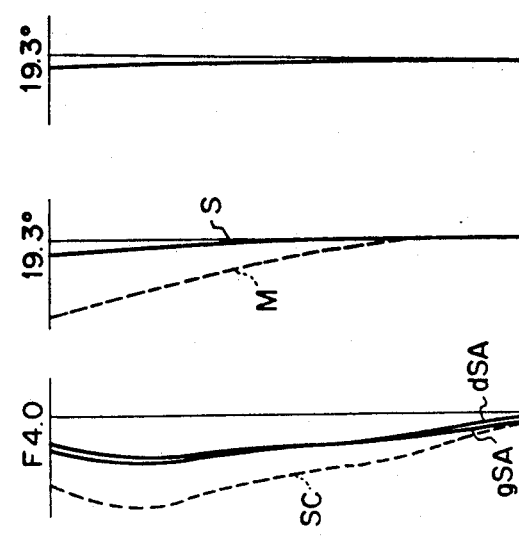
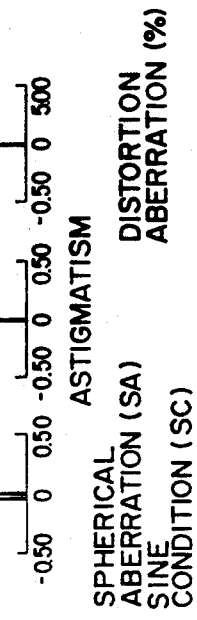
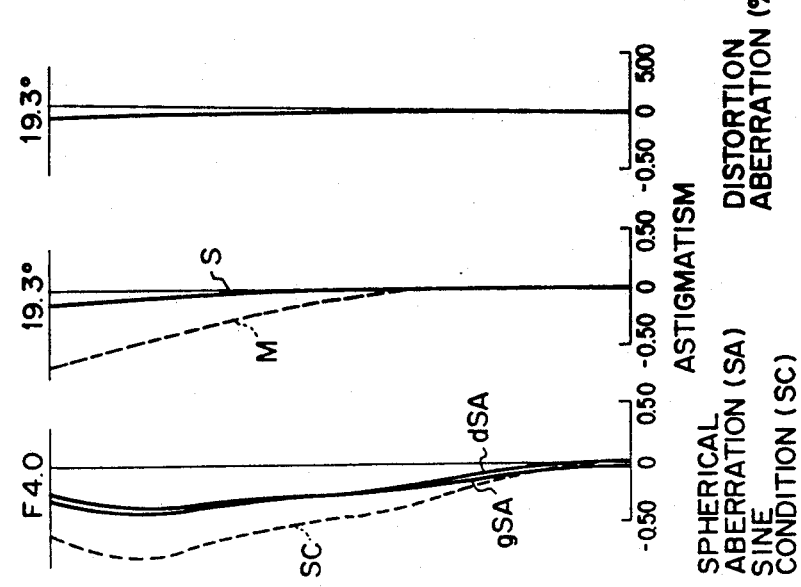

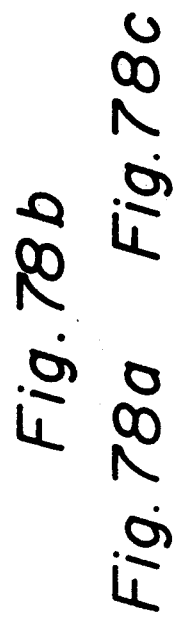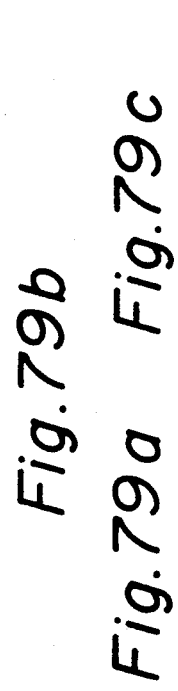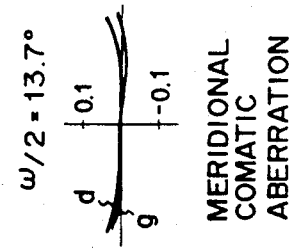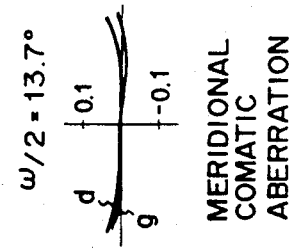

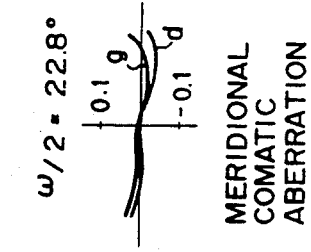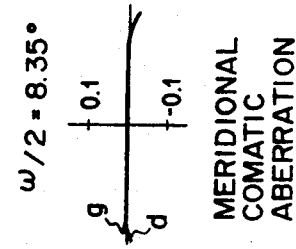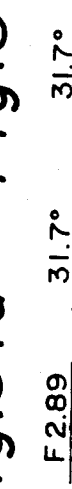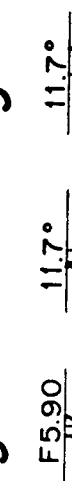

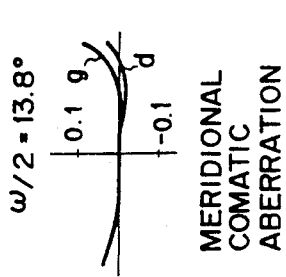
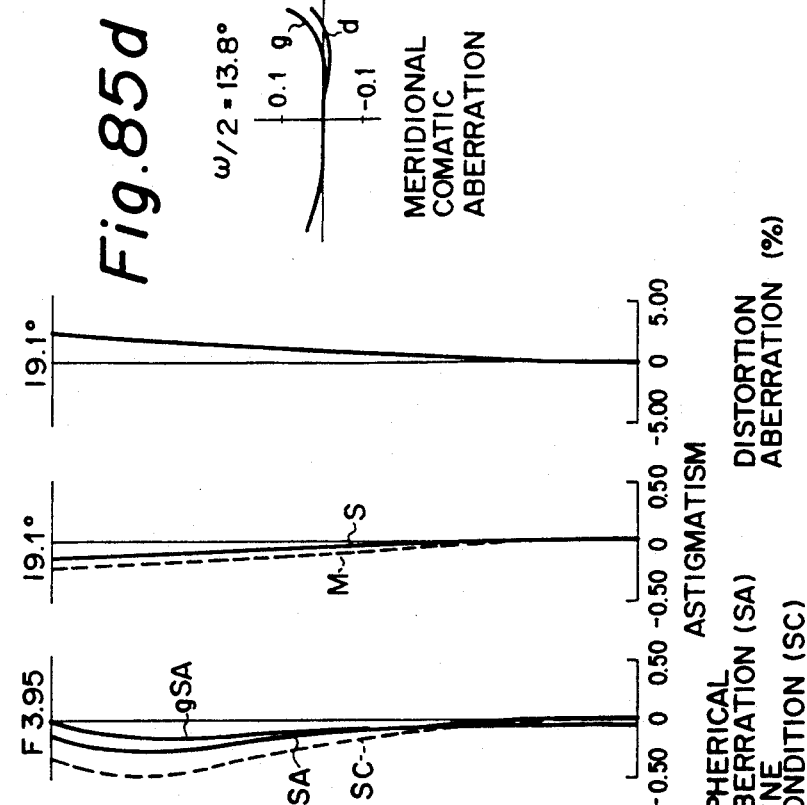
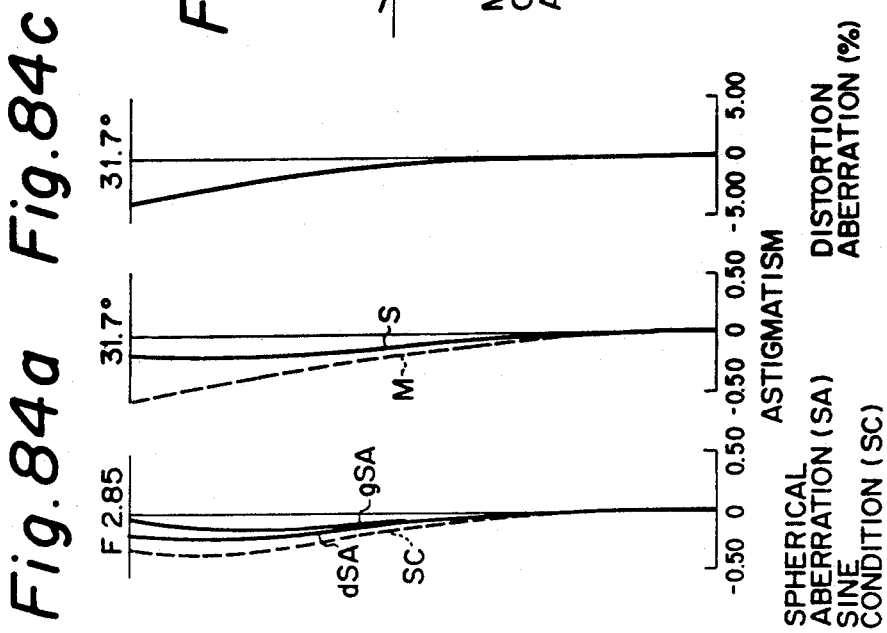

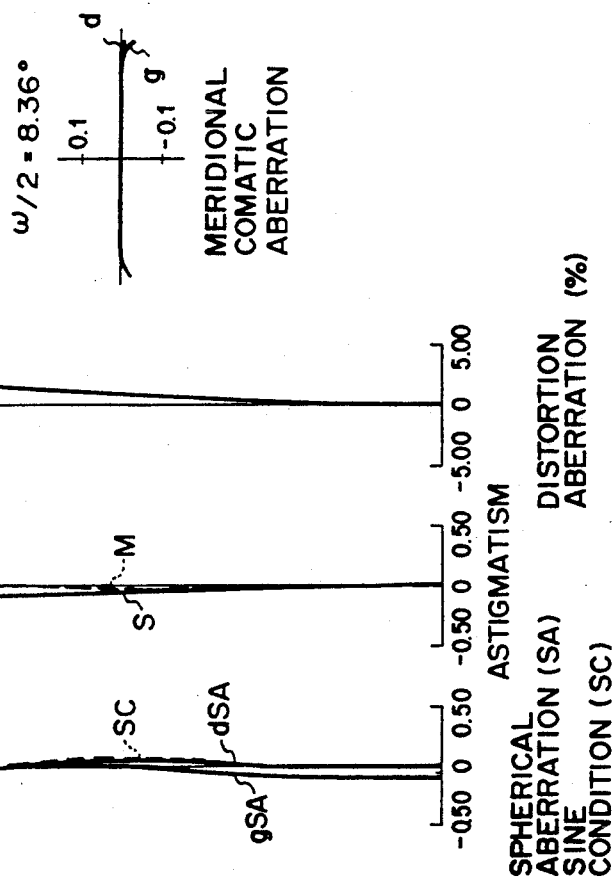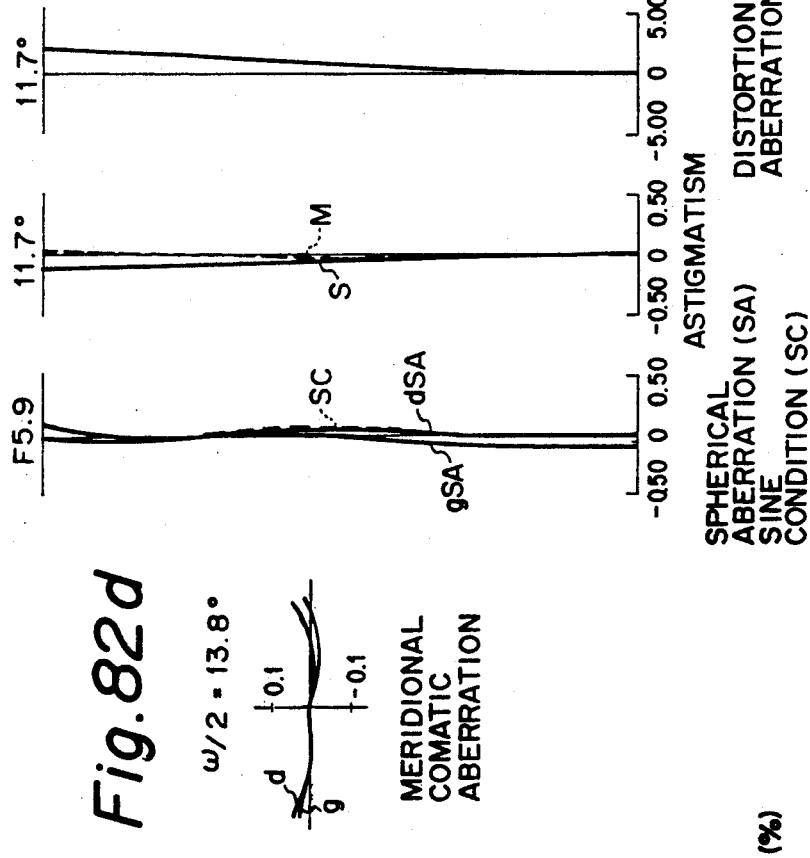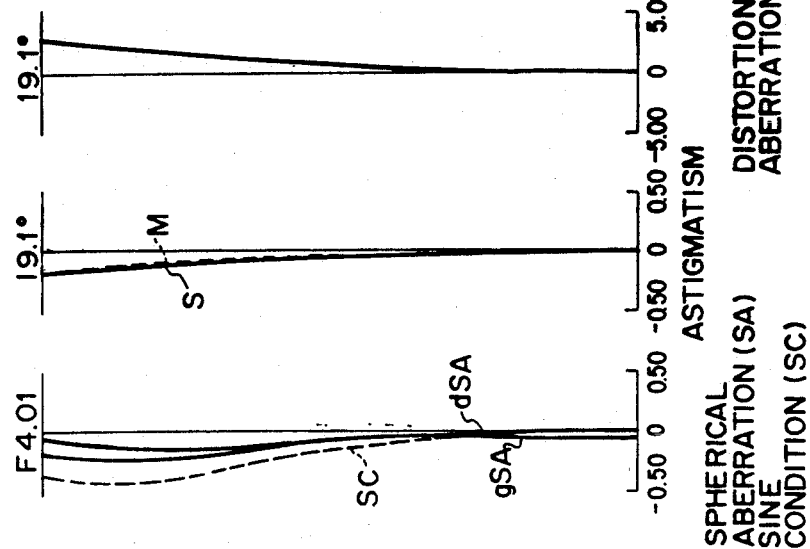

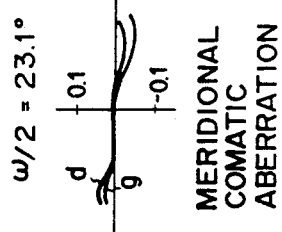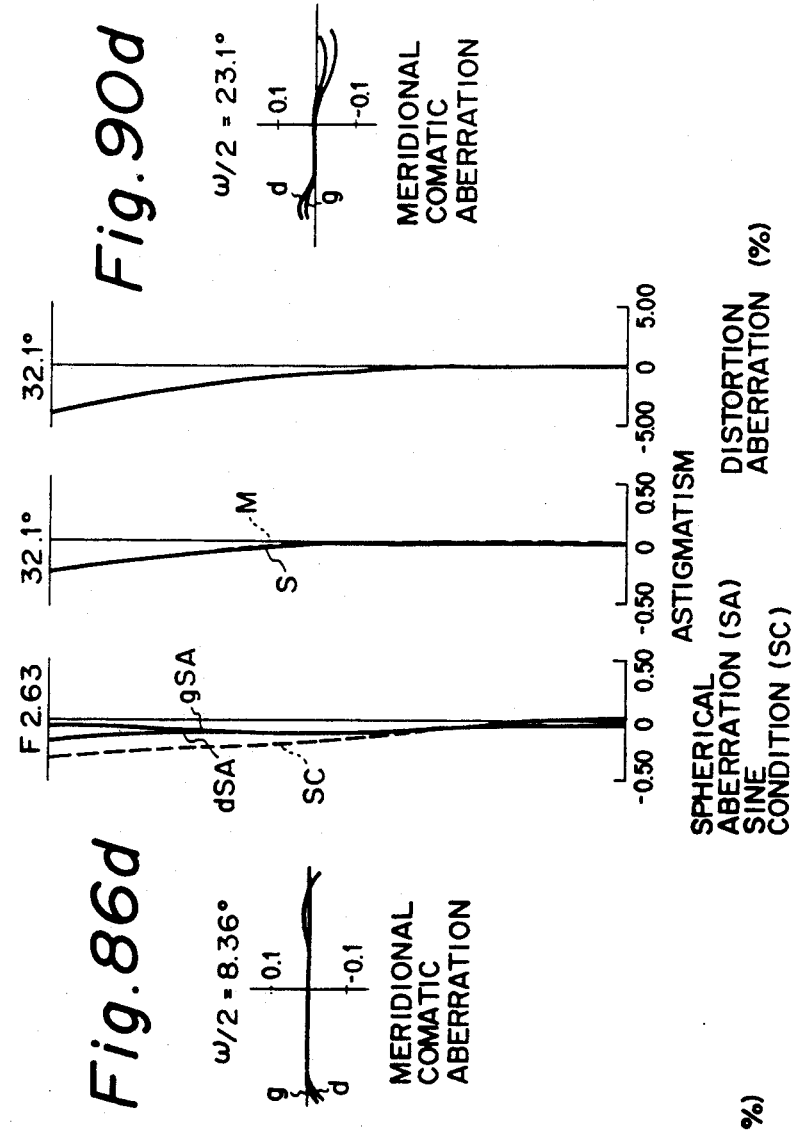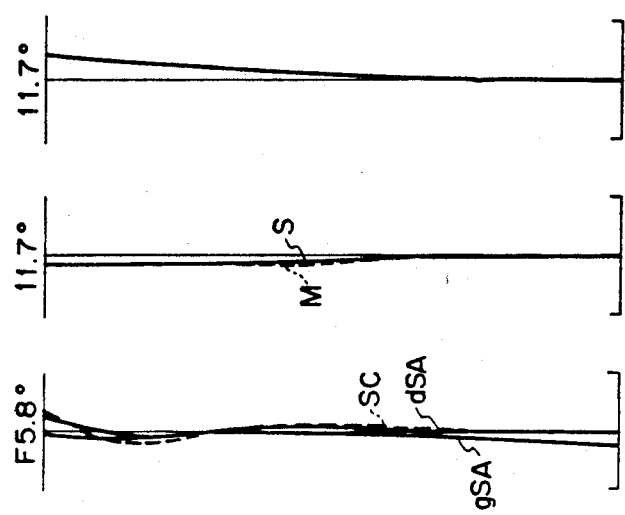

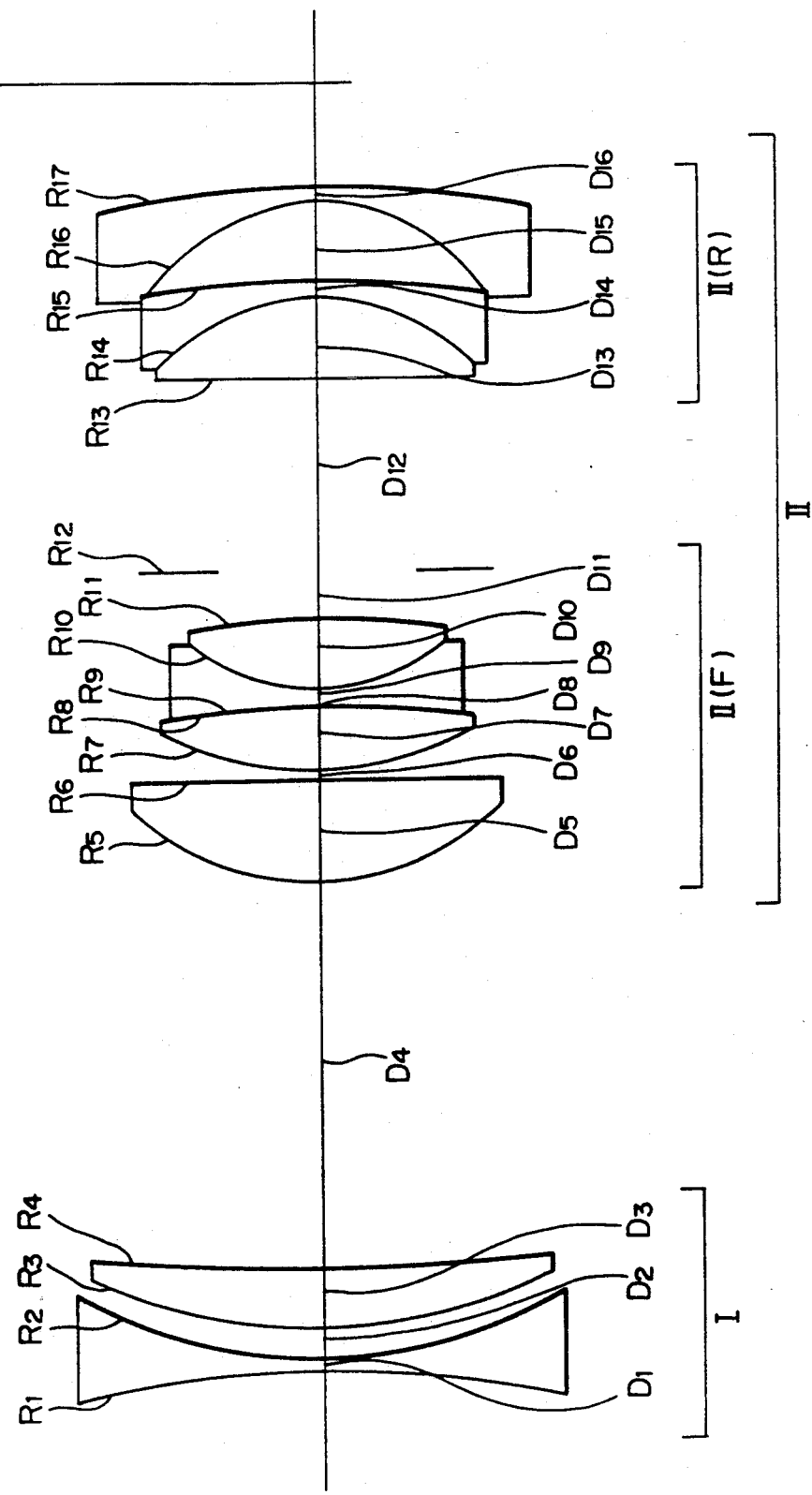

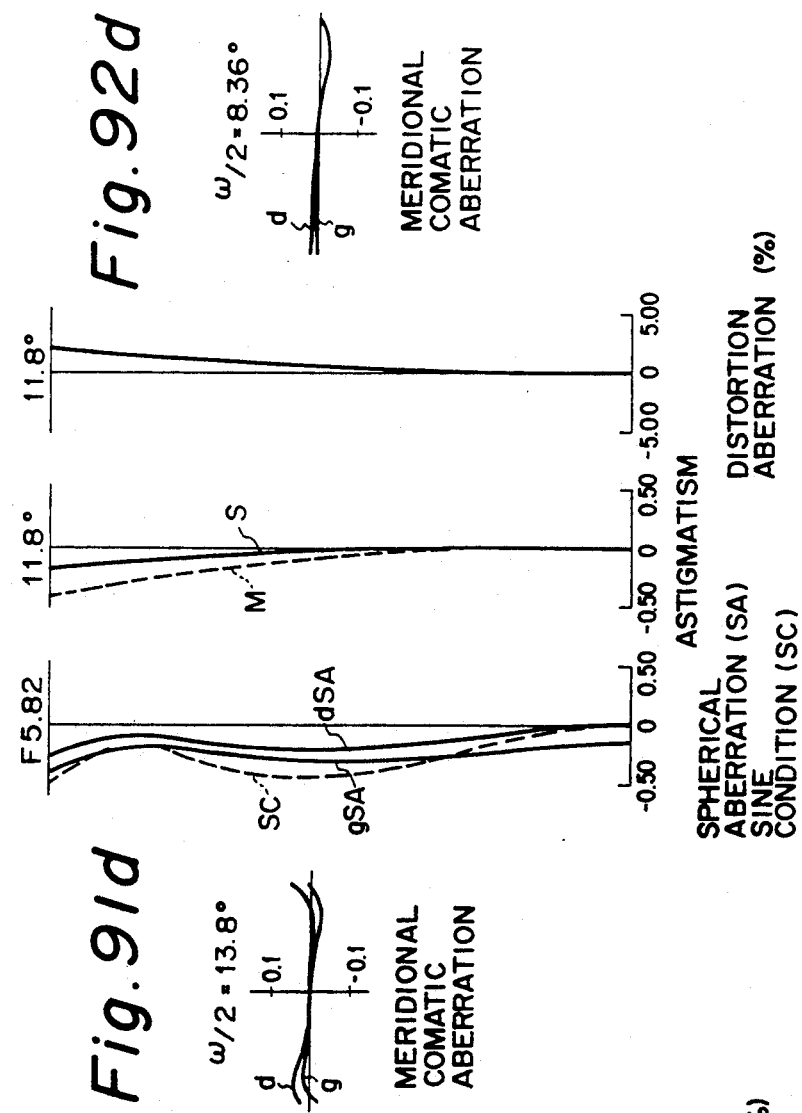

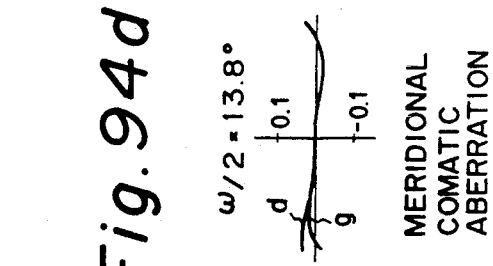
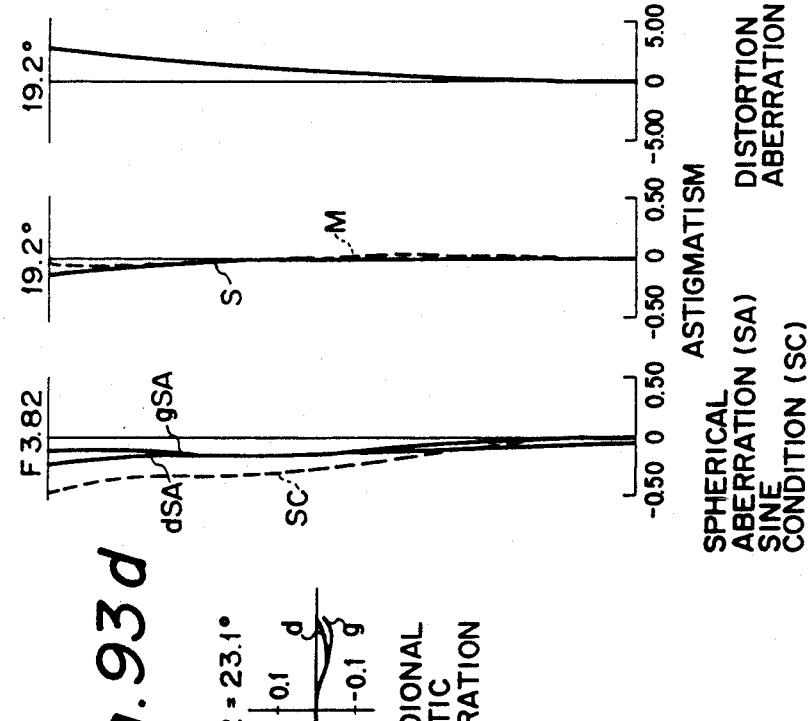
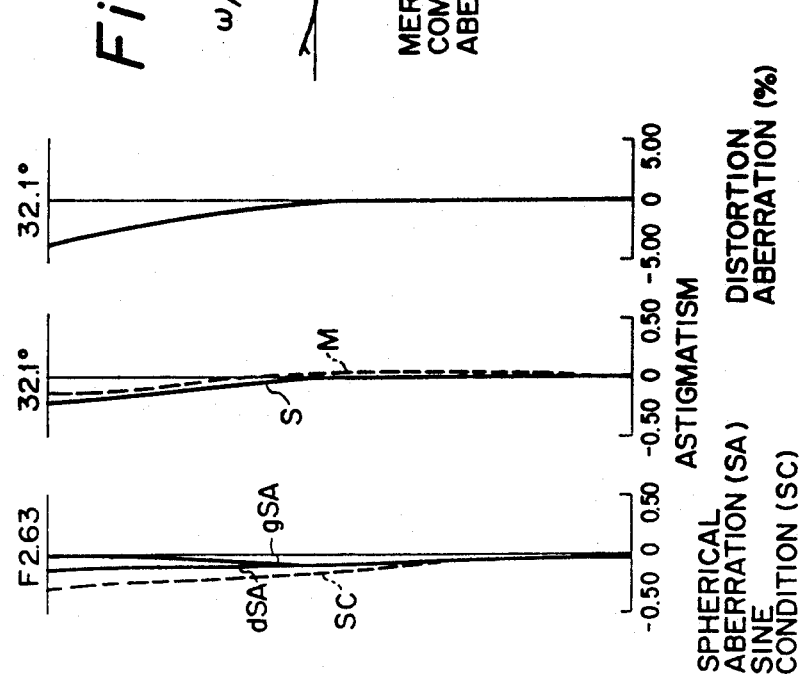

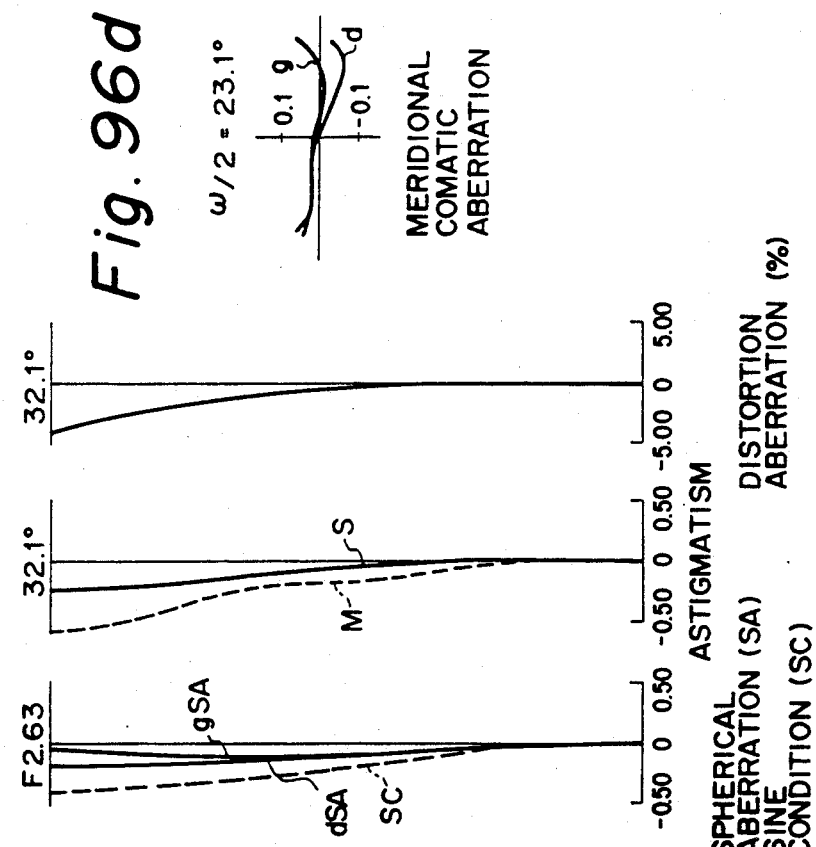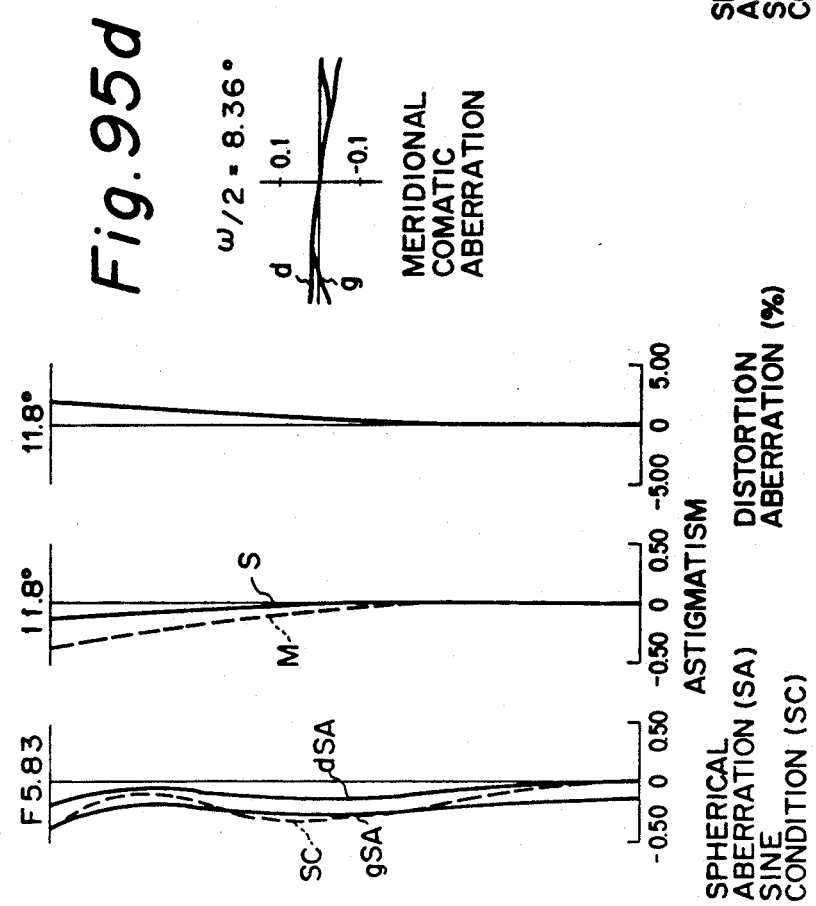

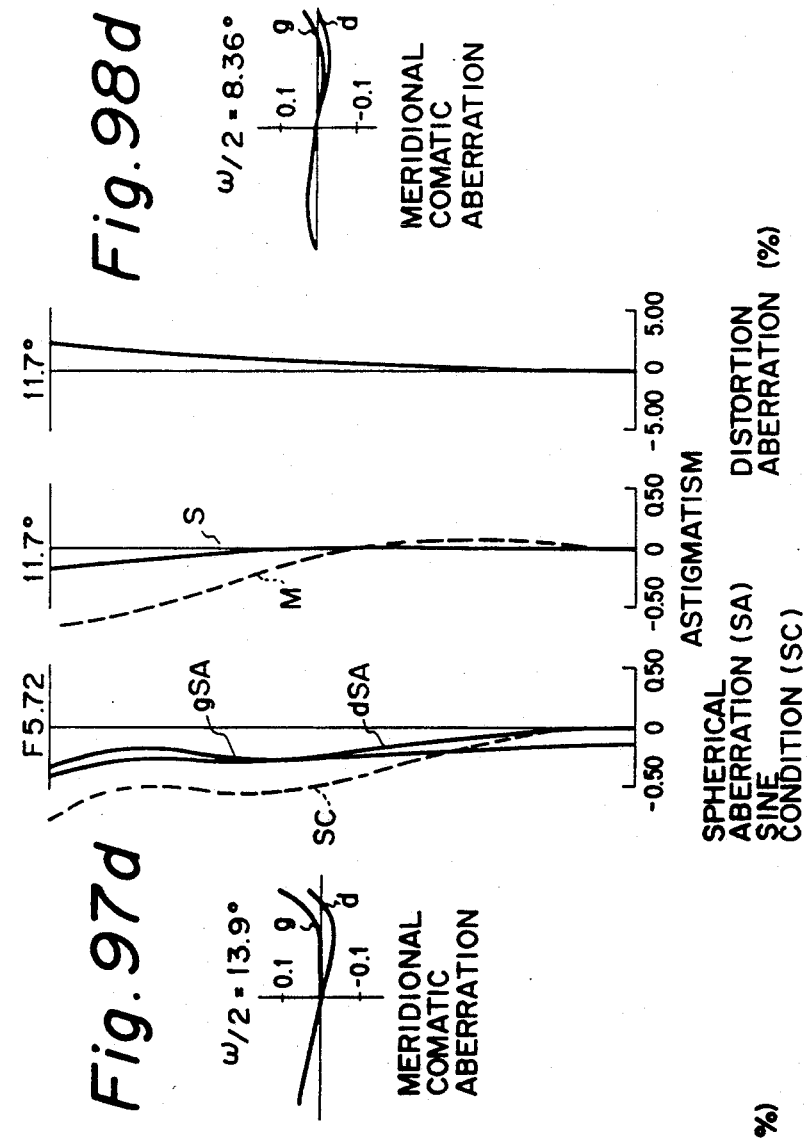

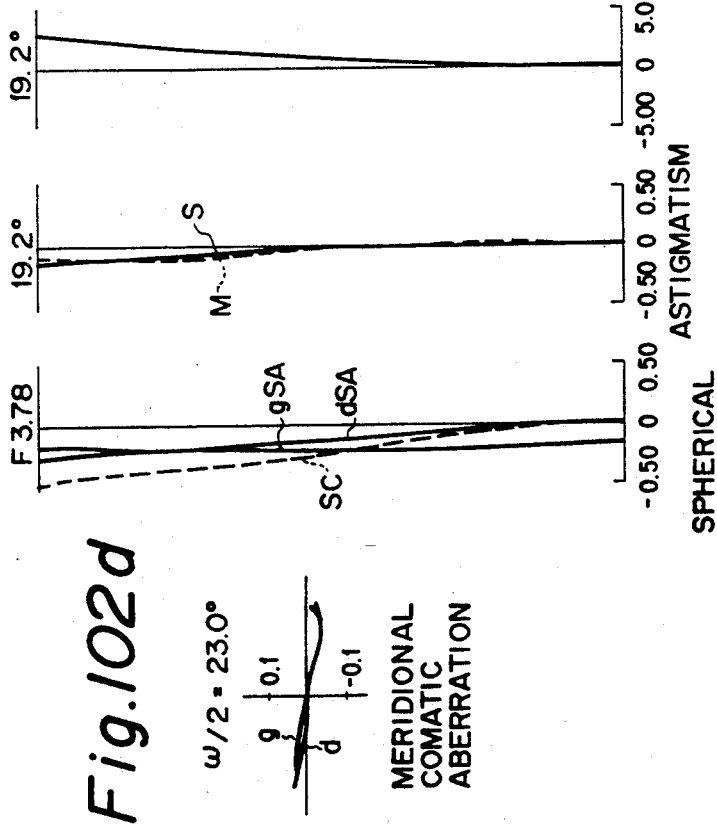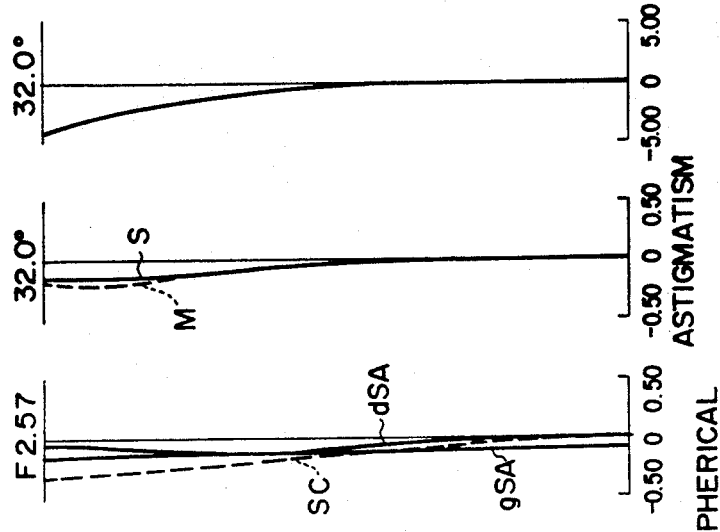

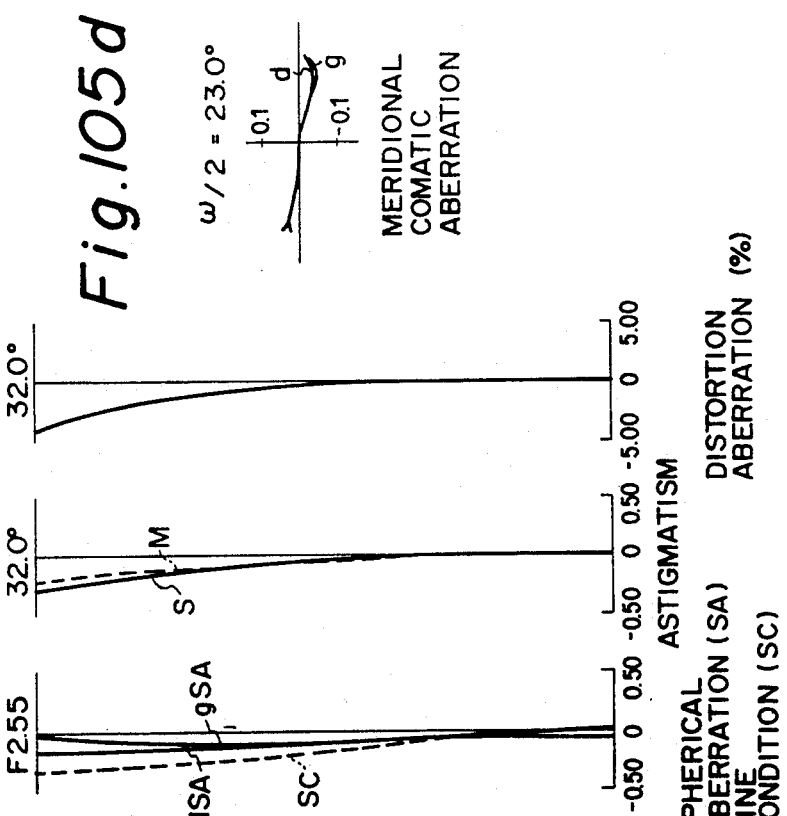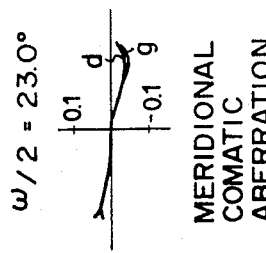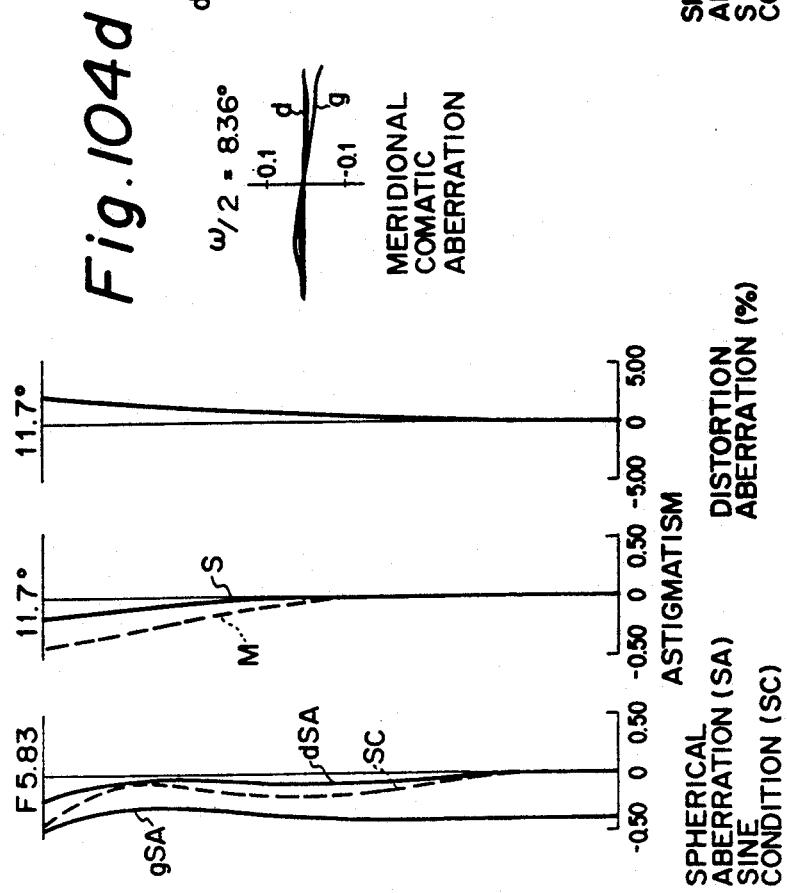

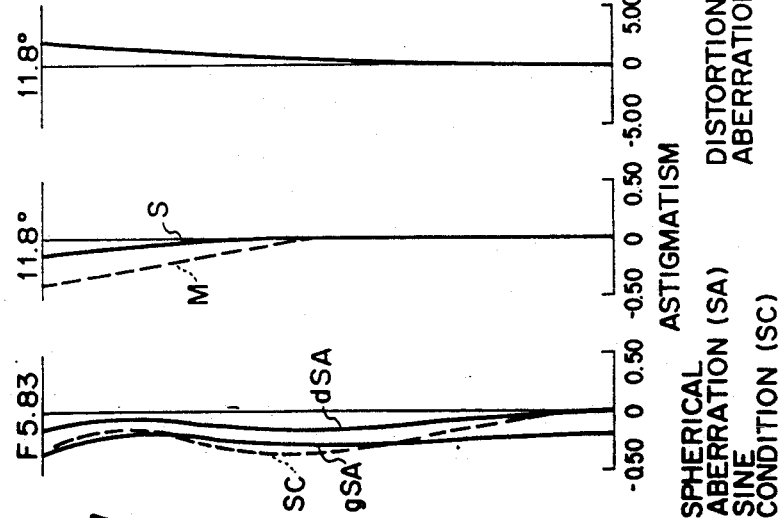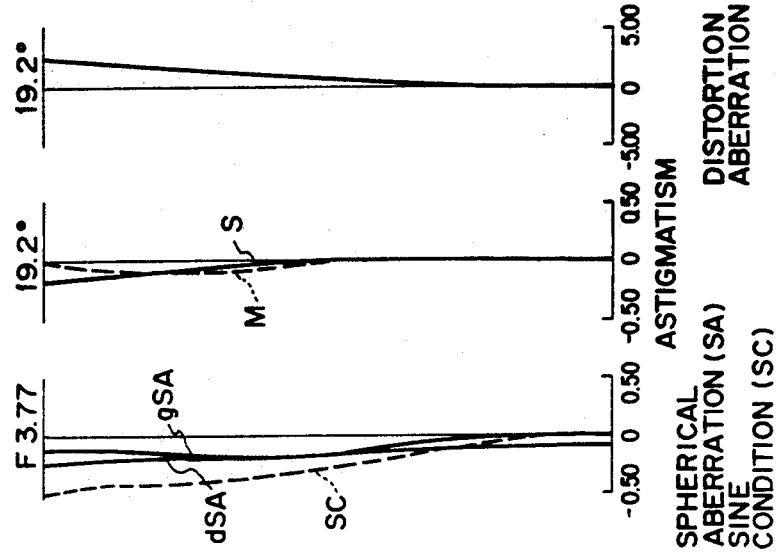

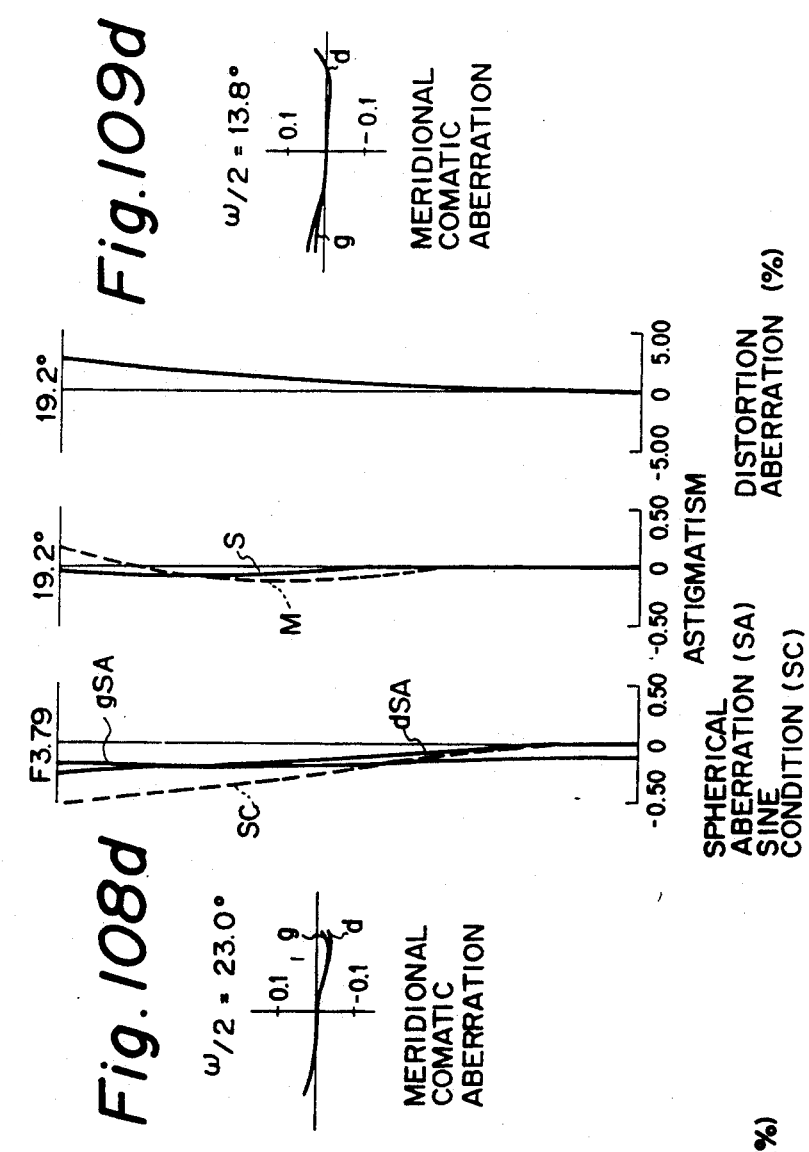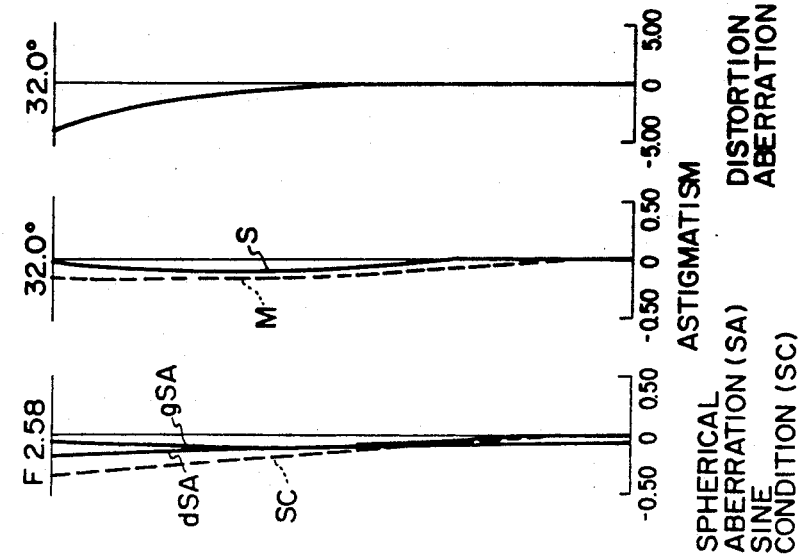

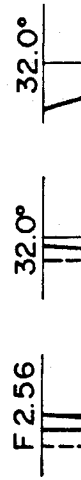
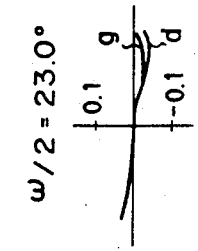
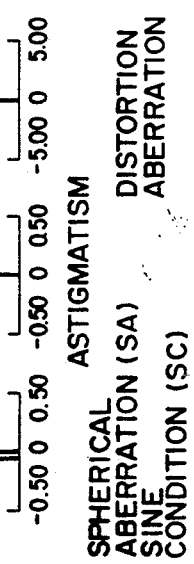
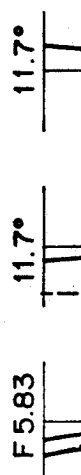
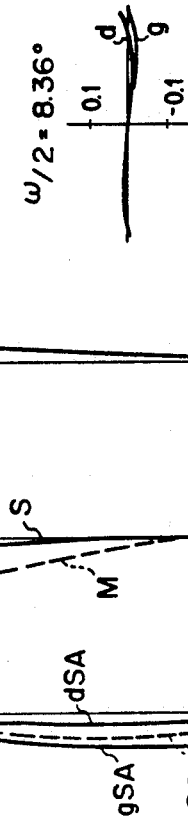
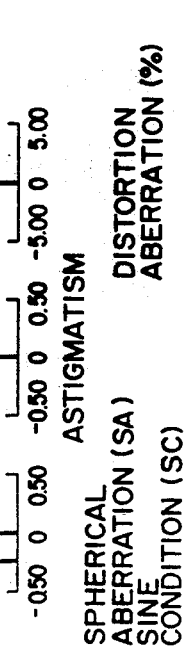

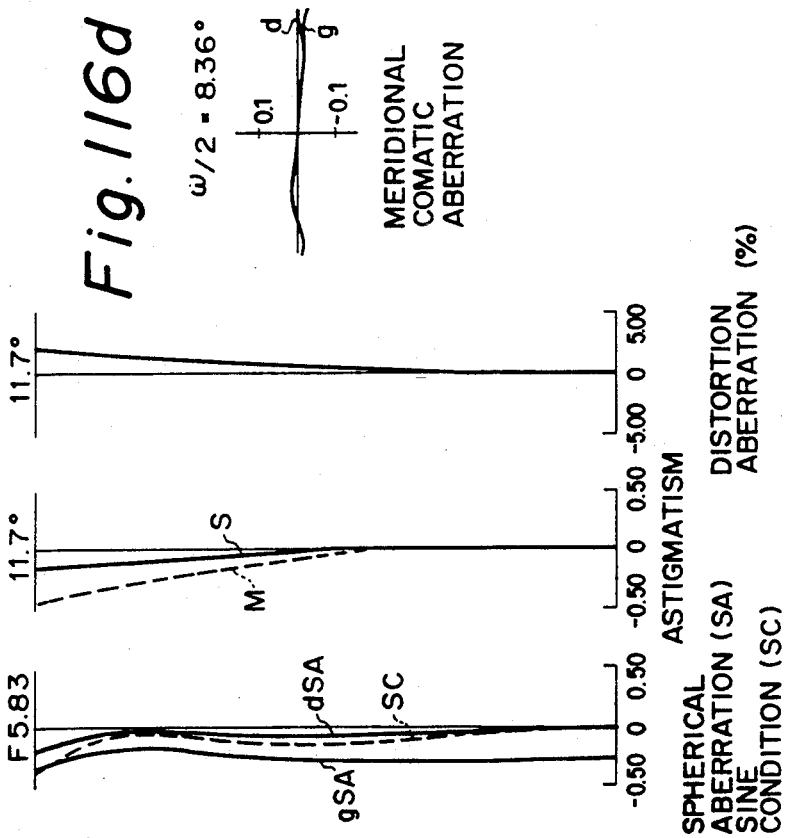
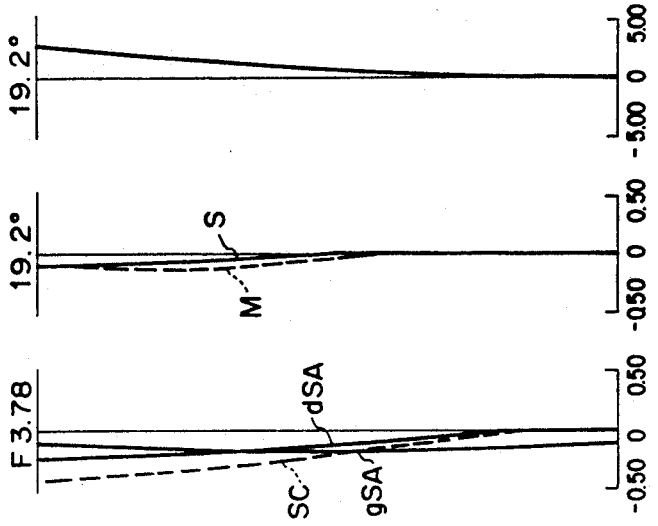

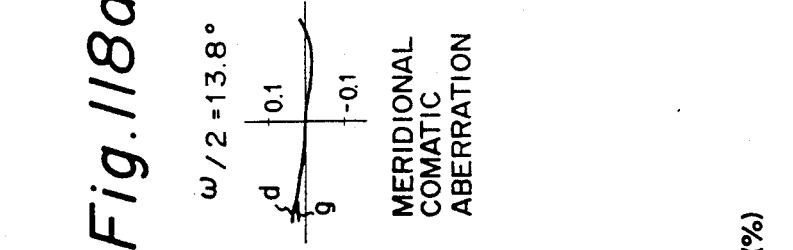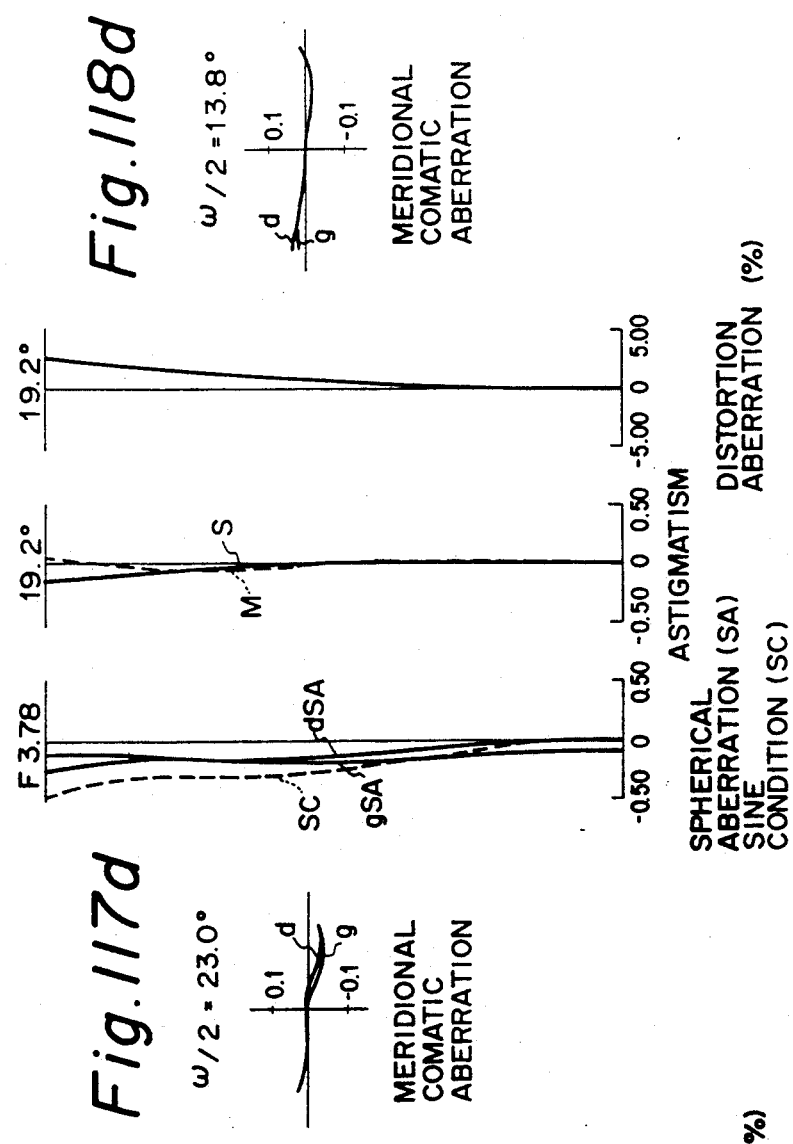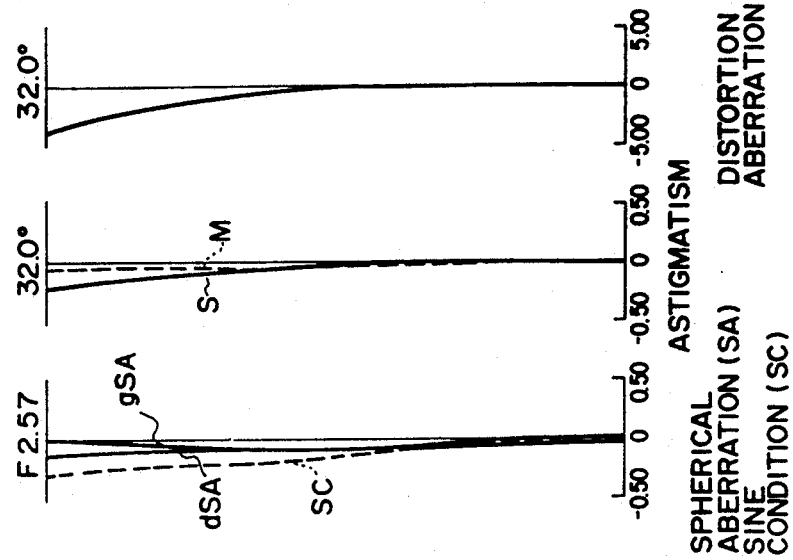

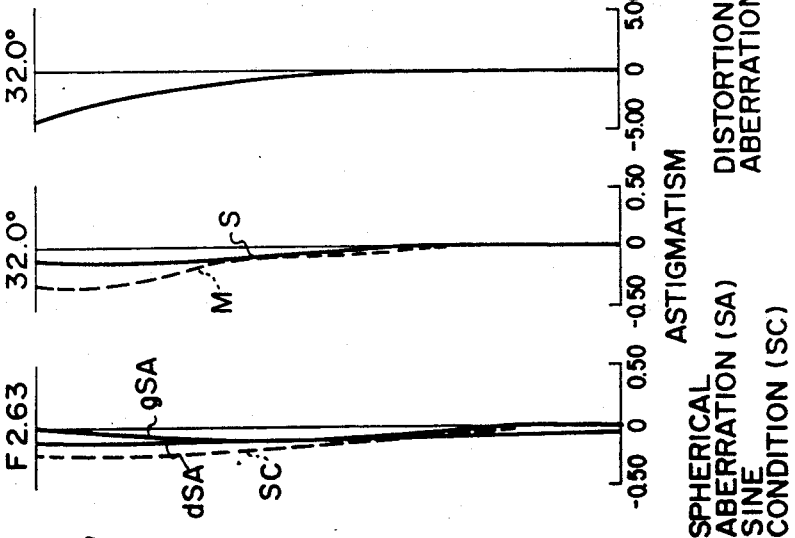
Fig.119a  Fig.119b  Fig.119c
Fig.119d
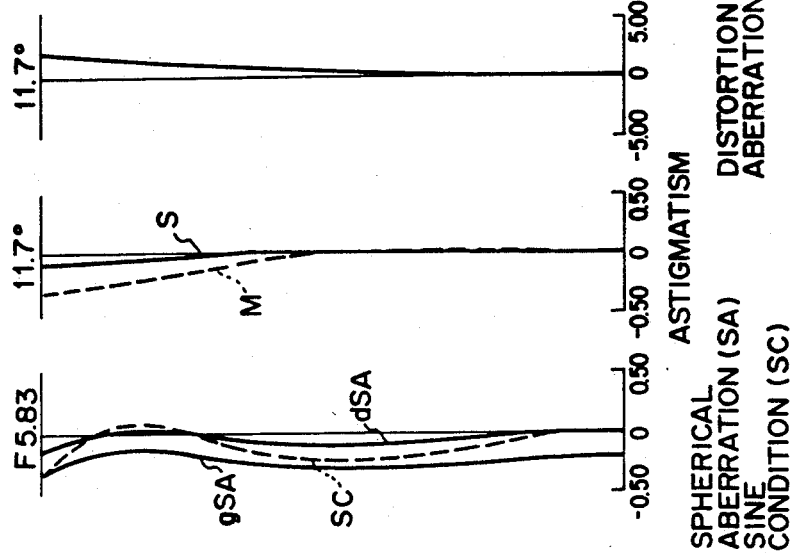
Fig.120a  Fig.120b  Fig.120c
Fig.120d

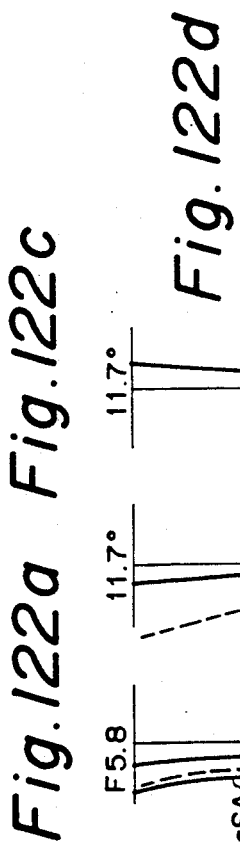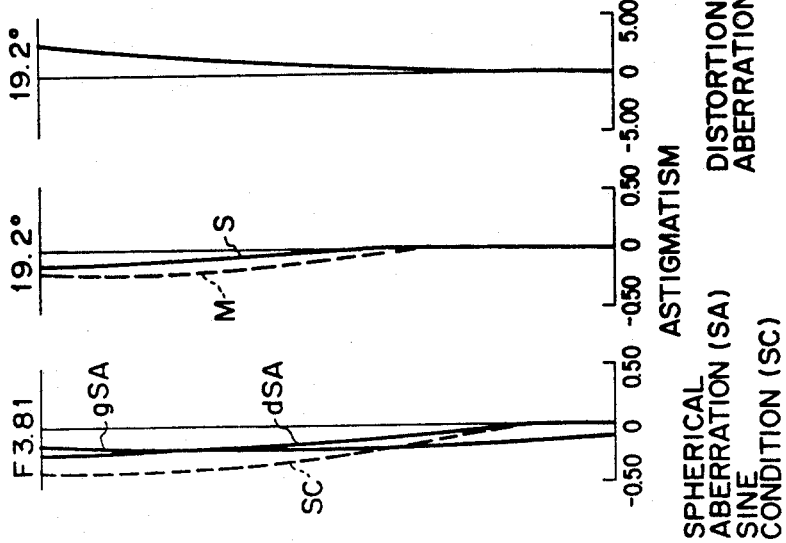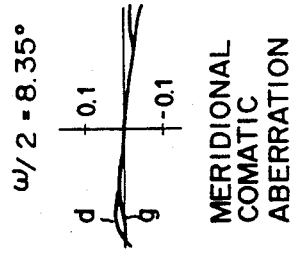

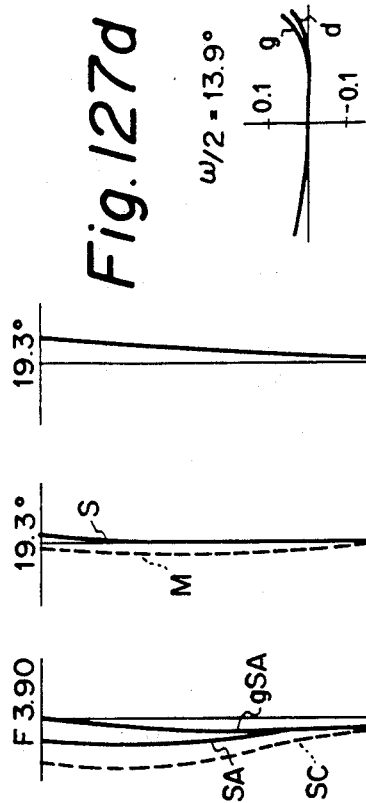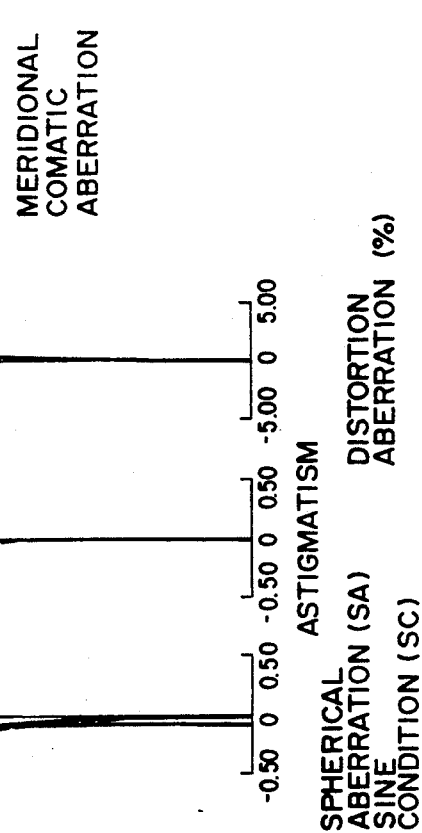

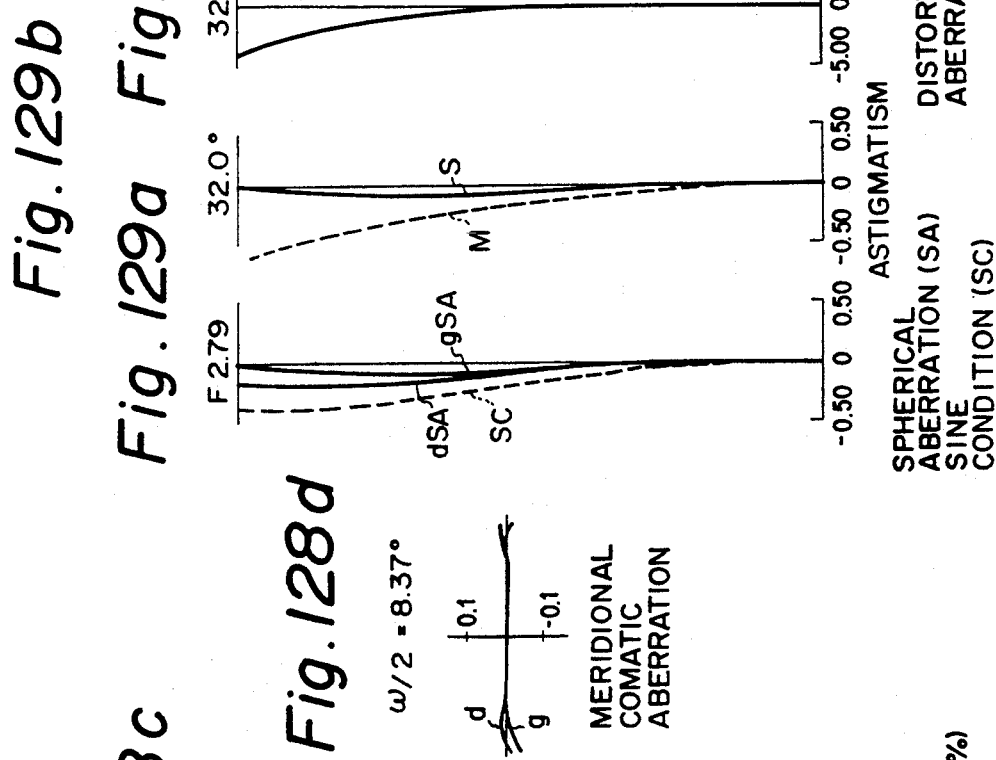
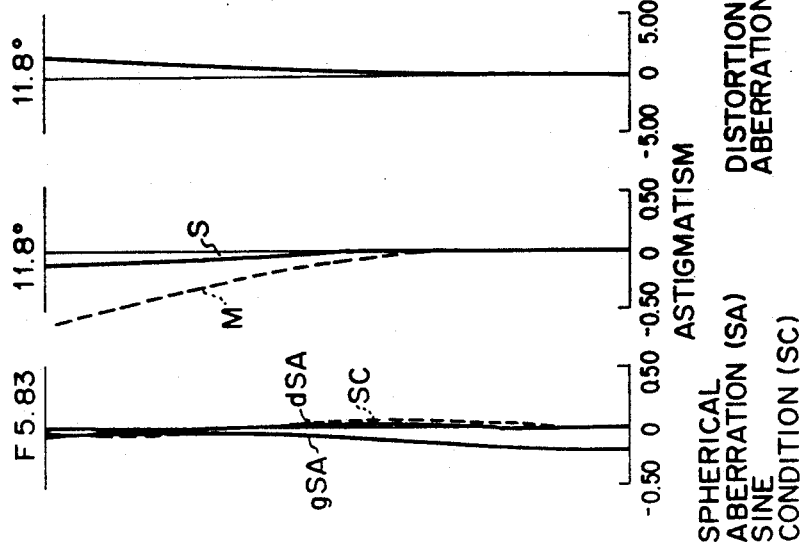

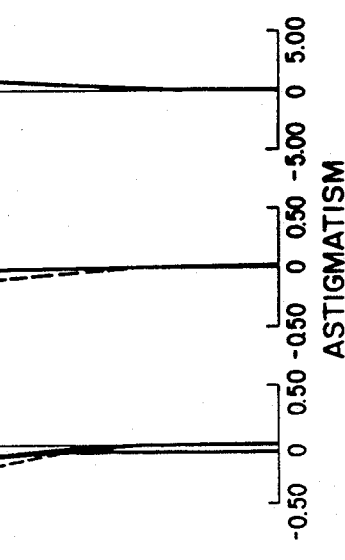
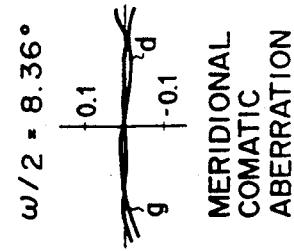

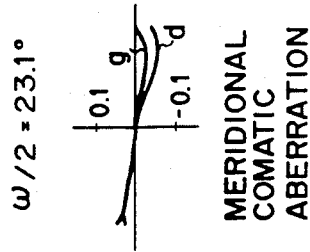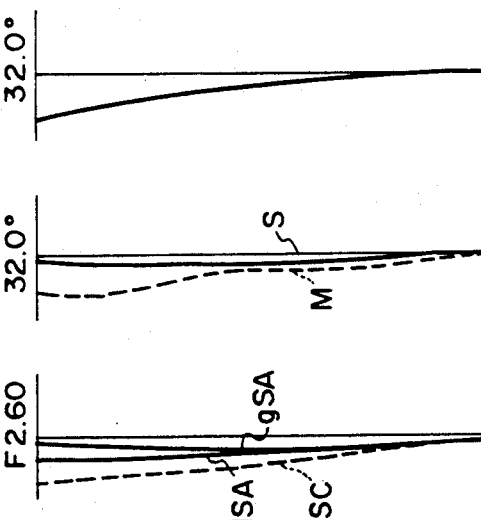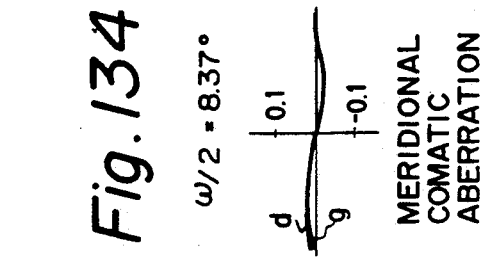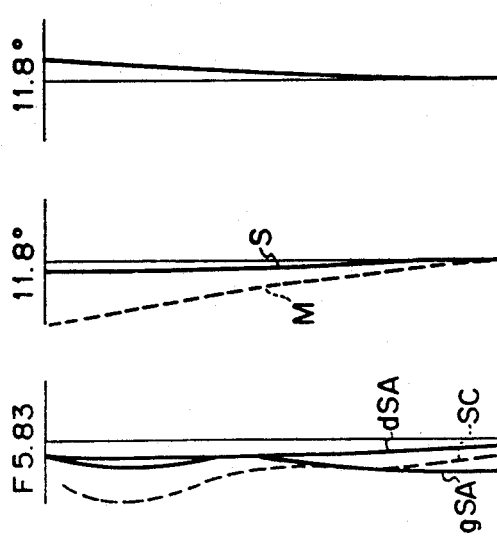

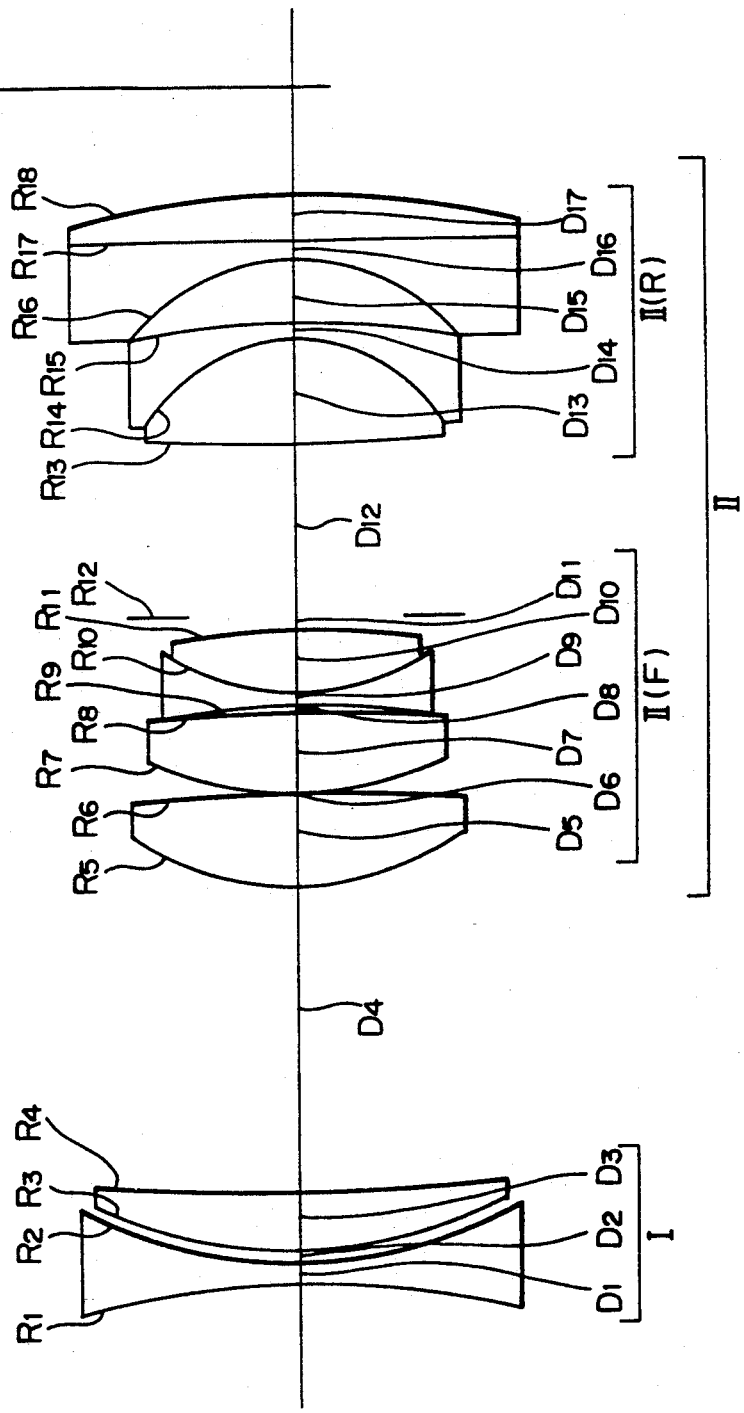

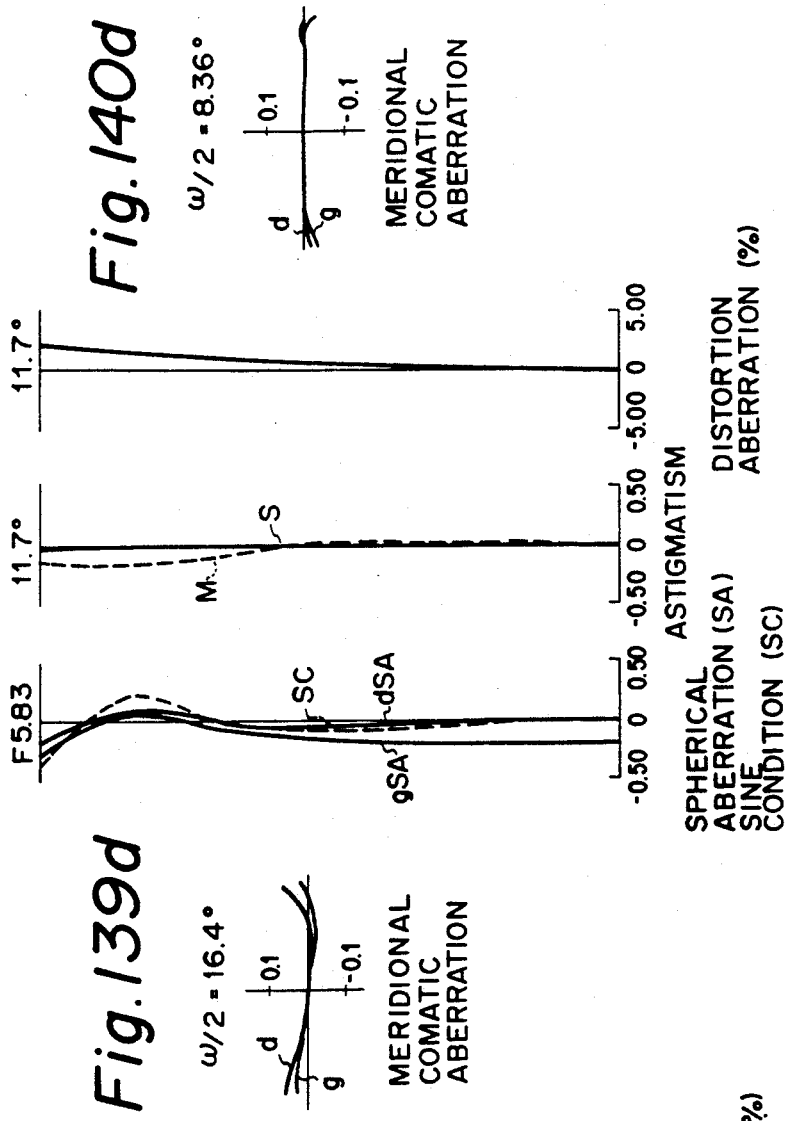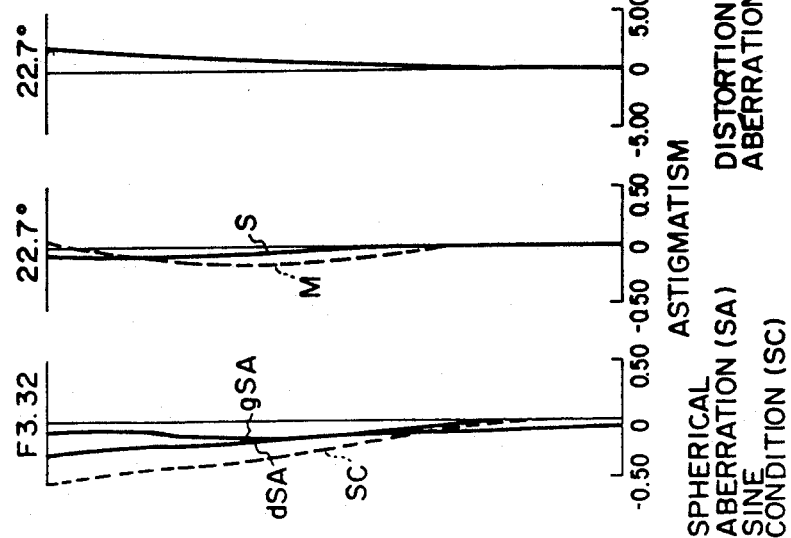

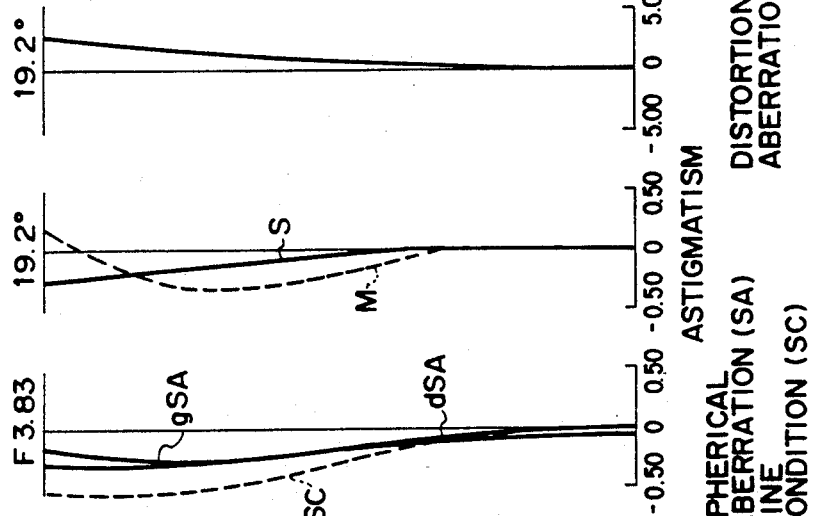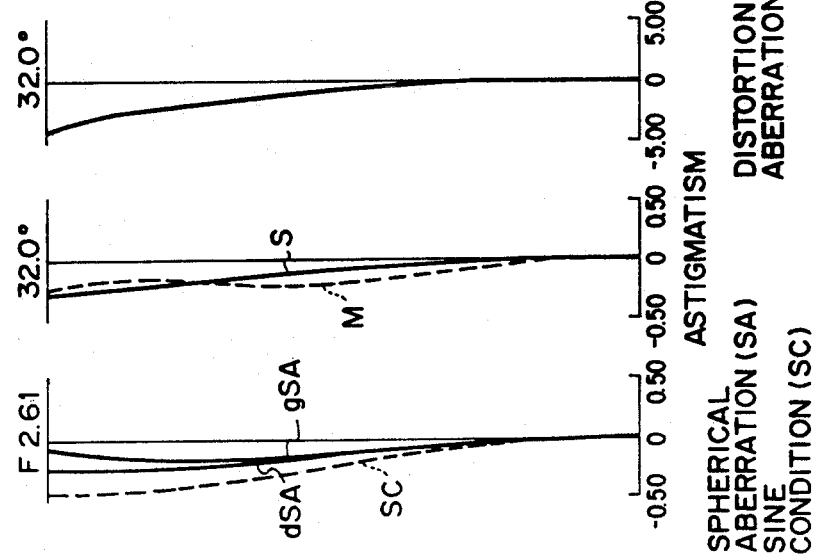

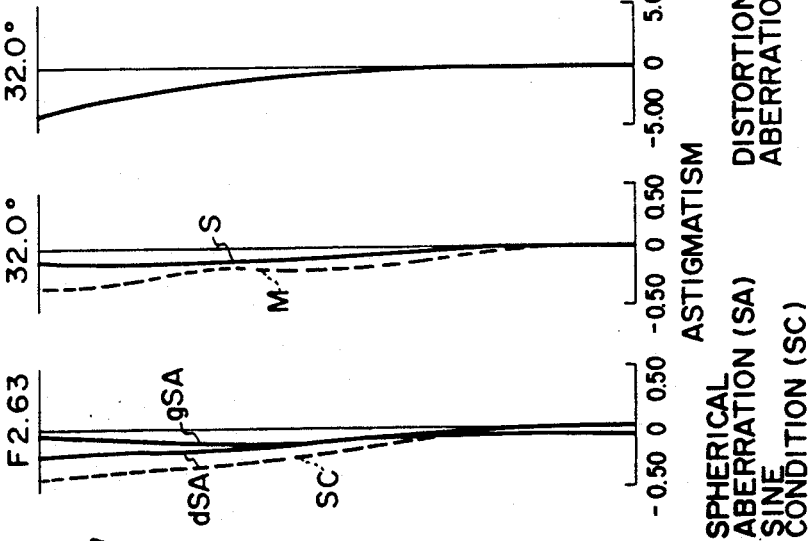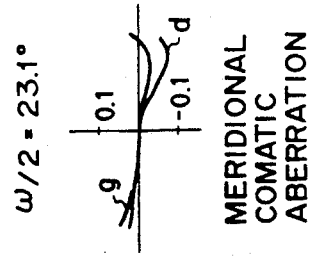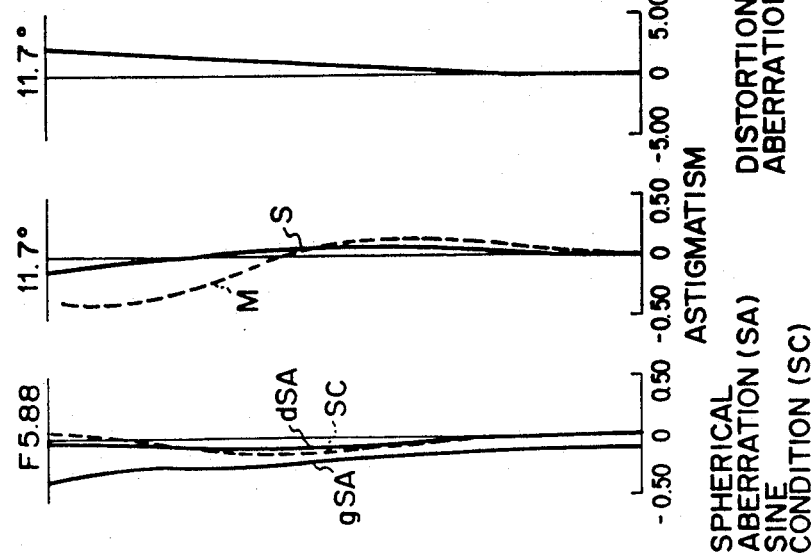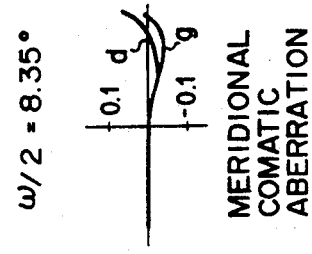

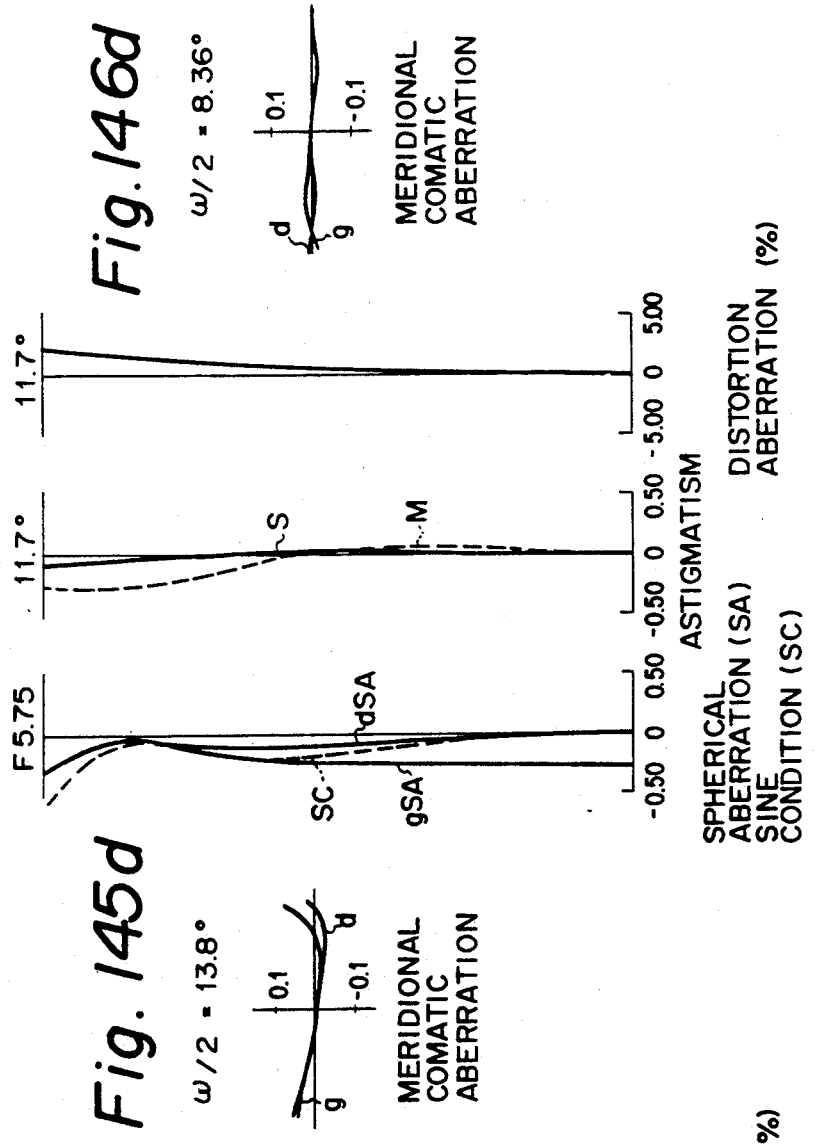

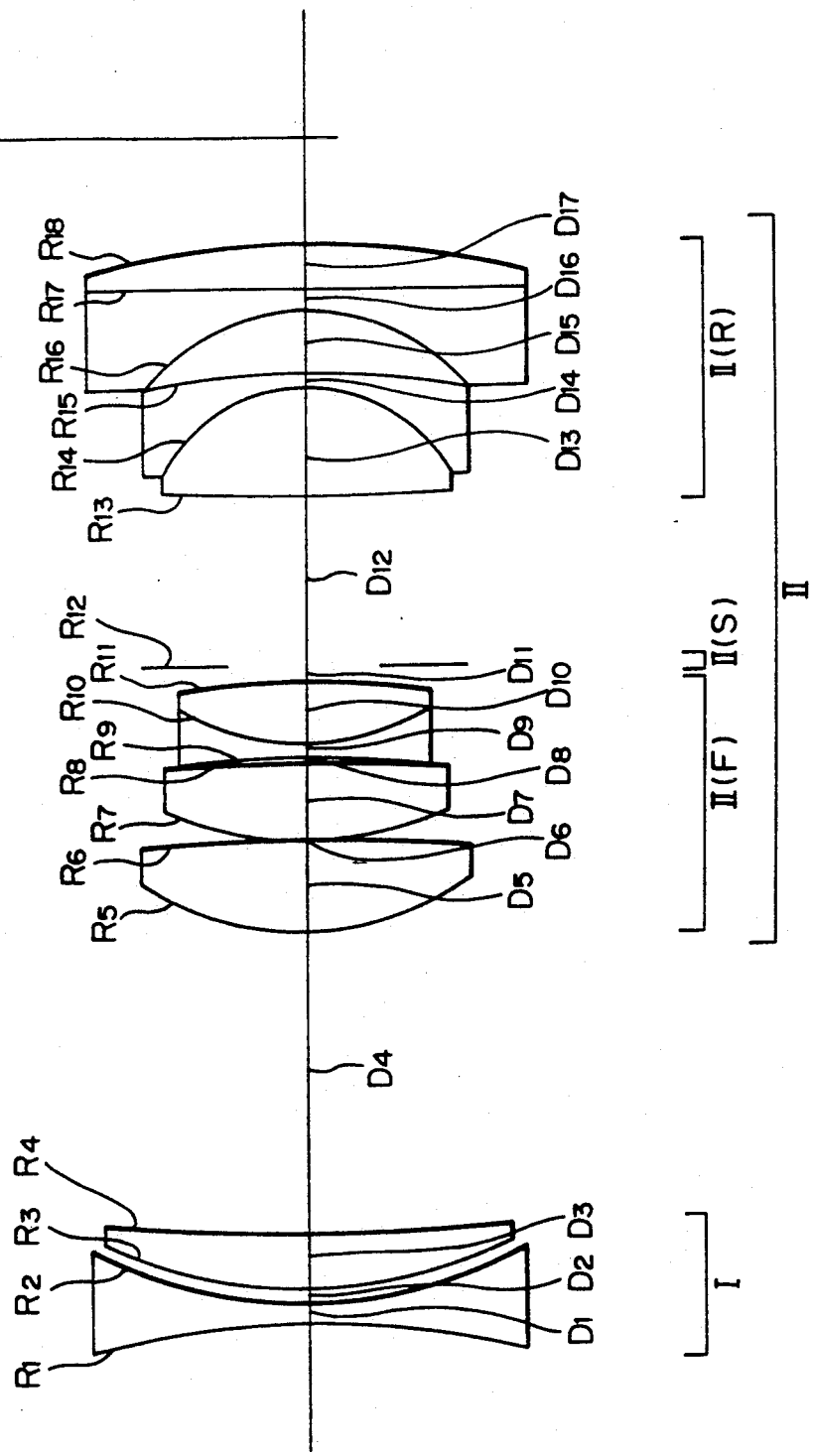

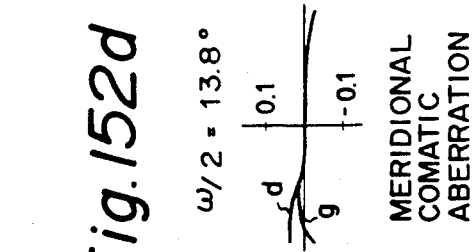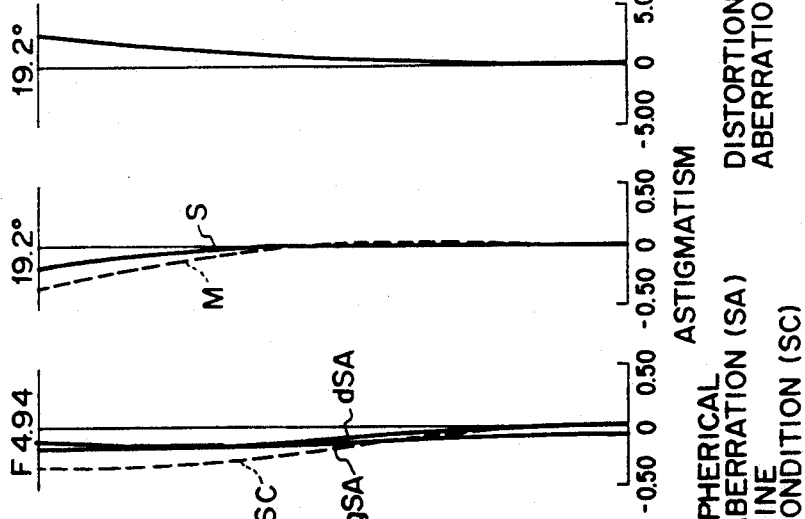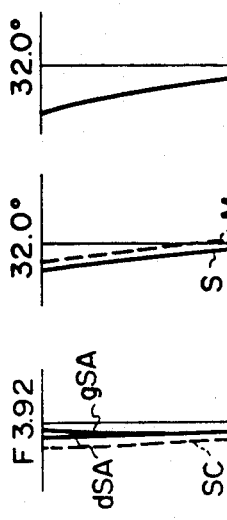

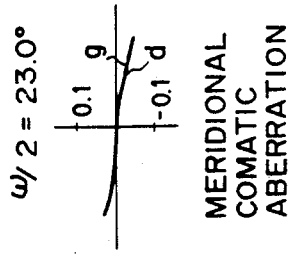
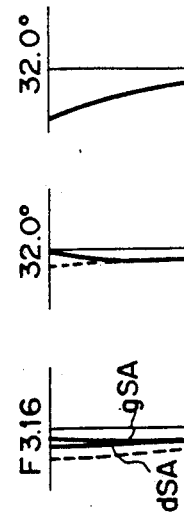
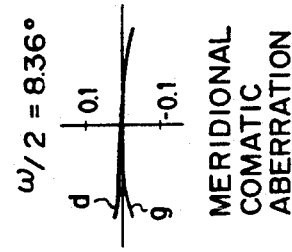
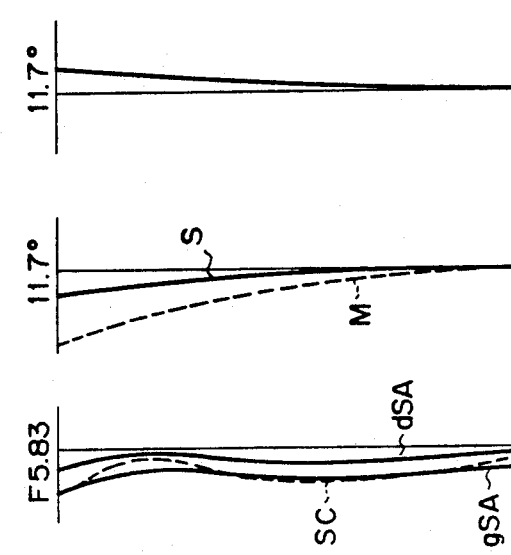

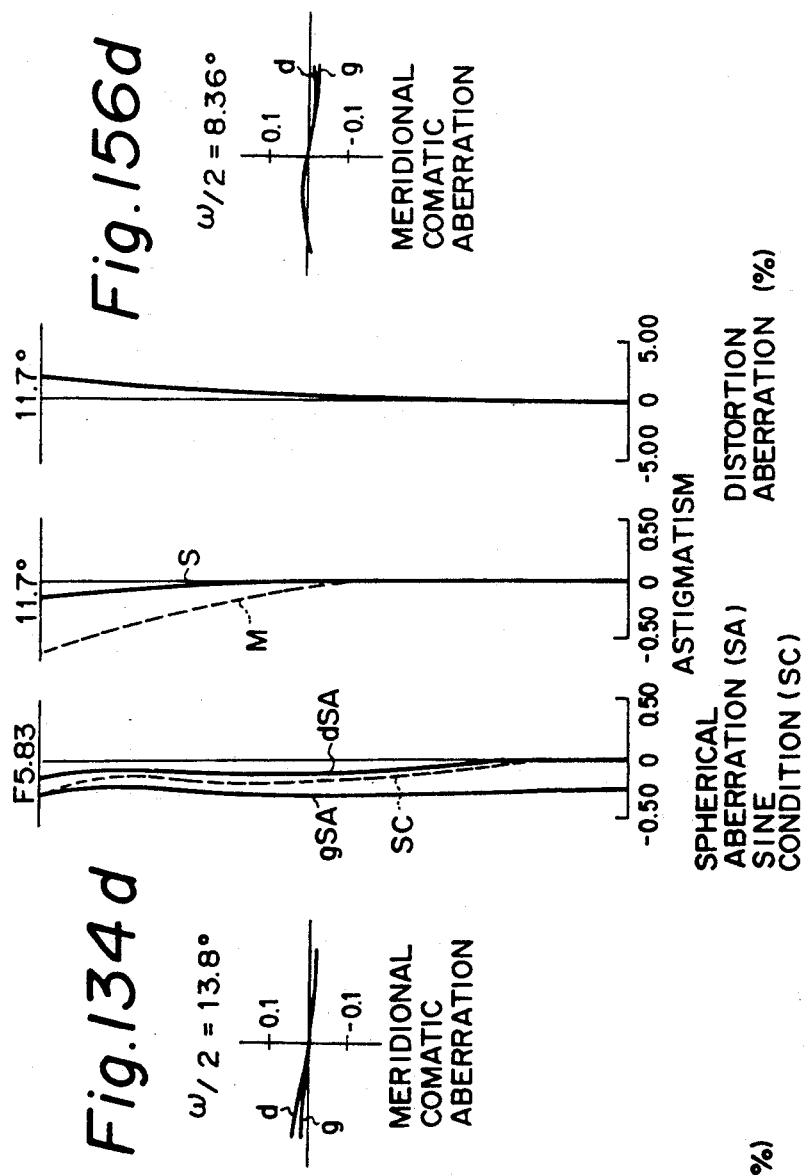

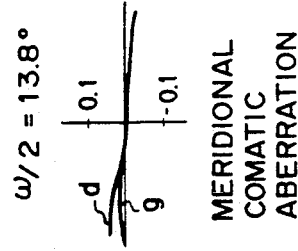
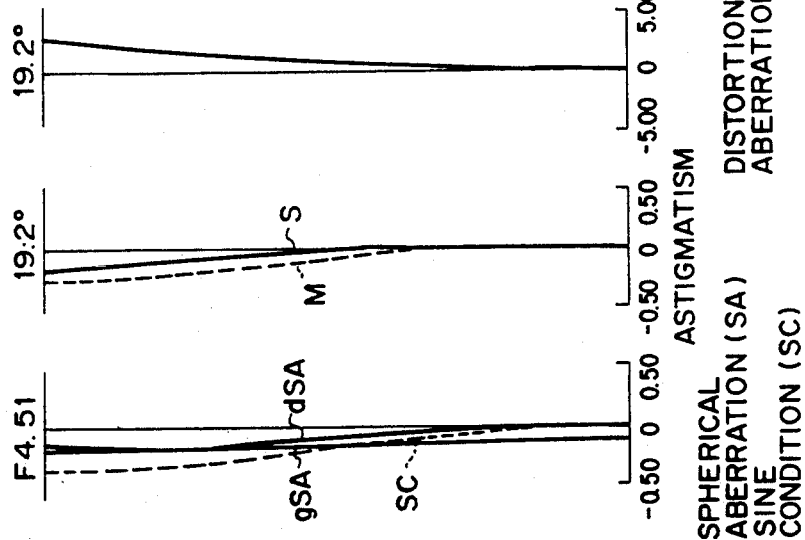
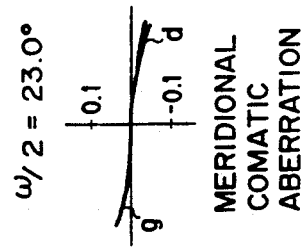
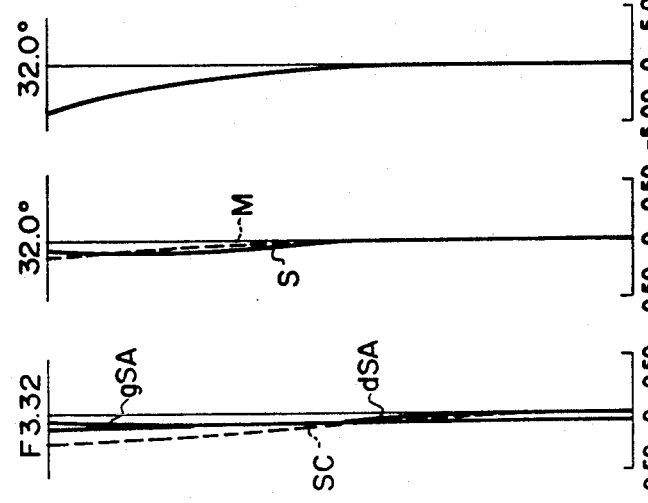
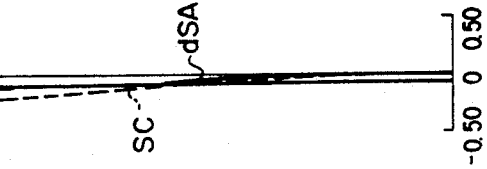

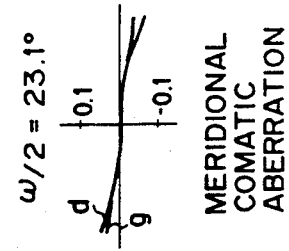
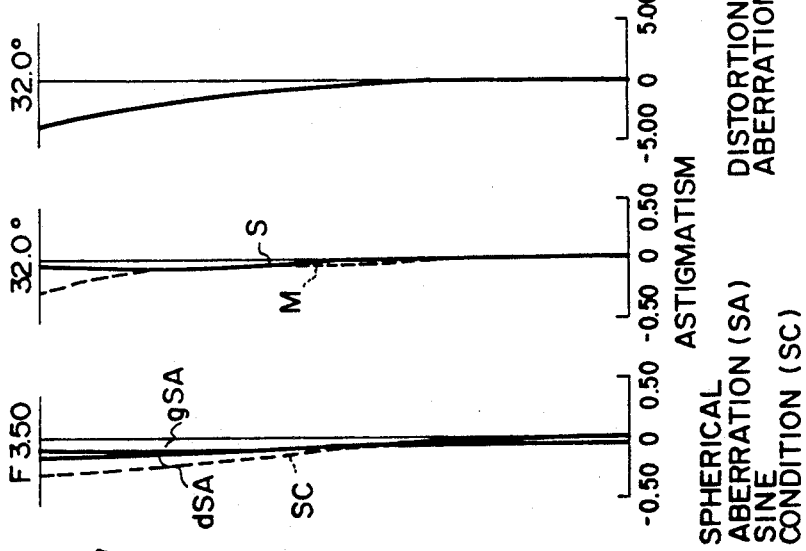
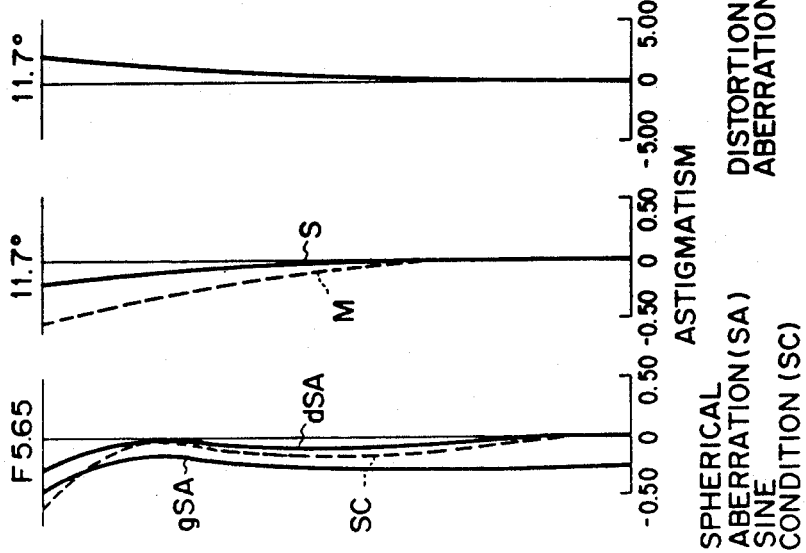

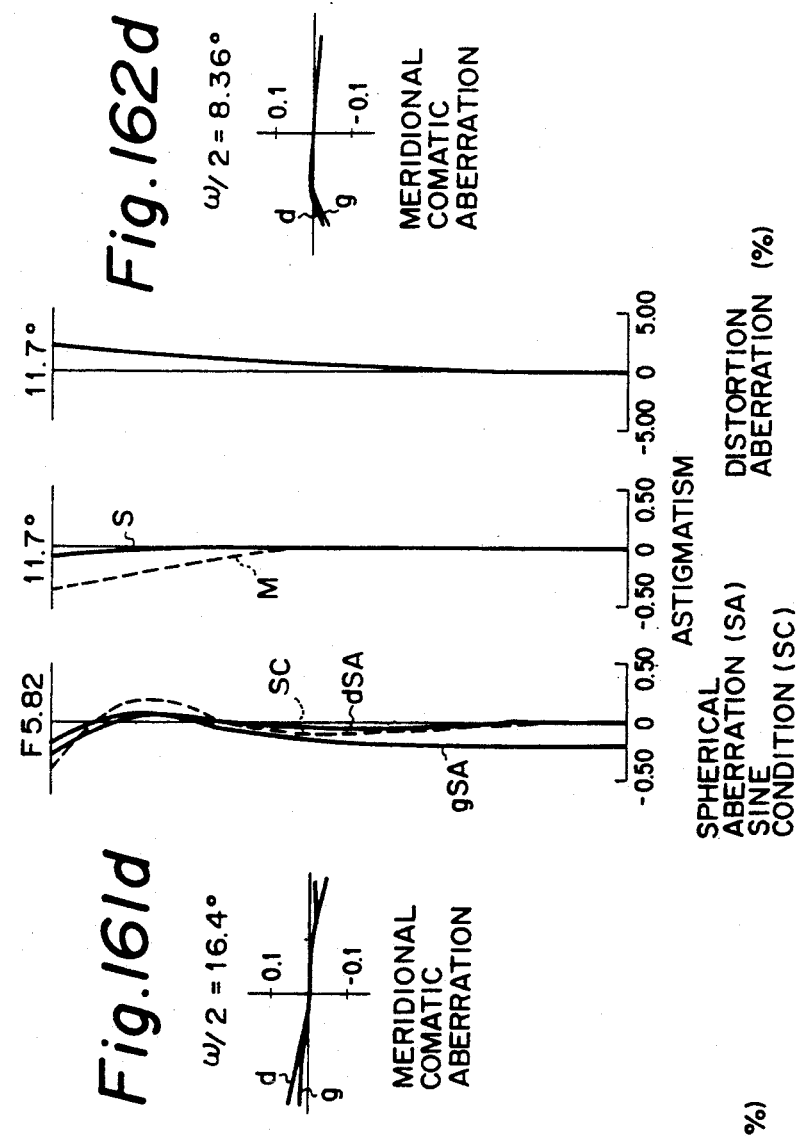

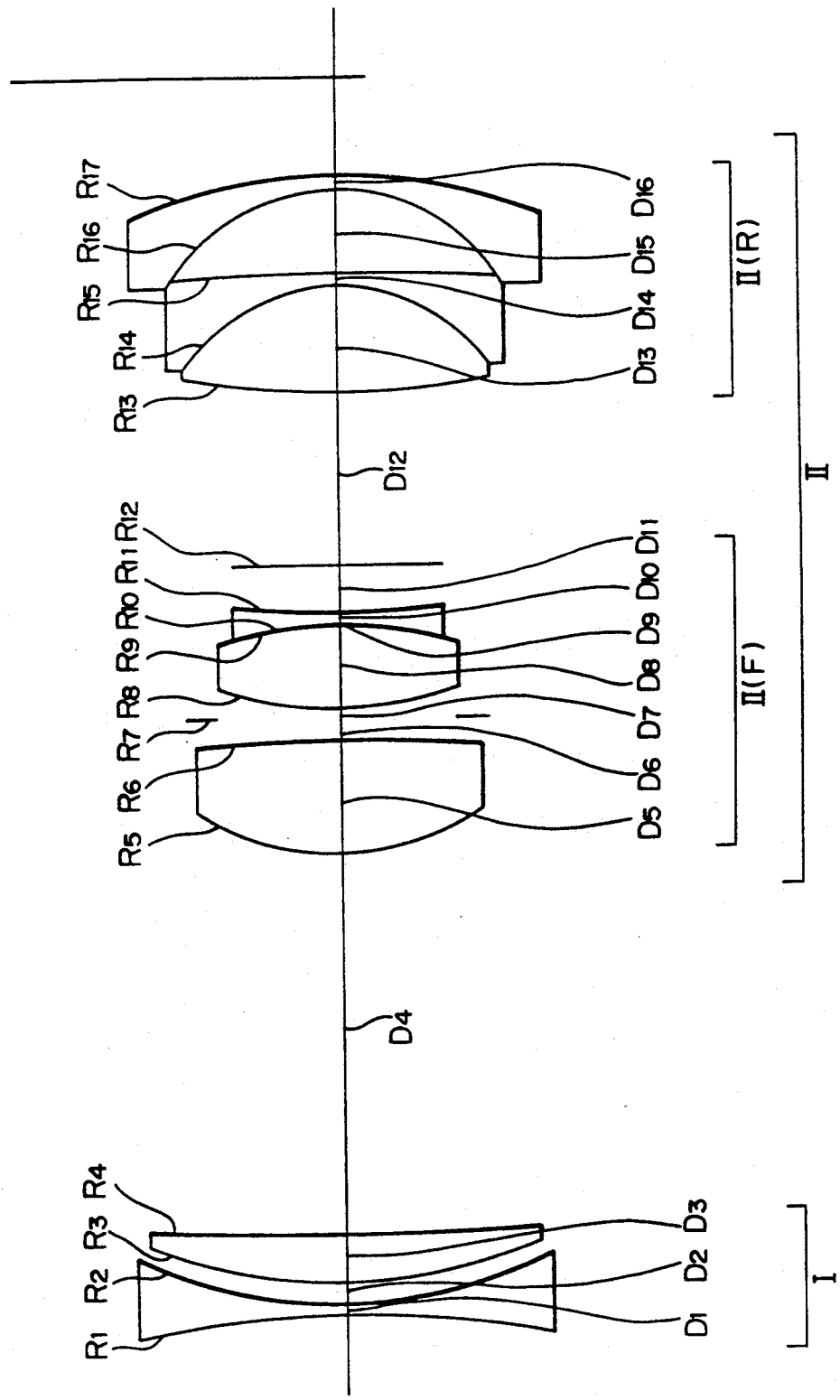

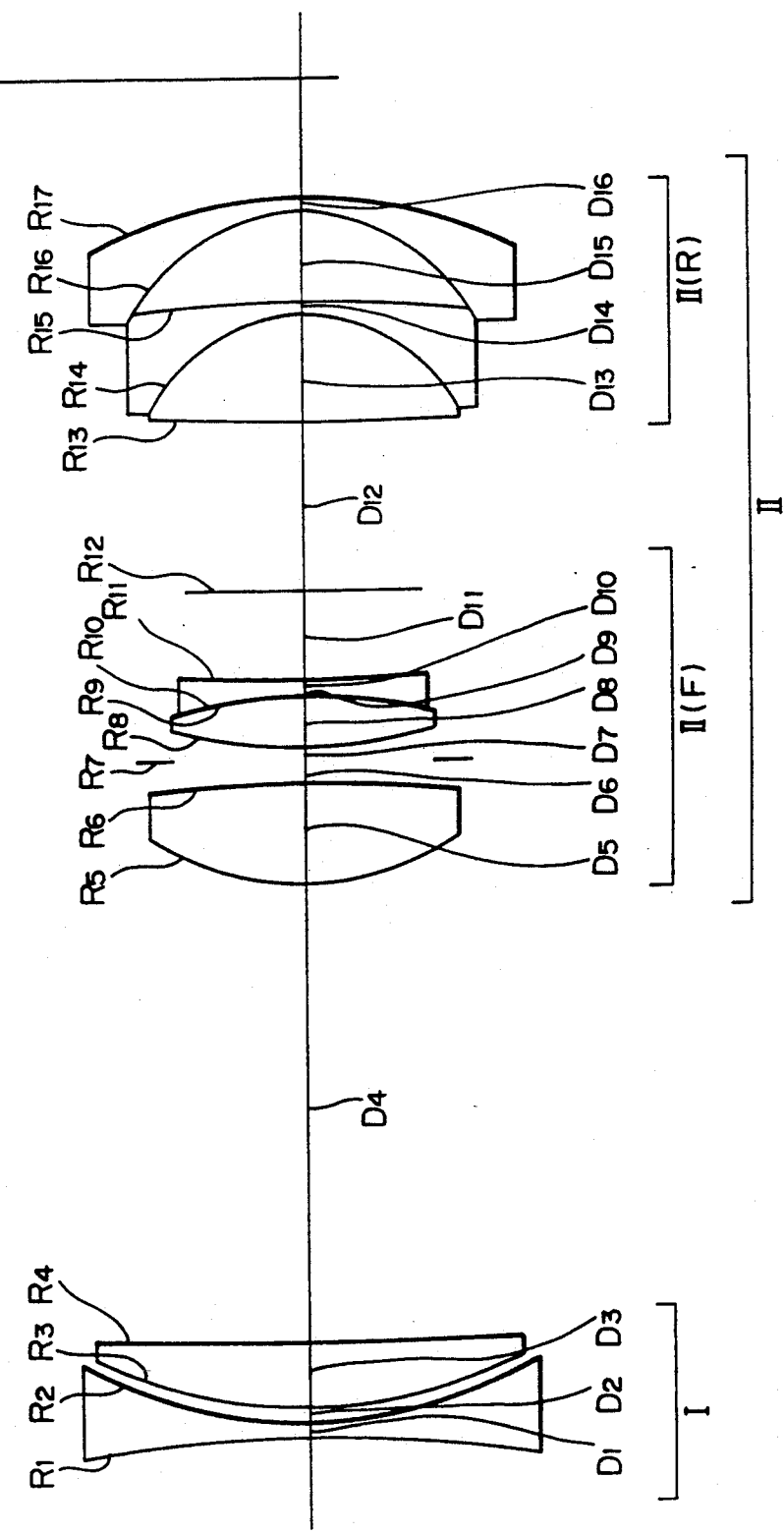

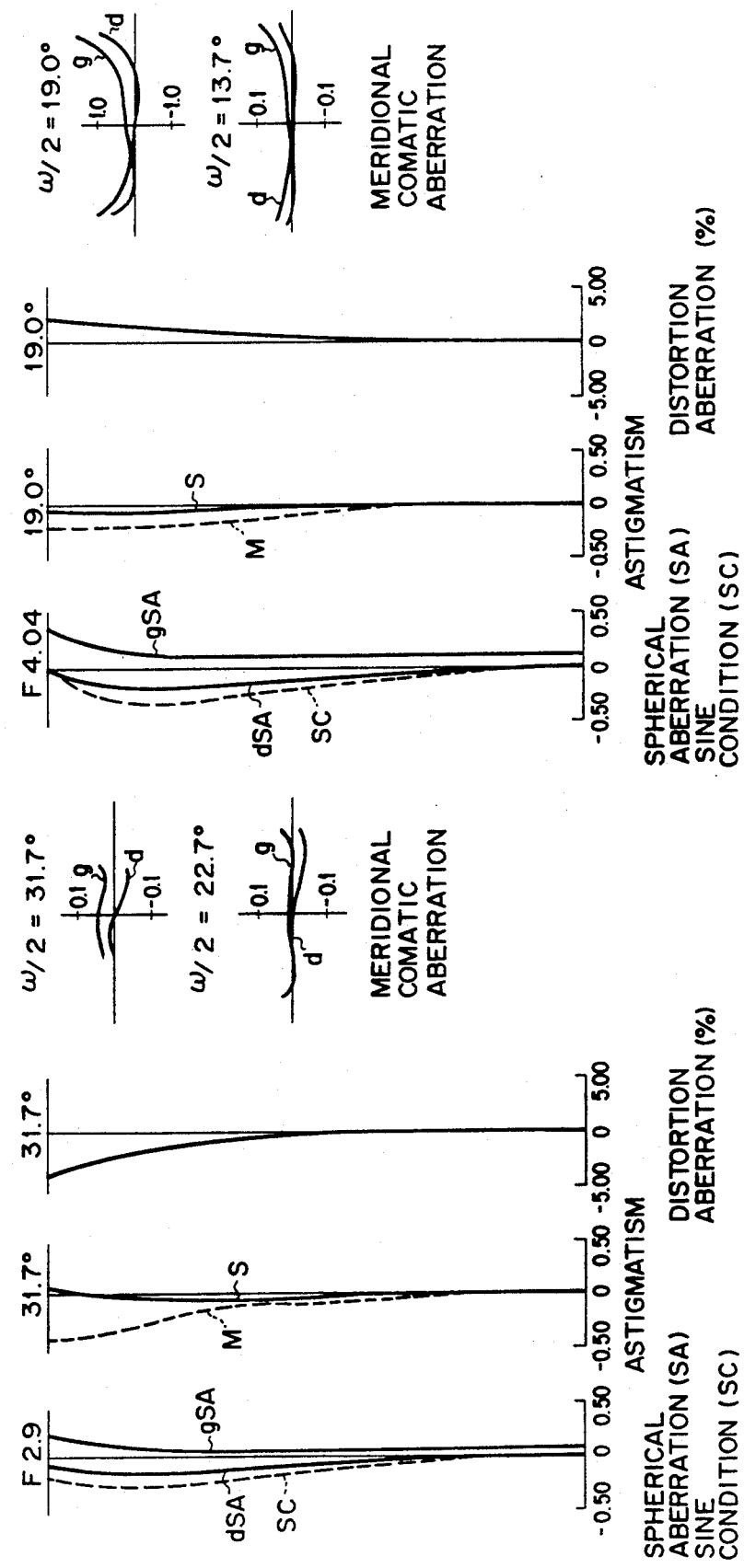

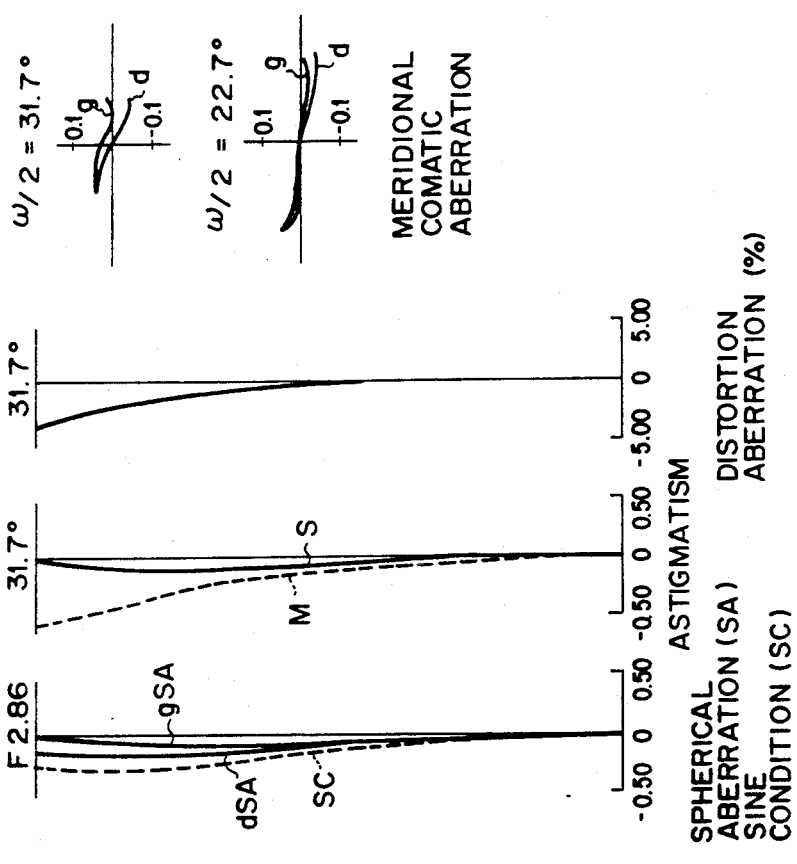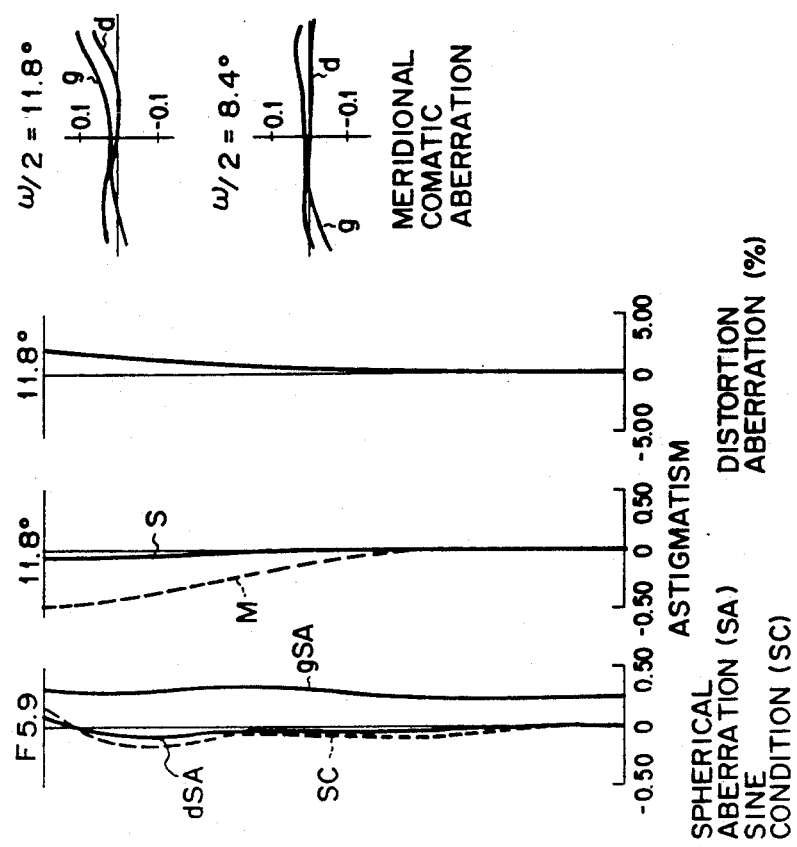

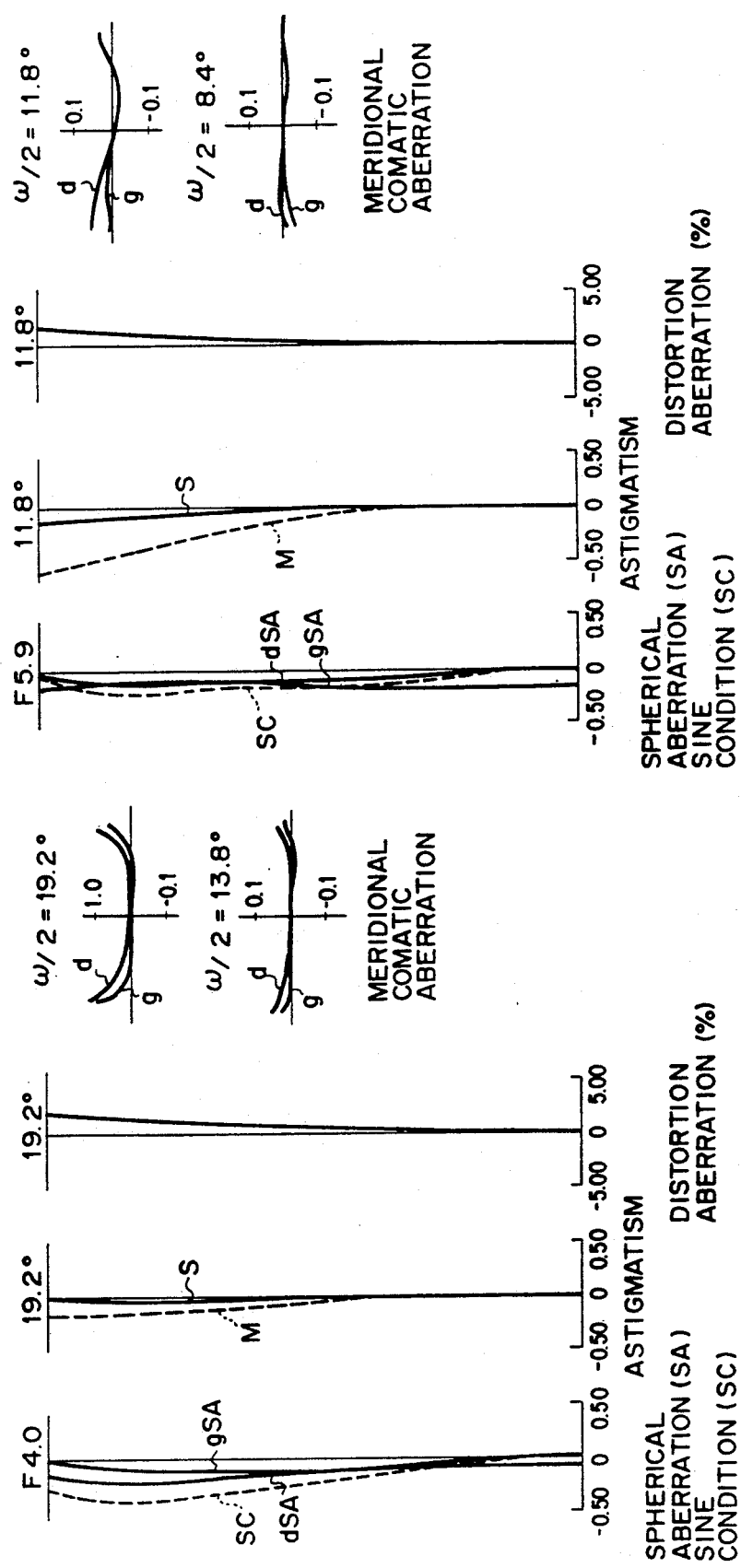

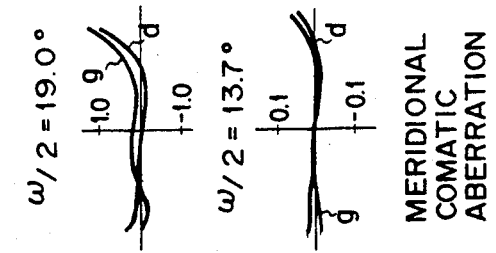
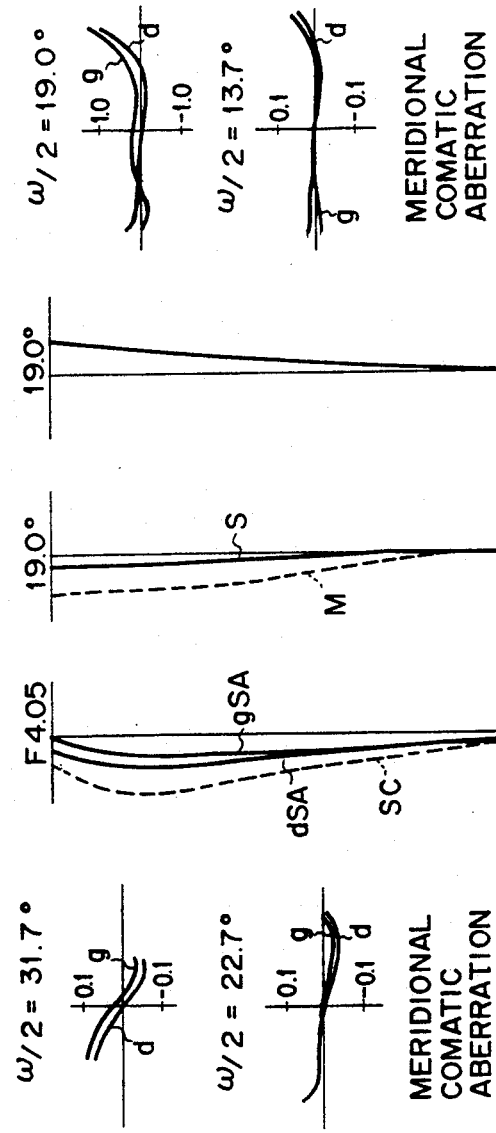
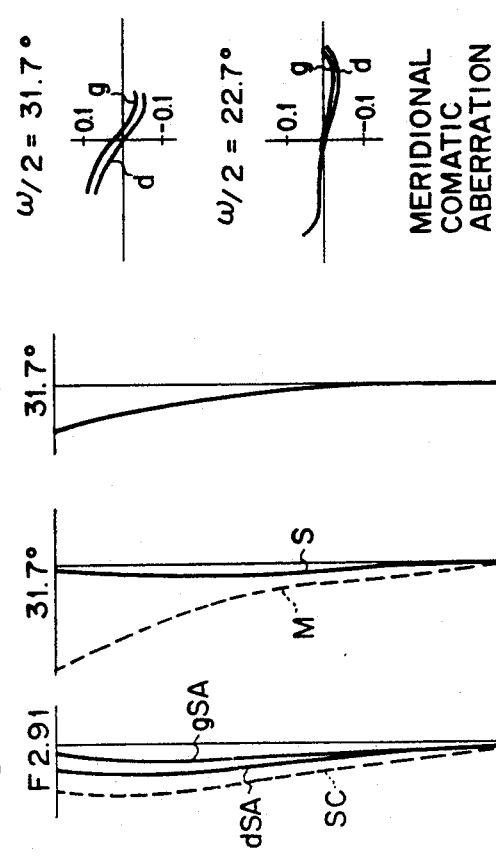

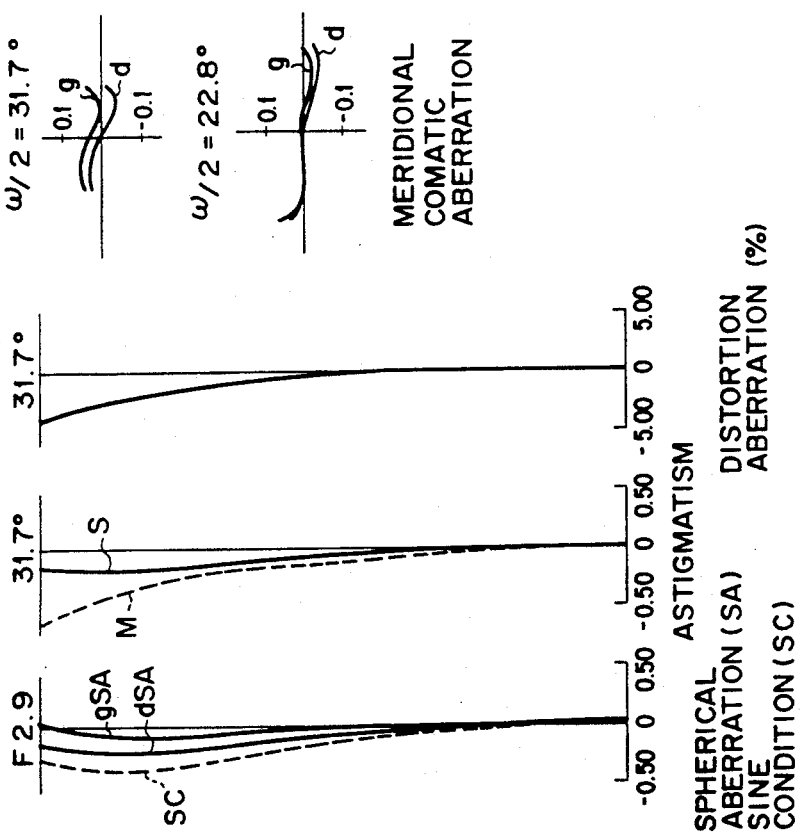
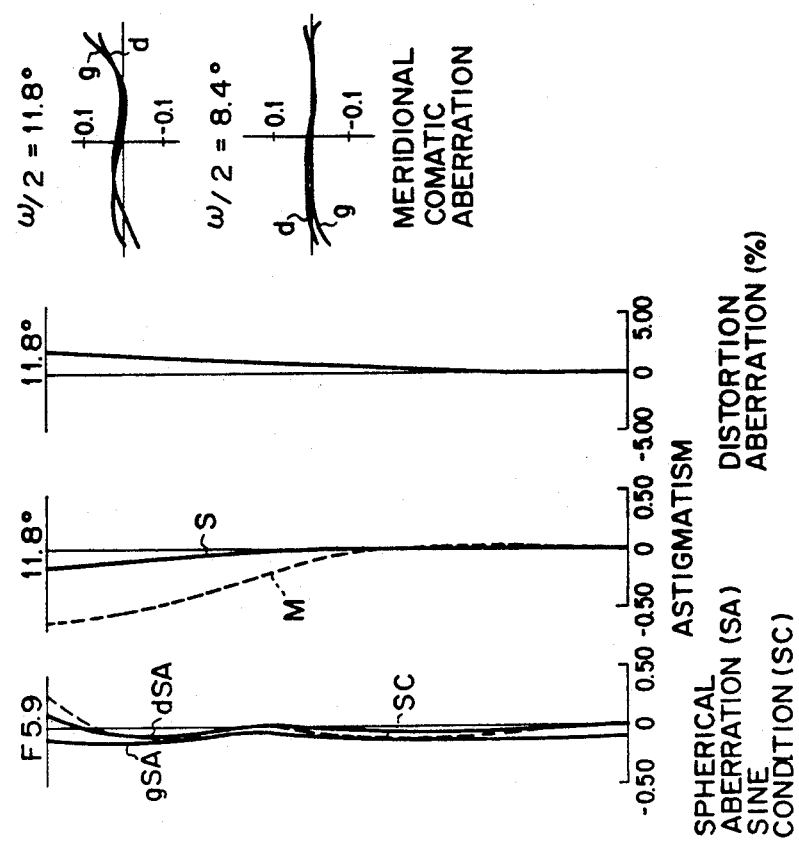

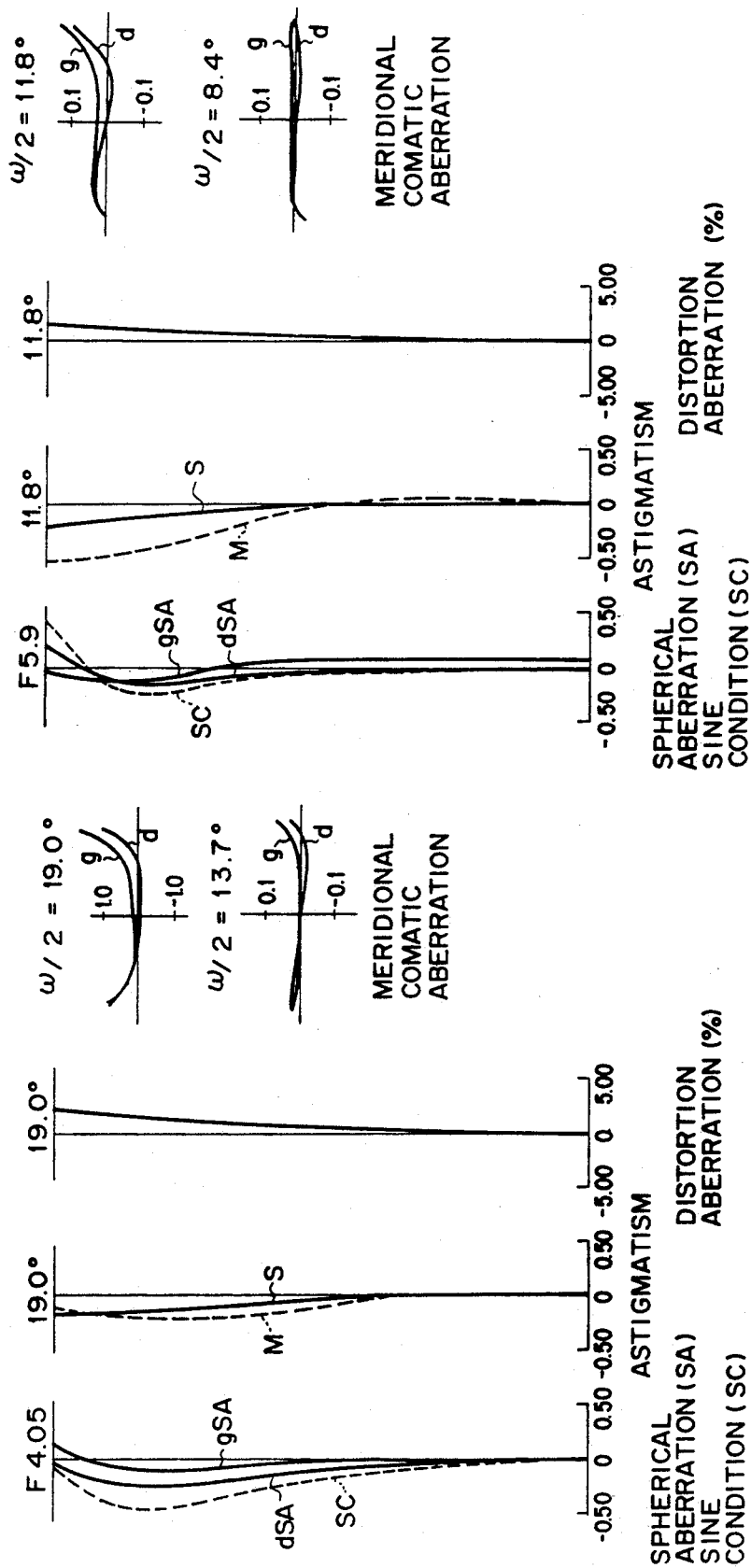

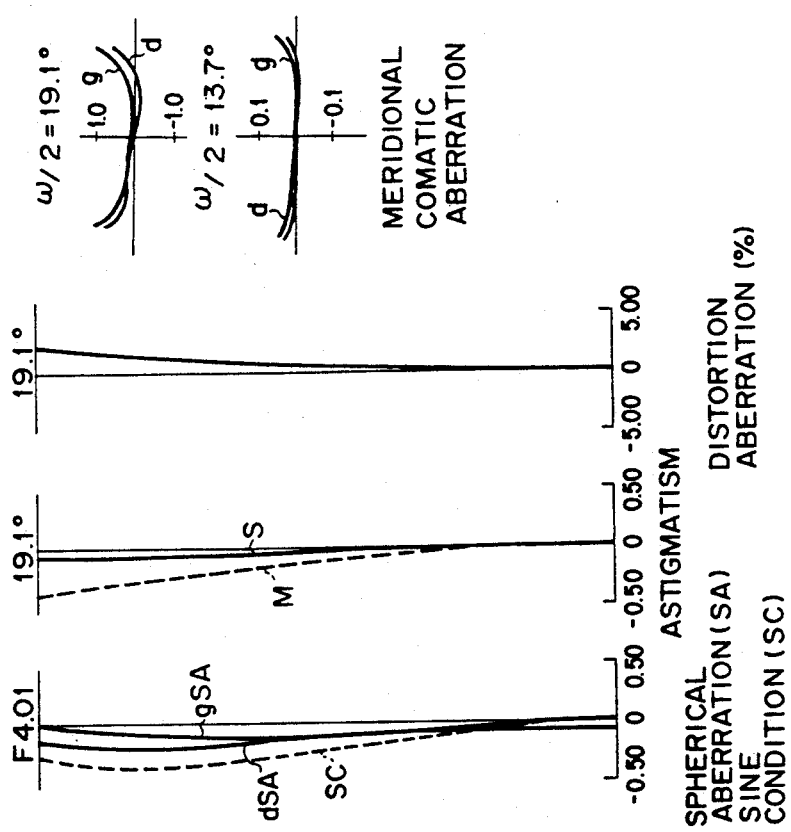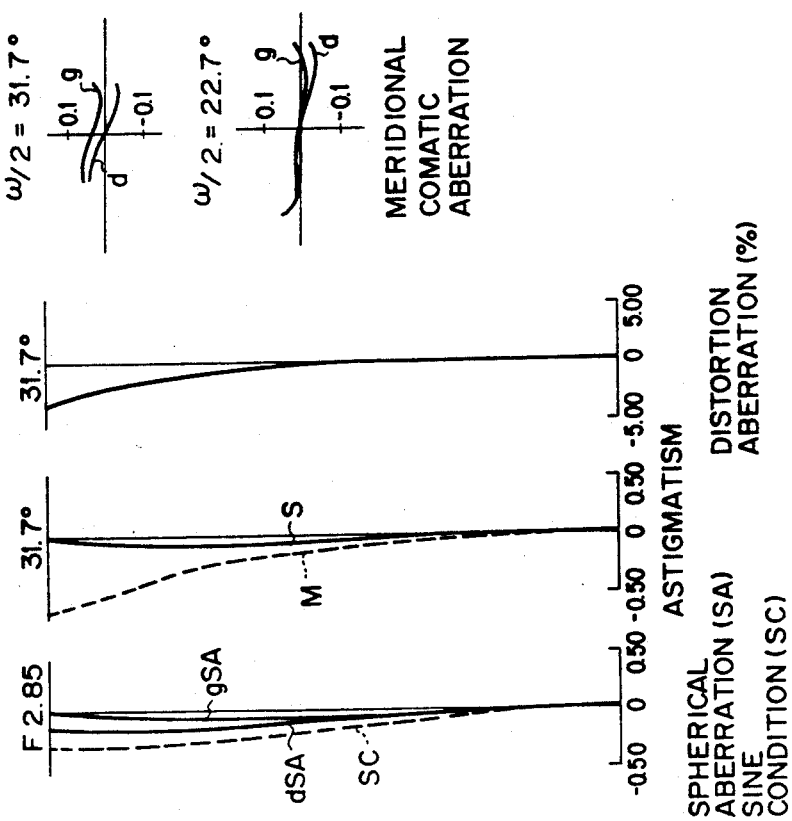

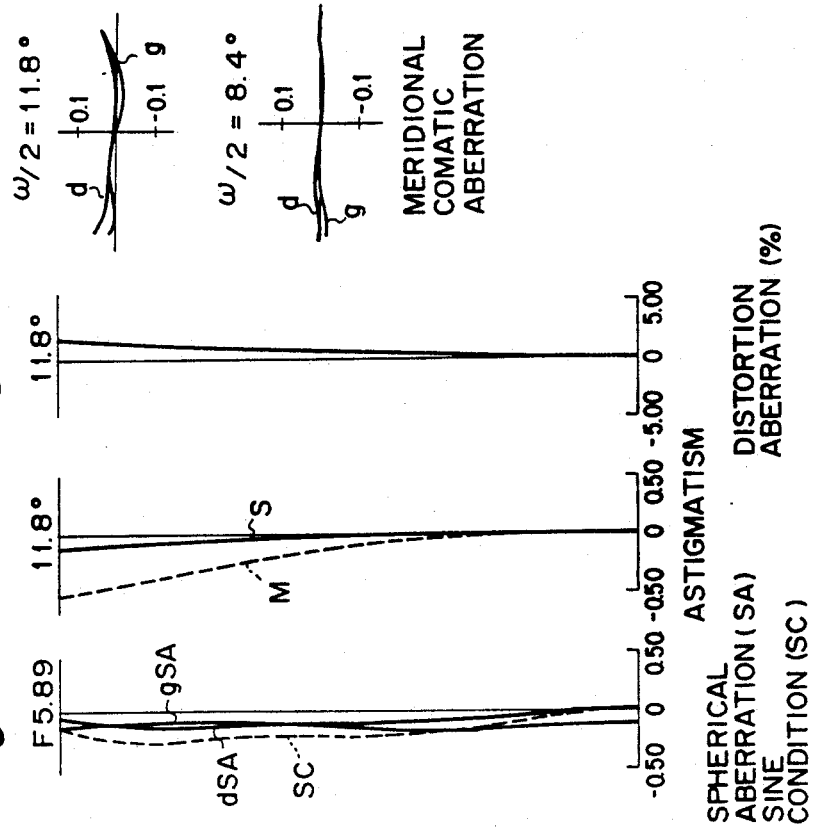

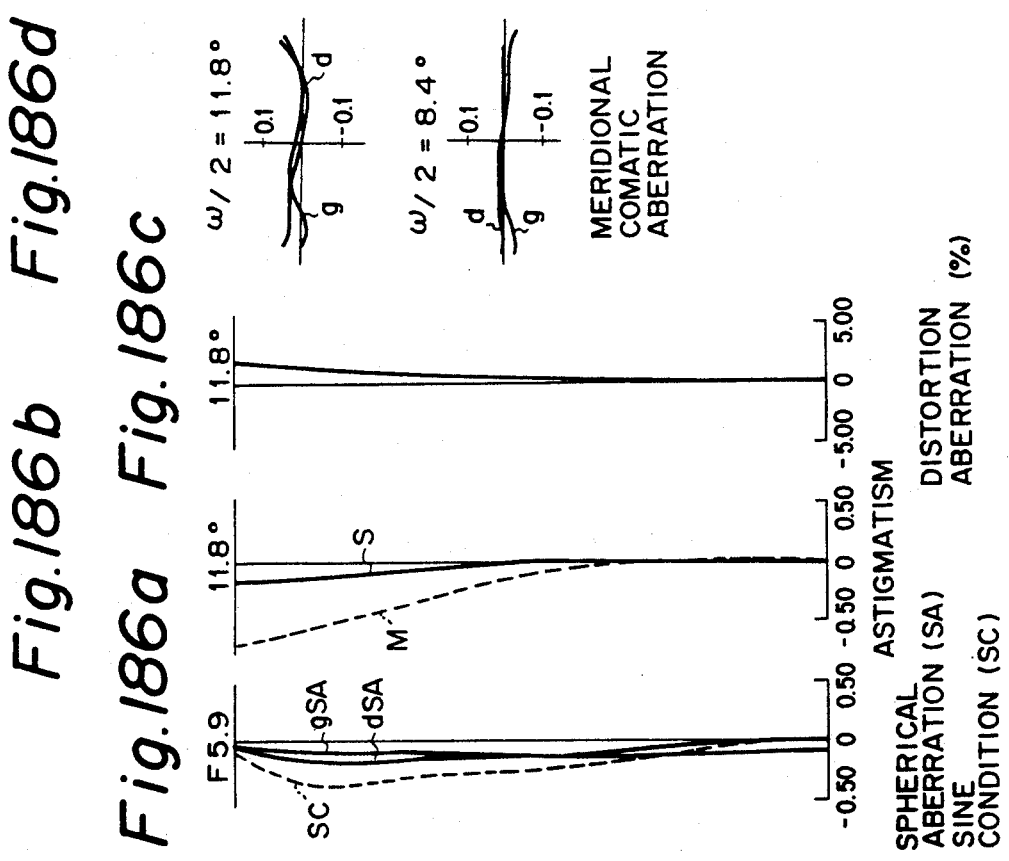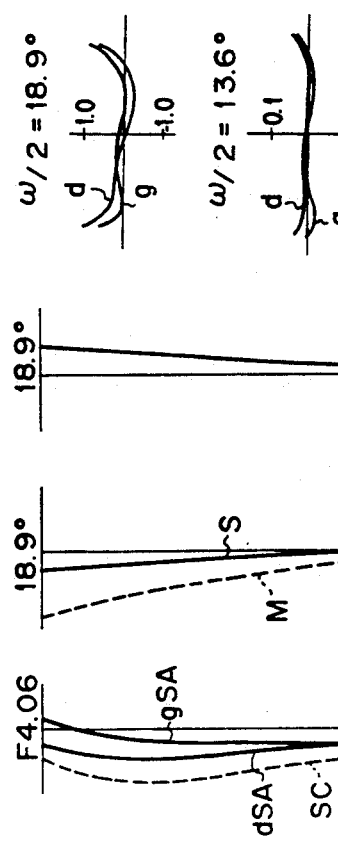

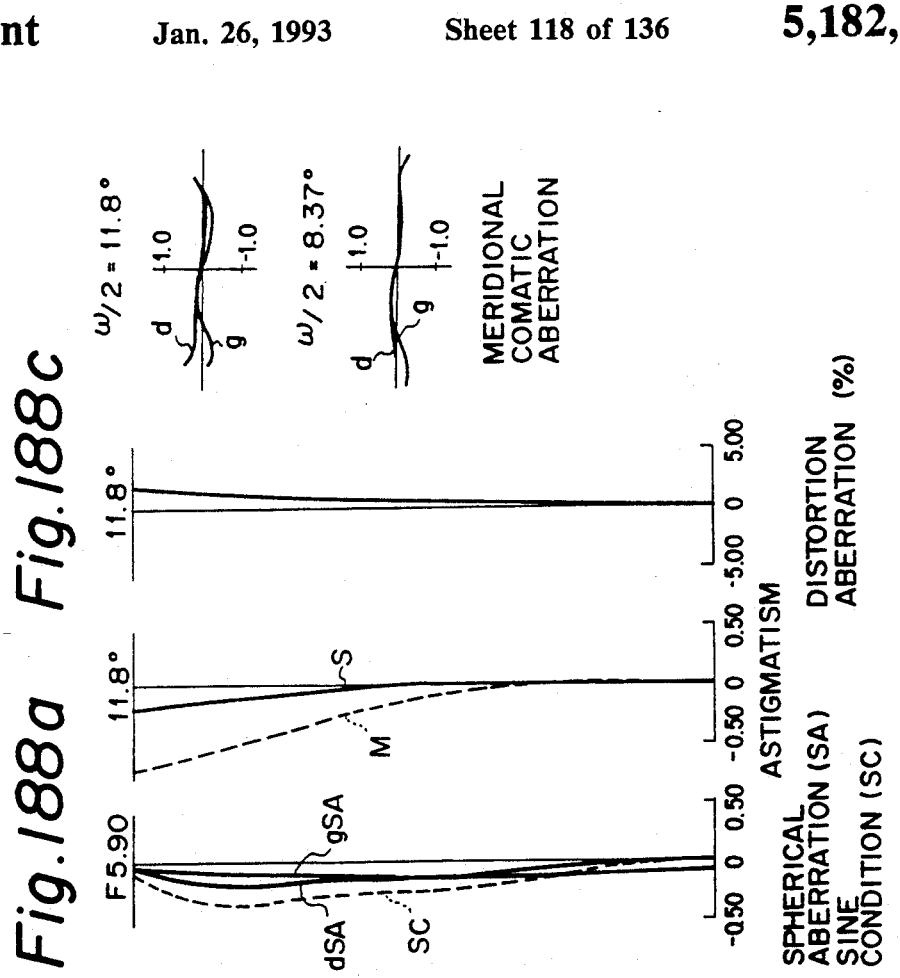

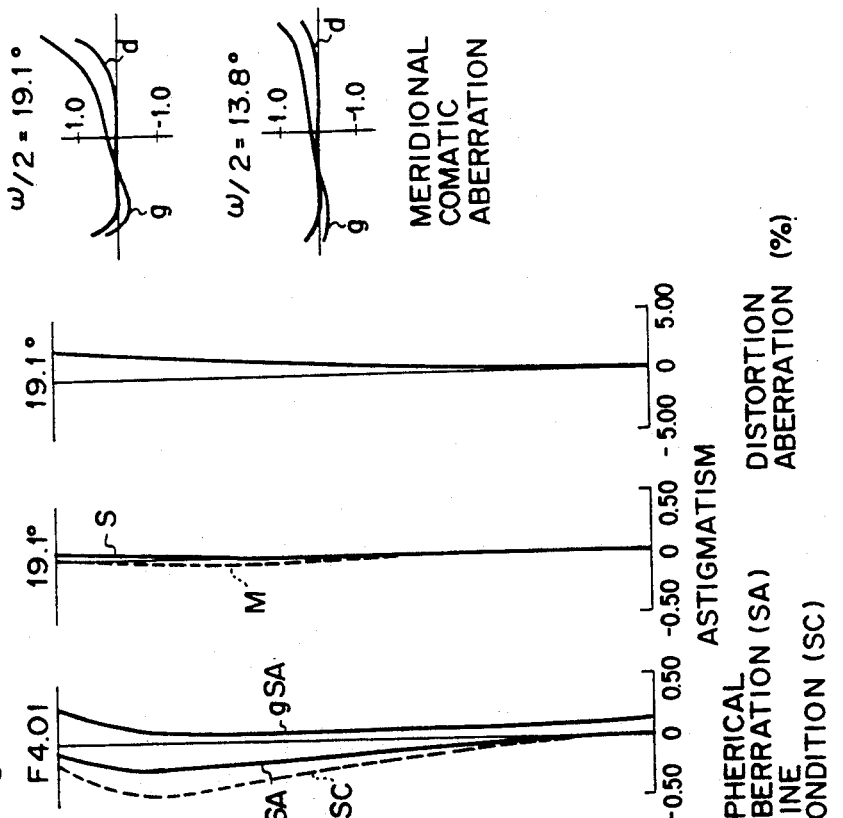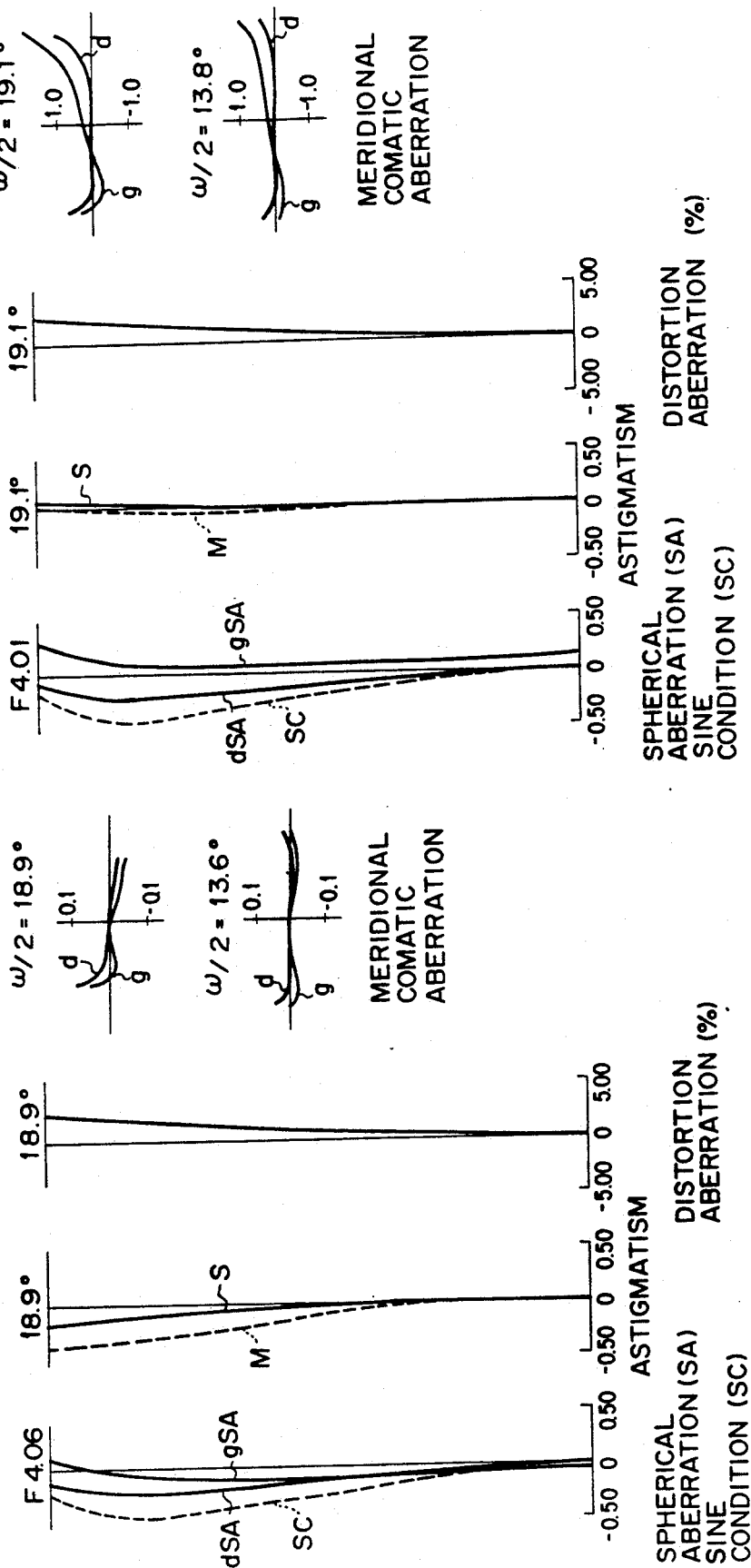

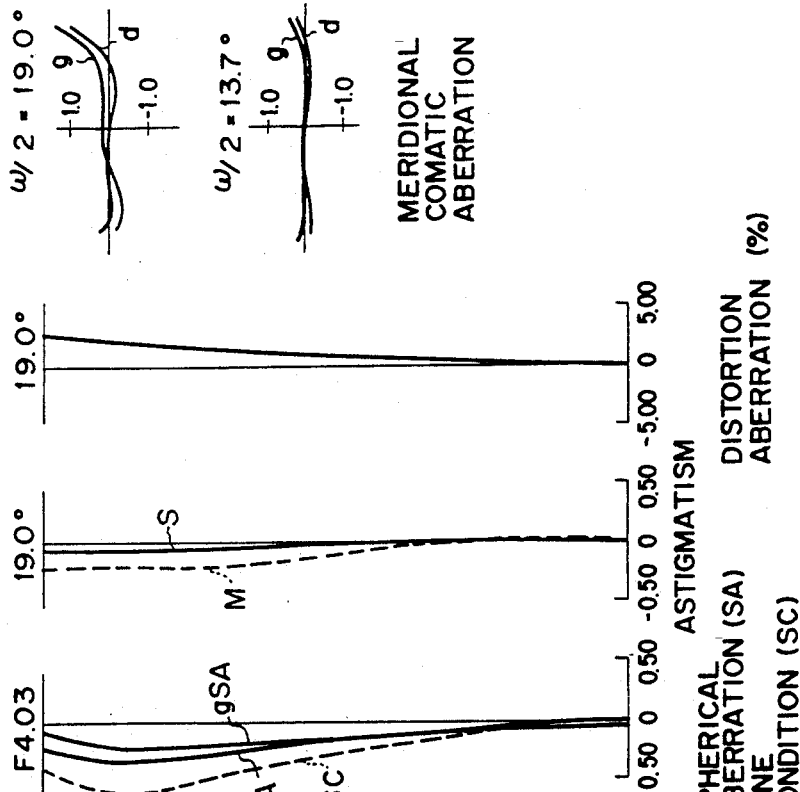
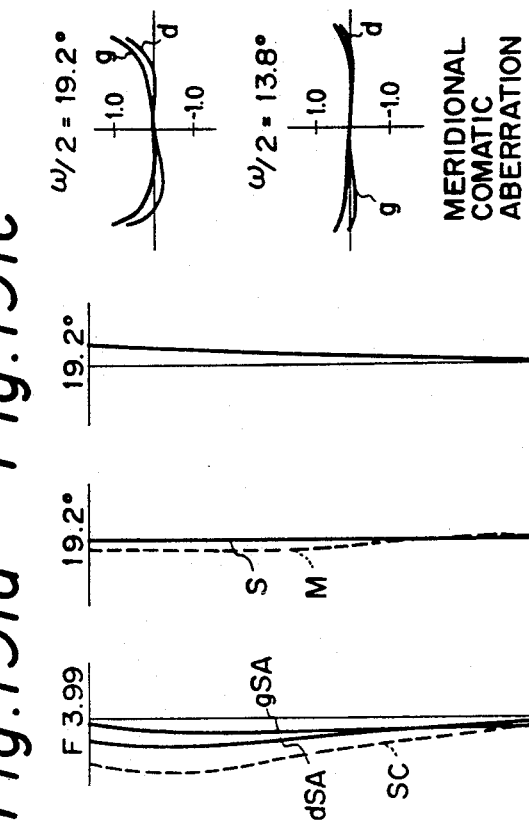

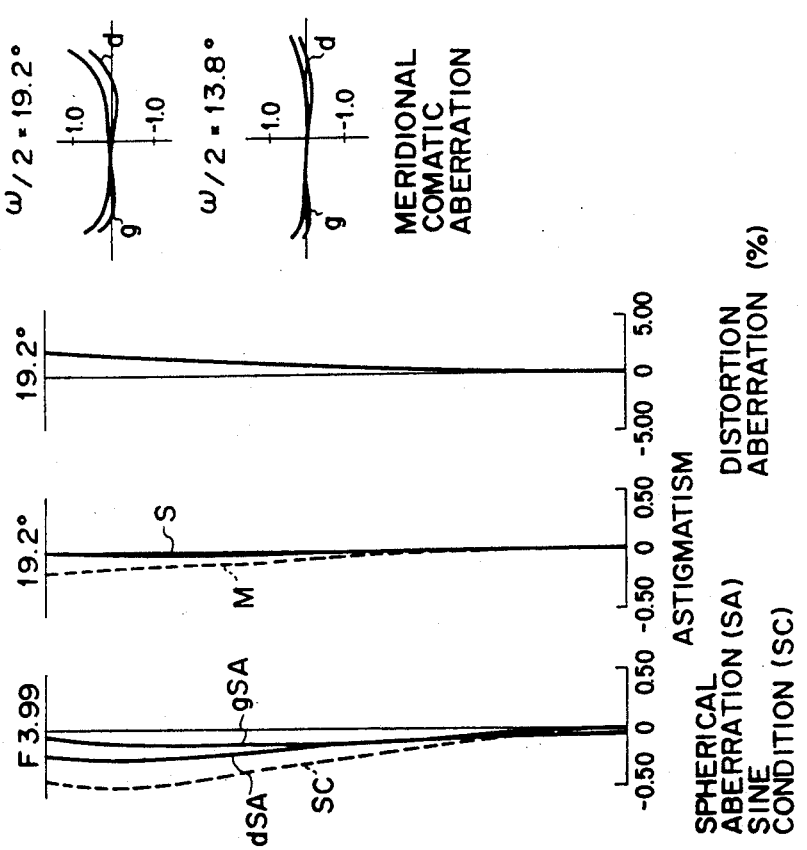

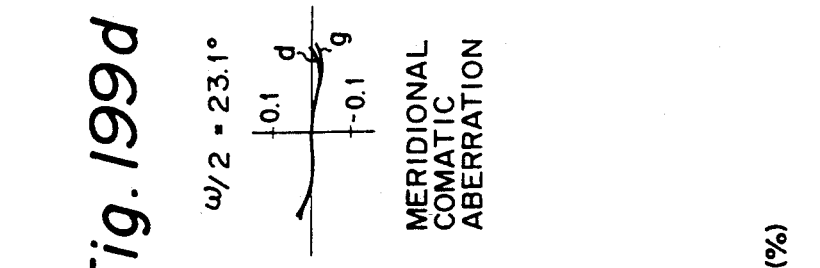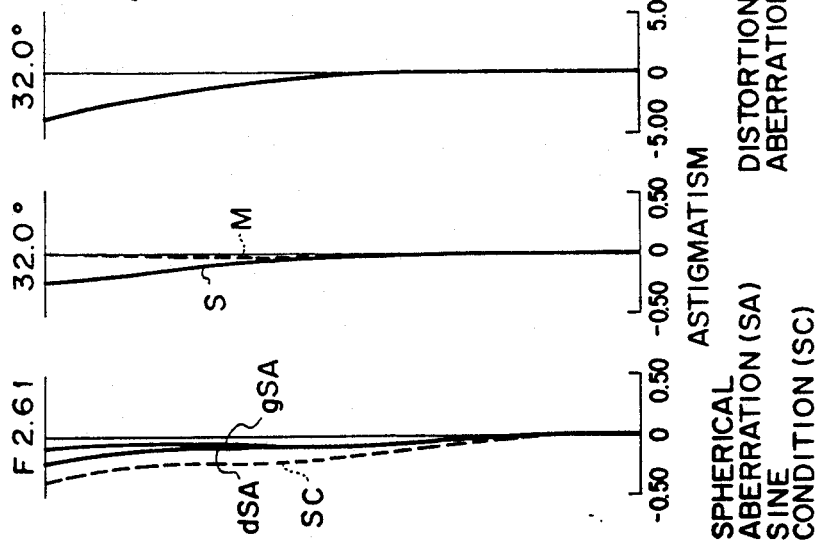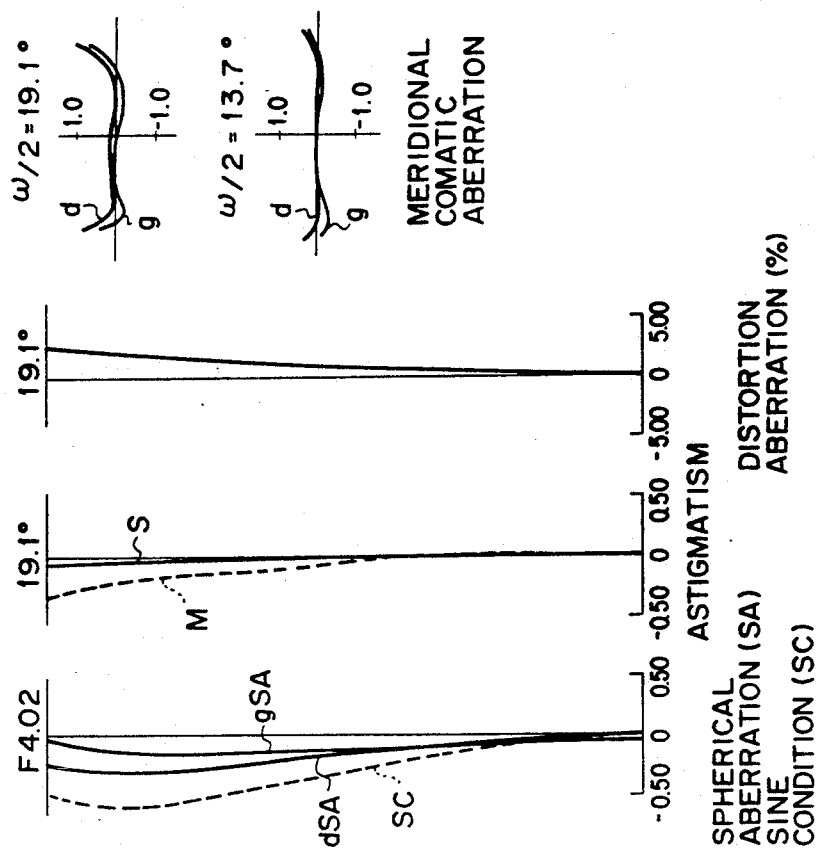

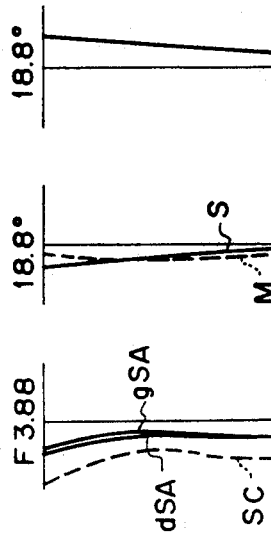
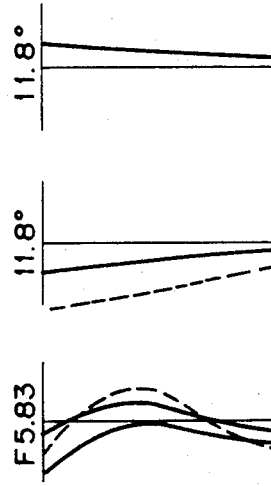

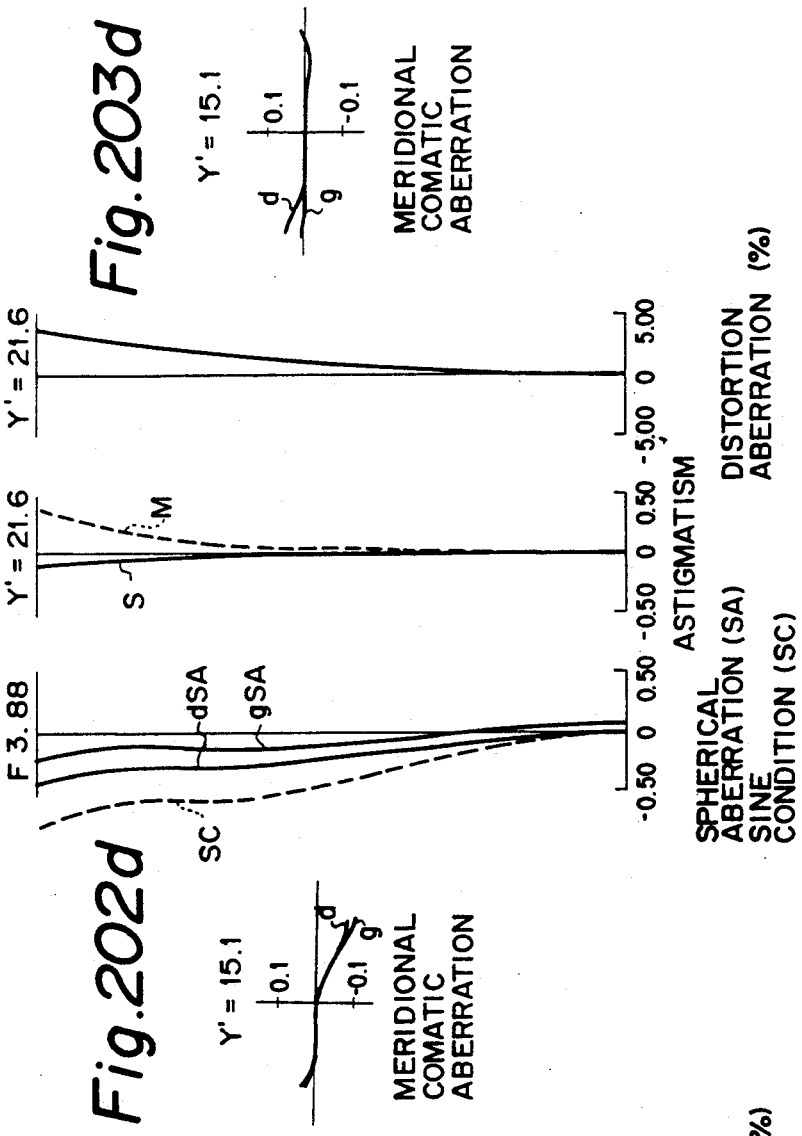

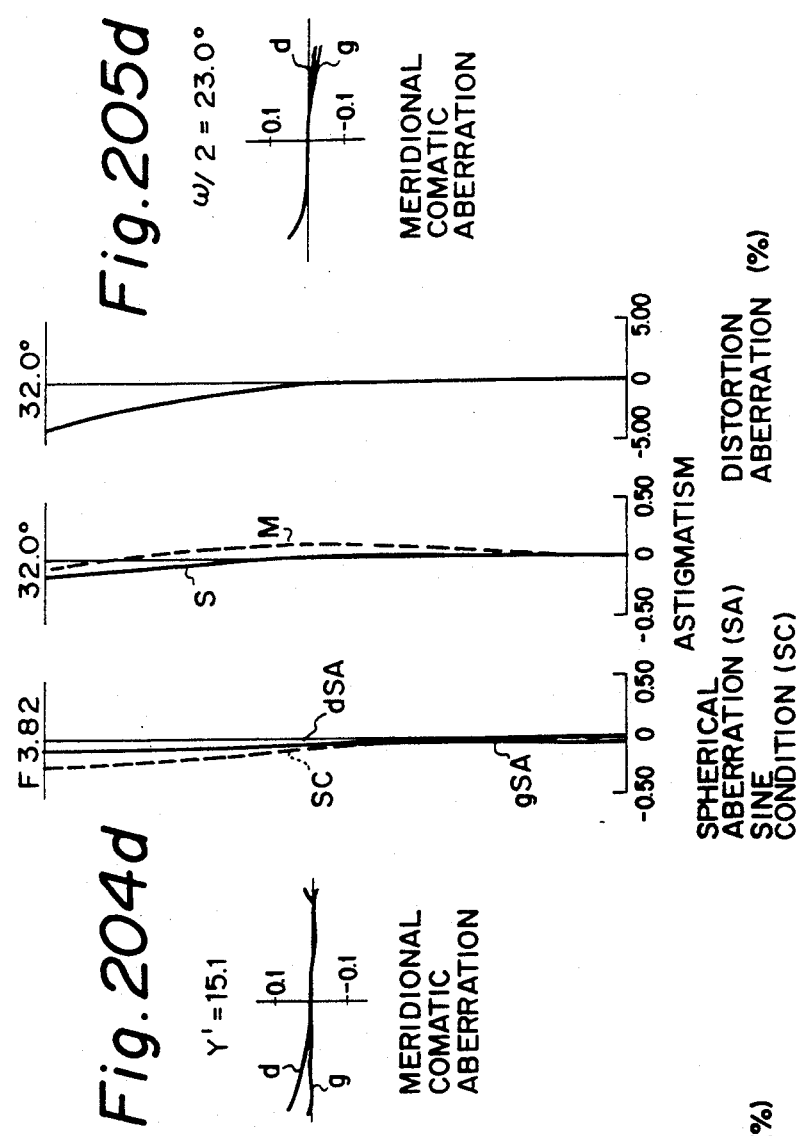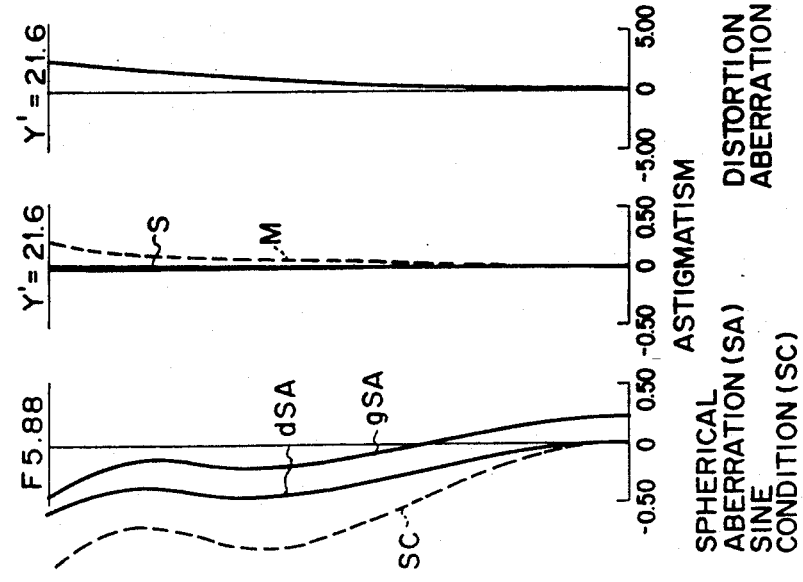

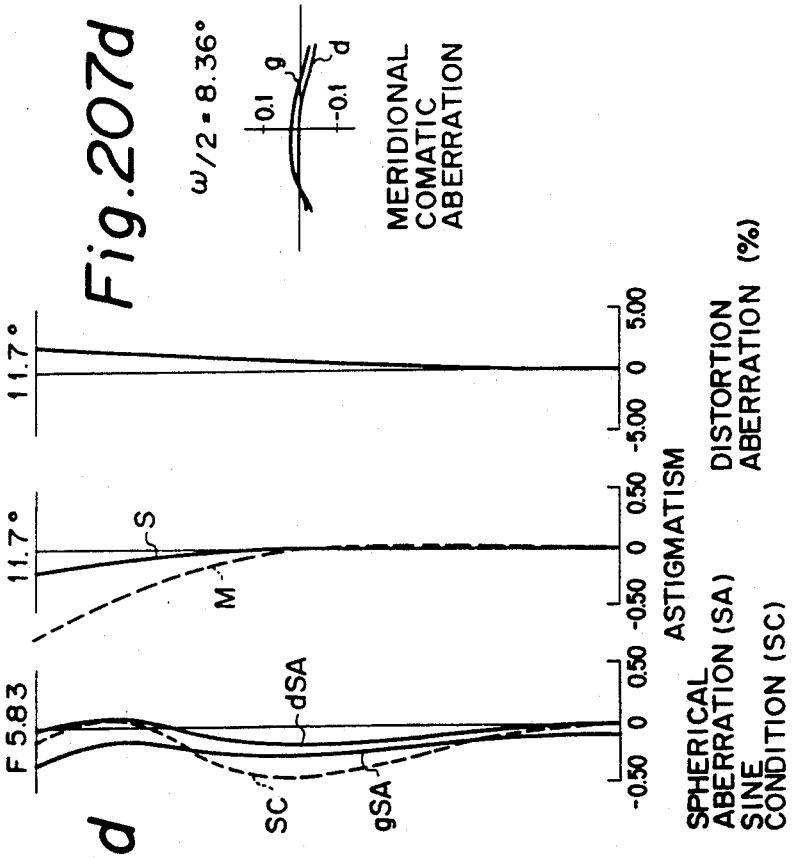

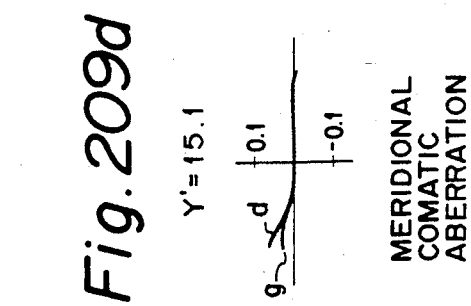
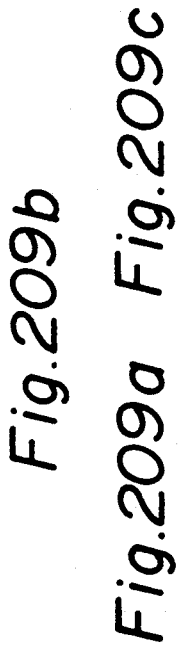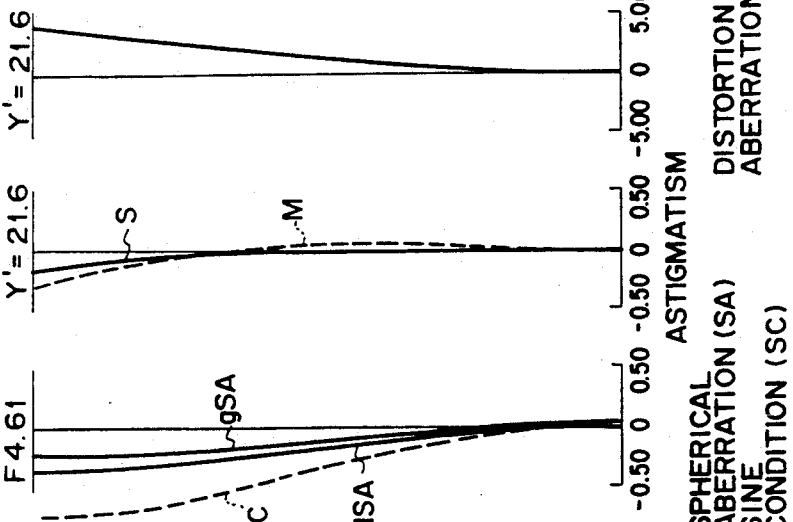
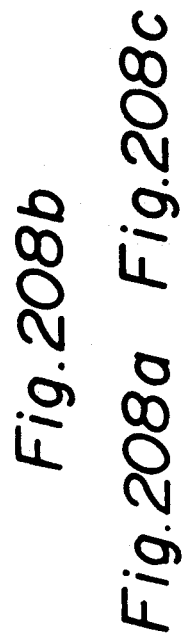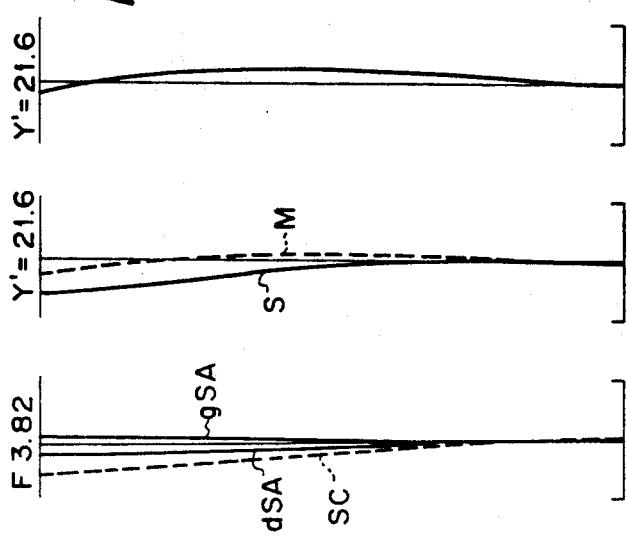

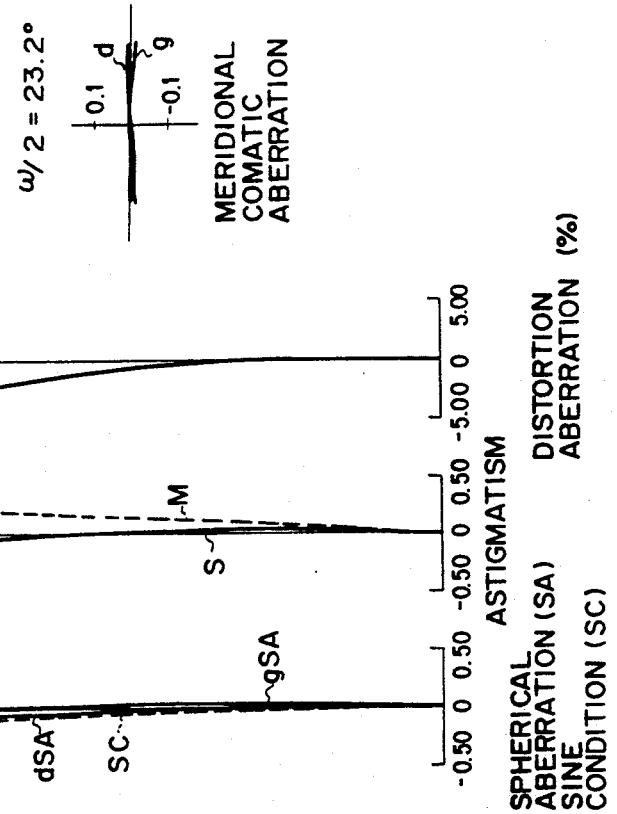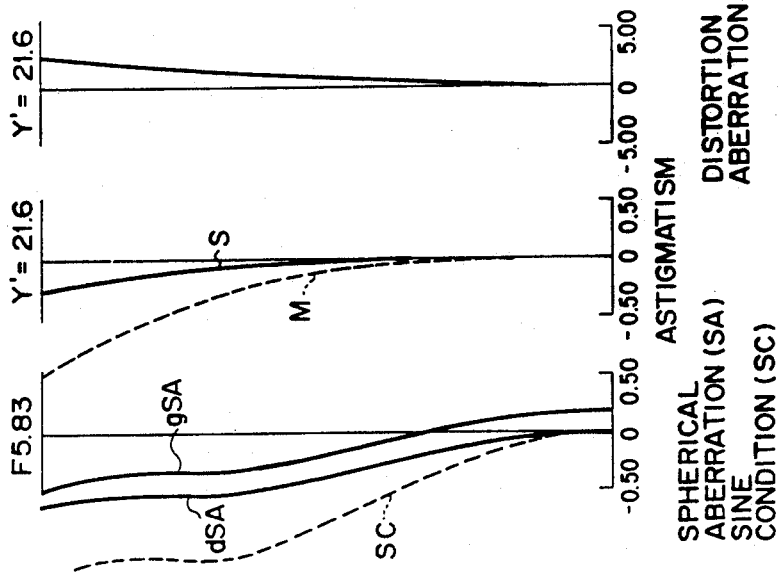

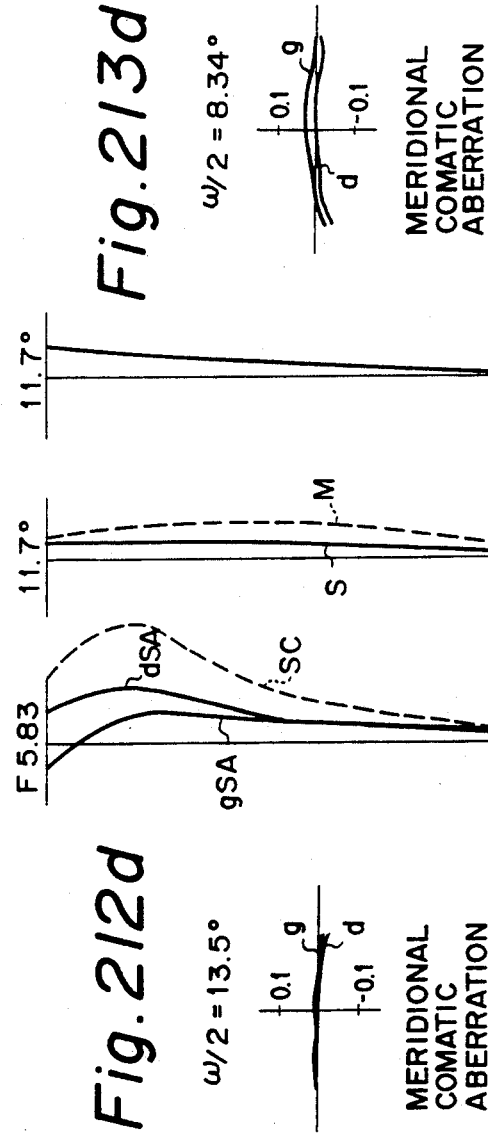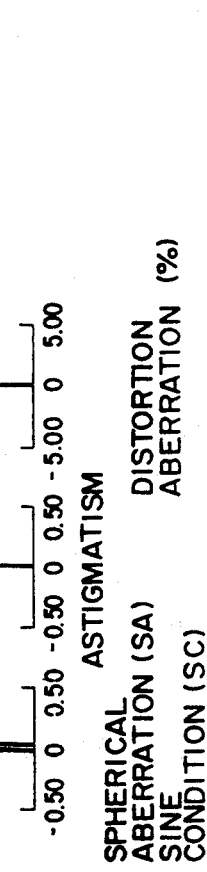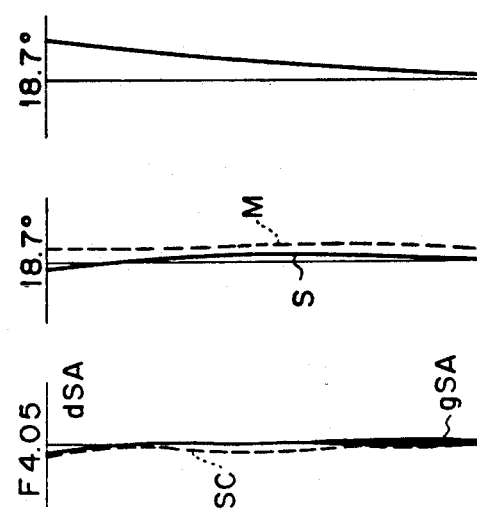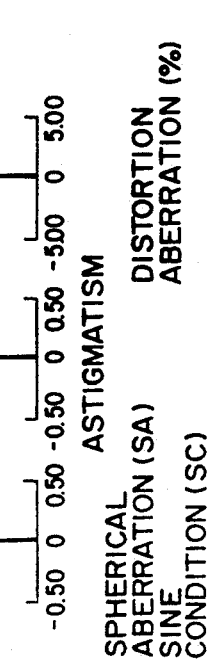

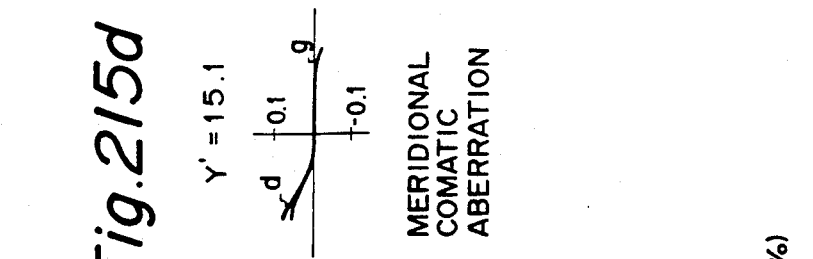
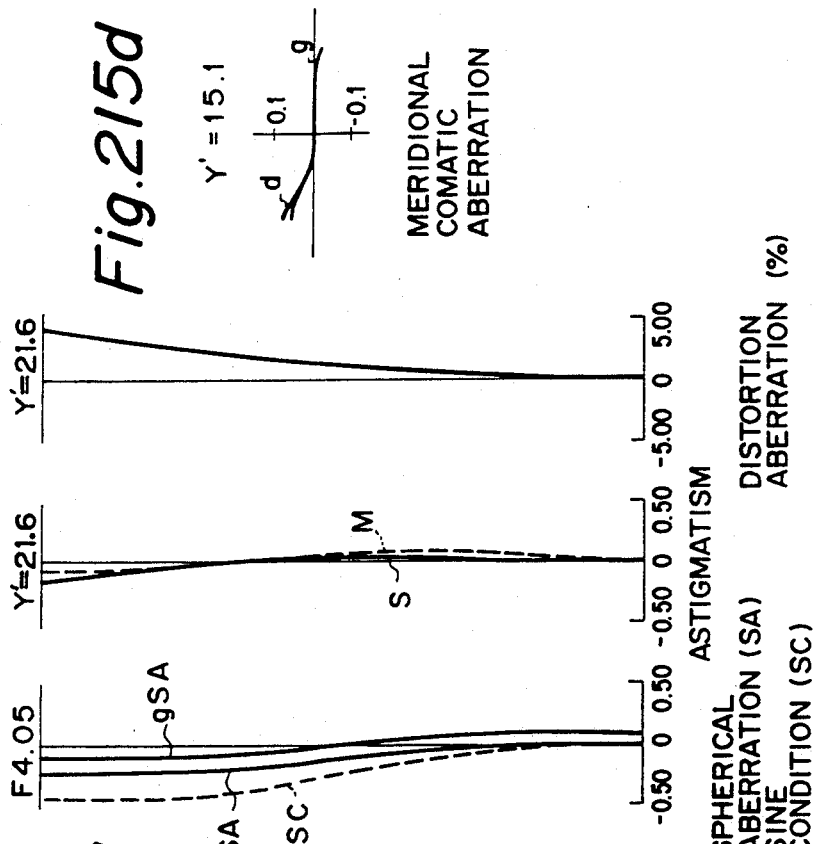
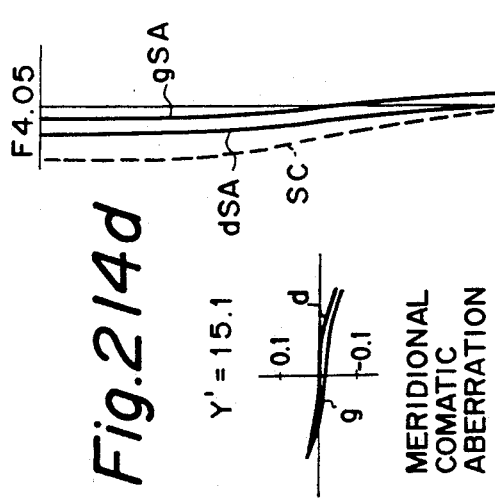
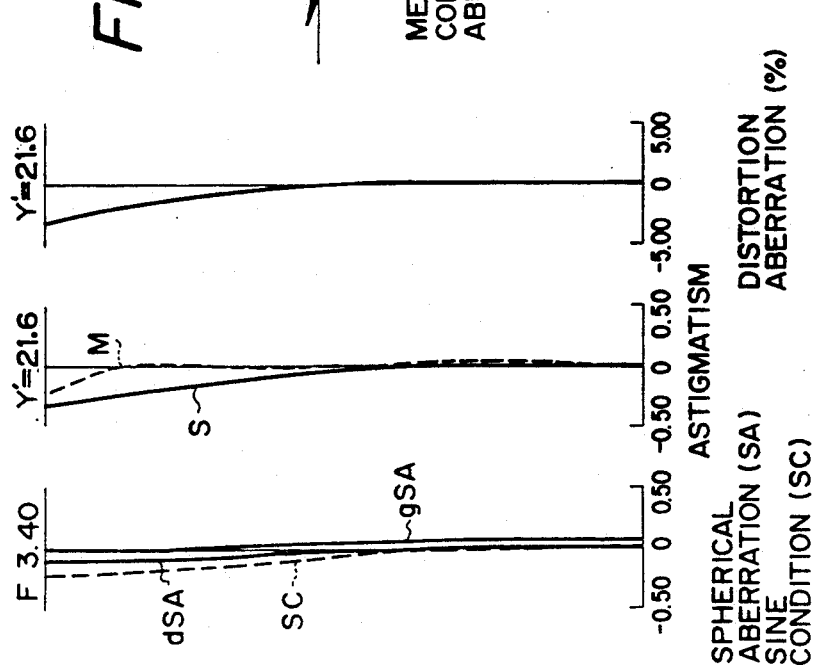

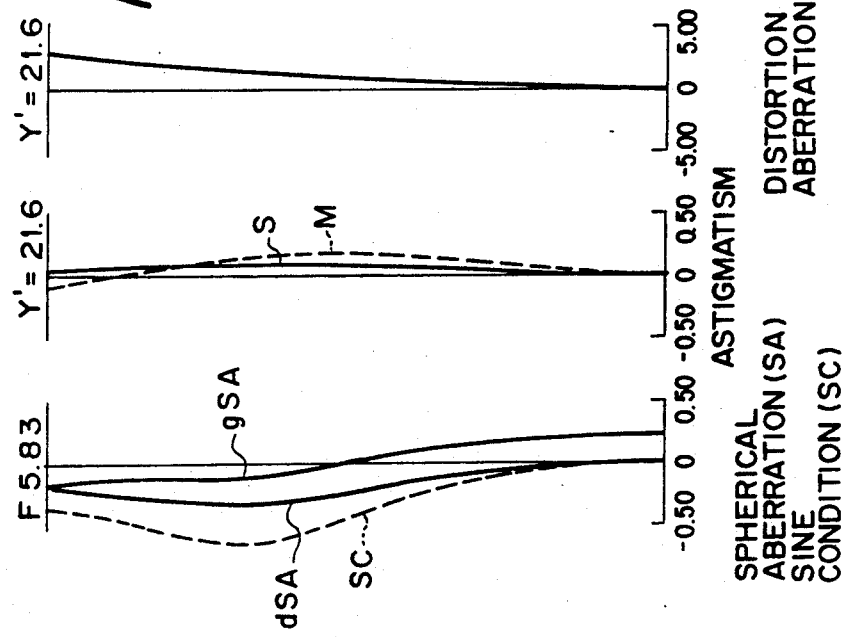
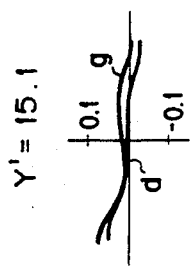
Fig.216a Fig.216b Fig.216c Fig.216d

Fig. 217
(1) RELATION BETWEEN $f_{2F}$ AND $H_2$
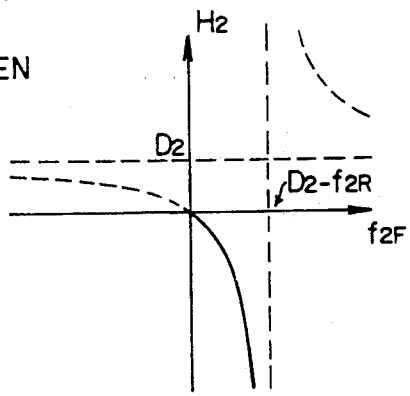
(2) RELATION BETWEEN $f_{2R}$ AND $H_2$
WHEN $D_2 < f_{2F}$, $f_{2F} + f_{2R} < D_2$
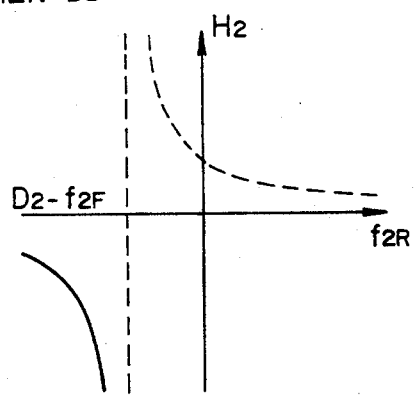
WHEN $D_2 > f_{2F}$, $f_{2R} < 0$
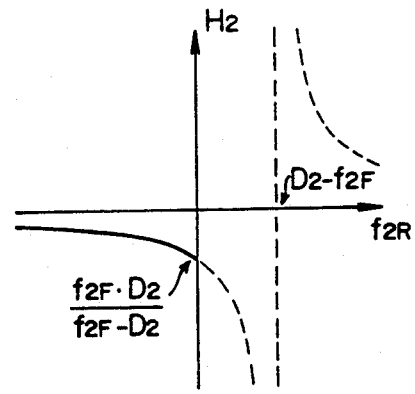
(3) RELATION BETWEEN $D_2$ AND $H_2$
WHEN $f_{2F} + f_{2R} < 0$, $D_2 > 0$
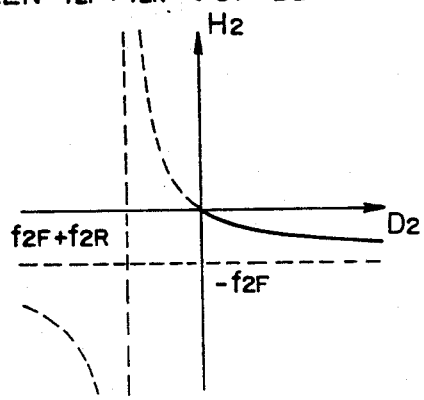
WHEN $f_{2F} + f_{2R} > 0$, $\begin{aligned}f_{2F} + f_{2R} &< D_2 \\ 0 &< D_2\end{aligned}$
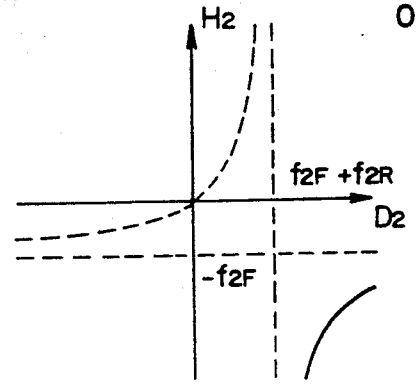

Fig. 218
(1) RELATION BETWEEN $f_{2F}$ AND $f_2$
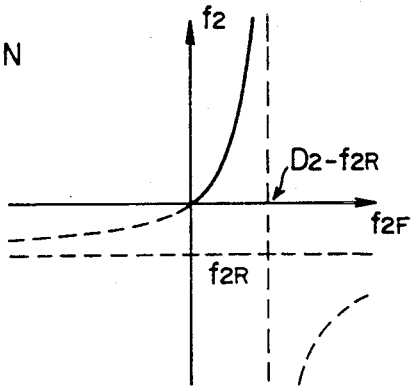
(2) RELATION BETWEEN $f_{2R}$ AND $f_2$
WHEN $D_2 < f_{2F}$, $f_{2F} + f_{2R} < D_2$
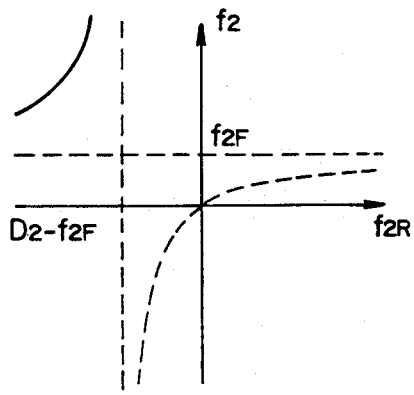
WHEN $D_2 > f_{2F}$, $f_{2R} < 0$
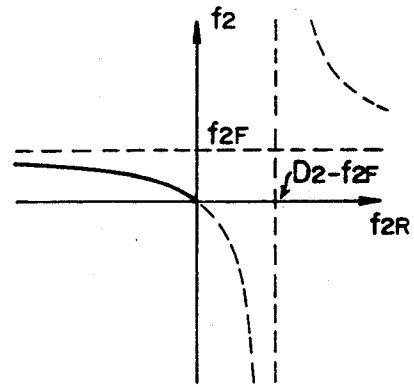
(3) RELATION BETWEEN $D_2$ AND $f_2$
WHEN $f_{2F} + f_{2R} < 0$, $D_2 > 0$
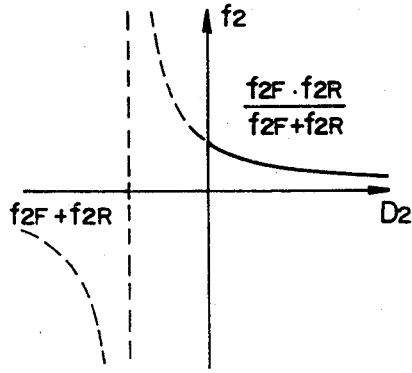
WHEN $f_{2F} + f_{2R} > 0$, $f_{2F} + f_{2R} < D_2$
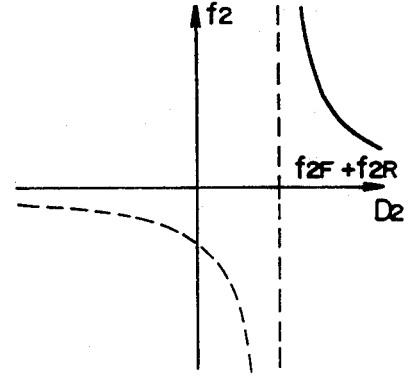

ZOOM LENS HAVING HIGH VARIABLE MAGNIFICATION

BACKGROUND OF THE INVENTION

1. Field of the Invention

The present invention relates to a compact zoom lens which has a high variable magnification and can be used as a photographing lens for a 35 mm lens shutter camera.

2. Description of the Related Art

A general zoom lens used for a 35 mm lens shutter camera is basically of a telephotographic type to reduce an entire length of the zoom lens.

A simplest zoom lens of the telephotographic type is often constructed by a first lens group having a positive focal length and a second lens group having a negative focal length.

However, when the zoom lens of this type is used to obtain a high variable magnification, an F-number of the zoom lens at a telescopic end thereof is extremely increased and a moving amount of the second lens group having a negative focal length is extremely increased when a zooming operation is performed from a wide angle end of the zoom lens to the telescopic end thereof.

To solve these problems, for example, Japanese Patent Application Laying Open (KOKAI) No. 62-50718 and U.S. Pat. No. 4,828,372 show a lens structure constructed by a first lens group having a negative focal length and a second lens group having a positive lens group. This second lens group is constructed by a front lens group having a positive focal length and a rear lens group having a negative focal length. An entire length of the lens structure is reduced by such first and second lens groups.

However, in the lens structure shown in Japanese Patent Application Laying Open (KOKAI) No. 62-50718, the distance between principal points of the front and rear lens groups constituting the second lens group is considerably short in comparison with the focal length of the front lens group. Therefore, refracting power of the front lens group in the second lens group is increased so that it is difficult to reduce an F-number of the lens structure and increase brightness of the lens structure. Further, a back focus of the lens structure is also increased so that the entire length of the lens structure cannot be necessarily reduced sufficiently.

In the lens structure shown in the above U.S. Patent, the distance between principal points of the front and rear lens groups constituting the second lens group is set to be longer than the focal length of the front lens group. Therefore, an F-number of the lens structure is small and a back focus thereof is also short. However, a ratio of a maximum entire length of the lens structure to a focal length of the lens structure at a telescopic end thereof is equal to about 1.1 so that the maximum entire length cannot be necessarily reduced sufficiently.

SUMMARY OF THE INVENTION

It is therefore an object of the present invention to provide a compact zoom lens having a high variable magnification in which the number of movable lens groups is reduced to two and an F-number of the zoom lens at a telescopic end thereof is equal to about 6 showing a bright state and a ratio of a maximum entire length of the zoom lens to a focal length of the zoom lens at the telescopic end thereof is equal to or less than one and a zooming region is widened by changing the focal length of the zoom lens from 36 mm to 102 mm and moving amounts of the movable lens groups at a zooming time of the zoom lens are reduced.

The above object of the present invention can be achieved by a zoom lens having a high variable magnification in which first and second lens groups respectively having negative and positive focal lengths are sequentially arranged from an object side of the zoom lens to an image side thereof and a combined focal length of an entire lens system is changed by changing a distance between the first and second lens groups while the position of an image surface is constantly held, the zoom lens being constructed such that the second lens group is constructed by front and rear lens groups respectively having positive and negative focal lengths, and the respective focal lengths $f_1$ and $f_2$ of the first and second lens groups, the respective focal lengths $f_2(F)$ and $f_2(R)$ of the front and rear lens groups in the second lens group, and combined focal lengths $f(W)$ and $f(T)$ of the entire lens system at wide angle and telescopic ends thereof satisfy the following conditions.

$$[f_1+f_2\cdot\{2-(f_1/f(W))-(f(W)/f_1)\}]/f(T)<0.6 \quad (I)$$

$$[f_1+f_2\cdot\{2-(f_1/f(T))-(f(T)/f_1)\}]/f(T)<0.6 \quad (II)$$

$$0.6<|f_2(R)|/f_2(F)<6.0 \quad (III)$$

$$0.8<f_2(F)/f_2<1.4 \quad (IV)$$

$$0.5<|f_1|/\sqrt{[f(W)\cdot f(T)]}<1.3 \quad (V)$$

where $\sqrt{[\,]}$ means a square root of a value within bracket $[\,]$.

In accordance with a second lens structure of the present invention, the first lens group is constructed by negative and positive lenses sequentially arranged from the object side of the zoom lens to the image side thereof. The front lens group of the second lens group is constructed by a joining positive lens composed of a combination of positive and negative lenses, a positive lens, a negative lens, and a joining positive lens composed of a combination of positive and negative lenses sequentially arranged from the object side of the zoom lens to the image side thereof. The rear lens group of the second lens group is constructed by a joining negative lens composed of a combination of negative and positive lenses.

In accordance with a third lens structure of the present invention, the first lens group is constructed by negative and positive lenses sequentially arranged from the object side of the zoom lens to the image side thereof. The front lens group of the second lens group is constructed by a joining positive lens composed of a combination of positive and negative lenses, a positive lens, a negative lens, and a positive lens sequentially arranged from the object side of the zoom lens to the image side thereof. The rear lens group of the second lens group is constructed by a joining negative lens composed of a combination of negative and positive lenses.

In accordance with a fourth lens structure of the present invention, the first lens group is constructed by negative and positive lenses sequentially arranged from the object side of the zoom lens to the image side thereof. The front lens group of the second lens group is constructed by a positive lens, a positive lens, and a negative lens sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a fifth lens structure of the present invention, the first lens group is constructed by negative and positive lenses sequentially arranged from the object side of the zoom lens to the image side thereof. The front lens group of the second lens group is constructed by a positive lens and a joining lens composed of a combination of positive and negative lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a sixth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, a positive lens, and a negative lens sequentially arranged from the object side of the zoom lens to the image side thereof. The rear lens group of the second lens group is constructed by a positive lens and a negative lens sequentially arranged from the object side of the zoom lens to the image side thereof.

In accordance with a seventh lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, and a joining lens composed of a combination of positive and negative lenses sequentially arranged from the object side of the zoom lens to the image side thereof. The rear lens group of the second lens group is constructed by a positive lens and a negative lens sequentially arranged from the object side of the zoom lens to the image side thereof.

In accordance with an eight lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a positive lens and a joining lens composed of a combination of negative and positive lenses sequentially arranged from the object side of the zoom lens to the image side thereof.

In accordance with a ninth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a tenth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with an eleventh lens structure of the present invention, the first lens group is constructed by negative and positive lenses sequentially arranged from the object side of the zoom lens to the image side thereof. The front lens group of the second lens group is constructed by a positive lens, a joining lens composed of a combination of positive and negative lenses, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a twelfth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, and a joining lens composed of a combination of positive and negative lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a thirteenth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a joining lens composed of a combination of negative and positive lenses sequentially arranged from the object side of the zoom lens to the image side thereof.

In accordance with a fourteenth lens structure of the present invention, the second lens group has a diaphragm between the front and rear lens groups. The zoom lens is constructed such that a moving amount of the diaphragm is smaller than that of the second lens group when a zooming operation is performed from the wide angle end of the zoom lens to the telescopic end thereof.

In accordance with a fifteenth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a sixteenth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with a seventeenth lens structure of the present invention, the first lens group is constructed by negative and positive lenses sequentially arranged from the object side of the zoom lens to the image side thereof. The front lens group of the second lens group is constructed by a positive lens, a joining lens composed of a combination of positive and negative lenses, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In accordance with an eighteenth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a joining lens composed of a combination of negative and positive lenses sequentially arranged from the object side of the zoom lens to the image side thereof.

In accordance with a nineteenth lens structure of the present invention, a distance between the front and rear lens groups in the second lens group is reduced in an intermediate zooming region of the zoom lens.

In accordance with a twentieth lens structure of the present invention, a first diaphragm is disposed within the front lens group of the second lens group, or on an object side thereof, and a second diaphragm having a constant opening diameter is disposed between the front and rear lens groups of the second lens group. The second diaphragm is moved and separated from the front lens group of the second lens group when a zooming operation is performed from the wide angle end of the zoom lens to the telescopic end thereof.

In accordance with a twenty-first lens structure of the present invention, a focusing operation is performed by moving the rear lens group of the second lens group on the image side thereof. The rear lens group of the second lens group includes at least one positive lens, and a lateral magnification $m_2(RW)$ of the rear lens group in the second lens group at the wide angle end of the zoom lens and infinity with respect to a photographed object satisfies the following condition.

$$1.1 < m_2(RW) < 2$$

In accordance with a twenty-second lens structure of the present invention, a diaphragm is disposed between the front and rear lens groups in the second lens group. A moving amount of the diaphragm is set to be smaller than that of the second lens group when a zooming operation is performed from the wide angle end of the zoom lens to the telescopic end thereof.

In accordance with the above structures, it is possible to provide a compact zoom lens having a high variable magnification in which the number of movable lens groups is reduced to two and an F-number of the zoom lens at the telescopic end thereof is equal to about 6 showing a bright state and a ratio of a maximum entire length of the zoom lens to a focal length of the zoom lens at the telescopic end thereof is equal to or less than one and a zooming region is widened by changing the focal length of the zoom lens from 36 mm to 102 mm and moving amounts of the movable lens groups at a zooming time of the zoom lens are reduced.

Further objects and advantages of the present invention will be apparent from the following description of the preferred embodiments of the present invention as illustrated in the accompanying drawings.

BRIEF DESCRIPTION OF THE DRAWINGS

FIGS. 6a, 6b, 6c and 6d are aberration diagrams of the zoom lens at the wide angle end thereof in Embodiment 1 of the present invention;

FIGS. 7a, 7b, 7c and 7d are aberration diagrams of the zoom lens at an intermediate focal length thereof in Embodiment 1 of the present invention;

FIGS. 8a, 8b, 8c and 8d are aberration diagrams of the zoom lens at a telescopic end thereof in Embodiment 1 of the present invention;

FIGS. 9a, 9b, 9c and 9d are aberration diagrams of the zoom lens at the wide angle end thereof in Embodiment 2 of the present invention;

FIGS. 10a, 10b, 10c and 10d are aberration diagrams of the zoom lens at an intermediate focal length thereof in Embodiment 2 of the present invention;

FIGS. 11a, 11b, 11c and 11d are aberration diagrams of the zoom lens at a telescopic end thereof in Embodiment 2 of the present invention;

FIGS. 12a, 12b, 12c and 12d are aberration diagrams of the zoom lens at the wide angle end thereof in Embodiment 3 of the present invention;

FIGS. 13a, 13b, 13c and 13d are aberration diagrams of the zoom lens at an intermediate focal length thereof in Embodiment 3 of the present invention;

FIGS. 14a, 14b, 14c and 14d are aberration diagrams of the zoom lens at a telescopic end thereof in Embodiment 3 of the present invention;

FIG. 17 is a view showing the arrangement of a zoom lens at a wide angle end thereof in accordance with Embodiment 6 of the present invention;

FIGS. 18a, 18b, 18c and 18d are aberration diagrams of the zoom lens at the wide angle end thereof in Embodiment 4 of the present invention;

FIGS. 19a, 19b, 19c and 19d are aberration diagrams of the zoom lens at an intermediate focal length thereof in Embodiment 4 of the present invention;

FIGS. 20a, 20b, 20c and 20d are aberration diagrams of the zoom lens at a telescopic end thereof in Embodiment 4 of the present invention;

FIGS. 21a, 21b, 21c and 21d are aberration diagrams of the zoom lens at the wide angle end thereof in Embodiment 5 of the present invention;

FIGS. 22a, 22b, 22c and 22d are aberration diagrams of the zoom lens at an intermediate focal length thereof in Embodiment 5 of the present invention;

FIGS. 23a, 23b, 23c and 23d are aberration diagrams of the zoom lens at a telescopic end thereof in Embodiment 5 of the present invention;

FIGS. 24a, 24b, 24c and 24d are aberration diagrams of the zoom lens at the wide angle end thereof in Embodiment 6 of the present invention;

FIGS. 25a, 25b, 25c and 25d are aberration diagrams of the zoom lens at an intermediate focal length thereof in Embodiment 6 of the present invention;

FIGS. 26a, 26b, 26c and 26d are aberration diagrams of the zoom lens at a telescopic end thereof in Embodiment 6 of the present invention;

FIG. 27 is a view showing the arrangement of a zoom lens at a wide angle end thereof in accordance with Embodiment 7 of the present invention;

FIGS. 30a, 30b, 30c and 30d are aberration diagrams of the zoom lens at the wide angle end thereof in Embodiment 7 of the present invention;

FIGS. 31a, 31b, 31c and 31d are aberration diagrams of the zoom lens at an intermediate focal length thereof in Embodiment 7 of the present invention;

FIGS. 32a, 32b, 32c and 32d are aberration diagrams of the zoom lens at a telescopic end thereof in Embodiment 7 of the present invention;

FIGS. 33a, 33b, 33c and 33d are aberration diagrams of the zoom lens at the wide angle end thereof in Embodiment 8 of the present invention;

FIGS. 34a, 34b, 34c and 34d are aberration diagrams of the zoom lens at an intermediate focal length thereof in Embodiment 8 of the present invention;

FIGS. 35a, 35b, 35c and 35d are aberration diagrams of the zoom lens at a telescopic end thereof in Embodiment 8 of the present invention;

FIGS. 36a, 36b, 36c and 36d are aberration diagrams of the zoom lens at the wide angle end thereof in Embodiment 9 of the present invention;

FIGS. 37a, 37b, 37c and 37d are aberration diagrams of the zoom lens at an intermediate focal length thereof in Embodiment 9 of the present invention;

FIGS. 38a, 38b, 38c and 38d are aberration diagrams of the zoom lens at a telescopic end thereof in Embodiment 9 of the present invention;

FIG. 39 is a view showing the arrangement of a zoom lens at a wide angle end thereof in accordance with Embodiment 10 of the present invention;

FIG. 41 is a view showing the arrangement of a zoom lens at a wide angle end thereof in accordance with Embodiment 12 of the present invention;

FIGS. 42a, 42b, 42c and 42d are aberration diagrams of the zoom lens at the wide angle end thereof in Embodiment 10 of the present invention;

FIGS. 43a, 43b, 43c and 43d are aberration diagrams of the zoom lens at an intermediate focal length thereof in Embodiment 10 of the present invention;

FIGS. 44a, 44b, 44c and 44d are aberration diagrams of the zoom lens at a telescopic end thereof in Embodiment 10 of the present invention;

FIGS. 45a, 45b, 45c and 45d are aberration diagrams of the zoom lens at the wide angle end thereof in Embodiment 11 of the present invention;

FIGS. 46a, 46b, 46c and 46d are aberration diagrams of the zoom lens at an intermediate focal length thereof in Embodiment 11 of the present invention;

FIGS. 49a, 49b, 49c and 49d are aberration diagrams of the zoom lens at an intermediate focal length thereof in Embodiment 12 of the present invention;

FIGS. 50a, 50b, 50c and 50d are aberration diagrams of the zoom lens at a telescopic end thereof in Embodiment 12 of the present invention;

FIGS. 54a, 54b, 54c and 54d are aberration diagrams of the zoom lens at the wide angle end thereof in Embodiment 13 of the present invention;

FIGS. 55a, 55b, 55c and 55d are aberration diagrams of the zoom lens at an intermediate focal length thereof in Embodiment 13 of the present invention;

FIGS. 56a, 56b, 56c and 56d are aberration diagrams of the zoom lens at a telescopic end thereof in Embodiment 13 of the present invention;

FIGS. 57a, 57b, 57c and 57d are aberration diagrams of the zoom lens at the wide angle end thereof in Embodiment 14 of the present invention;

FIGS. 58a, 58b, 58c and 58d are aberration diagrams of the zoom lens at an intermediate focal length thereof in Embodiment 14 of the present invention;

FIGS. 59a, 59b, 59c and 59d are aberration diagrams of the zoom lens at a telescopic end thereof in Embodiment 14 of the present invention;

FIGS. 60a, 60b, 60c and 60d are aberration diagrams of the zoom lens at the wide angle end thereof in Embodiment 15 of the present invention;

FIGS. 61a, 61b, 61c and 61d are aberration diagrams of the zoom lens at an intermediate focal length thereof in Embodiment 15 of the present invention;

FIGS. 62a, 62b, 62c and 62d are aberration diagrams of the zoom lens at a telescopic end thereof in Embodiment 15 of the present invention;

FIG. 65 is a view showing the arrangement of a zoom lens at a wide angle end thereof in accordance with Embodiment 18 of the present invention;

FIGS. 66a, 66b, 66c and 66d are aberration diagrams of the zoom lens at the wide angle end thereof in Embodiment 16 of the present invention;

FIGS. 67a, 67b, 67c and 67d are aberration diagrams of the zoom lens at an intermediate focal length thereof in Embodiment 16 of the present invention;

FIGS. 68a, 68b, 68c and 68d are aberration diagrams of the zoom lens at a telescopic end thereof in Embodiment 16 of the present invention;

FIGS. 69a, 69b, 69c and 69d are aberration diagrams of the zoom lens at the wide angle end thereof in Embodiment 17 of the present invention;

FIGS. 70a, 70b, 70c and 70d are aberration diagrams of the zoom lens at an intermediate focal length thereof in Embodiment 17 of the present invention;

FIGS. 71a, 71b, 71c and 71d are aberration diagrams of the zoom lens at a telescopic end thereof in Embodiment 17 of the present invention;

FIGS. 72a, 72b, 72c and 72d are aberration diagrams of the zoom lens at the wide angle end thereof in Embodiment 18 of the present invention;

FIGS. 73a, 73b, 73c and 73d are aberration diagrams of the zoom lens at an intermediate focal length thereof in Embodiment 18 of the present invention;

FIGS. 74a, 74b, 74c and 74d are aberration diagrams of the zoom lens at a telescopic end thereof in Embodiment 18 of the present invention;

FIGS. 78a, 78b, 78c and 78d are aberration diagrams of the zoom lens at the wide angle end thereof in Embodiment 19 of the present invention;

FIGS. 79a, 79b, 79c and 79d are aberration diagrams of the zoom lens at an intermediate focal length thereof in Embodiment 19 of the present invention;

FIGS. 80a, 80b, 80c and 80d are aberration diagrams of the zoom lens at a telescopic end thereof in Embodiment 19 of the present invention;

FIGS. 81a, 81b, 81c and 81d are aberration diagrams of the zoom lens at the wide angle end thereof in Embodiment 20 of the present invention;

FIGS. 82a, 82b, 82c and 82d are aberration diagrams of the zoom lens at an intermediate focal length thereof in Embodiment 20 of the present invention;

FIGS. 83a, 83b, 83c and 83d are aberration diagrams of the zoom lens at a telescopic end thereof in Embodiment 20 of the present invention;

FIGS. 84a, 84b, 84c and 84d are aberration diagrams of the zoom lens at the wide angle end thereof in Embodiment 21 of the present invention;

FIGS. 85a, 85b, 85c and 85d are aberration diagrams of the zoom lens at an intermediate focal length thereof in Embodiment 21 of the present invention;

FIGS. 86a, 86b, 86c and 86d are aberration diagrams of the zoom lens at a telescopic end thereof in Embodiment 21 of the present invention;

FIG. 87 is a view showing the arrangement of a zoom lens at a wide angle end thereof in accordance with Embodiment 22 of the present invention;

FIGS. 90a, 90b, 90c and 90d are aberration diagrams of the zoom lens at the wide angle end thereof in Embodiment 22 of the present invention;

FIGS. 91a, 91b, 91c and 91d are aberration diagrams of the zoom lens at an intermediate focal length thereof in Embodiment 22 of the present invention;

FIGS. 92a, 92b, 92c and 92d are aberration diagrams of the zoom lens at a telescopic end thereof in Embodiment 22 of the present invention;

FIGS. 93a, 93b, 93c and 93d are aberration diagrams of the zoom lens at the wide angle end thereof in Embodiment 23 of the present invention;

FIGS. 94a, 94b, 94c and 94d are aberration diagrams of the zoom lens at an intermediate focal length thereof in Embodiment 23 of the present invention;

FIGS. 95a, 95b, 95c and 95d are aberration diagrams of the zoom lens at a telescopic end thereof in Embodiment 23 of the present invention;

FIGS. 96a, 96b, 96c and 96d are aberration diagrams of the zoom lens at the wide angle end thereof in Embodiment 24 of the present invention;

FIGS. 97a, 97b, 97c and 97d are aberration diagrams of the zoom lens at an intermediate focal length thereof in Embodiment 24 of the present invention;

FIGS. 98a, 98b, 98c and 98d are aberration diagrams of the zoom lens at a telescopic end thereof in Embodiment 24 of the present invention;

FIGS. 102a, 102b, 102c and 102d are aberration diagrams of the zoom lens at the wide angle end thereof in Embodiment 25 of the present invention;

FIGS. 103a, 103b, 103c and 103d are aberration diagrams of the zoom lens at an intermediate focal length thereof in Embodiment 25 of the present invention;

FIGS. 104a, 104b, 104c and 104d are aberration diagrams of the zoom lens at a telescopic end thereof in Embodiment 25 of the present invention;

FIGS. 105a, 105b, 105c and 105d are aberration diagrams of the zoom lens at the wide angle end thereof in Embodiment 26 of the present invention;

FIGS. 106a, 106b, 106c and 106d are aberration diagrams of the zoom lens at an intermediate focal length thereof in Embodiment 26 of the present invention;

FIGS. 107a, 107b, 107c and 107d are aberration diagrams of the zoom lens at a telescopic end thereof in Embodiment 26 of the present invention;

FIGS. 108a, 108b, 108c and 108d are aberration diagrams of the zoom lens at the wide angle end thereof in Embodiment 27 of the present invention;

FIGS. 109a, 109b, 109c and 109d are aberration diagrams of the zoom lens at an intermediate focal length thereof in Embodiment 27 of the present invention;

FIGS. 110a, 110b, 110c and 110d are aberration diagrams of the zoom lens at a telescopic end thereof in Embodiment 27 of the present invention;

FIGS. 114a, 114b, 114c and 114d are aberration diagrams of the zoom lens at the wide angle end thereof in Embodiment 28 of the present invention;

FIGS. 115a, 115b, 115c and 115d are aberration diagrams of the zoom lens at an intermediate focal length thereof in Embodiment 28 of the present invention;

FIGS. 116a, 116b, 116c and 116d are aberration diagrams of the zoom lens at a telescopic end thereof in Embodiment 28 of the present invention;

FIGS. 117a, 117b, 117c and 117d are aberration diagrams of the zoom lens at the wide angle end thereof in Embodiment 29 of the present invention;

FIGS. 118a, 118b, 118c and 118d are aberration diagrams of the zoom lens at an intermediate focal length thereof in Embodiment 29 of the present invention;

FIGS. 119a, 119b, 119c and 119d are aberration diagrams of the zoom lens at a telescopic end thereof in Embodiment 29 of the present invention;

FIGS. 120a, 120b, 120c and 120d are aberration diagrams of the zoom lens at the wide angle end thereof in Embodiment 30 of the present invention;

FIGS. 121a, 121b, 121c and 121d are aberration diagrams of the zoom lens at an intermediate focal length thereof in Embodiment 30 of the present invention;

FIGS. 122a, 122b, 122c and 122d are aberration diagrams of the zoom lens at a telescopic end thereof in Embodiment 30 of the present invention;

FIG. 123 is a view showing the arrangement of a zoom lens at a wide angle end thereof in accordance with Embodiment 31 of the present invention;

FIG. 124 is a view showing the arrangement of a zoom lens at a wide angle end thereof in accordance with Embodiment 32 of the present invention;

FIG. 125 is a view showing the arrangement of a zoom lens at a wide angle end thereof in accordance with Embodiment 33 of the present invention;

FIGS. 126a, 126b, 126c and 126d are aberration diagrams of the zoom lens at the wide angle end thereof in Embodiment 31 of the present invention;

FIGS. 127a, 127b, 127c and 127d are aberration diagrams of the zoom lens at an intermediate focal length thereof in Embodiment 31 of the present invention;

FIGS. 128a, 128b, 128c and 128d are aberration diagrams of the zoom lens at a telescopic end thereof in Embodiment 31 of the present invention;

FIGS. 129a, 129b, 129c and 129d are aberration diagrams of the zoom lens at the wide angle end thereof in Embodiment 32 of the present invention;

FIGS. 130a, 130b, 130c and 130d are aberration diagrams of the zoom lens at an intermediate focal length thereof in Embodiment 32 of the present invention;

FIGS. 131a, 131b, 131c and 131d are aberration diagrams of the zoom lens at a telescopic end thereof in Embodiment 32 of the present invention;

Figure 136:
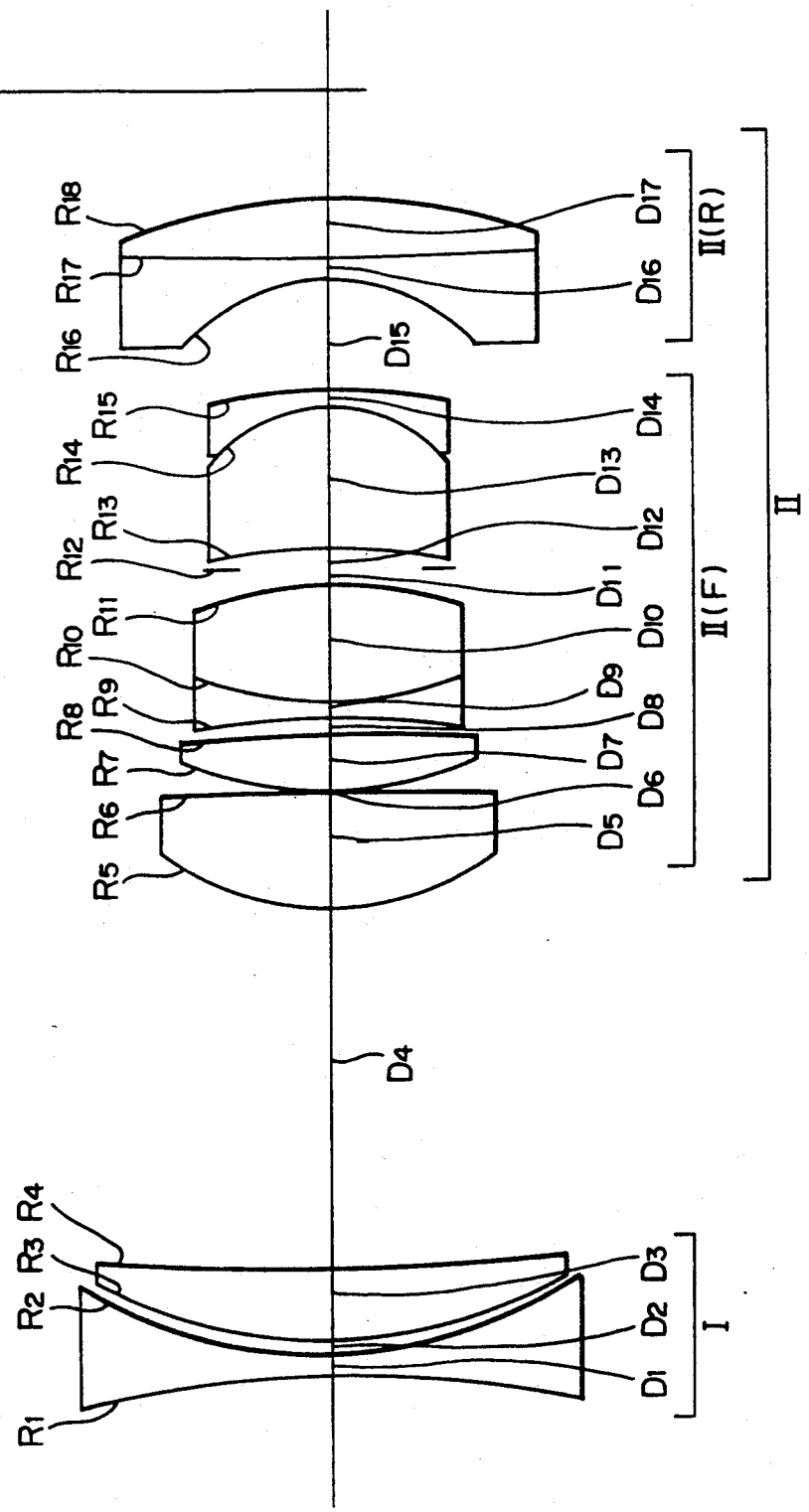
Figure 137:
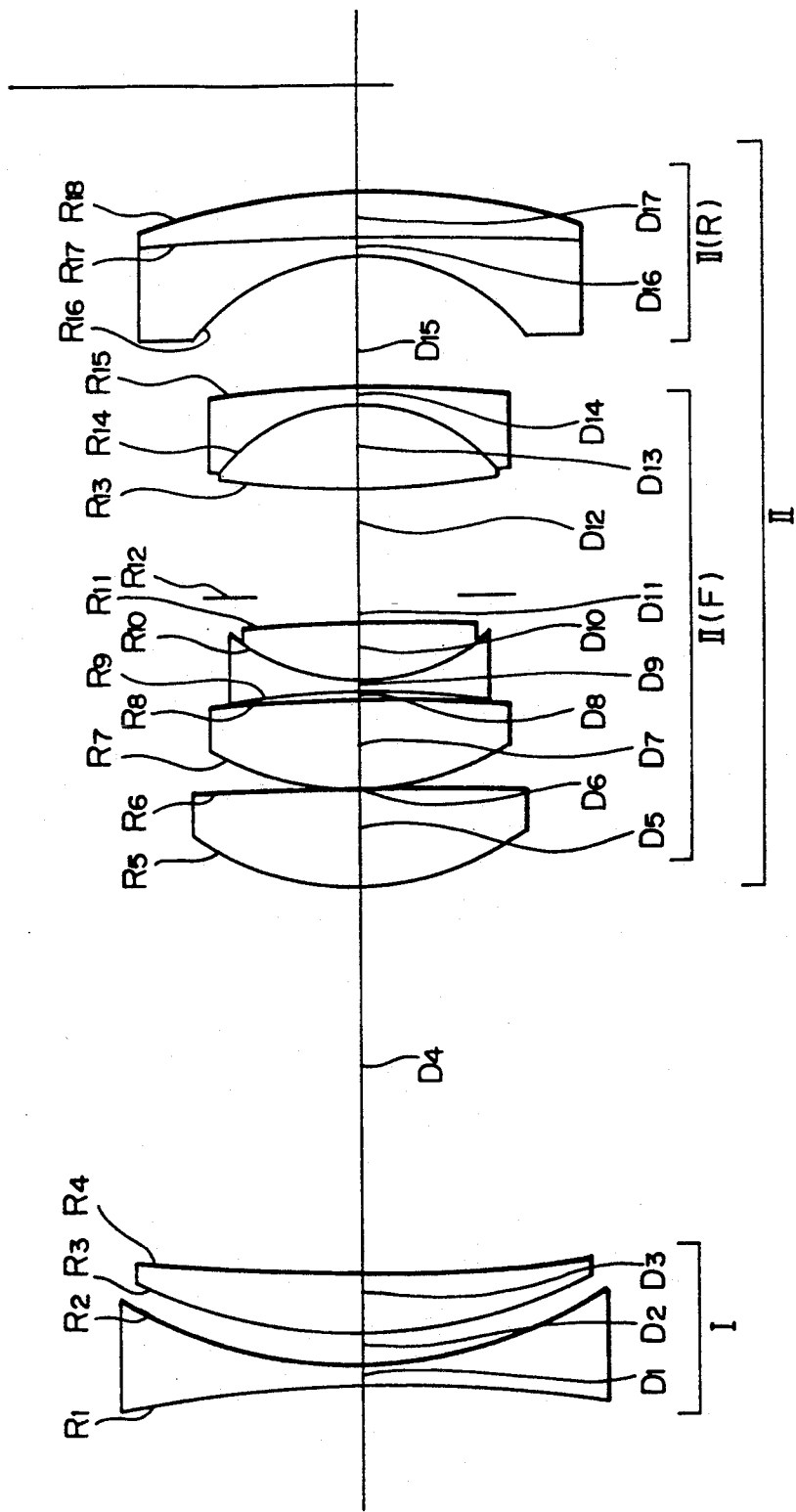
Figure 147:
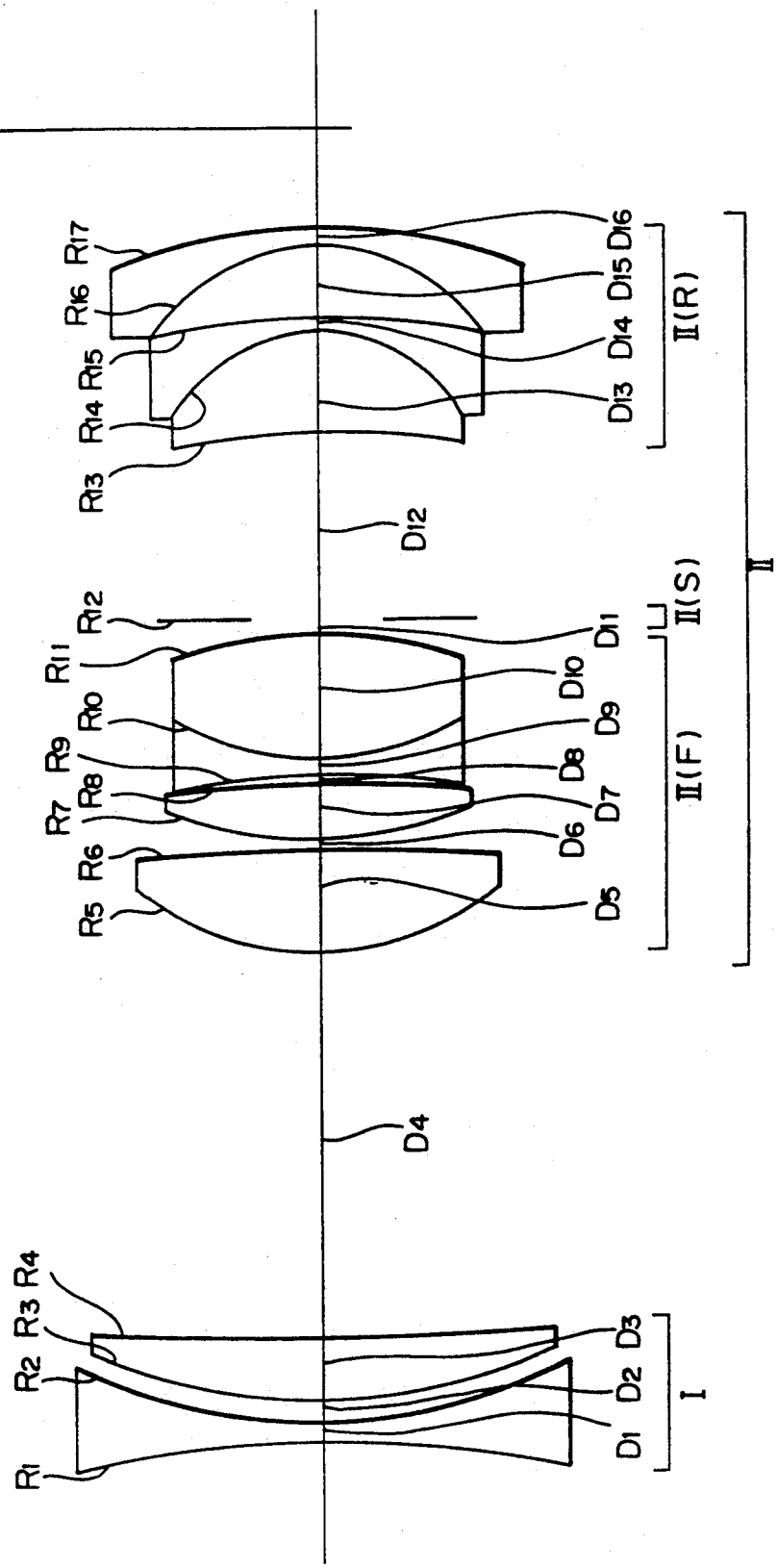
Figure 148:
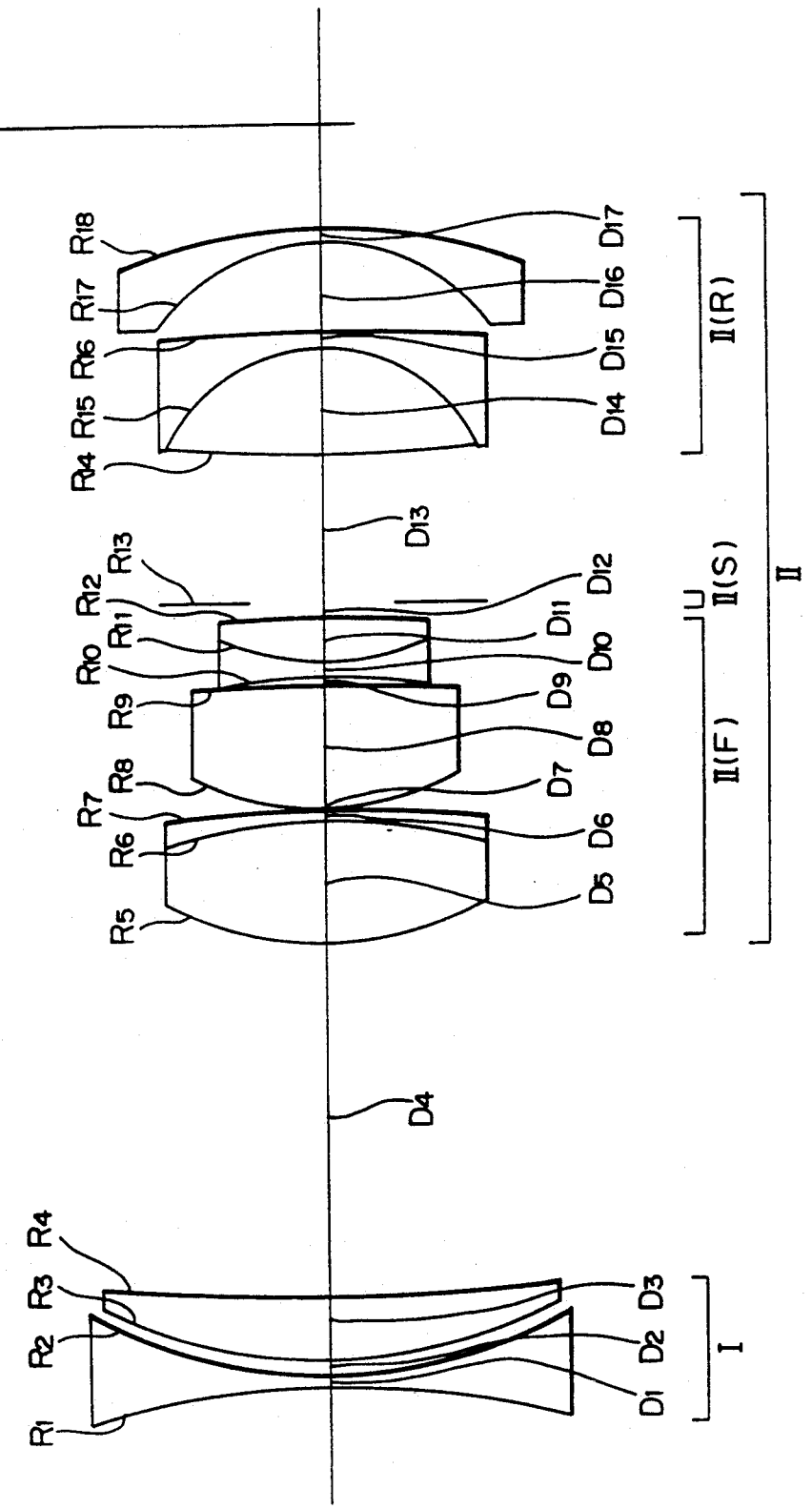
Figure 149:
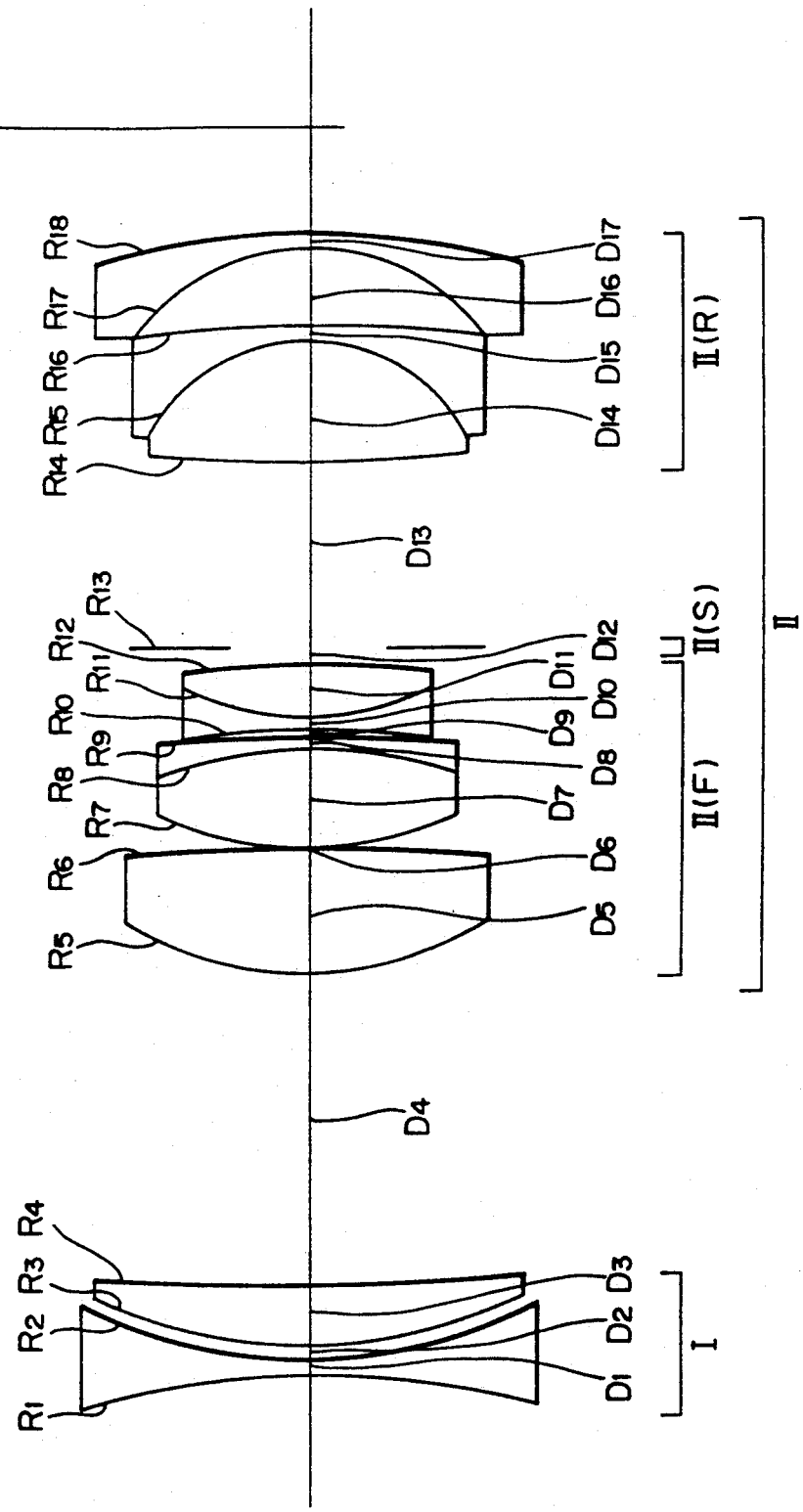
Figure 163:
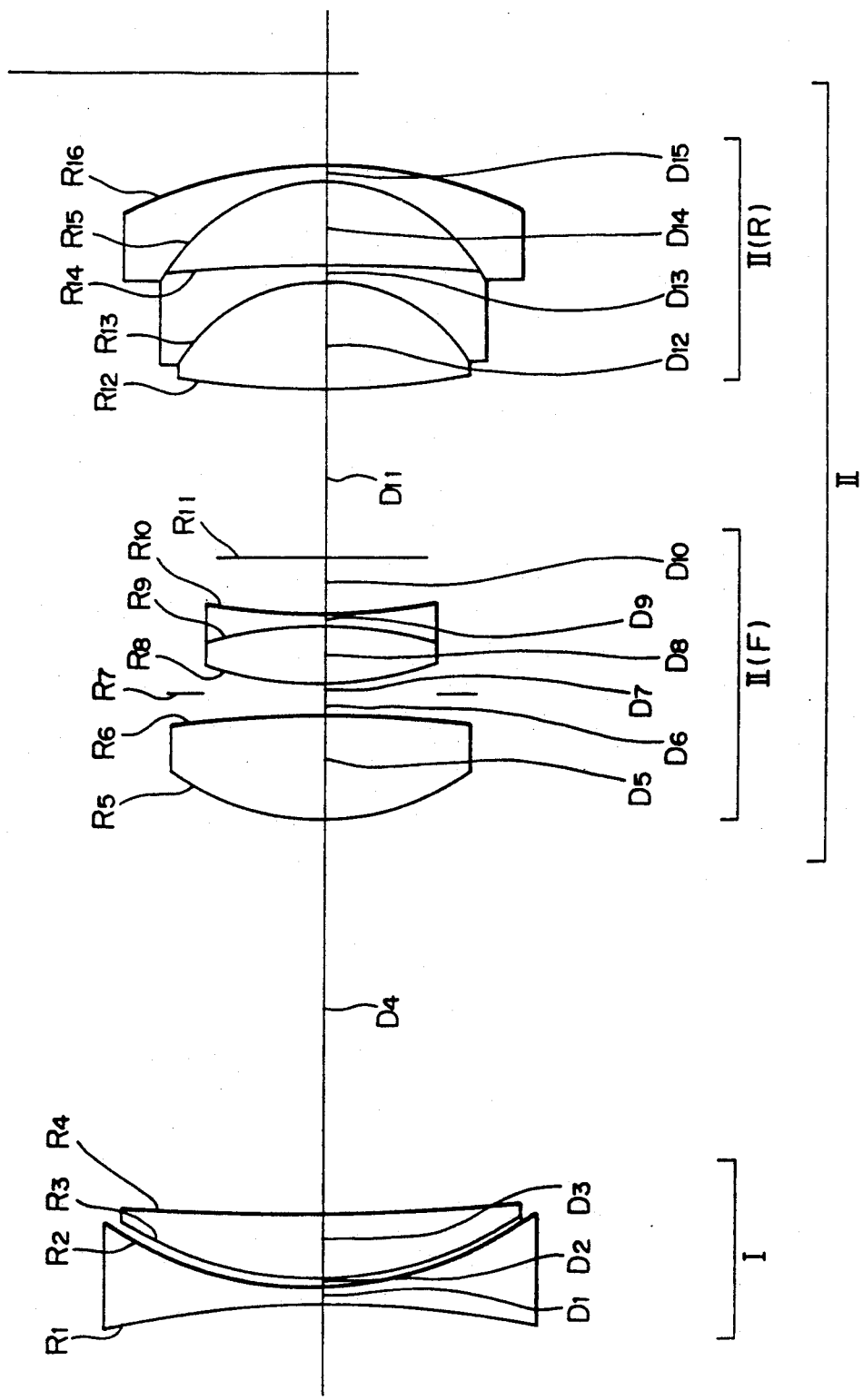
Figure 164:
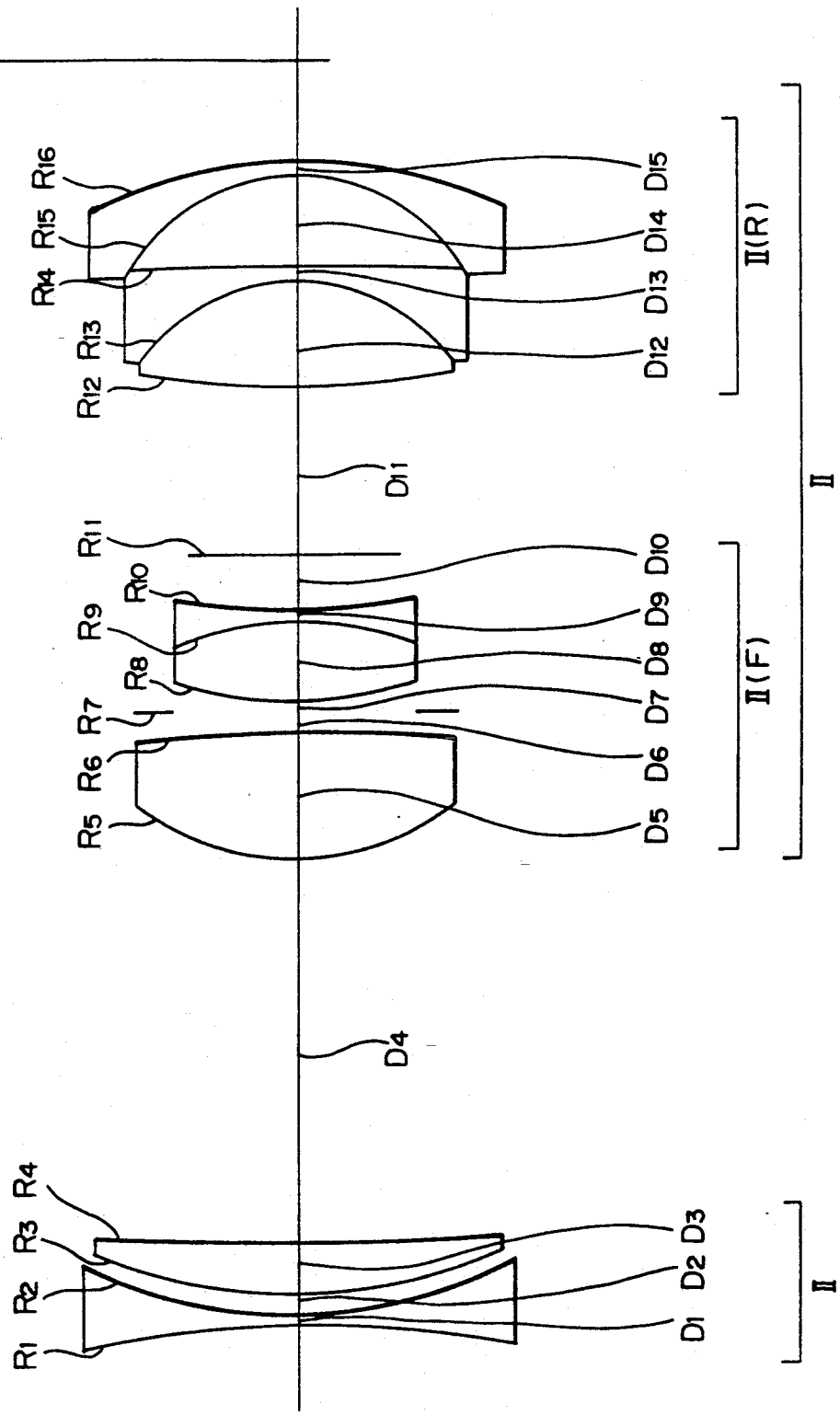
Figure 165:
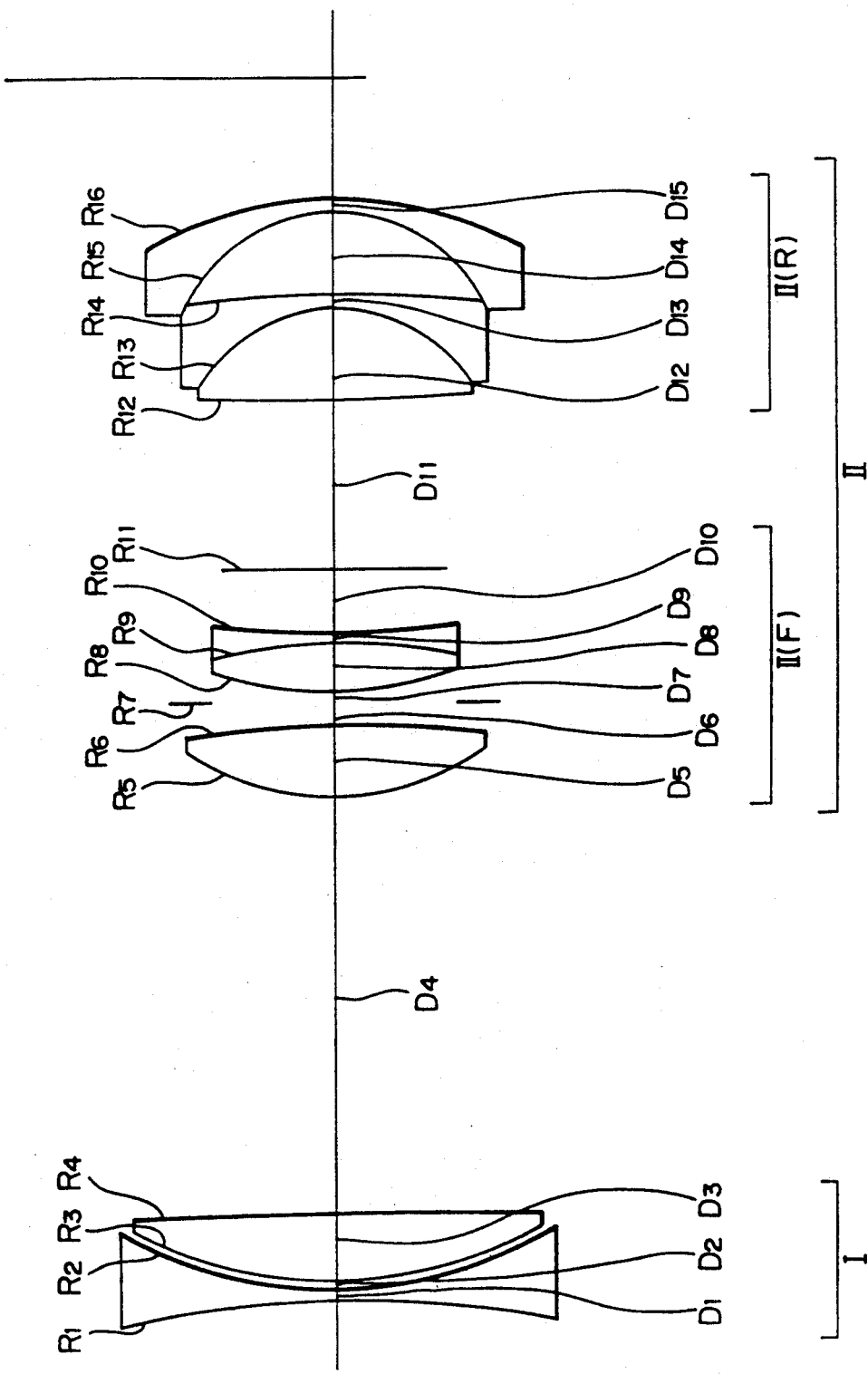
Figure 166:
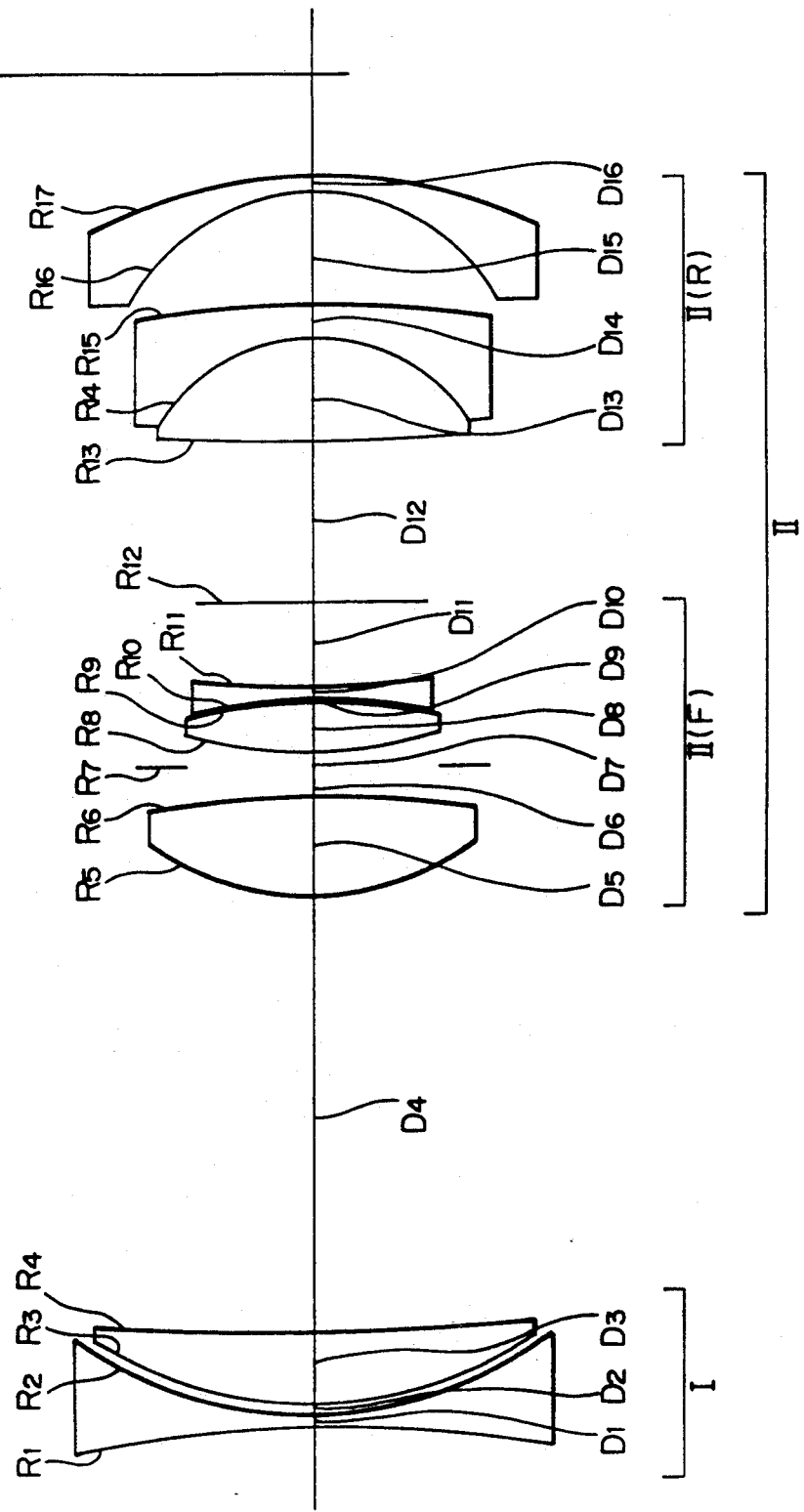
Figure 196:
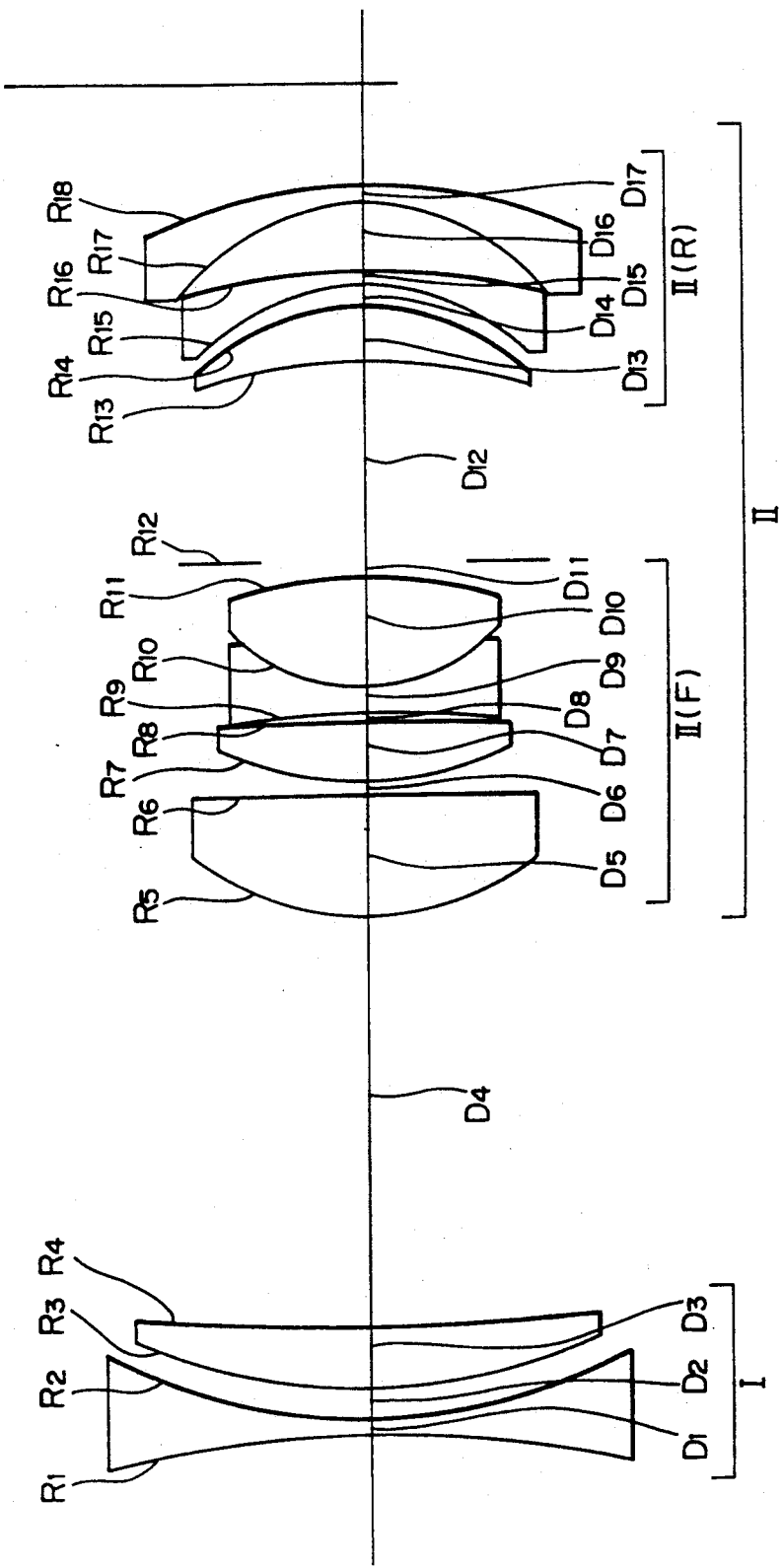
Figure 197:
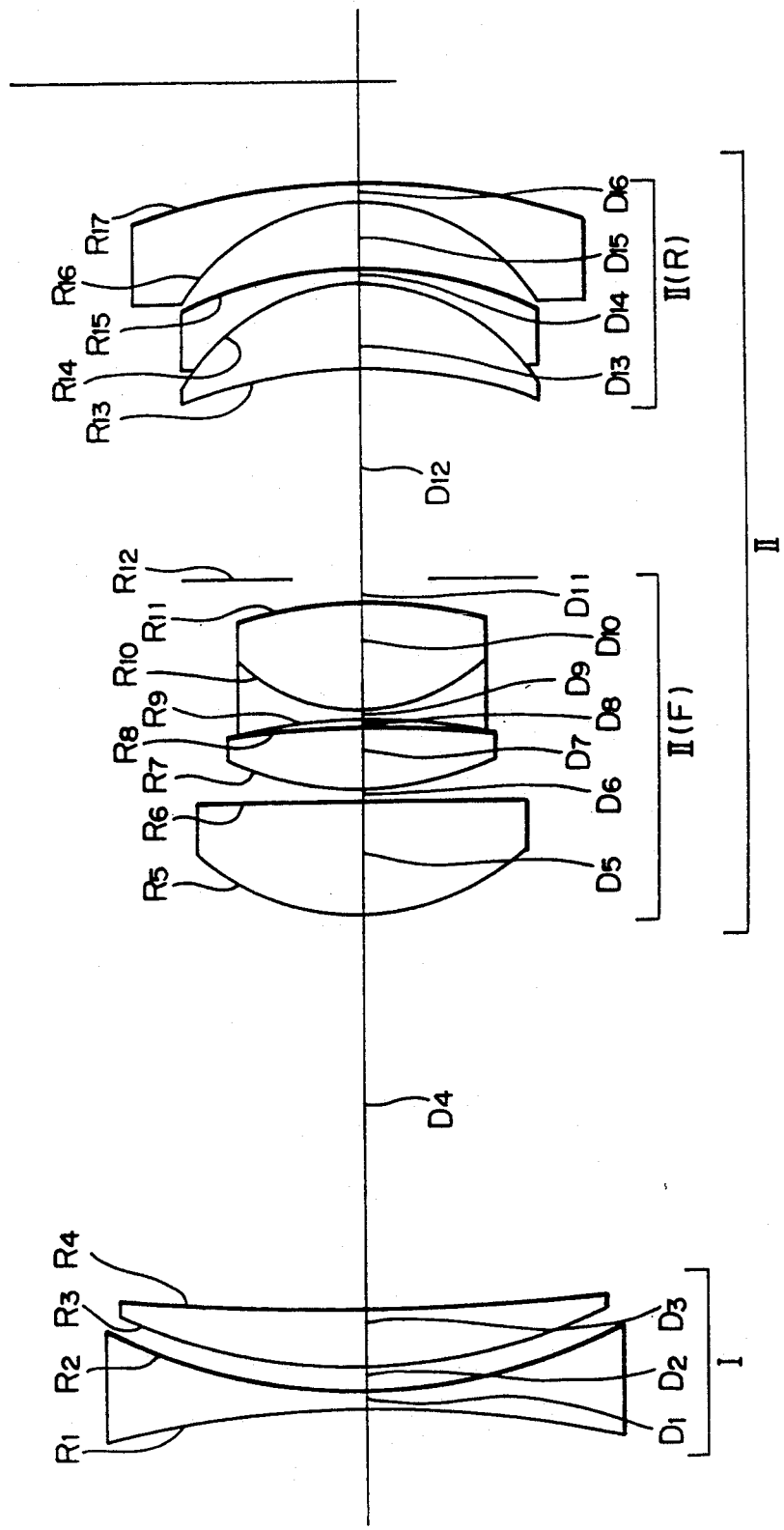
Figure 198:
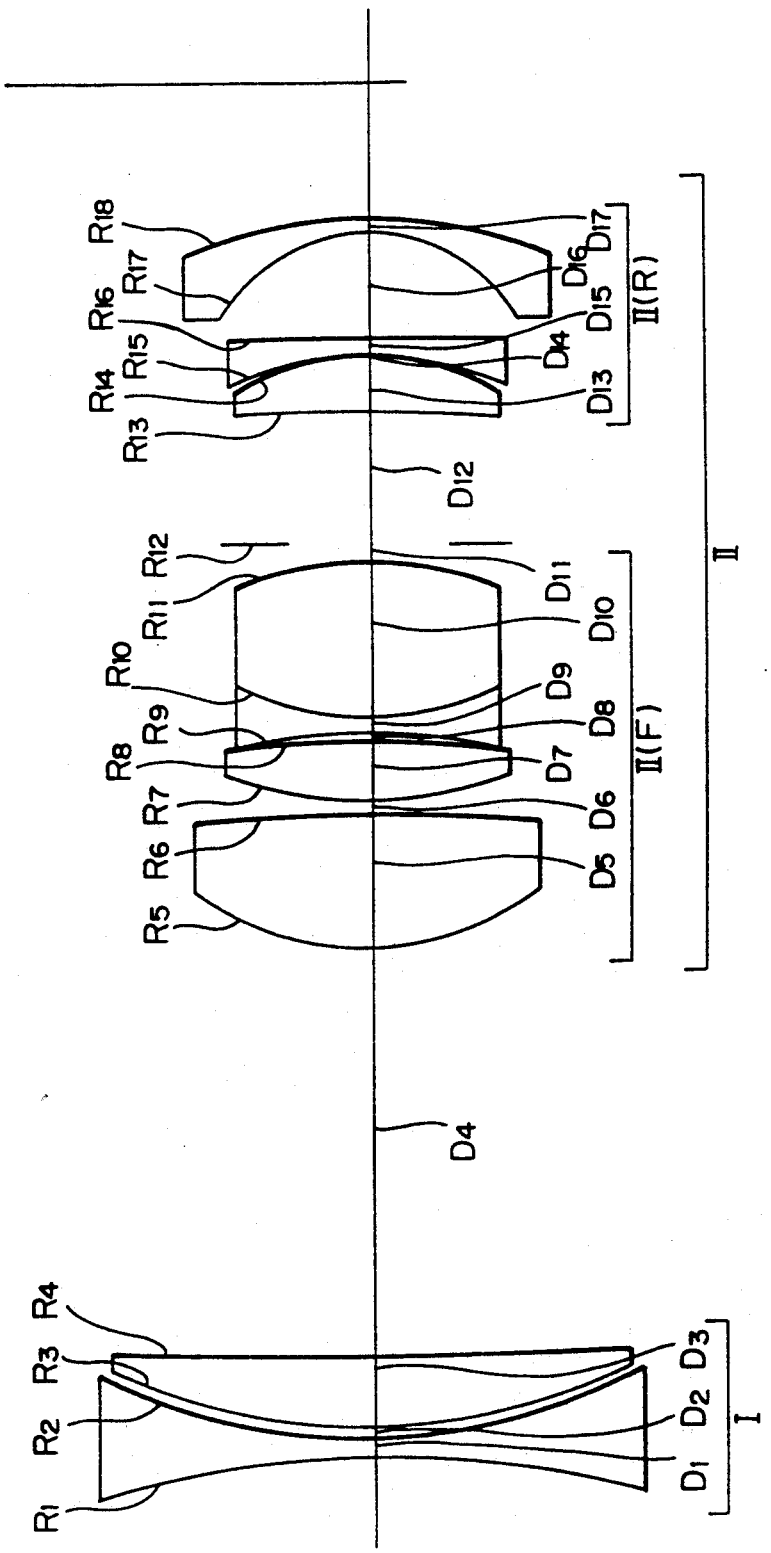

FIGS. 132a, 132b, 132c and 132d are aberration diagrams of the zoom lens at the wide angle end thereof in Embodiment 33 of the present invention;

FIGS. 133a, 133b, 133c and 133d are aberration diagrams of the zoom lens at an intermediate focal length thereof in Embodiment 33 of the present invention;

FIGS. 134a, 134b, 134c and 134d are aberration diagrams of the zoom lens at a telescopic end thereof in Embodiment 33 of the present invention;

FIG. 135 is a view showing the arrangement of a zoom lens at a wide angle end thereof in accordance with Embodiment 34 of the present invention;

FIG. 136 is a view showing the arrangement of a zoom lens at a wide angle end thereof in accordance with Embodiment 35 of the present invention;

FIG. 137 is a view showing the arrangement of a zoom lens at a wide angle end thereof in accordance with Embodiment 36 of the present invention;

FIGS. 138a, 138b, 138c and 138d are aberration diagrams of the zoom lens at the wide angle end thereof in Embodiment 34 of the present invention;

FIGS. 139a, 139b, 139c and 139d are aberration diagrams of the zoom lens at an intermediate focal length thereof in Embodiment 34 of the present invention;

FIGS. 140a, 140b, 140c and 140d are aberration diagrams of the zoom lens at a telescopic end thereof in Embodiment 34 of the present invention;

FIGS. 141a, 141b, 141c and 141d are aberration diagrams of the zoom lens at the wide angle end thereof in Embodiment 35 of the present invention;

FIGS. 142a, 142b, 142c and 142d are aberration diagrams of the zoom lens at an intermediate focal length thereof in Embodiment 35 of the present invention;

FIGS. 143a, 143b, 143c and 143d are aberration diagrams of the zoom lens at a telescopic end thereof in Embodiment 35 of the present invention;

FIGS. 144a, 144b, 144c and 144d are aberration diagrams of the zoom lens at the wide angle end thereof in Embodiment 36 of the present invention;

FIGS. 145a, 145b, 145c and 145d are aberration diagrams of the zoom lens at an intermediate focal length thereof in Embodiment 36 of the present invention;

FIGS. 146a, 146b, 146c and 146d are aberration diagrams of the zoom lens at a telescopic end thereof in Embodiment 36 of the present invention;

FIG. 147 is a view showing the arrangement of a zoom lens at a wide angle end thereof in accordance with Embodiment 37 of the present invention;

FIG. 148 is a view showing the arrangement of a zoom lens at a wide angle end thereof in accordance with Embodiment 38 of the present invention;

FIG. 149 is a view showing the arrangement of a zoom lens at a wide angle end thereof in accordance with Embodiment 39 of the present invention;

FIG. 150 is a view showing the arrangement of a zoom lens at a wide angle end thereof in accordance with Embodiment 40 of the present invention;

FIGS. 151a, 151b, 151c and 151d are aberration diagrams of the zoom lens at the wide angle end thereof in Embodiment 37 of the present invention;

FIGS. 152a, 152b, 152c and 152d are aberration diagrams of the zoom lens at an intermediate focal length thereof in Embodiment 37 of the present invention;

FIGS. 153a, 153b, 153c and 153d are aberration diagrams of the zoom lens at a telescopic end thereof in Embodiment 37 of the present invention;

FIGS. 154a, 154b, 154c and 154d are aberration diagrams of the zoom lens at the wide angle end thereof in Embodiment 38 of the present invention;

FIGS. 155a, 155b, 155c and 155d are aberration diagrams of the zoom lens at an intermediate focal length thereof in Embodiment 38 of the present invention;

FIGS. 156a, 156b, 156c and 156d are aberration diagrams of the zoom lens at a telescopic end thereof in Embodiment 38 of the present invention;

FIGS. 157a, 157b, 157c and 157d are aberration diagrams of the zoom lens at the wide angle end thereof in Embodiment 39 of the present invention;

FIGS. 158a, 158b, 158c and 158d are aberration diagrams of the zoom lens at an intermediate focal length thereof in Embodiment 39 of the present invention;

FIGS. 159a, 159b, 159c and 159d are aberration diagrams of the zoom lens at a telescopic end thereof in Embodiment 39 of the present invention;

FIGS. 160a, 160b, 160c and 160d are aberration diagrams of the zoom lens at the wide angle end thereof in Embodiment 40 of the present invention;

FIGS. 161a, 161b, 161c and 161d are aberration diagrams of the zoom lens at an intermediate focal length thereof in Embodiment 40 of the present invention;

FIGS. 162a, 162b, 162c and 162d are aberration diagrams of the zoom lens at a telescopic end thereof in Embodiment 40 of the present invention;

FIG. 163 is a view showing the arrangement of a zoom lens at a wide angle end thereof in accordance with Embodiment 41 of the present invention;

FIG. 164 is a view showing the arrangement of a zoom lens at a wide angle end thereof in accordance with Embodiment 42 of the present invention;

FIG. 165 is a view showing the arrangement of a zoom lens at a wide angle end thereof in accordance with Embodiment 43 of the present invention;

FIG. 166 is a view showing the arrangement of a zoom lens at a wide angle end thereof in accordance with Embodiment 44 of the present invention;

FIG. 167 is a view showing the arrangement of a zoom lens at a wide angle end thereof in accordance with Embodiment 45 of the present invention;

FIG. 168 is a view showing the arrangement of a zoom lens at a wide angle end thereof in accordance with Embodiment 46 of the present invention;

FIGS. 169a, 169b, 169c and 169d are aberration diagrams of the zoom lens at the wide angle end thereof in Embodiment 41 of the present invention;

FIGS. 170a, 170b, 170c and 170d are aberration diagrams of the zoom lens at an intermediate focal length thereof in Embodiment 41 of the present invention;

FIGS. 171a, 171b, 171c and 171d are aberration diagrams of the zoom lens at a telescopic end thereof in Embodiment 41 of the present invention;

FIGS. 172a, 172b, 172c and 172d are aberration diagrams of the zoom lens at the wide angle end thereof in Embodiment 42 of the present invention;

FIGS. 173a, 173b, 173c and 173d are aberration diagrams of the zoom lens at an intermediate focal length thereof in Embodiment 42 of the present invention;

FIGS. 174a, 174b, 174c and 174d are aberration diagrams of the zoom lens at a telescopic end thereof in Embodiment 42 of the present invention;

FIGS. 175a, 175b, 175c and 175d are aberration diagrams of the zoom lens at the wide angle end thereof in Embodiment 43 of the present invention;

FIGS. 176a, 176b, 176c and 176d are aberration diagrams of the zoom lens at an intermediate focal length thereof in Embodiment 43 of the present invention;

FIGS. 177a, 177b, 177c and 177d are aberration diagrams of the zoom lens at a telescopic end thereof in Embodiment 43 of the present invention;

FIGS. 178a, 178b, 178c and 178d are aberration diagrams of the zoom lens at the wide angle end thereof in Embodiment 44 of the present invention;

FIGS. 179a, 179b, 179c and 179d are aberration diagrams of the zoom lens at an intermediate focal length thereof in Embodiment 44 of the present invention;

FIGS. 180a, 180b, 180c and 180d are aberration diagrams of the zoom lens at a telescopic end thereof in Embodiment 44 of the present invention;

FIGS. 181a, 181b, 181c and 181d are aberration diagrams of the zoom lens at the wide angle end thereof in Embodiment 45 of the present invention;

FIGS. 182a, 182b, 182c and 182d are aberration diagrams of the zoom lens at an intermediate focal length thereof in Embodiment 45 of the present invention;

FIGS. 183a, 183b, 183c and 183d are aberration diagrams of the zoom lens at a telescopic end thereof in Embodiment 45 of the present invention;

FIGS. 184a, 184b, 184c and 184d are aberration diagrams of the zoom lens at the wide angle end thereof in Embodiment 46 of the present invention;

FIGS. 185a, 185b, 185c and 185d are aberration diagrams of the zoom lens at an intermediate focal length thereof in Embodiment 46 of the present invention;

FIGS. 186a, 186b, 186c and 186d are aberration diagrams of the zoom lens at a telescopic end thereof in Embodiment 46 of the present invention;

FIGS. 187a, 187b, 187c and 187d are aberration diagrams of a zoom lens at an intermediate focal length thereof in accordance with Embodiment 47 of the present invention;

FIGS. 188a, 188b, 188c and 188d are aberration diagrams of the zoom lens at a telescopic end thereof in Embodiment 47 of the present invention;

FIGS. 189a, 189b, 189c and 189d are aberration diagrams of a zoom lens at an intermediate focal length thereof in accordance with Embodiment 48 of the present invention;

FIGS. 190a, 190b, 190c and 190d are comparative aberration diagrams of the zoom lens at the intermediate focal length thereof with respect to Embodiment 41 when a zooming operation is integrally performed by front and rear lens groups of a second lens group in the lens structure in Embodiment 41;

FIGS. 191a, 191b, 191c and 191d are comparative aberration diagrams of the zoom lens at the intermediate focal length thereof with respect to Embodiment 42 when a zooming operation is integrally performed by front and rear lens groups of a second lens group in the lens structure in Embodiment 42;

FIGS. 192a, 192b, 192c and 192d are comparative aberration diagrams of the zoom lens at the intermediate focal length thereof with respect to Embodiment 43 when a zooming operation is integrally performed by front and rear lens groups of a second lens group in the lens structure in Embodiment 43;

FIGS. 193a, 193b, 193c and 193d are comparative aberration diagrams of the zoom lens at the intermediate focal length thereof with respect to Embodiment 44 when a zooming operation is integrally performed by front and rear lens groups of a second lens group in the lens structure in Embodiment 44;

FIG. 194a, 194b, 194c and 194d are comparative aberration diagrams of the zoom lens at the intermediate focal length thereof with respect to Embodiment 45 when a zooming operation is integrally performed by front and rear lens groups of a second lens group in the lens structure in Embodiment 45;

FIG. 195a, 195b, 195c and 195d are comparative aberration diagrams of the zoom lens at the intermediate focal length thereof with respect to Embodiment 46 when a zooming operation is integrally performed by fron and rear lens groups of a second lens group in the lens structure in Embodiment 46;

FIG. 196 is a view showing the arrangement of a zoom lens at a wide angle end thereof in accordance with Embodiment 49 of the present invention;

FIG. 197 is a view showing the arrangement of a zoom lens at a wide angle end thereof in accordance with Embodiment 50 of the present invention;

FIG. 198 is a view showing the arrangement of a zoom lens at a wide angle end thereof in accordance with Embodiment 51 of the present invention;

FIGS. 199a, 199b, 199c and 199d are aberration diagrams of the zoom lens at the wide angle end thereof when the distance between a photographed object and the zoom lens is infinite in Embodiment 49 of the present invention;

FIGS. 200a, 200b, 200c and 200d are aberration diagrams of the zoom lens at an intermediate focal length thereof when the distance between the photographed object and the zoom lens is infinite in Embodiment 49 of the present invention;

FIGS. 201a, 201b, 201c and 201d are aberration diagrams of the zoom lens at a telescopic end thereof when the distance between the photographed object and the zoom lens is infinite in Embodiment 49 of the present invention;

FIGS. 202a, 202b, 202c and 202d are aberration diagrams of the zoom lens at the wide angle end thereof when the distance between the photographed object and the zoom lens is set to 1 m in Embodiment 49 of the present invention;

FIGS. 203a, 203b, 203c and 203d are aberration diagrams of the zoom lens at the intermediate focal length thereof when the distance between the photographed object and the zoom lens is set to 1 m in Embodiment 49 of the present invention;

FIGS. 204a, 204b, 204c and 204d are aberration diagrams of the zoom lens at the telescopic end thereof when the distance between the photographed object and the zoom lens is set to 1 m in Embodiment 49 of the present invention;

FIGS. 205a, 205b, 205c and 205d are aberration diagrams of the zoom lens at the wide angle end thereof when the distance between a photographed object and the zoom lens is infinite in Embodiment 50 of the present invention;

FIGS. 206a, 206b, 206c and 206d are aberration diagrams of the zoom lens at an intermediate focal length thereof when the distance between the photographed object and the zoom lens is infinite in Embodiment 50 of the present invention;

FIGS. 207a, 207b, 207c and 207d are aberration diagrams of the zoom lens at a telescopic end thereof when the distance between the photographed object and the zoom lens is infinite in Embodiment 50 of the present invention;

FIGS. 208a, 208b, 208c and 208d are aberration diagrams of the zoom lens at the wide angle end thereof when the distance between the photographed object and the zoom lens is set to 1 m in Embodiment 50 of the present invention;

FIGS. 209a, 209b, 209c and 209d are aberration diagrams of the zoom lens at the intermediate focal length thereof when the distance between the photographed object and the zoom lens is set to 1 m in Embodiment 50 of the present invention;

FIGS. 210a, 210b, 210c and 210d are aberration diagrams of the zoom lens at the telescopic end thereof when the distance between the photographed object and the zoom lens is set to 1 m in Embodiment 50 of the present invention;

FIGS. 211a, 211b, 211c and 211d are aberration diagrams of the zoom lens at the wide angle end thereof when the distance between a photographed object and the zoom lens is infinite in Embodiment 51 of the present invention;

FIGS. 212a, 212b, 212c and 212d are aberration diagrams of the zoom lens at an intermediate focal length thereof when the distance between the photographed object and the zoom lens is infinite in Embodiment 51 of the present invention;

FIGS. 213a, 213b, 213c and 213d are aberration diagrams of the zoom lens at a telescopic end thereof when the distance between the photographed object and the zoom lens is infinite in Embodiment 51 of the present invention;

FIGS. 214a, 214b, 214c and 214d are aberration diagrams of the zoom lens at the wide angle end thereof when the distance between the photographed object and the zoom lens is set to 1 m in Embodiment 51 of the present invention;

FIGS. 215a, 215b, 215c and 215d are aberration diagrams of the zoom lens at the intermediate focal length thereof when the distance between the photographed object and the zoom lens is set to 1 m in Embodiment 51 of the present invention;

FIGS. 216a, 216b, 216c and 216d are aberration diagrams of the zoom lens at the telescopic end thereof when the distance between the photographed object and the zoom lens is set to 1 m in Embodiment 51 of the present invention;

FIG. 217 shows graphs for explaining a condition for moving a principal point of a second lens group on a front side thereof toward a first lens group; and FIG. 218 shows graphs for explaining a paraxial condition for reducing a focal length of the second lens group.

DESCRIPTION OF THE PREFERRED EMBODIMENTS

The preferred embodiments of a zoom lens having a high variable magnification in the present invention will next be described in detail with reference to the accompanying drawings.

Figure 1:
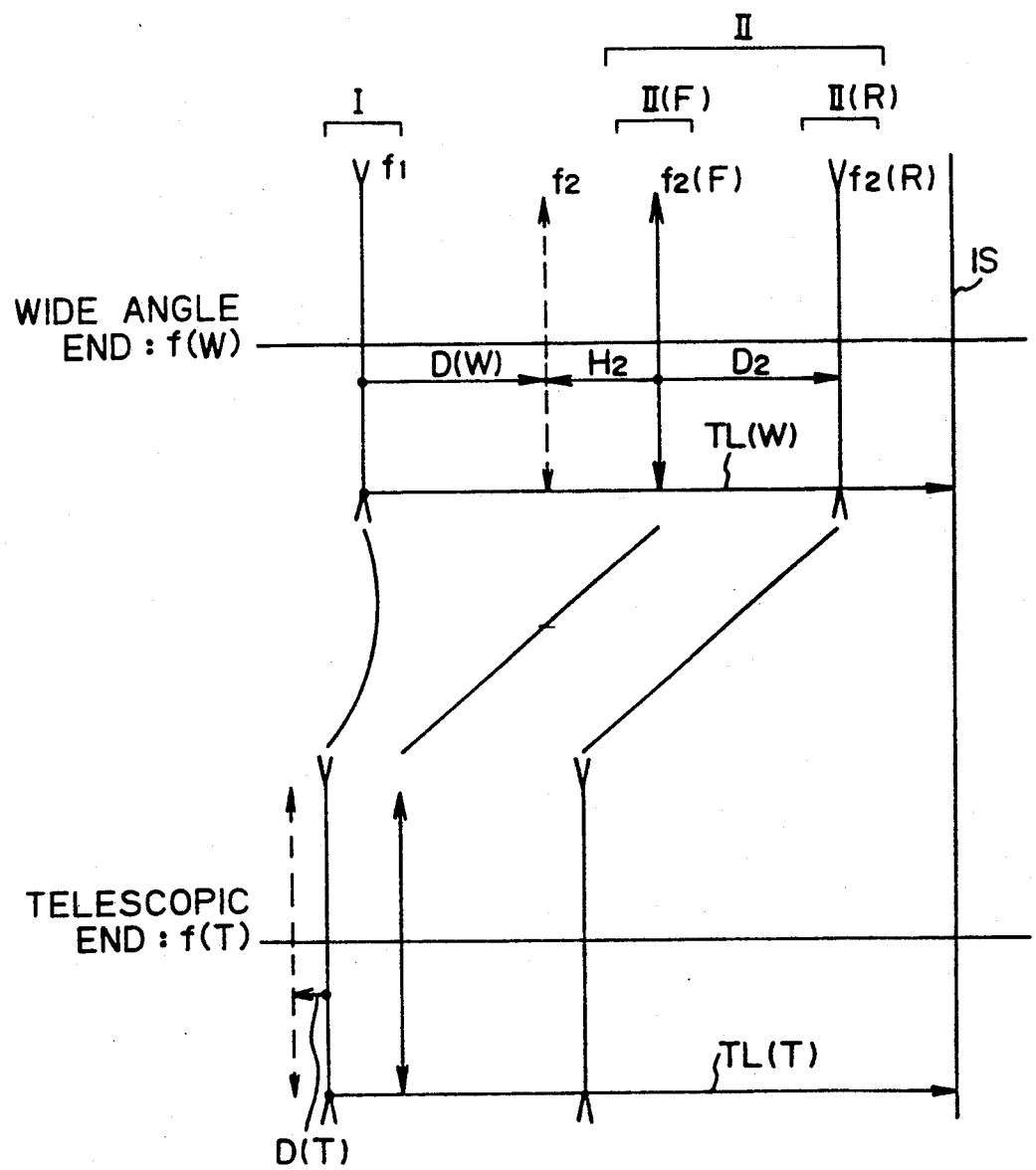
FIG. 1 is a view for explaining a zoom lens having a high variable magnification in the present invention.

As shown in FIG. 1, a zoom lens having a high variable magnification in the present invention, first and second lens groups I and II respectively having negative and positive focal lengths are sequentially arranged from an object side of the zoom lens to an image side thereof. A combined focal length of an entire lens system is changed by changing a distance between the first and second lens groups while the position of an image face IS is constantly held. This zoom lens has the following features.

Namely, in this zoom lens, the second lens group II is constructed by front and rear lens groups II(F) and II(R) respectively having positive and negative focal lengths. The respective focal lengths $f_1$ and $f_2$ of the first and second lens groups I and II, the respective focal lengths $f_2(F)$ and $f_2(R)$ of the front and rear lens groups II(F) and II(R) in the second lens group, and combined focal lengths $f(W)$ and $f(T)$ of the entire lens system at wide angle and telescopic ends thereof satisfy the following conditions, $[f_1+f_2\cdot\{2-(f_1/f(W))-(f(W)/f_1)\}]/f(T)<0.6$ (I)

$[f_1+f_2\cdot\{2-(f_1/f(T))-(f(T)/f_1)\}]/f(T)<0.6$ (II)

$0.6<|f_2(R)|/f_2(F)<6.0$ (III)

$0.8<f_2(F)/f_2<1.4$ (IV)

$0.5<|f_1|/\sqrt{[f(W)\cdot f(T)]}<1.3$ (V)

where $\sqrt{[\ ]}$ means a square root of a value within bracket [].

The first lens group I, the front lens group II(F) of the second lens group, and the rear lens group II(R) of the second lens group can be concretely constructed by various kinds of lens structures.

Namely, in a second lens structure of the present invention, the first lens group is constructed by negative and positive lenses sequentially arranged from the object side of the zoom lens to the image side thereof. The front lens group of the second lens group is constructed by a joining positive lens composed of a combination of positive and negative lenses, a positive lens, a negative lens, and a joining positive lens composed of a combination of positive and negative lenses sequentially arranged from the object side of the zoom lens to the image side thereof. The rear lens group of the second lens group is constructed by a joining negative lens composed of a combination of negative and positive lenses. The lenses constituting the joining lens are sequentially arranged in an order from the object side of the zoom lens to the image side thereof. For example, in a combination of positive and negative lenses in the joining lens, this positive lens is arranged on the object side of the zoom lens and this negative lens is arranged on the image side of the zoom lens.

In a third lens structure of the present invention, the first lens group is constructed by negative and positive lenses sequentially arranged from the object side of the zoom lens to the image side thereof. The front lens group of the second lens group is constructed by a joining positive lens composed of a combination of positive and negative lenses, a positive lens, a negative lens, and a positive lens sequentially arranged from the object side of the zoom lens to the image side thereof. The rear lens group of the second lens group is constructed by a joining negative lens composed of a combination of negative and positive lenses.

In a fourth lens structure of the present invention, the first lens group is constructed by negative and positive lenses sequentially arranged from the object side of the zoom lens to the image side thereof. The front lens group of the second lens group is constructed by a positive lens, a positive lens, and a negative lens sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In a fifth lens structure of the present invention, the first lens group is constructed by negative and positive lenses sequentially arranged from the object side of the zoom lens to the image side thereof. The front lens group of the second lens group is constructed by a positive lens and a joining lens composed of a combination of positive and negative lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In a sixth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, a positive lens, and a negative lens sequentially arranged from the object side of the zoom lens to the image side thereof. The rear lens group of the second lens group is constructed by a positive lens and a negative lens sequentially arranged from the object side of the zoom lens to the image side thereof.

In a seventh lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, and a joining lens composed of a combination of positive and negative lenses sequentially arranged from the object side of the zoom lens to the image side thereof. The rear lens group of the second lens group is constructed by a positive lens and a negative lens sequentially arranged from the object side of the zoom lens to the image side thereof.

In an eighth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a positive lens and a joining lens composed of a combination of negative and positive lenses sequentially arranged from the object side of the zoom lens to the image side thereof.

In a ninth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In a tenth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In an eleventh lens structure of the present invention, the first lens group is constructed by negative and positive lenses sequentially arranged from the object side of the zoom lens to the image side thereof. The front lens group of the second lens group is constructed by a positive lens, a joining lens composed of a combination of positive and negative lenses, and a joining lens composed of a combination of negative and positive lenses sequentially arranged from the object side of the zoom lens to the image side thereof. The rear lens group of the second lens group is constructed by a joining lens composed of a combination of positive and negative lenses, and a negative lens sequentially arranged from the object side of the zoom lens to the image side thereof.

In a twelfth lens structure of the present invention, the first lens group is constructed by negative and positive lenses sequentially arranged from the object side of the zoom lens to the image side thereof. The front lens group of the second lens group is constructed by a joining lens composed of a combination of positive and negative lenses, and a joining lens composed of a combination of positive and negative lenses sequentially arranged from the object side of the zoom lens to the image side thereof. The rear lens group of the second lens group is constructed by a joining lens composed of a combination of positive and negative lenses, and a negative lens sequentially arranged from the object side of the zoom less to the image side thereof.

In a thirteenth lens structure of the present invention, the first lens group is constructed by negative and positive lenses sequentially arranged from the object side of the zoom lens to the image side thereof. The front lens group of the second lens group is constructed by a positive lens, a positive lens, and a joining lens composed of a combination of negative and positive lenses sequentially arranged from the object side of the zoom lens to the image side thereof. The rear lens group of the second lens group is constructed by a joining lens composed of a combination of positive and negative lenses, and a joining lens composed of a combination of negative and positive lenses sequentially arranged from the object side of the zoom lens to the image side thereof.

In a fourteenth lens structure of the present invention, a diaphragm can be arranged between the front and rear lens groups in the second lens group. In this case, the zoom lens can be constructed such that a moving amount of the diaphragm is smaller than that of the second lens group when a zooming operation is performed from the wide angle end of the zoom lens to the telescopic end thereof.

In accordance with a fifteenth lens structure of the present invention, the first lens group can be constructed by negative and positive lenses sequentially arranged from the object side of the zoom lens to the image side thereof when the diaphragm can be arranged between the front and rear lens groups in the second lens group. The front lens group of the second lens group can be constructed by a positive lens, a positive lens, and a joining lens composed of a combination of negative and positive lenses sequentially arranged from the object side of the zoom lens to the image side thereof. The rear lens group of the second lens group can be constructed by a joining lens composed of a combination of positive and negative lenses, and a negative lens sequentially arranged from the object side of the zoom lens to the image side thereof.

Otherwise, in accordance with a sixteenth lens structure of the present invention, the first lens group may be constructed by negative and positive lenses sequentially arranged from the object side of the zoom lens to the image side thereof. The front lens group of the second lens group may be constructed by a joining lens composed of a combination of positive and negative lenses, a positive lens, and a joining lens composed of a combination of negative and positive lenses sequentially arranged from the object side of the zoom lens to the image side thereof. The rear lens group of the second lens group may be constructed by a joining lens composed of a combination of positive and negative lenses, and a negative lens sequentially arranged from the object side of the zoom lens to the image side thereof.

Further, in accordance with a seventeenth lens structure of the present invention, the first lens group can be constructed by negative and positive lenses sequentially arranged from the object side of the zoom lens to the image side thereof. The front lens group of the second lens group can be constructed by a positive lens, a joining lens composed of a combination of positive and negative lenses, and a joining lens composed of a combination of negative and positive lenses sequentially arranged from the object side of the zoom lens to the image side thereof. The rear lens group of the second lens group can be constructed by a joining lens composed of a combination of positive and negative lenses, and a negative lens sequentially arranged from the object side of the zoom lens to the image side thereof.

Further, in accordance with an eighteenth lens structure of the present invention, the first lens group can be constructed by negative and positive lenses sequentially arranged from the object side of the zoom lens to the image side thereof. The front lens group of the second lens group can be constructed by a positive lens, a positive lens, and a joining lens composed of a combination of negative and positive lenses sequentially arranged from the object side of the zoom lens to the image side thereof. The rear lens group of the second lens group can be constructed by a joining lens composed of a combination of positive and negative lenses, and a joining lens composed of a combination of negative and positive lenses sequentially arranged from the object side of the zoom lens to the image side thereof.

In accordance with a nineteenth lens structure of the present invention, the zoom lens can be constructed such that a distance between the front and rear lens groups in the second lens group is reduced in an intermediate zooming region of the zoom lens.

In accordance with a twentieth lens structure of the present invention, a first diaphragm can be disposed within the front lens group of the second lens group, or on an object side thereof in the first or nineteenth lens structure of the present invention. In this case, a second diaphragm having a constant opening diameter can be disposed between the front and rear lens groups of the second lens group. The second diaphragm is moved and separated from the front lens group of the second lens group when a zooming operation is performed from the wide angle end of the zoom lens to the telescopic end thereof.

In accordance with a twenty-first lens structure of the present invention, a focusing operation is performed by moving the rear lens group of the second lens group on the image side thereof. The rear lens group of the second lens group includes at least one positive lens. A lateral magnification $m_2(RW)$ of the rear lens group in the second lens group at the wide angle end of the zoom lens and infinity with respect to a photographed object satisfies the following condition.

$$1.1 < m_2(RW) < 2$$

In accordance with a twenty-second lens structure of the present invention, a diaphragm can be disposed between the front and rear lens groups of the second lens group in the twenty-first lens structure. A moving amount of this diaphragm can be set to be smaller than that of the second lens group when a zooming operation is performed from the wide angle end of the zoom lens to the telescopic end thereof.

In a zoom lens shown in FIG. 1, a first lens group I having a negative focal length and a second lens group II having a positive focal length are sequentially arranged from an object side of the zoom lens to an image side thereof. In the following description, the focal lengths of the first and second lens groups in the above zoom lens are respectively set to $f_1$ and $f_2$. A magnification of the second lens group is set to $m_2$. Further, reference numeral TL designates an entire length of a lens system when each of the lens groups is approximately set to be thin. Namely, this entire length TL is equal to a distance from a principal point of the first lens group on a front side thereof to a focal point of the entire lens system. In this case, this distance TL is provided by the following formula.

$$TL = f_1 + f_2 \cdot \{2 - (1/m_2) - m_2\} \tag{1}$$

Further, reference numerals f(W) and f(T) respectively designate combined focal lengths of the entire lens system at wide angle and telescopic ends of the zoom lens. Reference numerals $m_2(W)$ and $m_2(T)$ respectively designate magnifications of the second lens group at the wide angle and telescopic ends of the zoom lens. In this case, the following formulas are formed with respect to the above combined focal lengths and the above magnifications.

$$f(W) = f_1 \cdot m_2(W) \tag{2}$$

$$f(T) = f_1 \cdot m_2(T) \tag{3}$$

Accordingly, entire lengths TL(W) and TL(T) of the lens system at the wide angle and telescopic ends of the zoom lens are represented by the following formulas.

$$TL(W) = f_1 + f_2 \cdot \{2 - (f_1/f(W)) - (f(W)/f_1)\} \tag{4}$$

$$TL(T) = f_1 + f_2 \cdot \{2 - (f_1/f(T)) - (f(T)/f_1)\} \tag{5}$$

Since the focal length $f_1$ of the first lens group is negative, the entire lengths TL(W) and TL(T) are reduced as the focal length $f_2$ is reduced.

The above formulas (4) and (5) are partially differentiated as follows with respect to the focal length $f_1$.

$$\partial TL(W) = [\{f_1^2 \cdot (f(W) - f_2) + f_2 \cdot f(W)^2\}/\{f_1^2 \cdot f(W)\}] \partial f_1 \tag{6}$$

$$\partial TL(T) = [\{f_1^2 \cdot (f(T) - f_2) + f_2 \cdot f(T)^2\}/\{f_1^2 \cdot f(T)\}] \partial f_1 \tag{7}$$

From the above formulas (6) and (7), it is understood that the above entire lengths TL(W) and TL(T) are reduced as an absolute focal length $|f_1|$ is increased when $\{f(W) - f_2\} > 0$, and $\{f(T) - f_2\} > 0$. Namely, the above entire lengths TL(W) and TL(T) are reduced as the negative forcal length $f_1$ is decreased when $\{f(W) - f_2\} > 0$, and $\{f(T) - f_2\} > 0$.

Accordingly, there are the following two methods for reducing the entire length of the lens system.

① The focal length $f_1$ is reduced.
② The focal length $f_2$ is reduced.

It is preferable to simultaneously satisfy the above-mentioned conditional inequalities (I) and (II) with respect to the focal lengths $f_1$ and $f_2$. When these conditional inequalities are not satisfied, the entire length of the lens system is too long when the lens groups are approximately set to be thin. Therefore, when the lens system is really constructed by thick lenses, it is difficult to reduce and set a ratio of a maximum entire length of the lens system to a focal length thereof at the telescopic end of the zoom lens to a value equal to or less than one.

A distance D(T) between principal points of the first and second lens groups at the telescopic end of the zoom lens is provided by the following formula.

$$D(T) = f_1 + f_2 - \{f_1 \cdot f_2 / f(T)\} \quad (8)$$

The above formula (8) is partially differentiated as follows with respect to the respective focal lengths $f_1$ and $f_2$.

$$\partial D(T) = \{1 - f_2/f(T)\} \cdot \partial f_1, \quad \partial D(T) = \{1 - f_1/f(T)\} \cdot \partial f_2$$

Accordingly, the distance D(T) is reduced as the focal lengths $f_1$ and $f_2$ are reduced.

In other words, when one or both of the focal lengths $f_1$ and $f_2$ are reduced to reduce the entire length of the lens system, the distance D(T) between the principal points of the first and second lens groups is reduced. Accordingly, when the lens system is really constructed by lenses, it is difficult to substantially secure distances between these lenses.

There are two methods for solving this problem. In a first method, a principal point of the first lens group on a rear side thereof is moved toward the second lens group. In a second method, a principal point of the second lens group on a front side thereof is moved toward the first lens group.

The first method is disadvantageous since the entire length of the lens system is increased since the first lens group is really located on the object side. In the second method, a back focus of the lens system is reduced, but no entire length thereof is changed. Accordingly, the second method can be used in a lens shutter camera.

An arrangement of refracting power for moving the principal point of the second lens group on the front side thereof toward the first lens group will next be described. It is necessary that the second lens group is constructed by a front lens group having a positive focal length and a rear lens group having a negative focal length to move the principal point of the second lens group on the front side thereof toward the first lens group.

In the following description, $f_2(F)$ and $f_2(R)$ respectively designate focal lengths of the front lens group II(F) and the rear lens group II(R) constituting the second lens group. Reference numeral $D_2$ designates a distance between principal points of the front and rear lens groups. Further, reference numeral $H_2$ designates a distance from a principal point of the front lens group on a front side thereof to the principal point of the second lens group on the front side thereof. In this case, this distance $H_2$ is represented by the following formula.

$$H_2 = f_2 \cdot D_2 / f_2(R) \quad (9)$$

Otherwise, this distance $H_2$ is represented by the following formula.

$$H_2 = f_2(F) \cdot D_2 / \{f_2(F) + f_2(R) - D_2\} \quad (10)$$

The formula (10) is partially differentiated as follows with respect to the focal length $f_2(F)$.

$$\partial H_2 = [\{D_2 \cdot (f_2(R) - D_2)\} / \{f_2(F) + f_2(R) - D_2\}^2] \cdot \partial f_2(F)$$

From this formula, it is understood that the distance $H_2$ is reduced as the focal length $f_2(F)$ is increased.

The formula (10) is partially differentiated as follows with respect to the focal length $f_2(R)$.

$$\partial H_2 = [\{-f_2(F) \cdot D_2\} / \{f_2(F) + f_2(R) - D_2\}^2] \cdot \partial f_2(R)$$

From this formula, it is understood that the distance $H_2$ is reduced as the focal length $f_2(R)$ is increased.

Further, the formula (10) is partially differentiated as follows with respect to the distance $D_2$.

$$\partial H_2 = [f_2(F) \cdot \{f_2(F) + f_2(R)\} / \{f_2(F) + f_2(R) - D_2\}^2] \cdot \partial D_2$$

From this formula, the following two conditions for reducing the distance $H_2$ are obtained.

① The distance $D_2$ is decreased when $f_2(F) + f_2(R) > 0$.
② The distance $D_2$ is increased when $f_2(F) + f_2(R) < 0$.

When the distance $H_2$ is negative, the principal point of the second lens group II on the front side thereof is located on a side of the first lens group from the principal point of the front lens group on the front side thereof in the second lens group. The focal length $f_2(F)$ of the front lens group in the second lens group satisfies the following formula.

$$f_2 = \{f_2(F) \cdot f_2(R) / \{f_2(F) + f_2(R) - D_2\} \quad (11)$$

In this formula, $f_2(F) + f_2(R) - D_2 < 0$ is obtained since $f_2 < 0$, $f_2(F) > 0$, and $f_2(R) < 0$. The above conditions are shown by solid lines in FIG. 217.

A paraxial condition for reducing the focal length $f_2$ of the second lens group will next be described when the second lens group II is constructed by the front lens group II(F) and the rear lens group II(R) as mentioned above.

The formula (11) is partially differentiated as follows with respect to the focal length $f_2(F)$.

$$\partial f_2 = [(f_2(R) \cdot \{f_2(R) - D_2\}) / \{f_2(F) + f_2(R) - D_2\}^2] \partial f_2(F) \quad (12)$$

From this formula (12), it is understood that the focal length $f_2$ is reduced as the focal length $f_2(F)$ is reduced.

The formula (11) is partially differentiated as follows with respect to the focal length $f_2(R)$.

$$\partial f_2 = [(f_2(F) \cdot \{f_2(F) - D_2\}) / \{f_2(F) + f_2(R) - D_2\}^2] \partial f_2(R) \quad (13)$$

Accordingly, the following two conditions for reducing the focal length $f_2$ are obtained.

① The focal length $f_2(R)$ is reduced and $|f_2(R)|$ is increased when $\{f_2(F) - D_2\} > 0$, i.e., $f_2(F) < f_2$.
② The focal length $f_2(R)$ is increased and $|f_2(R)|$ is decreased when $\{f_2(F) - D_2\} < 0$, i.e., $f_2(F) > f_2$.

With respect to these two conditions, the focal length $f_2$ in the second condition can be further reduced in comparison with that in the first condition.

The above formula (11) is partially differentiated as follows with respect to the distance $D_2$.

$$\partial f_2 = [\{f_2(F) \cdot f_2(R)\} / \{f_2(F) + f_2(R) - D_2\}^2] \partial D_2 \quad (14)$$

From this formula (14), it is understood that the focal length $f_2$ is reduced as the distance $D_2$ is increased.

The above conditions are shown by solid lines in FIG. 21B.

A paraxial condition of the second lens group for reducing the entire length of the lens system and securing the distance between the lens groups is summarized in the following table when the lens system is constructed by thin lenses.

|  | Reduction of the entire length of the lens system $f_2$:small | Security for the distance between the lens groups $H_2$:small |
| --- | --- | --- |
| $f_2(F)$ | small | large |
| $\|f_2(R)\|$ | [small when $f_2(F) - D_2 < 0$] | [small] |
| $D_2$ | [large] | [large when $f_2(F) + f_2(R) < 0$] small when $f_2(F) + f_2(R) > 0$ |

In the above table, a preferable condition for reducing the entire length of the lens system and securing the distance between the lens groups is provided by contents surrounded by bracket [].

An arrangement of refracting power will next be described when aberration is considered in the lens system constructed by thick lenses.

A changing amount of the distance between the first and second lens groups will next be described when a zooming operation is performed from the wide angle end of the zoom lens to the telescopic end thereof. As shown in FIG. 1, reference numeral D(W) designates a distance between principal points of the first lens group I and the second lens group II at the wide angle end of the zoom lens. Reference numeral D(T) designates a distance between principal points of the first lens group I and the second lens group II at the telescopic end of the zoom lens. In this case, the distances D(W) and D(T) are respectively provided by the following formulas.

$$D(W) = f_1 + f_2 - \{f_1 \cdot f_2 / f(W)\} \quad (15)$$

$$D(T) = f_1 + f_2 - \{f_1 \cdot f_2 / f(T)\} \quad (8)$$

Accordingly, when the zooming operation is performed from the wide angle end of the zoom lens to the telescopic end thereof, the changing amount $\Delta D(=D(W)-D(T))$ of the distance between the above principal points is provided by the following formula.

$$\Delta D = f_1 \cdot f_2 \cdot [\{1/f(T)\} - \{1/f(W)\}] \quad (16)$$

From this formula, it is understood that the changing amount $\Delta D$ is increased as the focal lengths $|f_1|$ and $f_2$ are increased. Accordingly, in the actual lens construction, it is necessary that the distance between the first lens group I and the second lens group II is increased as the focal lengths $|f_1|$ and $f_2$ are increased.

At this time, it is necessary to reduce thicknesses of the lens groups in the second lens group and reduce a back focus of the lens system at the wide angle end of the zoom lens so as to secure the distance between the lens groups while the entire length of the lens system is reduced. Therefore, it is difficult to preferably construct the lens system. Further, a diameter of the first lens group is increased when a diaphragm is disposed in the second lens group.

In contrast to this, when the absolute focal length $|f_1|$ is reduced, the focal length $f_2$ must be also reduced to reduce the entire length of the lens system. However, as shown in the above table, to reduce the focal length $f_2$, it is necessary to reduce the focal length $f_2(F)$, reduce the absolute focal length $|f_2(R)|$ under the condition of $f(F) < D_2$, or increase the distance $D_2$.

When the focal lengths $f_2(F)$ and $|f_2(R)|$ are excessively reduced, it is difficult to correct aberration of the lens system. When the absolute focal length $|f_2(R)|$ is excessively reduced or the distance $D_2$ is excessively increased, it is difficult to secure the back focus of the lens system and correct a Petzval's sum.

In consideration of the above-mentioned contents, the following inequality is obtained as a range of the focal length $f_1$ suitable for security for the distance between the lens groups while the entire length of the lens system is reduced.

$$0.5 < |f_1|/\sqrt{[f(W) \cdot f(T)]} < 1.3$$

This determined inequality is provided as the above-mentioned condition (V) with respect to the zoom lens of the present invention. In this inequality, notation $\sqrt{[]}$ means a square root of a value within this bracket [].

The above-mentioned condition (III) will next be described.

When the focal length of the second lens group is reduced and the distance between the first and second lens groups is secured, it is preferable to reduce the absolute focal length $|f_2(R)|$ under the condition of $f_2(F) < D_2$ and increase the distance $D_2$ under the condition of $f_2(R) + f_2(F) < 0$ from the above-mentioned table.

In consideration of these contents, the relation between the absolute focal length $|f_2(R)|$ and the focal length $f_2(F)$ is determined and provided as the following condition (III).

$$0.6 < |f_2(R)|/f_2(F) < 6.0$$

When the ratio in this condition (III) exceeds a lower limit thereof, it is difficult to reduce the entire length of the lens system since such an exceeding condition is greatly shifted from the above condition for reducing the focal length of the second lens group and securing the distance between the first and second lens groups.

Further, the absolute focal length $|f_2(R)|$ of the rear lens group in the second lens group II is excessively reduced so that it is difficult to correct the Petzval's sum and secure the back focus of the lens system.

In contrast to this, when the ratio in the condition (III) exceeds an upper limit thereof, the entire length of the lens system can be reduced by increasing the distance between the principal points of the front and rear lens groups in the second lens group. However, in this case, it is difficult to secure the back focus of the lens system, or the focal length of the front lens group in the second lens group II is excessively reduced. Therefore, it is difficult to correct aberration of the lens system and secure the distance between the first and second lens groups.

The above condition (IV) will next be described.

When the focal length $f_2$ is reduced and the principal point of the second lens group on the front side thereof is moved on a side of the first lens group, it is preferable to reduce the absolute focal length $|f_2(R)|$ under the condition of $f_2(F) < D_2$, or increase the distance $D_2$ under the condition of $f_2(F) + f_2(R) < 0$ in accordance with the above-mentioned table. At this time, the relation between the focal lengths $f_2$ and $f_2(F)$ is determined and provided as the following condition (IV).

$$0.8 < f_2(F)/f_2 < 1.4$$

When the ratio in this condition (IV) is equal to or less than one, no condition of $f_2(F) < D_2$ is satisfied so that the focal length $f_2$ cannot be reduced by the rear lens group of the second lens group II.

Accordingly, when the ratio in the condition (IV) exceeds a lower limit thereof, it is difficult to secure the distance between the first and second lens groups, and the focal length $f_2(F)$ of the front lens group in the second lens group is excessively reduced. Therefore, it is difficult to correct aberration of the lens system. In contrast to this, when the ratio in the condition (IV) exceeds an upper limit thereof, the focal length $f_2$ of the second lens group is greatly reduced by the rear lens group in the second lens group II. However, in this case, the absolute focal length $|f_2(R)|$ is excessively reduced, or the distance $D_2$ between the principal points of the front and rear lens groups in the second lens group is excessively increased. Therefore, it is difficult to correct the Petzval's sum and secure the back focus of the lens system.

The respective lens groups are constructed as follows.

It is preferable to construct the first lens group I by two lenses as a minimum number of lenses for correcting aberration of the first lens group so as to set the first lens group to be thin.

In second to thirteenth lens structures of the present invention and fifteenth to eighteenth lens structures of the present invention, negative and positive lenses are sequentially arranged from an object side of the zoom lens to an image side thereof, thereby constituting the first lens group. Aberration caused within the first lens group is reduced by such a lens arrangement and a wide angle operation can be performed by such a lens arrangement.

When the first lens group is constructed by these negative and positive lenses, it is preferable to satisfy the following condition, $$\nu_1(N) > \nu_1(P)$$

to reduce chromatic aberration caused within the first lens group when Abbe numbers of the negative and positive lens are respectively set to $\nu_1(N)$ and $\nu_1(P)$.

When this condition is not satisfied, it is difficult to sufficiently correct axial chromatic aberration and chromatic aberration of magnification within the first lens group. Accordingly, the chromatic aberration of the entire lens system caused by a zooming operation of the zoom lens is greatly changed.

The second lens group II can be constructed by various kinds of lenses.

The second lens structure of the present invention will next be described.

In the second lens structure, the front lens group in the second lens group is constructed by sequentially arranging a positive lens composed of a combination of positive and negative lenses; a positive lens; a negative lens; and a positive lens composed of a combination of positive and negative lenses from the object side of the zoom lens to the image side thereof. The rear lens group in the second lens group is constructed by a negative lens composed of a combination of negative and positive lenses.

The front lens group in the second lens group performs an image forming action of the entire zoom lens and has strong positive refracting power. An axial light beam is widest since a light beam diverged by the first lens group is converged. Accordingly, an amount of aberration caused in the front lens group tends to be increased. Therefore, in the front lens group, the positive lens in the above first combination and the subsequent positive lens are used to reduce this aberration amount. The above negative lens is arranged after these two positive lenses to correct aberration caused by these two positive lenses. The combined positive lens for assisting the image forming action of the zoom lens is arranged as a final lens of the front lens group.

At this time, refracting powers of the two positive lenses arranged on the object side of the zoom lens are preferably increased, and a focal length of the front lens group until the negative lens as a third lens of the front lens group in the second lens group is preferably set to be positive to secure the distance between the first and second lens groups and reduce and hold the focal length of the second lens group.

Since a first lens of the front lens group is composed of the above combined lens, it is possible to mainly correct axial chromatic aberration and chromatic aberration of magnification in the second lens group. In this case, it is preferable to satisfy the following condition, $$\nu_2(FP) > \nu_2(FN)$$

when Abbe numbers of the positive and negative lenses constituting the first lens of the front lens group are respectively set to $\nu_2(FP)$ and $\nu_2(FN)$.

When this condition is not satisfied, it is insufficient to correct the chromatic aberrations within the second lens group.

In the second lens group, each of the lenses of the front lens group on most object and image sides thereof is composed of a combination of positive and negative lenses. Accordingly, it is possible to correct spherical aberration in the front lens group by setting a refractive index of the negative lens in each of these combined lenses to be larger than that of the positive lens in each of these combined lenses.

Further, since the rear lens group in the second lens group is constructed by the above negative lens composed of a combination of negative and positive lenses, it is possible to mainly correct the chromatic aberration of magnification with respect to aberrations caused in the rear lens group.

It is preferable to satisfy the following condition, $$\nu_2(RN) > \nu_2(RP)$$

when Abbe numbers of the negative and positive lenses of the combined lens constituting the rear lens group are respectively set to $\nu_2(RN)$ and $\nu_2(RP)$. When this condition is not satisfied, it is impossible to correct the chromatic aberration of magnification in the rear lens group of the second lens group. Therefore, the chromatic aberration of magnification of the entire lens system caused by a zooming operation of the zoom lens is greatly changed.

It is desirable to use an aspherical lens surface within the front lens group so as to preferably correct spherical aberration caused within the front lens group of the second lens group. Further, aberration outside an optical axis of the lens system can be suitably held by using an aspherical lens surface in the rear lens group of the second lens group on the object or image side thereof.

In the third lens structure of the present invention, the front lens group in the second lens group is constructed by sequentially arranging a joining positive lens composed of a combination of positive and negative lenses; a positive lens; a negative lens; and a positive lens from the object side of the zoom lens to the image side thereof. Ther rear lens group in the second lens group is constructed by a joining negative lens composed of a combination of negative and positive lenses.

As mentioned above, an amount of aberration tends to be increased in the front lens group of the second lens group. To reduce this aberration amount, the two positive lenses are arranged on the object side of the second lens group in the third lens structure of the present invention. One of these two positive lenses is constructed by the joining positive lens. The negative lens is arranged after these two positive lenses and the positive lens for assisting an image forming action is finally arranged on an image side of this negative lens to correct aberration caused by the above two positive lenses.

In this case, refracting powers of the above two positive lenses on the object side of the second lens group are preferably increased and a focal length of the second lens group until the negative lens subsequent to these two positive lenses is preferably set to be positive so as to secure the distance between the first and second lens groups and reduce and hold the focal length of the second lens group.

Axial chromatic aberration and chromatic aberration of magnification within the second lens group are mainly corrected by constructing a lens of the front lens group on the most object side thereof by the joining positive lens composed of a combination of positive and negative lenses.

Accordingly, it is preferable to satisfy the following condition, $$\nu_2(FP) > \nu_2(FN)$$

when Abbe numbers of the positive and negative lenses in this joining positive lens are respectively set to $\nu_2(FP)$ and $\nu_2(FN)$. When this condition is not satisfied, it is insufficient to correct the chromatic aberrations within the second lens group.

Spherical aberration of the front lens group can be corrected by setting a refractive index of the negative lens in the joining positive lens on the most object side of the front lens group in the second lens group to be larger than that of the positive lens in this joining positive lens.

The rear lens group in the second lens group is constructed by the joining negative lens composed of a combination of negative and positive lenses to mainly correct the chromatic aberration of magnification with respect to aberrations caused in the rear lens group.

It is preferable to satisfy the following condition, $$\nu_2(RN) > \nu_2(RP)$$

when Abbe numbers of the negative and positive lenses of the joining negative lens constituting the rear lens group are respectively set to $\nu_2(RN)$ and $\nu_2(RP)$.

When this condition is not satisfied, it is impossible to correct the chromatic aberration of magnification in the rear lens group of the second lens group. Therefore, the chromatic aberration of magnification of the entire lens system caused by a zooming operation of the zoom lens is greatly changed.

In the third lens structure of the present invention, it is desirable to use an aspherical lens surface within the front lens group so as to preferably correct spherical aberration caused within the front lens group of the second lens group. Further, aberration outside an optical axis of the lens system can be suitably held by using an aspherical lens surface on the object or image side of the joining negative lens in the rear lens group of the second lens group.

In the fourth lens structure of the present invention, the front lens group in the second lens group is constructed by sequentially arranging a positive lens; a positive lens; and a negative lens from the object side of the zoom lens to the image side thereof. The rear lens group in the second lens group is constructed by sequentially arranging a joining lens composed of a combination of positive and negative lenses; and a negative lens from the object side of the zoom lens to the image side thereof.

In the front lens group, the first two positive lenses are used to reduce aberration caused in the front lens group. The negative lens is arranged after these two positive lenses to locate a principal point of the front lens group on a front side thereof on the object side of the second lens group and correct aberration caused by these two positive lenses.

A Petzval's sum can be corrected by setting a refractive index of this negative lens to be larger than an average of refractive indexes of the two positive lenses on the object side of this negative lens.

It is preferable to satisfy the following condition, $$\nu_2(FP) > \nu_2(FN)$$

when an average of Abbe numbers of the two positive lenses of the front lens group in the second lens group is set to $\nu_2(FP)$ and an Abbe number of the negative lens of the front lens group is set to $\nu_2(FN)$.

When this condition is not satisfied, it is insufficient to correct chromatic aberration within the second lens group.

Refracting power of the front lens group in the second lens group can be reduced by increasing the distance between principal points of the front and rear lens groups in the second lens group.

In the fourth lens structure of the present invention, the rear lens group in the second lens group is constructed by sequentially arranging a joining lens composed of a combination of positive and negative lenses; and a negative lens from the object side of the zoom lens to the image side thereof so as to reduce the above refracting power of the front lens group while a back focus of the lens system is secured.

It is preferable to satisfy the following condition, $$\nu_2(RN) > \nu_2(RP)$$

when Abbe numbers of the positive and negative lenses of the joining lens used in the rear lens group are respectively set to $\nu_2(RP)$ and $\nu_2(RN)$.

When this condition is not satisfied, it is impossible to correct chromatic aberration of magnification in the rear lens group of the second lens group. Therefore, the chromatic aberration of magnification of the entire lens system caused by a zooming operation of the zoom lens is greatly changed.

It is desirable to use an aspherical lens surface within the front lens group so as to preferably correct spherical aberration caused within the front lens group of the second lens group. Further, aberration outside an optical axis of the lens system can be suitably held by using an aspherical lens surface within the rear lens group of the second lens group.

In the fifth lens structure of the present invention, the front lens group in the second lens group is constructed by sequentially arranging a positive lens; and a joining lens composed of a combination of positive and negative lenses from the object side of the zoom lens to the image side thereof. The rear lens group in the second lens group is constructed by sequentially arranging a joining lens composed of a combination of positive and negative lenses; and a negative lens from the object side of the zoom lens to the image side thereof.

In the front lens group, the two positive lenses are used to reduce an amount of aberration caused in the front lens group. The negative lens is arranged after these two positive lenses to correct aberration caused by these two positive lenses.

When a joining lens is constructed by combining the final negative lens of the front lens group with the positive lens on the object side of this negative lens and a refractive index of this negative lens is set to be larger than that of this positive lens, it is possible to locate a principal point of the front lens group on a front side thereof on the object side of the second lens group and correct aberration caused in this positive lens on a joining face of the joining lens.

It is preferable to satisfy the following condition, $$\nu_2(FP) > \nu_2(FN)$$

when Abbe numbers of the positive and negative lenses in the joining lens of the front lens group in the second lens group are respectively set to $\nu_2(FP)$ and $\nu_2(FN)$.

When this condition is not satisfied, it is insufficient to correct chromatic aberration within the second lens group.

Refracting power of the front lens group in the second lens group can be reduced by increasing the distance between principal points of the front and rear lens groups in the second lens group.

In the fifth lens structure of the present invention, the rear lens group in the second lens group is constructed by sequentially arranging a joining lens composed of a combination of positive and negative lenses; and a negative lens from the object side of the zoom lens to the image side thereof so as to reduce the above refracting power of the front lens group while a back focus of the lens system is secured.

It is preferable to satisfy the following condition, $$\nu_2(RN) > \nu_2(RP)$$

when Abbe numbers of the positive and negative lenses of the joining lens used in the rear lens group are respectively set to $\nu_2(RP)$ and $\nu_2(RN)$.

When this condition is not satisfied, it is impossible to correct chromatic aberration of magnification in the rear lens group of the second lens group. Therefore, the chromatic aberration of magnification of the entire lens system caused by a zooming operation of the zoom lens is greatly changed.

It is desirable to use an aspherical lens surface within the front lens group so as to preferably correct spherical aberration caused within the front lens group of the second lens group. Further, aberration outside an optical axis of the lens system can be suitably held by using an aspherical lens surface within the rear lens group of the second lens group.

In the sixth lens structure of the present invention, the front lens group in the second lens group is constructed by sequentially arranging a joining lens composed of a combination of positive and negative lenses; a positive lens; and a negative lens from the object side of the zoom lens to the image side thereof. This joining lens is constructed as a positive lens. The rear lens group in the second lens group is constructed by sequentially arranging a positive lens and a negative lens from the object side of the zoom lens to the image side thereof.

In the front lens group, the two positive lenses are used to reduce an amount of aberration caused in the front lens group. One of these two positive lenses is constructed by the joining lens. The negative lens is arranged after these two positive lenses to locate a principal point of the front lens group on a front side thereof on the object side of the second lens group and correct aberration caused by these two positive lenses.

A first positive lens in the front lens group is constructed by the above joining lens composed of a combination of positive and negative lenses to correct axial chromatic aberration and chromatic aberration of magnification within the second lens group. Accordingly, it is preferable to satisfy the following condition, $$\nu_2(FP) > \nu_2(FN)$$

when Abbe numbers of the positive and negative lenses in the joining lens of the front lens group in the second lens group are respectively set to $\nu_2(FP)$ and $\nu_2(FN)$.

When this condition is not satisfied, it is insufficient to correct the chromatic aberrations within the second lens group.

It is also preferable to satisfy the following condition, $$N_2(FP) < N_2(FN)$$

when refractive indexes of the positive and negative lenses of the above joining lens are respectively set to $N_2(FP)$ and $N_2(FN)$.

When this condition is satisfied, it is possible to cause negative spherical aberration on a joining face of the above positive and negative lenses and correct spherical aberration of the front lens group in the second lens group.

The rear lens group in the second lens group is constructed by positive and negative lenses to locate a principal point of the rear lens group on a front side thereof on the image side of the second lens group and mainly correct chromatic aberration of magnification. It is preferable to satisfy the following condition, $$\nu_2(RN) > \nu_2(RP)$$

when Abbe numbers of the positive and negative lenses constituting the rear lens group are respectively set to $\nu_2(RP)$ and $\nu_2(RN)$.

When this condition is not satisfied, it is impossible to correct chromatic aberration of magnification in the rear lens group of the second lens group. Therefore, the chromatic aberration of magnification of the entire lens system caused by a zooming operation of the zoom lens is greatly changed.

In the seventh lens structure of the present invention, the front lens group in the second lens group is constructed by sequentially arranging two joining lenses composed of a combination of positive and negative lenses from the object side of the zoom lens to the image side thereof. One of the two joining lens of the front lens group on the object side thereof is constructed as a positive lens. The rear lens group in the second lens group is constructed by sequentially arranging a positive lens and a negative lens from the object side of the zoom lens to the image side thereof.

In the front lens group, the two positive lenses are used to reduce aberration easily caused in the front lens group. A first positive lens in the front lens group is constructed by the above joining lens composed of a combination of positive and negative lenses to correct axial chromatic aberration and chromatic aberration of magnification within the second lens group.

Accordingly, it is preferable to satisfy the following condition, $$\nu_2(FP_1) > \nu_2(FN_1)$$

when Abbe numbers of the positive and negative lenses in the first joining lens of the front lens group in the second lens group are respectively set to $\nu_2(FP_1)$ and $\nu_2(FN_1)$.

When this condition is not satisfied, it is insufficient to correct the chromatic aberrations within the second lens group.

It is also preferable to satisfy the following condition, $$N_2(FP_1) < N_2(FN_1)$$

when refractive indexes of the positive and negative lenses of the above first joining lens in the front lens group are respectively set to $N_2(FP_1)$ and $N_2(FN_1)$.

When this condition is satisfied, it is possible to cause negative spherical aberration on a joining face of the above positive and negative lenses and correct spherical aberration of the front lens group in the second lens group.

It is also preferable to satisfy the following condition, $$N_2(FP_2) < N_2(FN_2)$$

when refractive indexes of the positive and negative lenses constituting the joining lens of the front lens group on an image side thereof in the second lens group are respectively set to $N_2(FP_2)$ and $N_2(FN_2)$.

When this condition is satisfied, it is possible to locate a principal point of the front lens group on a front side thereof on the object side of the second lens group and correct aberration caused in the positive lenses of the front lens group on joining faces of the joining lenses.

The rear lens group in the second lens group is constructed by positive and negative lenses to locate a principal point of the rear lens group on a front side thereof on the image side of the second lens group and mainly correct chromatic aberration of magnification.

It is preferable to satisfy the following condition, $$\nu_2(RN) > \nu_2(RP)$$

when Abbe numbers of the positive and negative lenses constituting the rear lens group are respectively set to $\nu_2(RP)$ and $\nu_2(RN)$.

When this condition is not satisfied, it is impossible to correct chromatic aberration of magnification in the rear lens group of the second lens group. Therefore, the chromatic aberration of magnification of the entire lens system caused by a zooming operation of the zoom lens is greatly changed.

In the sixth and seventh lens structures of the present invention, it is preferable to use an aspherical lens surface within the front lens group of the second lens group so as to correct spherical aberration caused within the front lens group of the second lens group. Further, aberration outside an optical axis of the lens system can be preferably corrected by using an aspherical lens surface within the rear lens group of the second lens group.

In the eighth lens structure of the present invention, the front lens group in the second lens group is constructed by sequentially arranging a positive lens; a positive lens; and a joining lens composed of a combination of negative and positive lenses from the object side of the zoom lens to the image side thereof. The rear lens group in the second lens group is constructed by sequentially arranging a positive lens and a joining lens composed of a combination of negative and positive lenses from the object side of the zoom lens to the image side thereof. In the front lens group, the two positive lenses are used to reduce an amount of aberration caused in the front lens group. The negative lens is arranged after these two positive lenses to correct aberration caused by these two positive lenses.

The joining lens in the front lens group is formed by joining a positive lens onto an image side of this negative lens to correct axial chromatic aberration and chromatic aberration of magnification within the second lens group. Accordingly, it is preferable to satisfy the following condition, $$\nu_2(FP) > \nu_2(FN)$$

when Abbe numbers of the positive and negative lenses in the joining lens of the front lens group are respectively set to $\nu_2(FP)$ and $\nu_2(FN)$. When this condition is not satisfied, it is insufficient to correct the chromatic aberrations within the second lens group.

It is also preferable to satisfy the following condition, $$N_2(FP) < N_2(FN)$$

when refractive indexes of the positive and negative lenses in the above joining lens are respectively set to $N_2(FP)$ and $N_2(FN)$.

When this condition is satisfied, a joining face of the above positive and negative lenses has negative refracting power so that it is effective to correct aberration caused in the positive lenses. A principal point of the front lens group on a front side thereof in the second lens group can be located on the object side of the second lens group by setting the above joining lens to a negative lens.

In the rear lens group of the second lens group, a positive lens is arranged on the most object side of the second lens group and a negative lens is arranged on the image side of the second lens group to locate a principal point of the rear lens group on a front side thereof on the image side of the second lens group. This negative lens is constructed by a joining lens composed of a combination of negative and positive lenses to mainly correct chromatic aberration of magnification.

Accordingly, it is preferable to satisfy the following condition, $$\nu_2(RP) < \nu_2(RN)$$

when Abbe numbers of the positive and negative lenses in this joining lens are respectively set to $\nu_2(RP)$ and $\nu_2(RN)$. When this condition is not satisfied, it is insufficient to correct the chromatic aberrations within the second lens group. Therefore, the chromatic aberration of magnification of the entire lens system caused at a zooming time of the zoom lens is greatly changed.

In the ninth lens structure of the present invention, the front lens group in the second lens group is constructed by sequentially arranging a positive lens; a positive lens; and a joining lens composed of a combination of negative and positive lenses from the object side of the zoom lens to the image side thereof. The rear lens group in the second lens group is constructed by sequentially arranging a joining lens composed of a combination of positive and negative lenses; and a negative lens from the object side of the zoom lens to the image side thereof.

It is preferable to satisfy the following condition, $$\nu_2(FP) > \nu_2(FN)$$

when Abbe numbers of the positive and negative lenses in the joining lens of the front lens group are respectively set to $\nu_2(FP)$ and $\nu_2(FN)$. When this condition is not satisfied, it is insufficient to correct chromatic aberration within the second lens group.

It is also preferable to satisfy the following condition, $$N_2(FP) < N_2(FN)$$

when refractive indexes of the positive and negative lenses in the joining lens of the front lens group are respectively set to $N_2(FP)$ and $N_2(FN)$. When this condition is satisfied, a joining face of the above positive and negative lenses has negative refracting power so that it is effective to correct aberration caused in the positive lenses. A principal point of the front lens group on a front side thereof in the second lens group can be located on the object side of the second lens group by setting the above joining lens to a negative lens.

In the rear lens group of the second lens group, a joining lens composed of a combination of positive and negative lenses is arranged on the object side of the second lens group, i.e., on the front lens group side thereof, and a negative lens is arranged on the image side of the second lens group to locate a principal point of the rear lens group on a front side thereof on the image side of the second lens group and mainly correct chromatic aberration of magnification.

It is preferable to satisfy the following condition, $$\nu_2(RP) < \nu_2(RN)$$

when Abbe numbers of the positive and negative lenses in the joining lens of the rear lens group are respectively set to $\nu_2(RP)$ and $\nu_2(RN)$. When this condition is not satisfied, it is insufficient to correct chromatic aberration within the second lens group. Therefore, the chromatic aberration of magnification of the entire lens system caused at a zooming time of the zoom lens is greatly changed.

In the tenth lens structure of the present invention, the front lens group in the second lens group is constructed by sequentially arranging a joining lens composed of a combination of positive and negative lenses; a positive lens; and a joining lens composed of a combination of negative and positive lenses from the object side of the zoom lens to the image side thereof. The joining lens of the front lens group on the most object side thereof is constructed as a positive lens. The rear lens group in the second lens group is constructed by sequentially arranging a joining lens composed of a combination of positive and negative lenses; and a negative lens from the object side of the zoom lens to the image side thereof.

In the front lens group, the first joining lens and the subsequent positive lens are used to reduce an amount of aberration caused in the front lens group. The first positive lens is constructed by the joining lens composed of positive and negative lenses to correct aberration caused in the positive lenses within the second lens group.

It is preferable to satisfy the following conditions, $$N_2(FP1) < N_2(FN1), \nu_2(FP1) > \nu_2(FN1)$$

when a refractive index and an Abbe number of the positive lens in the first joining lens are respectively set to $N_2(FP1)$ and $\nu_2(FP1)$ and a refractive index and an Abbe number of the negative lens in this first joining lens are respectively set to $N_2(FN1)$ and $\nu_2(FN1)$. When these conditions are not satisfied, it is difficult to correct aberration within the second lens group.

A negative lens is arranged after the above first joining lens and the positive lens to correct aberration caused by the positive lens. Further, a positive lens is joined to this negative lens so as to correct axial chromatic aberration and chromatic aberration of magnification within the second lens group. Accordingly, it is preferable to satisfy the following condition, $$\nu_2(FP_2) > \nu_2(FN_2)$$

when Abbe numbers of the positive and negative lenses in the final joining lens of the front lens group are respectively set to $\nu_2(FP_2)$ and $\nu_2(FN_2)$. When this condition is not satisfied, it is insufficient to correct chromatic aberration within the second lens group.

It is also preferable to satisfy the following condition, $$N_2(FP_2) < N_2(FN_2)$$

when refractive indexes of the positive and negative lenses in the final joining lens of the front lens group are respectively set to $N_2(FP_2)$ and $N_2(FN_2)$. When this condition is satisfied, a joining face of the above positive and negative lenses has negative refracting power so that it is effective to correct aberration caused in the positive lens. A principal point of the front lens group on a front side thereof in the second lens group can be located on the object side of the second lens group by setting the above final joining lens to a negative lens.

The rear lens group of the second lens group has the same lens construction as the rear lens group of the second lens group in the ninth structure of the zoom lens having a high variable magnification. Accordingly, similar to the ninth lens structure of the present invention, it is preferable to satisfy the following condition, $$\nu_2(RP) < \nu_2(RN)$$

when Abbe numbers of the positive and negative lenses in the joining lens of the rear lens group are respectively set to $\nu_2(RP)$ and $\nu_2(RN)$. When this condition is not satisfied, it is insufficient to correct chromatic aberration within the second lens group. Therefore, the chromatic aberration of magnification of the entire lens system caused at a zooming time of the zoom lens is greatly changed.

In the eleventh lens structure of the present invention, the front lens group in the second lens group is constructed by sequentially arranging a positive lens; a joining lens composed of a combination of positive and negative lenses; and a joining lens composed of a combination of negative and positive lenses from the object side of the zoom lens to the image side thereof. The rear lens group in the second lens group is constructed by sequentially arranging a joining lens composed of a combination of positive and negative lenses; and a negative lens from the object side of the zoom lens to the image side thereof.

The joining lens constituting a second lens of the front lens group is constructed as a positive lens. In the front lens group, this joining lens as a positive lens is arranged after the positive lens as a first lens of the front lens group to reduce an amount of aberration caused in the front lens group. Further, aberration caused in the positive lenses within the second lens group is corrected by constructing the second positive lens by the joining lens composed of positive and negative lenses to correct.

It is preferable to satisfy the following conditions, $$N_2(FP_1) < N_2(FN_1), \; \nu_2(FP_1) > \nu_2(FN_1)$$

when a refractive index and an Abbe number of the positive lens in the first joining lens of the front lens group are respectively set to $N_2(FP_1)$ and $\nu_2(FP_1)$ and a refractive index and an Abbe number of the negative lens in this joining lens are respectively set to $N_2(FN_1)$ and $\nu_2(FN_1)$. When these conditions are not satisfied, it is difficult to correct aberration within the second lens group.

A negative lens is arranged after the above positive lens and the above first joining lens to correct aberration caused by the positive lenses. Further, a positive lens is joined to this negative lens so as to correct axial chromatic aberration and chromatic aberration of magnification within the second lens group.

Accordingly, it is preferable to satisfy the following condition, $$\nu_2(FP_2) > \nu_2(FN_2)$$

when Abbe numbers of the positive and negative lenses in the final joining lens of the front lens group are respectively set to $\nu_2(FP_2)$ and $\nu_2(FN_2)$. When this condition is not satisfied, it is insufficient to correct the chromatic aberrations within the second lens group.

It is also preferable to satisfy the following condition, $$N_2(FP_2) < N_2(FN_2)$$

when refractive indexes of the positive and negative lenses in the final joining lens of the front lens group are respectively set to $N_2(FP_2)$ and $N_2(FN_2)$. When this condition is satisfied, a joining face of the above positive and negative lenses has negative refracting power so that it is effective to correct aberration caused in the positive lens. A principal point of the front lens group on a front side thereof in the second lens group can be located on the object side of the second lens group by setting the above final joining lens to a negative lens.

The rear lens group of the second lens group has the same lens construction as the rear lens group of the second lens group in the ninth structure of the zoom lens having a high variable magnification. Accordingly, similar to the ninth lens structure of the present invention, it is preferable to satisfy the following condition, $$\nu_2(RP) < \nu_2(RN)$$

when Abbe numbers of the positive and negative lenses in the joining lens of the rear lens group are respectively set to $\nu_2(RP)$ and $\nu_2(RN)$. When this condition is not satisfied, it is insufficient to correct chromatic aberration within the second lens group. Therefore, the chromatic aberration of magnification of the entire lens system caused at a zooming time of the zoom lens is greatly changed.

In the eighth to eleventh lens structures of the present invention, it is desirable to use an aspherical lens surface within the second lens group so as to correct spherical aberration caused within the front lens group of the second lens group. Further, aberration outside an optical axis of the lens system can be corrected by using an aspherical lens surface within the rear lens group of the second lens group.

In the twelfth lens structure of the present invention, the front lens group in the second lens group is constructed by sequentially arranging a joining lens composed of a combination of positive and negative lenses; and a joining lens composed of a combination of positive and negative lenses from the object side of the zoom lens to the image side thereof. The rear lens group in the second lens group is constructed by sequentially arranging a joining lens composed of a combination of positive and negative lenses; and a negative lens from the object side of the zoom lens to the image side thereof.

In the front lens group, the two positive lenses are used to reduce an amount of aberration tending to be greatly caused in the front lens group.

It is preferable to satisfy the following condition, $$N_2(FP_2) < N_2(FN_2)$$

when a refractive index of the positive lens in the second joining lens of the front lens group is set to $N_2(FP_2)$ and a refractive index of the negative lens in this joining lens is set to $N_2(FN_2)$. When this condition is satisfied, a principal point of the front lens group on a front side thereof in the second lens group can be located on the object side of the second lens group and aberration caused in the above positive lens can be corrected on a joining face of the second joining lens.

A lens of the front lens group on an object side thereof in the second lens group is constructed by a positive joining lens composed of a combination of positive and negative lenses to correct axial chromatic aberration and chromatic aberration of magnification within the second lens group. Accordingly, it is preferable to satisfy the following condition, $$\nu_2(FP_1) > \nu_2(FN_1)$$

when Abbe numbers of the positive and negative lenses in this positive joining lens of the front lens group are respectively set to $\nu_2(FP_1)$ and $\nu_2(FN_1)$. When this condition is not satisfied, it is insufficient to correct the chromatic aberrations within the second lens group.

It is also preferable to satisfy the following condition, $$N_2(FP_1) < N_2(FN_1)$$

when refractive indexes of the positive and negative lenses in the above positive joining lens of the front lens group on the object side thereof in the second lens group are respectively set to $N_2(FP_1)$ and $N_2(FN_1)$. When this condition is satisfied, negative spherical aberration is caused on a joining face of the positive and negative lenses of this positive joining lens. Accordingly, it is possible to correct spherical aberration of the front lens group in the second lens group.

In the rear lens group of the second lens group, a joining lens composed of a combination of positive and negative lenses, and a negative lens are sequentially arranged from the object side of the zoom lens to the image side thereof to locate a principal point of the rear lens group on a front side thereof on the image side of the second lens group and mainly correct chromatic aberration of magnification.

It is preferable to satisfy the following condition, $$\nu_2(RN) > \nu_2(RP)$$

when Abbe numbers of the positive and negative lenses constituting the above joining lens of the rear lens group are respectively set to $\nu_2(RP)$ and $\nu_2(RN)$. When this condition is not satisfied, it is impossible to correct chromatic aberration of magnification in the rear lens group of the second lens group. Therefore, the chromatic aberration of magnification of the entire lens system caused by a zooming operation of the zoom lens is greatly changed.

In the thirteenth lens structure of the present invention, the front lens group in the second lens group is constructed by sequentially arranging a positive lens; a positive lens; and a joining lens composed of a combination of negative and positive lenses from the object side of the zoom lens to the image side thereof. The rear lens group in the second lens group is constructed by sequentially arranging a joining lens composed of a combination of positive and negative lenses; and a joining lens composed of a combination of negative and positive lenses from the object side of the zoom lens to the image side thereof. In the front lens group, the two positive lenses are used to reduce an amount of aberration tending to be greatly caused in the front lens group. Further, a negative lens is arranged after these two positive lenses to correct aberration caused in these two positive lenses. Further, a positive lens is joined to this negative lens so as to correct axial chromatic aberration and chromatic aberration of magnification within the second lens group.

Accordingly, it is preferable to satisfy the following condition, $$\nu_2(FP) > \nu_2(FN)$$

when Abbe numbers of the positive and negative lenses in the joining lens of the front lens group in the second lens group are respectively set to $\nu_2(FP)$ and $\nu_2(FN)$. When this condition is not satisfied, it is insufficient to correct the chromatic aberrations within the second lens group.

It is also preferable to satisfy the following condition, $$N_2(FP) < N_2(FN)$$

when refractive indexes of the positive and negative lenses in the above joining lens of the front lens group are respectively set to $N_2(FP)$ and $N_2(FN)$. When this condition is satisfied, a joining face of the above negative and positive lenses has negative refracting power so that it is effective to correct aberration caused in the positive lenses. Further, a principal point of the front lens group on a front side thereof in the second lens group can be located on the object side of the second lens group by constituting the above joining lens as a negative lens.

In the rear lens group of the second lens group, a joining lens composed of a combination of positive and negative lenses, and a joining lens composed of a combination of negative and positive lenses are sequentially arranged from the object side of the zoom lens to the image side thereof to locate a principal point of the rear lens group on a front side thereof on the image side of the second lens group and mainly correct chromatic aberration of magnification.

It is preferable to satisfy the following conditions, $$\nu_2(RP_1) < \nu_2(RN_1), \nu_2(RN_2) > \nu_2(RP_2)$$

when Abbe numbers of the positive, negative, negative and positive lenses sequentially arranged on the object side of the zoom lens and constituting the rear lens group are respectively set to $\nu_2(RP_1)$, $\nu_2(RN_1)$, $\nu_2(RN_2)$ and $\nu_2(RP_2)$. When these conditions are not satisfied, it is impossible to correct chromatic aberration of magnification in the rear lens group of the second lens group. Therefore, the chromatic aberration of magnification of the entire lens system caused by a zooming operation of the zoom lens is greatly changed.

It is also preferable to satisfy the following condition, $$N_2(RP_1) < N_2(RN_1)$$

when refractive indexes of the positive and negative lenses in the joining lens of the rear lens group on the object side thereof are respectively set to $N_2(RP_1)$ and $N_2(RN_1)$. When this condition is not satisfied, spherical aberration cannot be corrected on a joining face of these positive and negative lenses. Accordingly, it is difficult to correct spherical aberration of the entire lens system and suitably hold a Petzval's sum.

In the twelfth and thirteenth lens structures of the present invention, it is desirable to use an aspherical lens surface within the front lens group of the second lens group so as to correct spherical aberration caused within the front lens group of the second lens group. Further, aberration outside an optical axis of the lens system can be corrected by using an aspherical lens surface within the rear lens group of the second lens group.

Figure 2:
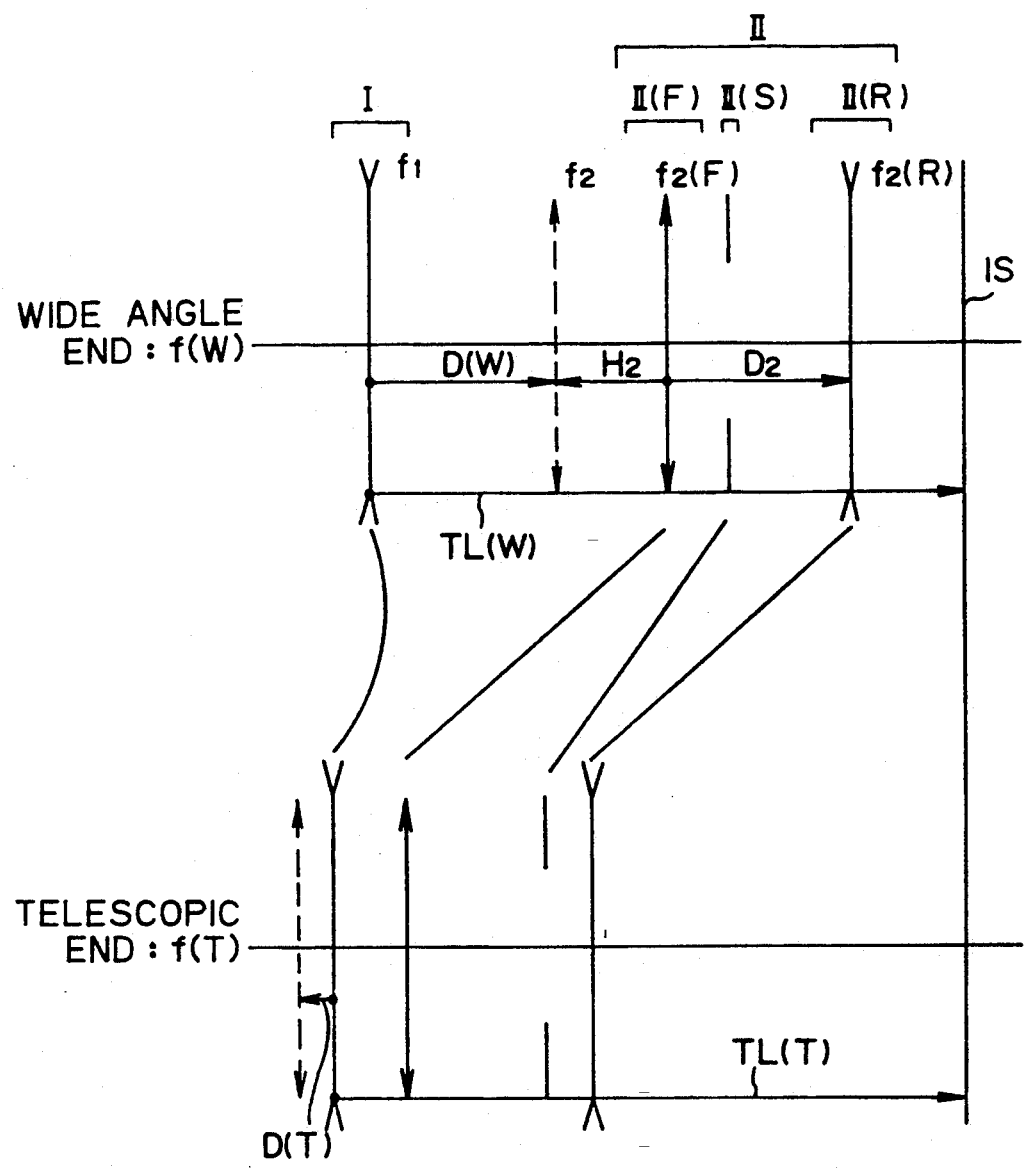
FIG. 2 is a view for explaining a zoom lens having a high variable magnification and a fourteenth lens structure.

In the fourteenth lens structure of the present invention, as shown in FIG. 2, a diaphragm II(S) is arranged between front and rear lens groups in a second lens group II. A moving amount of this diaphragm II(S) is set to be smaller than that of the second lens group when the zooming operation of a zoom lens is performed from a wide angle end of the zoom lens to a telescopic end thereof.

In such a zoom lens having two groups of negative and positive lenses, an F-number of the zoom lens is gradually increased while the zooming operation is performed from the wide angle end of the zoom lens to the telescopic end thereof. Accordingly, it is necessary to extremely reduce the F-number of the zoom lens at the wide angle end thereof to reduce the F-number and increase brightness at the telescopic end of the zoom lens. Therefore, it is difficult to obtain a preferable performance of the zoom lens at the wide angle end thereof.

To solve this problem, in the fourteenth lens structure of the present invention, the diaphragm II(S) is arranged between the front and rear lens groups of the second lens group II as mentioned above. Further, a moving amount of the diaphragm II(S) is set to be smaller than that of the second lens group II when the zooming operation is performed from the wide angle end of the zoom lens to the telescopic end thereof.

In such a structure, it is possible to locate the diaphragm II(S) in the vicinity of the front lens group of the second lens group at the wide angle end of the zoom lens. Further, it is possible to locate the diaphragm II(S) in the vicinity of the rear lens group of the second lens group at the telescopic end of the zoom lens. In other words, the diaphragm II(S) is gradually moved from the front lens group II(F) of the second lens group to the rear lens group II(R) thereof while the zooming operation is performed from the wide angle end of the zoom lens to the telescopic end thereof. Thus, the difference in F-number between the wide angle and telescopic ends of the zoom lens can be reduced in comparison with that in a case in which a moving amount of the diaphragm is equal to that of the second lens group. Accordingly, it is possible to prevent the F-number at the telescopic end of the zoom lens from being extremely increased while the performance of the zoom lens at the wide angle end thereof is preferably held.

The diameter of the first lens group can be held small by the above arrangement of the diaphragm. Further, the performance of the zoom lens can be improved since an upper light beam can be interrupted on the telescopic side of the zoom lens. Further, it is possible to reduce a diameter of the diaphragm by the above arrangement.

When the arrangement of the diaphragm in the fourteenth lens structure of the present invention is used, it is preferable to construct the second lens group in accordance with the above fifteenth to eighteenth lens structures of the present invention.

In the zoom lens constructed by two groups of negative and positive lenses, the relation in position between the first and second lens groups is greatly changed in the zooming operation of the zoom lens. Accordingly, it is ideal to preferably correct aberrations by each of the first and second lens groups until a maximum field angle of the zoom lens. Further, it is ideal to reduce a change in aberration of the entire lens system at a zooming time thereof so as to provide a preferable performance of the zoom lens in an entire zooming region thereof.

However, it is very difficult to preferably correct the above aberrations and provide the preferable performance of the zoom lens. Normally, the performance of the zoom lens is preferably held by balancing changes in aberration of the entire lens system caused by residual aberrations of the respective lens groups in the entire zooming region of the zoom lens at the zooming time thereof.

In this case, there is a case in which the position of a best peripheral image surface is not in conformity with the position of a best central image surface. When there is such nonconformity, the performance of the zoom lens is greatly reduced by errors in processing, assembly and focusing of the zoom lens, etc.

In the nineteenth lens structure of the present invention, the distance between the front and rear lens groups in the second lens group is changed in accordance with the zooming operation of the zoom lens. The distance between the front and rear lens groups is reduced in an intermediate zooming region of the zoom lens.

When the zooming operation is performed by integrally moving the front and rear lens groups in the second lens group, the position of a best peripheral image surface is separated from a lens at the distance of a best central image surface at an intermediate focal length of the zoom lens. In the nineteenth lens structure of the present invention, the distance between the front and rear lens groups in the second lens group is slightly reduced in the intermediate zooming region of the zoom lens so as to correct the above separation of the best peripheral image surface from the lens.

In general, when a diaphragm is arranged within the front lens group of the second lens group or on an object side of the front lens group, a most peripheral light beam at the wide angle end of the zoom lens is not restricted by an opening diameter of the diaphragm, but is restricted by effective diameters of lenses before and after the diaphragm, or an opening diameter of a light-interrupting member.

Accordingly, when the zooming operation is performed from the wide angle end of the zoom lens to the telescopic end thereof, the distance between the first and second lens groups is reduced and a field angle of the zoom lens is reduced. Therefore, the size of a peripheral light beam on a diaphragm face is increased and a vigetting factor of the zoom lens is increased so that a quantity of the peripheral light beam is considerably increased.

In general, it is difficult to sufficiently correct aberration with respect to a marginal portion of the light beam so that flare light is often caused and prevents an image forming performance of the zoom lens. Accordingly, it is desirable to secure a necessary and sufficient peripheral light quantity and interrupt a marginal portion of the light beam except for this peripheral light as much as possible.

As mentioned above, the peripheral light quantity is considerably increased when the zooming operation is performed from the wide angle end of the zoom lens to the telescopic end thereof. Accordingly, it is possible to secure the necessary and sufficient peripheral light quantity even when flare light is interrupted in the marginal portion of the light beam.

In the twentieth lens structure of the present invention, a first diaphragm is disposed within the front lens group of the second lens group or on an object side of the front lens group. A second diaphragm having a constant opening diameter is disposed between the front and rear lens groups. When the zooming operation is performed from the wide angle end of the zoom lens to the telescopic end thereof, the second diaphragm is moved such that the second diaphragm is separated from the front lens group of the second lens group.

Thus, a large amount of a most peripheral light beam is transmitted through the zoom lens at the wide angle end thereof at which the quantity of peripheral light is small. Further, flare light is interrupted at the telescopic end of the zoom lens at which the quantity of peripheral light is not small.

A focusing system for moving the first lens group is generally used in the above zoom lens having two groups of negative and positive lenses. In such a focusing system, a moving amount of the first lens group in a focusing operation of the zoom lens is approximately constant at the same distance from the zoom lens to a photographed object in a front zooming region of the zoom lens. Accordingly, no special focusing mechanism is required in this focusing system. However, in this focusing system, a movable lens group is disposed on the most photographed object side of the zoom lens. Therefore, it is necessary to dispose a mechanism for moving this movable lens group in the case of an automatic focusing camera so that the zoom lens is large-sized.

The twenty-first lens structure of the present invention uses a focusing system for moving the rear lens group in the second lens group. In the following description, reference numeral $\Delta X$ designates a moving amount of the rear lens group of the second lens group in a focusing operation of the zoom lens. This moving amount $\Delta X$ can be represented by the following formula when this moving amount is small.

$$\Delta X = x \cdot f^2 / \{m_2(R)^2 - 1\}$$

In this formula, reference numeral x designates a distance from a principal point of the entire lens system on a front side thereof to the photographed object. Reference numeral f designates a focal length of the entire lens system. Further, reference numeral $m_2(R)$ designates a lateral magnification of the rear lens group in the second lens group.

When $m_2(R) > 1$ is satisfied at any time and the focusing operation is performed in a state in which the distance from the zoom lens to the photographed object is short, the rear lens group in the second lens group is moved on the image side of the second lens group. The moving amount of the rear lens group is reduced as the lateral magnification $m_2(R)$ is increased. The lateral magnification $m_2(R)$ is represented by the following formula.

$$m_2(R) = 1 - \{BF/f_2(R)\}$$

In this formula, reference numeral BF designates a distance from a principal point of the rear lens group on a rear side thereof in the second lens group to an image face.

From this formula, it is understood that the lateral magnification $m_2(R)$ is increased as the distance BF is increased and the absolute focal length $|f_2(R)|$ is reduced.

In the above twenty-first lens structure of the present invention, a back focus of the zoom lens is smallest at the wide angle end thereof. Accordingly, when the moving amount of the rear lens group in the focusing operation of the zoom lens is increased, the rear lens group in the second lens group excessively approaches the image face and the diameter of the rear lens group is increased. Further, a change in aberration of the rear lens group is increased and the performance of the zoom lens is deteriorated at a focusing time thereof.

Accordingly, it is necessary to increase the lateral magnification $m_2(R)$ and reduce the moving amount of the rear lens group in the focusing operation of the zoom lens.

As mentioned above, it is necessary to reduce the absolute focal length $|f_2(R)|$ to increase the lateral magnification $m_2(R)$. However, when this absolute focal length is excessively reduced, it is difficult to correct aberration in the rear lens group of the second lens group.

Therefore, in the twenty-first lens structure of the present invention, the rear lens group in the second lens group has at least one positive lens. In the following description, reference numeral $m_2(RW)$ designates a lateral magnification of the rear lens group in the second lens group at the wide angle end of the zoom lens and infinity with respect to the photographed object. In the twenty-first lens structure of the present invention, this lateral magnification $m_2(RW)$ satisfies the following condition.

1. $1 < m_2(RW) < 2$

When the lateral magnification $m_2(RW)$ exceeds a lower limit thereof in the above condition, the moving amount of the rear lens group in the second lens group is excessively increased, thereby causing the above-mentioned problems. In contrast to this, when the lateral magnification $m_2(RW)$ exceeds an upper limit thereof in the above condition, a focal length of the rear lens group in the second lens group is excessively shortened so that it is difficult to correct aberration in the rear lens group.

The distance between the front and rear lens groups in the second lens group is changed by the focusing operation of the zoom lens. Accordingly, it is necessary to independently correct aberration with respect to each of the front and rear lens groups of the second lens group so as to preferably hold the performance of the zoom lens at the focusing time thereof, etc. Accordingly, at least one positive lens is arranged in the rear lens group of the second lens group to correct aberration caused in a negative lens.

It is necessary to dispose at least one negative lens to correct aberration in the front lens group of the second lens group. Further, it is preferable to arrange a positive lens as a final lens in the front lens group of the second lens group to preferably correct the aberration of the front lens group.

In the zoom lens having two groups of negative and positive lenses, when the zooming operation is performed from the wide angle end of the zoom lens to the telescopic end thereof, an F-number of the zoom lens at the telescopic end thereof is larger than that at the wide angle end of the zoom lens. When the F-number is reduced at the telescopic end of the zoom lens to increase brightness thereof, it is necessary to extremely reduce the F-number of the zoom lens at the wide angle end thereof. In this case, it is difficult to secure a preferable performance of the zoom lens at the wide angle end thereof.

To solve this problem, in the twenty-second lens structure of the present invention, a diaphragm is arranged between the front and rear lens groups in the second lens group. When the zooming operation is performed from the wide angle end of the zoom lens to the telescopic end thereof, a moving amount of this diaphragm is set to be smaller than that of the second lens group. Thus, this diaphragm within the second lens group approaches the front lens group of the second lens group at the wide angle end of the zoom lens and approaches the rear lens group of the second lens group at the telescopic end of the zoom lens. Therefore, it is possible to reduce the difference in F-number between the wide angle and telescopic ends of the zoom lens. Further, it is possible to preferably hold the performance of the zoom lens at the wide angle end thereof. The diameter of the first lens group can be held small by the above arrangement of the diaphragm and a marginal portion of the light beam can be interrupted at the telescopic end of the zoom lens, thereby providing a preferable performance of the zoom lens.

Concrete Embodiments of the present invention will next be described.

In the respective concrete Embodiments, reference numeral Ri using suffix i designates a radius of curvature of an i-th face (including a diaphragm) counted from the object side of the zoom lens. Reference numeral Di using suffix i designates a distance between an i-th face and an (i+1)-th face on an optical axis of the lens system. Reference numerals Nj and $\nu j$ using suffix j respectively designate a refractive index and an Abbe number of a j-th lens counted from the object side of the zoom lens with respect to line d.

Further, reference numeral f designates a combined focal length of the entire lens system. Reference numerals $\omega$ and FNo respectively designate a field angle (unit: degree) and brightness.

In the following description, reference numeral Y designates a coordinate in a direction perpendicular to the optical axis of the lens system. Reference numeral Z designates a coordinate in the direction of the optical axis of the lens system. Reference numeral R designates a radius of curvature on the optical axis of the lens system. Further, reference numeral K designates a conical constant and reference numerals A, B, C and D respectively designate aspherical coefficients of fourth, sixth, eighth and tenth orders. In this case, as is well known, an aspherical surface is a curved surface formed by rotating a curve represented by the following formula using the above parameters, $$Z = \{(1/R) \cdot Y^2 / [1 + \sqrt{\{1 - (1+K) \cdot (1/R^2) \cdot Y^2\}}]\} + A \cdot Y^4 + B \cdot Y^6 + C \cdot Y^8 + D \cdot Y^{10}$$

around the optical axis of the lens system. This aspherical surface is determined by specifying the above parameters R, K, A, B, C and D. The above radius Ri of curvature shows a radius of curvature on the optical axis of the lens system with respect to the aspherical surface. Alphabet E and a number subsequent to this alphabet E show power with respect to the aspherical coefficients of higher orders about the aspherical surface. For example, E−10 means $1/10^{10}$ and a number before this alphabet E is multiplied by this value $1/10^{10}$.

Embodiment 1
F36.5∼102, FNo. = 3.12∼6.33, $\omega$ = 63.0∼23.5

| i | Ri | Di | j | Nj | $\nu j$ |
|---|---|---|---|---|---|
| 1 | −132.697 | 0.811 | 1 | 1.88300 | 40.80 |
| 2 | 29.272 | 2.023 | | | |
| 3 | 32.595 | 3.738 | 2 | 1.82359 | 24.52 |
| 4 | 134.613 | variable | | | |
| 5 | 18.131 | 6.338 | 3 | 1.62203 | 61.38 |
| 6 | −38.166 | 0.800 | 4 | 1.87092 | 33.66 |

-continued

| | | | | | |
|---|---|---|---|---|---|
| 7 | −334.457 | 0.715 | | | |
| 8 | ∞(diaphragm) | 1.000 | | | |
| 9 | 18.398 | 3.952 | 5 | 1.49700 | 81.60 |
| 10 | 531.439 | 2.276 | | | |
| 11 | −76.803 | 0.800 | 6 | 1.87296 | 34.25 |
| 12 | 13.536 | 0.351 | | | |
| 13 | 15.229 | 8.987 | 7 | 1.58735 | 39.47 |
| 14 | −13.045 | 0.800 | 8 | 1.75325 | 52.38 |
| 15 | −40.214 | 15.384 | | | |
| 16 | −13.021 | 0.800 | 9 | 1.49700 | 81.60 |
| 17 | 227.475 | 3.068 | 10 | 1.64854 | 32.88 |
| 18 | −59.992 | | | | |

Aspherical surfaces
Fifth face
K = −0.060693, A = −1.747204E-6,
B = −1.219325E-8, C = 1.161183E-10,
D = −1.720309E-14
Eleventh face
K = 16.956051, A = −4.631422E-6,
B = 9.861092E-9, C = 6.670963E-10,
D = −1.069999E-11
Fifteenth face
K = −2.763672, A = 2.439264E-6,
B = 4.534996E-8, C = 1.219346E-9,
D = −2.231143E-11
Sixteenth face
K = −0.046230, A = 1.114557E-5,
B = 2.040012E-7, C = −1.691015E-9,
D = 9.442470E-12
Variable amounts

| f | 36.496 | 61.009 | 101.985 |
|---|---|---|---|
| D$_4$ | 30.170 | 12.415 | 1.795 |

Values of conditional formulas
[f$_1$ + f$_2$ · {2 − (f$_1$/f(W)) − (f(W)/f$_1$)}]/f(T) = 0.509
[f$_1$ + f$_2$ · {2 − (f$_1$/f(T)) − (f(T)/f$_1$)}]/f(T) = 0.509
|f$_2$(R)|/f$_2$(F) = 1.313, f$_2$(F)/f$_2$ = 1.120,
|f$_1$|/$\sqrt{[f(W) \cdot f(T)]}$ = 1.000

Embodiment 2
F36.5∼102, FNO. = 2.94∼5.93, $\omega$ = 63.7∼23.7

| i | Ri | Di | j | Nj | $\nu j$ |
|---|---|---|---|---|---|
| 1 | −104.634 | 0.901 | 1 | 1.88300 | 40.80 |
| 2 | 30.331 | 1.302 | | | |
| 3 | 32.705 | 4.127 | 2 | 1.84666 | 23.83 |
| 4 | 155.989 | variable | | | |
| 5 | 21.215 | 6.017 | 3 | 1.61765 | 55.16 |
| 6 | −24.053 | 1.450 | 4 | 1.83400 | 37.34 |
| 7 | −105.946 | 0.855 | | | |
| 8 | ∞(diaphragm) | 0.868 | | | |
| 9 | 22.286 | 3.794 | 5 | 1.49700 | 81.60 |
| 10 | −73.311 | 2.077 | | | |
| 11 | −45.160 | 2.481 | 6 | 1.90315 | 29.84 |
| 12 | 15.975 | 0.488 | | | |
| 13 | 17.177 | 6.581 | 7 | 1.62004 | 36.30 |
| 14 | −12.539 | 0.859 | 8 | 1.77250 | 49.62 |
| 15 | −31.745 | 20.308 | | | |
| 16 | −10.904 | 0.824 | 9 | 1.49700 | 81.61 |
| 17 | −73.312 | 2.064 | 10 | 1.84666 | 23.83 |
| 18 | −38.005 | | | | |

Aspherical surfaces
Fifth face
K = −0.035077, A = −5.228067E-7,
B = −3.877944E-9, C = 1.169510E-10,
D = 1.640908E-14
Sixteenth face
K = −0.300459, A = 5.721353E-6,
B = 7.199471E-8, C = 6.221942E-10,
D = −4.087988E-12
Variable amounts

| f | 36.505 | 60.012 | 102.032 |
|---|---|---|---|
| D$_4$ | 29.189 | 11.825 | 0.719 |

Values of conditional formulas
[f$_1$ + f$_2$ · {2 − (f$_1$/f(W)) − (f(W)/f$_1$)}]/f(T) = 0.5
[f$_1$ + f$_2$ · {2 − (f$_1$/f(T)) − (f(T)/f$_1$)}]/f(T) = 0.495
|f$_2$(R)|/f$_2$(F) = 1.243, f$_2$(F)/f$_2$ = 1.160,
|f$_1$|/$\sqrt{[f(W) \cdot f(T)]}$ = 1.008

Embodiment 3
F36.5∼102, FNO. = 2.87∼5.82, $\omega$ = 63.8∼23.4

| i | Ri | Di | j | Nj | $\nu j$ |
|---|---|---|---|---|---|

-continued

| i | Ri | Di | j | Nj | vj |
|---|---|---|---|---|---|
| 1 | −69.698 | 0.800 | 1 | 1.88300 | 40.80 |
| 2 | 37.077 | 0.928 | | | |
| 3 | 39.268 | 3.589 | 2 | 1.84666 | 23.83 |
| 4 | 467.492 | variable | | | |
| 5 | 21.197 | 6.600 | 3 | 1.63854 | 55.45 |
| 6 | −31.186 | 0.800 | 4 | 1.83400 | 37.34 |
| 7 | −177.850 | 1.478 | | | |
| 8 | ∞(diaphragm) | 1.685 | | | |
| 9 | 18.309 | 3.731 | 5 | 1.49700 | 81.60 |
| 10 | −75.042 | 1.184 | | | |
| 11 | −40.565 | 0.888 | 6 | 1.85030 | 32.18 |
| 12 | 14.872 | 0.100 | | | |
| 13 | 14.646 | 10.000 | 7 | 1.59551 | 39.22 |
| 14 | −12.062 | 1.435 | 8 | 1.81600 | 46.57 |
| 15 | −23.162 | 11.152 | | | |
| 16 | −12.511 | 6.131 | 9 | 1.75500 | 52.32 |
| 17 | −76.754 | 3.756 | 10 | 1.84666 | 23.83 |
| 18 | −85.092 | | | | |

Aspherical surfaces
Ninth face
$K = -0.179177$, $A = -3.612813E-6$,
$= 3.874821E-9$, $C = 2.971765E-10$,
$= 1.767060E-12$
Eighteenth face
$K = -0.718998$, $A = -1.850240E-6$,
$B = -3.234995E-8$, $C = 3.320808E-10$,
$D = -6.586454E-13$ Variable amounts

| f | 36.496 | 59.992 | 101.979 |
|---|---|---|---|
| $D_4$ | 28.852 | 11.826 | 0.938 |

Values of conditional formulas
$[f_1 + f_2 \cdot \{2 - (f_1/f(W)) - (f(W)/f_1)\}]/f(T) = 0.468$
$[f_1 + f_2 \cdot \{2 - (f_1/f(T)) - (f(T)/f_1)\}]/f(T) = 0.46$
$|f_2(R)|/f_2(F) = 0.828$, $f_2(F)/f_2 = 1.033$,
$|f_1|/\sqrt{[f(W) \cdot f(T)]} = 1.016$ The above Embodiments 1 to 3 relate to the second lens structure of the present invention.

Figure 3:
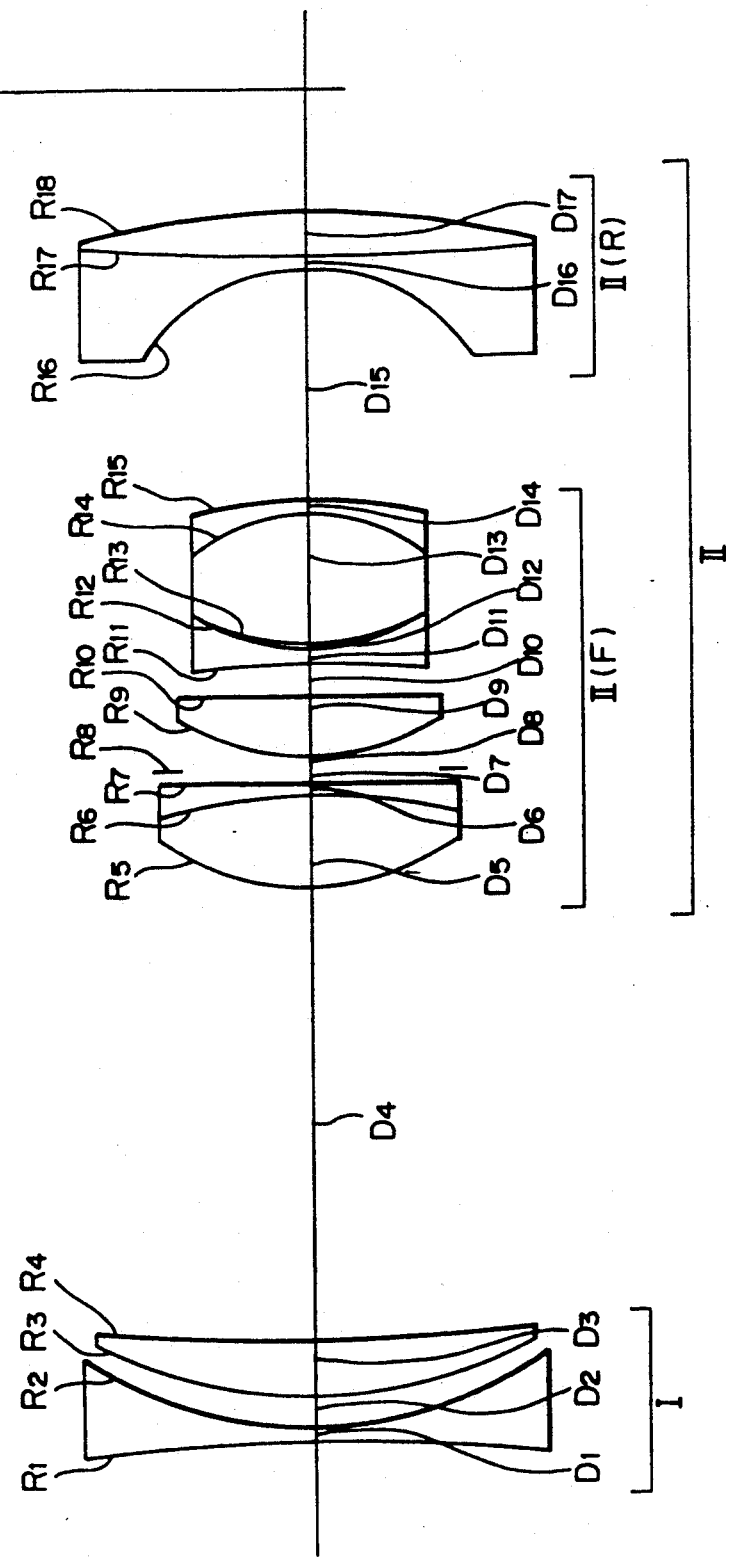
FIG. 3 is a view showing the arrangement of a zoom lens at a wide angle end thereof in accordance with Embodiment 1 of the present invention.

FIG. 3 shows a lens arrangement in the Embodiment 1 at the wide angle end of the zoom lens. FIGS. 6, 7 and 8 respectively show aberration diagrams with respect to the Embodiment 1 at the wide angle end of the zoom lens, an intermediate focal length of the zoom lens and the telescopic end of the zoom lens.

Figure 4:
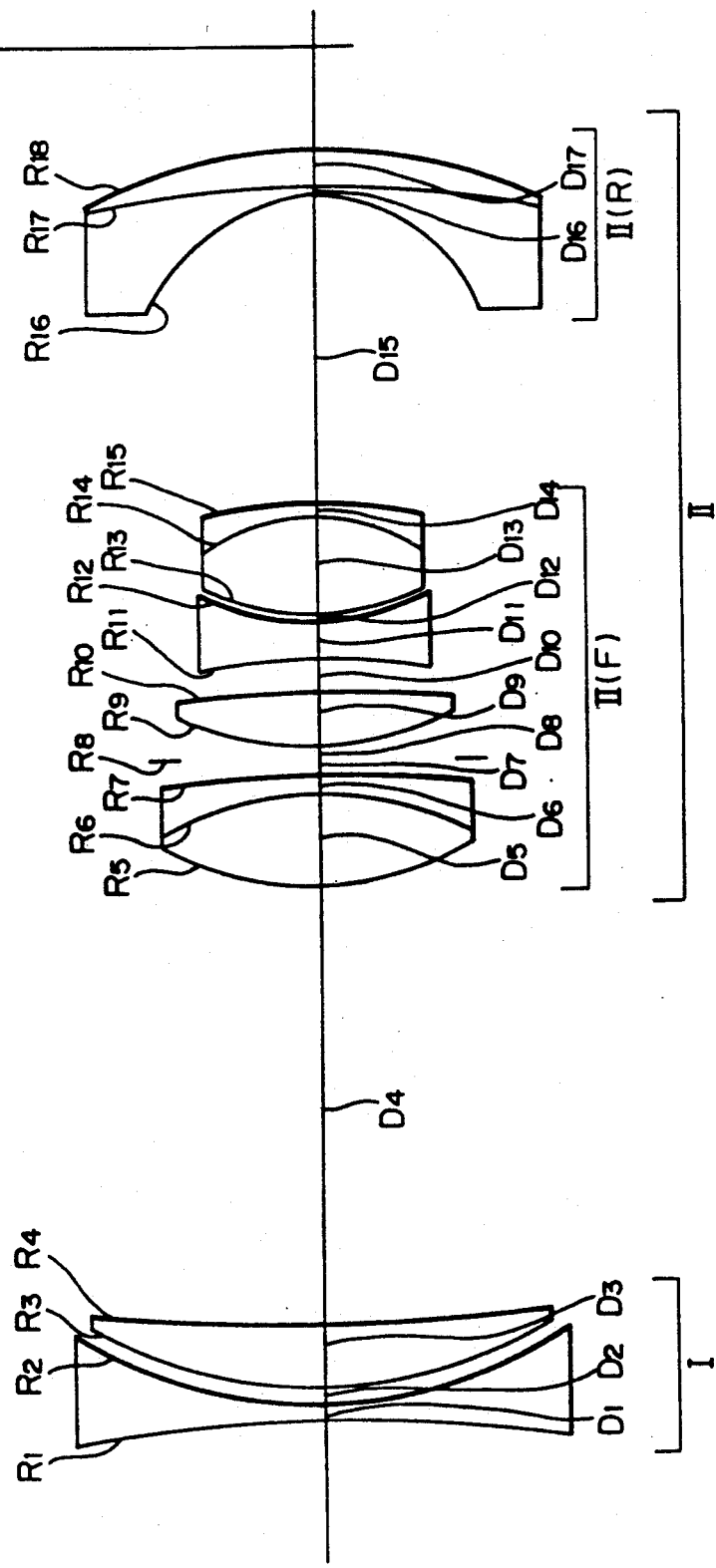
FIG. 4 is a view showing the arrangement of a zoom lens at a wide angle end thereof in accordance with Embodiment 2 of the present invention.

FIG. 4 shows a lens arrangement in the Embodiment 2 at the wide angle end of the zoom lens. FIGS. 9, 10 and 11 respectively show aberration diagrams with respect to the Embodiment 2 at the wide angle end of the zoom lens, an intermediate focal length of the zoom lens and the telescopic end of the zoom lens.

Figure 5:
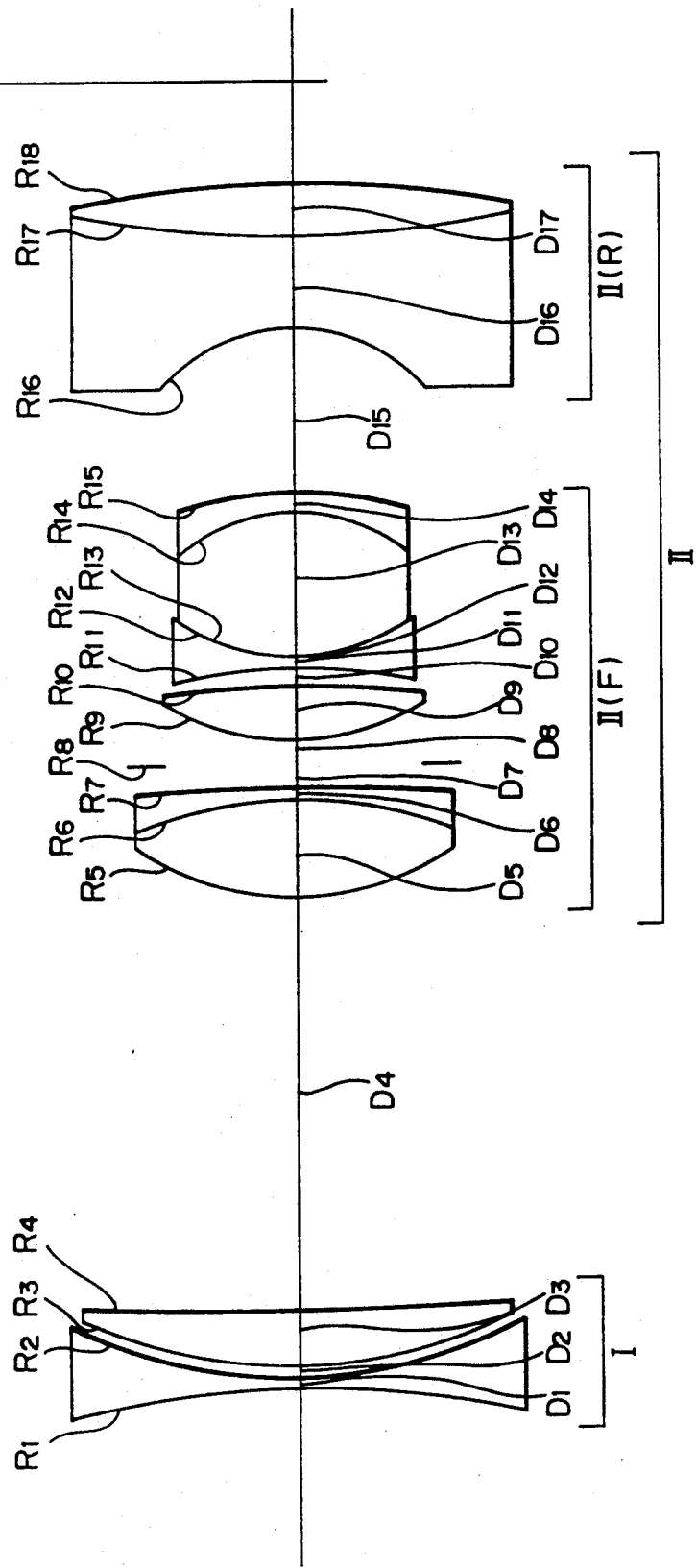
FIG. 5 is a view showing the arrangement of a zoom lens at a wide angle end thereof in accordance with Embodiment 3 of the present invention.

FIG. 5 shows a lens arrangement in the Embodiment 3 at the wide angle end of the zoom lens. FIGS. 12, 13 and 14 respectively show aberration diagrams with respect to the Embodiment 3 at the wide angle end of the zoom lens, an intermediate focal length of the zoom lens and the telescopic end of the zoom lens.

In the respective aberration diagrams, reference numerals dSA and gSA respectively designate spherical aberrations with respect to lines d and g. Reference numeral SC designates a sine condition. Further, reference numerals S and M respectively designate sagittal and meridional image surfaces with respect to line d.

Embodiment 4
$f = 36.5 \sim 102$, FNO. $= 2.9 \sim 5.9$, $\omega = 63.6 \sim 23.3$

| i | Ri | Di | j | Nj | vj |
|---|---|---|---|---|---|
| 1 | −67.412 | 0.815 | 1 | 1.86300 | 41.53 |
| 2 | 35.934 | 0.925 | | | |
| 3 | 38.182 | 3.441 | 2 | 1.84666 | 23.89 |
| 4 | 366.434 | variable | | | |
| 5 | 20.555 | 5.581 | 3 | 1.60300 | 65.48 |
| 6 | −41.043 | 0.803 | 4 | 1.77250 | 49.60 |
| 7 | −102.177 | 1.621 | | | |
| 8 | ∞(diaphragm) | 0.800 | | | |
| 9 | 24.460 | 3.143 | 5 | 1.48749 | 70.21 |
| 10 | −157.363 | 0.671 | | | |
| 11 | −44.969 | 0.897 | 6 | 1.87400 | 35.26 |
| 12 | 18.177 | 0.461 | | | |
| 13 | 18.583 | 9.994 | 7 | 1.52630 | 51.17 |
| 14 | −24.705 | 18.060 | | | |
| 15 | −15.238 | 3.090 | 8 | 1.75500 | 52.33 |
| 16 | 48.195 | 4.294 | 9 | 1.84666 | 23.89 |
| 17 | −118.121 | | | | |

Aspherical surfaces
Ninth face
$K = -1.008267$, $A = -1.348746E-5$,
$B = -6.190930E-8$, $C = -1.977751E-10$,
$D = -2.773300E-13$
Seventeenth face
$K = 1.285372$, $A = 5.394611E-7$,
$B = -4.647639E-8$, $C = 4.028286E-10$,
$D = -7.529230E-13$ Variable amounts

| f | 36.499 | 59.997 | 101.993 |
|---|---|---|---|
| $D_4$ | 28.220 | 11.568 | 0.919 |

Values of conditional formulas
$[f_1 + f_2 \cdot \{2 - (f_1/f(W)) - (f(W)/f_1)\}]/f(T) = 0.464$
$[f_1 + f_2 \cdot \{2 - (f_1/f(T)) - (f(T)/f_1)\}]/f(T) = 0.463$
$|f_2(R)|/f_2(F) = 0.900$, $f_2(F)/f_2 = 1.125$,
$|f_1|/\sqrt{[f(W) \cdot f(T)]} = 1.002$ Embodiment 5
$f = 36.5 \sim 102$, FNO. $= 2.92 \sim 5.89$, $\omega = 63.6 \sim 23.5$

| i | Ri | Di | j | Nj | vj |
|---|---|---|---|---|---|
| 1 | −77.786 | 0.945 | 1 | 1.83400 | 37.34 |
| 2 | 29.381 | 1.237 | | | |
| 3 | 33.157 | 3.954 | 2 | 1.84666 | 23.83 |
| 4 | 229.379 | variable | | | |
| 5 | 19.893 | 5.372 | 3 | 1.59181 | 58.31 |
| 6 | −46.078 | 0.800 | 4 | 1.83500 | 42.98 |
| 7 | −211.030 | 0.800 | | | |
| 8 | ∞(diaphragm) | 0.800 | | | |
| 9 | 23.248 | 3.218 | 5 | 1.48749 | 70.44 |
| 10 | −128.429 | 1.178 | | | |
| 11 | −60.671 | 1.095 | 6 | 1.83400 | 37.34 |
| 12 | 14.567 | 0.101 | | | |
| 13 | 14.697 | 8.586 | 7 | 1.52130 | 52.78 |
| 14 | −34.238 | 22.249 | | | |
| 15 | −13.852 | 0.791 | 8 | 1.60300 | 65.48 |
| 16 | 135.446 | 3.440 | 9 | 1.84666 | 23.83 |
| 17 | −77.710 | | | | |

Aspherical surfaces
First face
$K = -1.071674$, $A = 3.221728E-7$,
$B = 4.065251E-9$, $C = -1.096925E-11$,
$D = 1.113897E-14$
Ninth face
$K = -0.640719$, $A = -1.052945E-5$,
$B = -4.057532E-8$, $C = 9.494987E-11$,
$D = -9.978813E-13$
Fifteenth face
$K = -0.241523$, $A = -2.499751E-6$,
$B = 1.215630E-7$, $C = -1.683378E-9$,
$D = 3.317575E-12$ Variable amounts

| f | 36.500 | 60.000 | 101.999 |
|---|---|---|---|
| $D_4$ | 28.514 | 11.517 | 0.646 |

Values of conditional formulas
$[f_1 + f_2 \cdot \{2 - (f_1/f(W)) - (f(W)/f_1)\}]/f(T) = 0.484$
$[f_1 + f_2 \cdot \{2 - (f_1/f(T)) - (f(T)/f_1)\}]/f(T) = 0.482$
$|f_2(R)|/f_2(F) = 1.113$, $f_2(F)/f_2 = 1.168$,
$|f_1|/\sqrt{[f(W) \cdot f(T)]} = 1.003$ Embodiment 6
$f = 36.5 \sim 102$, FNO. $= 2.88 \sim 5.88$, $\omega = 63.6 \sim 23.4$

| i | Ri | Di | j | Nj | vj |
|---|---|---|---|---|---|
| 1 | −87.110 | 0.800 | 1 | 1.88300 | 40.80 |
| 2 | 33.970 | 1.781 | | | |
| 3 | 38.217 | 3.334 | 2 | 1.84700 | 23.90 |
| 4 | 242.958 | variable | | | |
| 5 | 20.025 | 5.539 | 3 | 1.56743 | 67.80 |
| 6 | −42.408 | 0.800 | 4 | 1.88300 | 40.80 |

-continued

| | | | | | |
|---|---|---|---|---|---|
| 7 | −133.825 | 1.260 | | | |
| 8 | ∞(diaphragm) | 0.800 | | | |
| 9 | 22.793 | 3.373 | 5 | 1.49700 | 81.60 |
| 10 | −106.185 | 1.692 | | | |
| 11 | −57.483 | 1.800 | 6 | 1.88300 | 40.80 |
| 12 | 15.236 | 0.100 | | | |
| 13 | 15.335 | 7.904 | 7 | 1.53408 | 50.08 |
| 14 | −33.771 | 21.829 | | | |
| 15 | −13.078 | 0.800 | 8 | 1.49700 | 81.60 |
| 16 | 106.335 | 2.938 | 9 | 1.84700 | 23.90 |
| 17 | −187.702 | | | | |

Aspherical surfaces
First face
K = −0.588739, A = 1.293210E-7,
B = −6.215850E-10, C = 8.351060E-12,
D = −2.353410E-14
Ninth face
K = −0.635545, A = −1.046480E-5,
B = −5.148540E-8, C = 1.942750E-10,
D = −1.655200E-12
Fifteenth face
K = −0.312535, A = 1.820590E-6,
B = −9.882400E-8, C = 6.637100E-10,
D = −4.115400E-12
Variable amounts

| f | 36.502 | 61.007 | 102.013 |
|---|---|---|---|
| $D_4$ | 28.251 | 11.081 | 0.800 |

Values of conditional formulas
$[f_1 + f_2 \cdot \{2 - (f_1/f(W)) - (f(W)/f_1)\}]/f(T) = 0.45$
$[f_1 + f_2 \cdot \{2 - (f_1/f(T)) - (f(T)/f_1)\}]/f(T) = 0.469$
$|f_2(R)|/f_2(F) = 1.096, f_2(F)/f_2 = 1.200,$
$|f_1|/\sqrt{[f(W) \cdot f(T)]} = 1.002$ The above Embodiments 4 to 6 relate to the third lens structure of the present invention.

Figure 15:
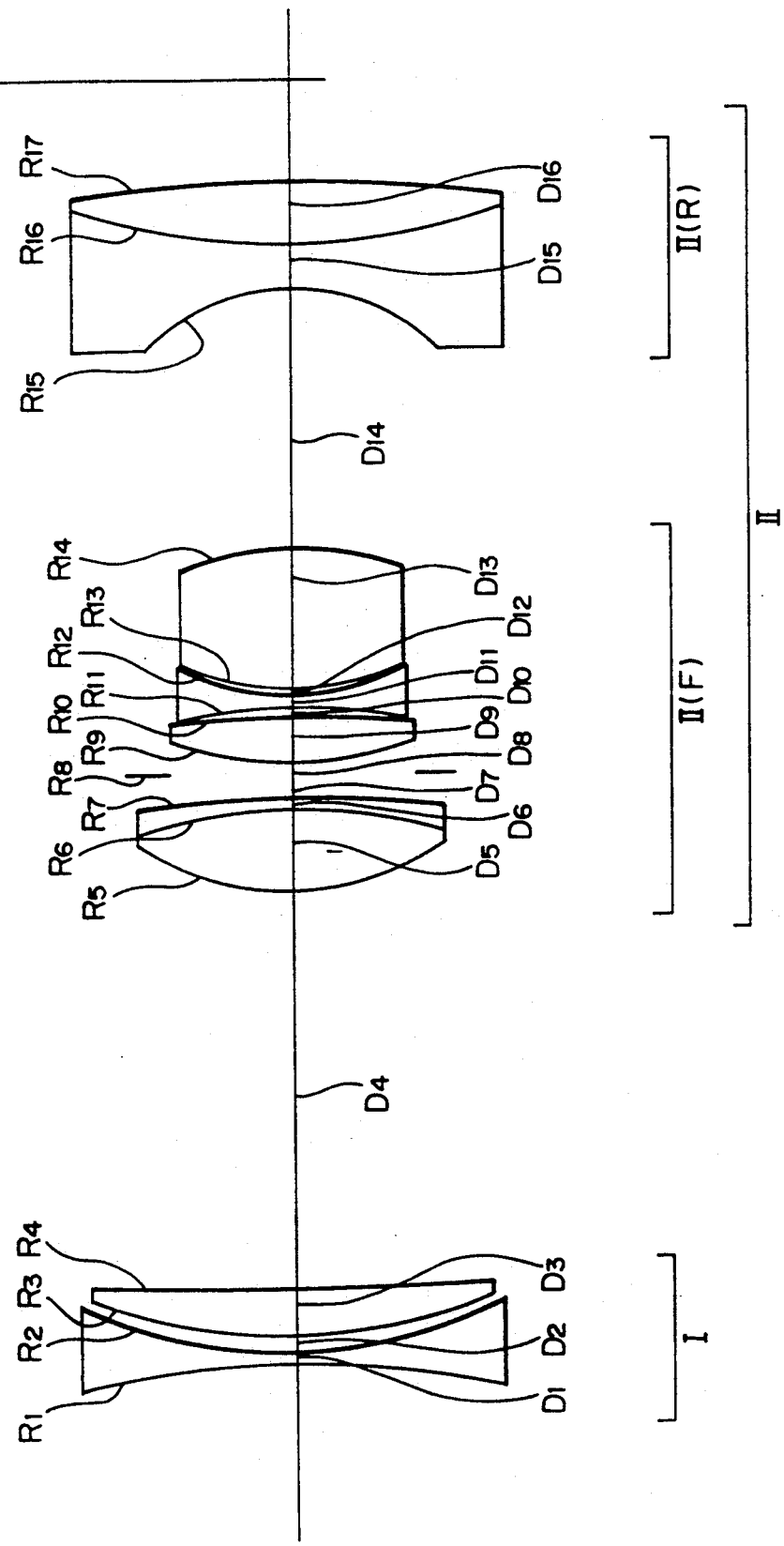
FIG. 15 is a view showing the arrangement of a zoom lens at a wide angle end thereof in accordance with Embodiment 4 of the present invention.

FIG. 15 shows a lens arrangement in the Embodiment 4 at the wide angle end of the zoom lens. FIGS. 18, 19 and 20 respectively show aberration diagrams with respect to the Embodiment 4 at the wide angle end of the zoom lens, an intermediate focal length of the zoom lens and the telescopic end of the zoom lens.

Figure 16:
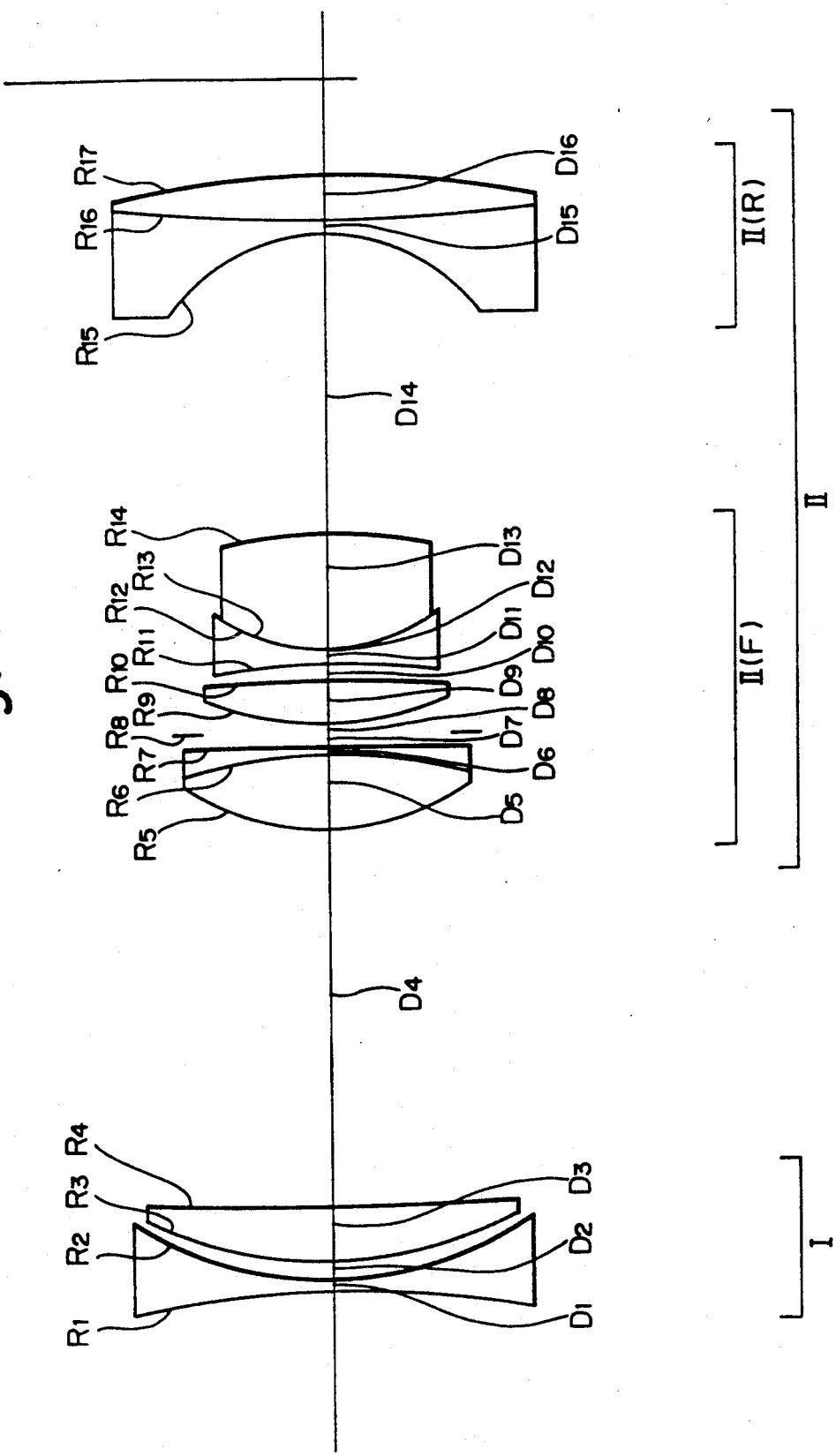
FIG. 16 is a view showing the arrangement of a zoom lens at a wide angle end thereof in accordance with Embodiment 5 of the present invention.

FIG. 16 shows a lens arrangement in the Embodiment 5 at the wide angle end of the zoom lens. FIGS. 21, 22 and 23 respectively show aberration diagrams with respect to the Embodiment 5 at the wide angle end of the zoom lens, an intermediate focal length of the zoom lens and the telescopic end of the zoom lens.

FIG. 17 shows a lens arrangement in the Embodiment 6 at the wide angle end of the zoom lens. FIGS. 24, 25 and 26 respectively show aberration diagrams with respect to the Embodiment 6 at the wide angle end of the zoom lens, an intermediate focal length of the zoom lens and the telescopic end of the zoom lens.

Embodiment 7
f = 36.5~102, FNO. = 2.9~5.9, ω = 63.5~23.6

| i | Ri | Di | j | Nj | νj |
|---|---|---|---|---|---|
| 1 | −85.138 | 0.887 | 1 | 1.83400 | 37.34 |
| 2 | 28.026 | 0.853 | | | |
| 3 | 29.944 | 4.583 | 2 | 1.84666 | 23.83 |
| 4 | 169.05 | variable | | | |
| 5 | 18.918 | 6.622 | 3 | 1.48749 | 70.44 |
| 6 | −87.255 | 2.089 | | | |
| 7 | ∞(diaphragm) | 0.800 | | | |
| 8 | 25.961 | 3.318 | 4 | 1.54814 | 45.82 |
| 9 | −49.591 | 0.138 | | | |
| 10 | −41.883 | 0.800 | 5 | 1.84666 | 23.83 |
| 11 | 59.536 | 5.669 | | | |
| 12 | ∞ | 10.795 | | | |
| 13 | 137.981 | 7.042 | 6 | 1.68893 | 31.16 |
| 14 | −13.085 | 2.279 | 7 | 1.88300 | 40.80 |
| 15 | −84.900 | 7.786 | | | |
| 16 | −12.568 | 0.800 | 8 | 1.49700 | 81.61 |
| 17 | −36.562 | | | | |

Aspherical surfaces
Eighth face
K = −1.182221, A = −7.870754E-6,
B = −7.371219E-8, C = 8.003773E-11,
D = −4.319129E-12
Sixteenth face
K = −0.73049, A = −1.862161E-5,
B = 8.064080E-8, C = −1.216524E-9,
D = 3.255338E-12
Variable amounts

| f | 36.499 | 60.998 | 101.996 |
|---|---|---|---|
| $d_4$ | 29.385 | 11.372 | 0.585 |

Values of conditional formulas
$[f_1 + f_2 \cdot \{2 - (f_1/f(W)) - (f(W)/f_1)\}]/f(T) = 0.46$
$[f_1 + f_2 \cdot \{2 - (f_1/f(T)) - (f(T)/f_1)\}]/f(T) = 0.435$
$|f_2(R)|/f_2(F) = 1.298, f_2(F)/f_2 = 1.227,$
$|f_1|/\sqrt{[f(W) \cdot f(T)]} = 1.047$ Embodiment 8
f = 36.5~102, FNO. = 2.86~5.89, ω = 63.4~23.6

| i | Ri | Di | j | Nj | νj |
|---|---|---|---|---|---|
| 1 | −83.270 | 0.800 | 1 | 1.88300 | 40.80 |
| 2 | 35.360 | 1.583 | | | |
| 3 | 38.701 | 3.520 | 2 | 1.84666 | 23.82 |
| 4 | 238.279 | variable | | | |
| 5 | 19.134 | 8.212 | 3 | 1.50378 | 66.89 |
| 6 | −144.780 | 1.709 | | | |
| 7 | ∞(diaphragm) | 0.800 | | | |
| 8 | 27.612 | 5.993 | 4 | 1.54072 | 47.20 |
| 9 | −30.027 | 0.100 | | | |
| 10 | −29.479 | 0.800 | 5 | 1.84666 | 23.83 |
| 11 | 70.640 | 3.433 | | | |
| 12 | ∞ | 12.701 | | | |
| 13 | 61.406 | 7.707 | 6 | 1.69895 | 30.05 |
| 14 | −14.007 | 0.800 | 7 | 1.88300 | 40.80 |
| 15 | −206.074 | 6.418 | | | |
| 16 | −12.759 | 0.800 | 8 | 1.49700 | 81.61 |
| 17 | −41.783 | | | | |

Aspherical surfaces
Eighth face
K = −1.403890, A = −9.278020E-6,
B = −8.577710E-8, C = 9.345540E-11,
D = −2.707970E-12
Sixteenth face
K = −0.736120, A = −1.815330E-5,
B = 1.581560E-8, C = −5.265050E-10,
D = 2.489460E-12
Variable amounts

| f | 36.45 | 60.999 | 101.996 |
|---|---|---|---|
| $D_4$ | 27.625 | 10.847 | 0.800 |

Values of conditional formulas
$[f_1 + f_2 \cdot \{2 - (f_1/f(W)) - (f(W)/f_1)\}]/f(T) = 0.443$
$[f_1 + f_2 \cdot \{2 - (f_1/f(T)) - (f(T)/f_1)\}]/f(T) = 0.441$
$|f_2(R)|/f_2(F) = 1.423, f_2(F)/f_2 = 1.286,$
$|f_1|/\sqrt{[f(W) \cdot f(T)]} = 1.004$ Embodiment 9
f = 36.5~102, FNO. = 2.9~5.9, ω = 63.4~23.5

| i | Ri | Di | j | Nj | νj |
|---|---|---|---|---|---|
| 1 | −83.380 | 0.800 | 1 | 1.88300 | 40.80 |
| 2 | 33.027 | 1.073 | | | |
| 3 | 34.906 | 4.360 | 2 | 1.78472 | 25.70 |
| 4 | 647.228 | variable | | | |
| 5 | 19.178 | 6.721 | 3 | 1.51680 | 64.20 |
| 6 | −187.184 | 1.664 | | | |
| 7 | ∞(diaphragm) | 0.800 | | | |
| 8 | 30.373 | 3.563 | 4 | 1.51742 | 52.15 |
| 9 | −31.353 | 0.100 | | | |
| 10 | −32.321 | 0.800 | 5 | 1.84666 | 23.83 |
| 11 | 152.357 | 6.000 | | | |
| 12 | ∞ | 11.287 | | | |
| 13 | 276.854 | 7.042 | 6 | 1.69895 | 30.05 |
| 14 | −11.945 | 0.800 | 7 | 1.88300 | 40.80 |
| 15 | −86.726 | 6.101 | | | |
| 16 | −11.369 | 0.800 | 8 | 1.49700 | 81.61 |
| 17 | −31.513 | | | | |

Aspherical surfaces
Eighth face
K = −1.601750, A = −9.927140E-6,

-continued

B = −8.102590E-8, C = 1.170720E-10,
D = −2.498730E-12
Sixteenth face
K = −0.709399, A = −2.297340E-5,
B = −5.850550E-8, C = −1.521790E-9,
D = 6.285460E-12
Variable amounts

| f | 36.504 | 61.03 | 102.032 |
|---|---|---|---|
| $D_4$ | 30.402 | 11.879 | 0.800 |

Values of conditional formulas
$[f_1 + f_2 \cdot \{2 - (f_1/f(W)) - (f(W)/f_1)\}]/f(T) = 0.454$
$[f_1 + f_2 \cdot \{2 - (f_1/f(T)) - (f(T)/f_1)\}]/f(T) = 0.416$
$|f_2(R)|/f_2(F) = 1.072$, $f_2(F)/f_2 = 1.193$,
$|f_1|/\sqrt{[f(W) \cdot f(T)]} = 1.073$ The above Embodiments 7 to 9 relate to the fourth lens structure of the present invention.

FIG. 27 shows a lens arrangement in the Embodiment 7 at the wide angle end of the zoom lens. FIGS. 30, 31 and 32 respectively show aberration diagrams with respect to the Embodiment 7 at the wide angle end of the zoom lens, an intermediate focal length of the zoom lens and the telescopic end of the zoom lens.

Figure 28:
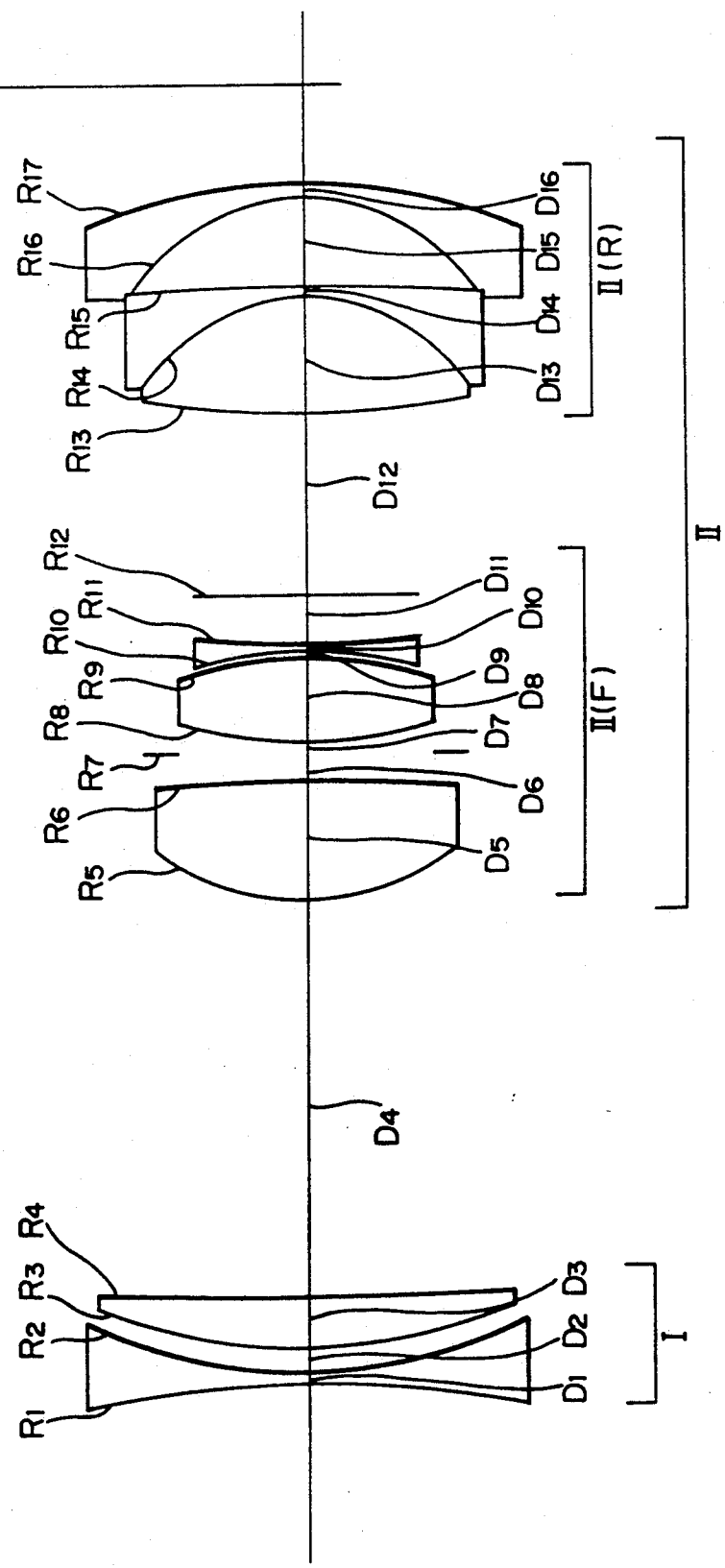
FIG. 28 is a view showing the arrangement of a zoom lens at a wide angle end thereof in accordance with Embodiment 8 of the present invention.

FIG. 28 shows a lens arrangement in the Embodiment 8 at the wide angle end of the zoom lens. FIGS. 33, 34 and 35 respectively show aberration diagrams with respect to the Embodiment 8 at the wide angle end of the zoom lens, an intermediate focal length of the zoom lens and the telescopic end of the zoom lens.

Figure 29:
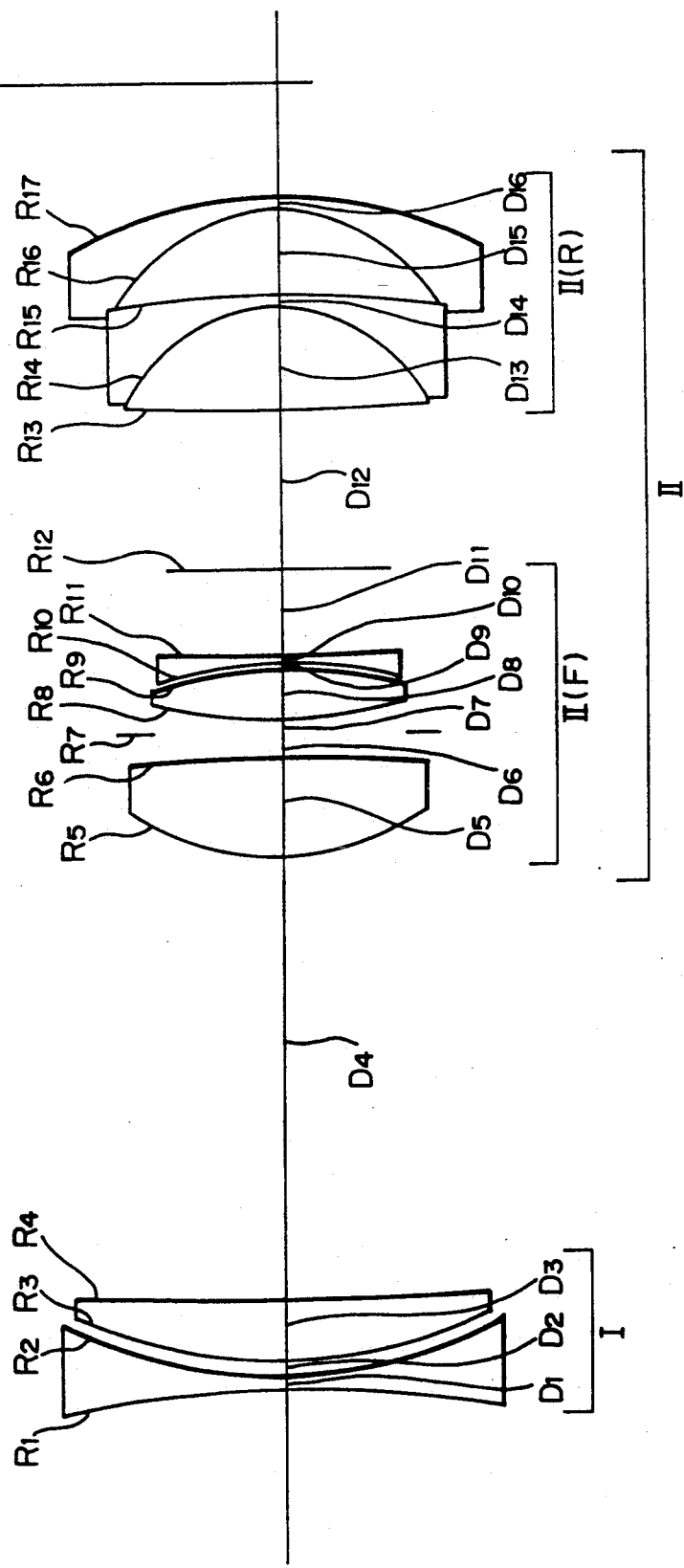
FIG. 29 is a view showing the arrangement of a zoom lens at a wide angle end thereof in accordance with Embodiment 9 of the present invention.

FIG. 29 shows a lens arrangement in the Embodiment 9 at the wide angle end of the zoom lens. FIGS. 36, 37 and 38 respectively show aberration diagrams with respect to the Embodiment 9 at the wide angle end of the zoom lens, an intermediate focal length of the zoom lens and the telescopic end of the zoom lens.

Embodiment 10
$f = 36.5 \sim 102$, FNO. = $2.89 \sim 5.9$, $\omega = 63.3 \sim 23.6$

| i | R i | D i | j | N j | ν j |
|---|---|---|---|---|---|
| 1 | −82.478 | 1.221 | 1 | 1.83400 | 37.34 |
| 2 | 28.647 | 0.871 | | | |
| 3 | 30.543 | 4.510 | 2 | 1.84666 | 23.83 |
| 4 | 181.540 | variable | | | |
| 5 | 19.466 | 7.648 | 3 | 1.51823 | 58.96 |
| 6 | −93.610 | 1.537 | | | |
| 7 | ∞ (diaphragm) | 0.800 | | | |
| 8 | 26.409 | 4.253 | 4 | 1.54814 | 45.82 |
| 9 | −29.127 | 0.990 | 5 | 1.84666 | 23.83 |
| 10 | 56.893 | 3.949 | | | |
| 11 | ∞ | 12.653 | | | |
| 12 | 75.006 | 7.593 | 6 | 1.69895 | 30.05 |
| 13 | −13.437 | 1.326 | 7 | 1.88300 | 40.80 |
| 14 | −163.240 | 6.368 | | | |
| 15 | −11.992 | 0.944 | 8 | 1.49700 | 81.61 |
| 16 | −35.711 | | | | |

Aspherical surfaces
Eighth face
K = −1.068895, A = −7.529721E-6,
B = −7.581887E-8, C = 1.848291E-10,
D = −4.184132E-12
Fifteenth face
K = −0.720314, A = −2.032129E-5,
B = 3.981674E-8, C = −1.029337E-9,
D = 3.613058E-12
Variable amounts

| f | 36.502 | 61.005 | 102.010 |
|---|---|---|---|
| $D_4$ | 29.183 | 11.321 | 0.624 |

Values of conditional formulas
$[f_1 + f_2 \cdot \{2 - (f_1/f(W)) - (f(W)/f_1)\}]/f(T) = 0.44$
$[f_1 + f_2 \cdot \{2 - (f_1/f(T)) - (f(T)/f_1)\}]/f(T) = 0.411$
$|f_2(R)|/f_2(F) = 1.290$, $f_2(F)/f_2 = 1.255$, $|f_1|/\sqrt{[f(W) \cdot f(T)]} = 1.055$ Embodiment 11
$f = 36.5 \sim 102$, FNO. = $2.86 \sim 5.9$, $\omega = 63.3 \sim 23.6$

| i | R i | D i | j | N j | ν j |
|---|---|---|---|---|---|
| 1 | −85.106 | 0.800 | 1 | 1.88300 | 40.80 |
| 2 | 35.156 | 1.538 | | | |
| 3 | 38.289 | 3.528 | 2 | 1.84666 | 23.83 |
| 4 | 218.963 | variable | | | |
| 5 | 19.131 | 8.962 | 3 | 1.51742 | 52.15 |
| 6 | −110.215 | 1.351 | | | |
| 7 | ∞ (diaphragm) | 0.800 | | | |
| 8 | 25.705 | 5.581 | 4 | 1.56965 | 49.39 |
| 9 | −25.120 | 0.800 | 5 | 1.84666 | 23.83 |
| 10 | 47.428 | 3.919 | | | |
| 11 | ∞ | 11.932 | | | |
| 12 | 56.689 | 7.728 | 6 | 1.72825 | 28.32 |
| 13 | −14.124 | 0.800 | 7 | 1.88300 | 40.80 |
| 14 | −545.329 | 6.809 | | | |
| 15 | −12.528 | 0.800 | 8 | 1.51728 | 69.68 |
| 16 | −35.185 | | | | |

Aspherical surfaces
Eighth face
K = −1.086781, A = −7.694750E-6,
B = −7.990350E-8, C = 1.269480E-10,
D = −3.567750E-12
Fifteenth face
K = −0.718346, A = −2.065820E-5,
B = 2.539640E-8, C = −7.606460E-10,
D = 2.968370E-12
Variable amounts

| f | 36.5 | 61.0 | 102.0 |
|---|---|---|---|
| $D_4$ | 27.651 | 10.857 | 0.800 |

Values of conditional formulas
$[f_1 + f_2 \cdot \{2 - (f_1/f(W)) - (f(W)/f_1)\}]/f(T) = 0.447$
$[f_1 + f_2 \cdot \{2 - (f_1/f(T)) - (f(T)/f_1)\}]/f(T) = 0.446$
$|f_2(R)|/f_2(F) = 1.553$, $f_2(F)/f_2 = 1.289$, $|f_1|/\sqrt{[f(W) \cdot f(T)]} = 1.001$ Embodiment 12
$f = 36.5 \sim 102$, FNO. = $2.91 \sim 5.9$, $\omega = 63.3 \sim 22.5$

| i | R i | D i | j | N j | ν j |
|---|---|---|---|---|---|
| 1 | −79.300 | 0.800 | 1 | 1.88300 | 40.80 |
| 2 | 30.882 | 0.804 | | | |
| 3 | 32.072 | 4.692 | 2 | 1.76182 | 26.55 |
| 4 | 8312.033 | variable | | | |
| 5 | 19.371 | 5.138 | 3 | 1.51823 | 58.96 |
| 6 | −110.256 | 1.657 | | | |
| 7 | ∞ (diaphragm) | 0.800 | | | |
| 8 | 27.310 | 3.557 | 4 | 1.51602 | 56.77 |
| 9 | −38.223 | 0.800 | 5 | 1.84666 | 23.83 |
| 10 | 81.350 | 4.431 | | | |
| 11 | ∞ | 12.226 | | | |
| 12 | 175.268 | 6.711 | 6 | 1.69895 | 30.05 |
| 13 | −11.845 | 0.800 | 7 | 1.88300 | 40.80 |
| 14 | −93.359 | 6.106 | | | |
| 15 | −10.865 | 0.800 | 8 | 1.49700 | 81.61 |
| 16 | −29.498 | | | | |

Aspherical surfaces
Eighth face
K = −1.100163, A = −7.715040E-6,
B = −7.482230E-8, C = 2.277150E-10,
D = −3.216280E-12
Fifteenth face
K = −0.683131, A = −2.921990E-5,
B = 9.162650E-8, C = −2.548350E-9,
D = 8.628930E-12
Variable amounts

| f | 36.501 | 61.004 | 102.009 |
|---|---|---|---|
| $D_4$ | 30.306 | 11.851 | 0.800 |

Values of conditional formulas
$[f_1 + f_2 \cdot \{2 - (f_1/f(W)) - (f(W)/f_1)\}]/f(T) = 0.457$
$[f_1 + f_2 \cdot \{2 - (f_1/f(T)) - (f(T)/f_1)\}]/f(T) = 0.421$
$|f_2(R)|/f_2(F) = 1.090$, $f_2(F)/f_2 = 1.172$, $|f_1|/\sqrt{[f(W) \cdot f(T)]} = 1.069$ The above Embodiments 10 to 12 relate to the fifth lens structure of the present invention.

FIG. 39 shows a lens arrangement in the Embodiment 10 at the wide angle end of the zoom lens. FIGS. 42, 43 and 44 respectively show aberration diagrams with respect to the Embodiment 10 at the wide angle end of the zoom lens, an intermediate focal length of the zoom lens and the telescopic end of the zoom lens.

Figure 40:
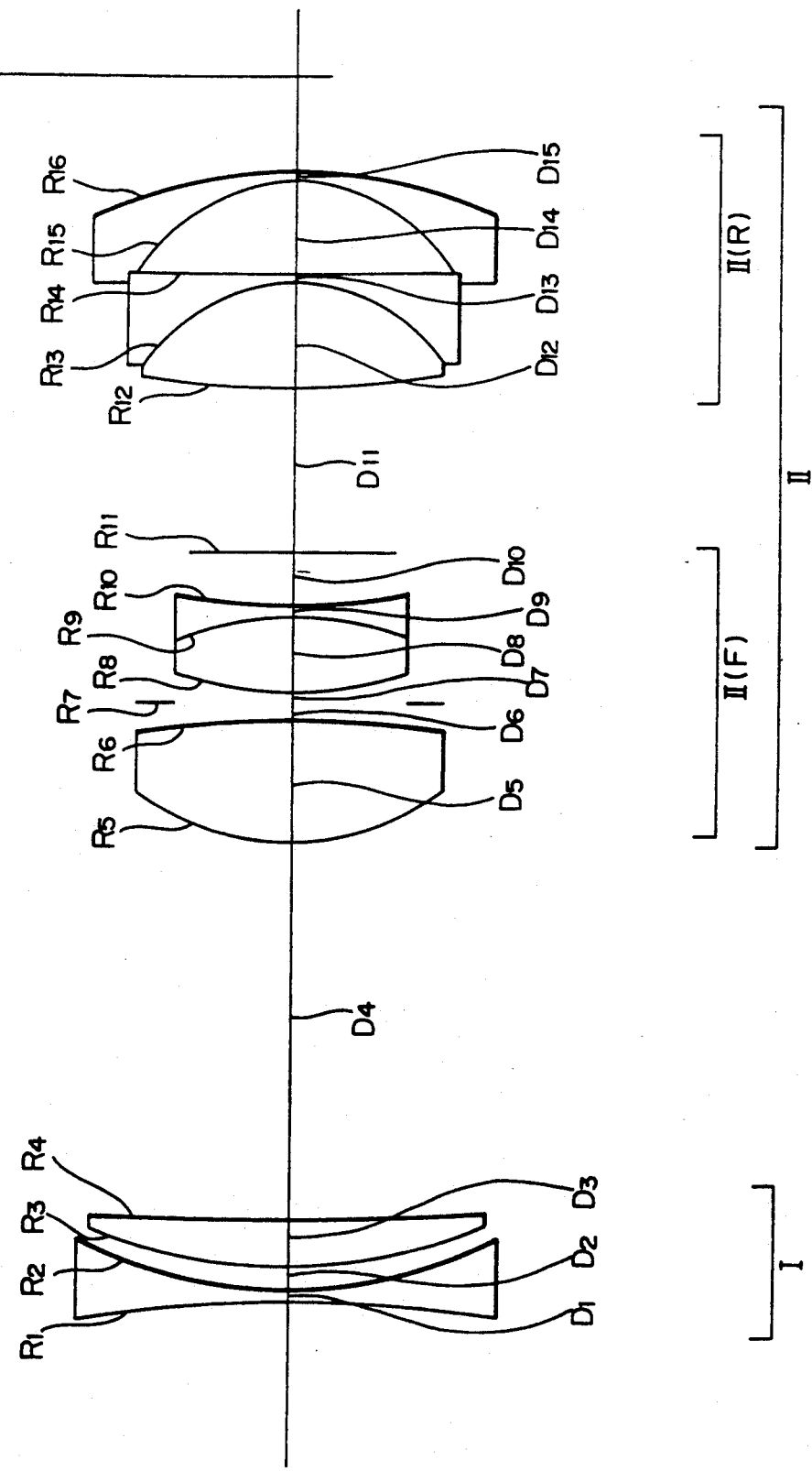
FIG. 40 is a view showing the arrangement of a zoom lens at a wide angle end thereof in accordance with Embodiment 11 of the present invention.
Figures 47A, 47B, 47C, 47D:
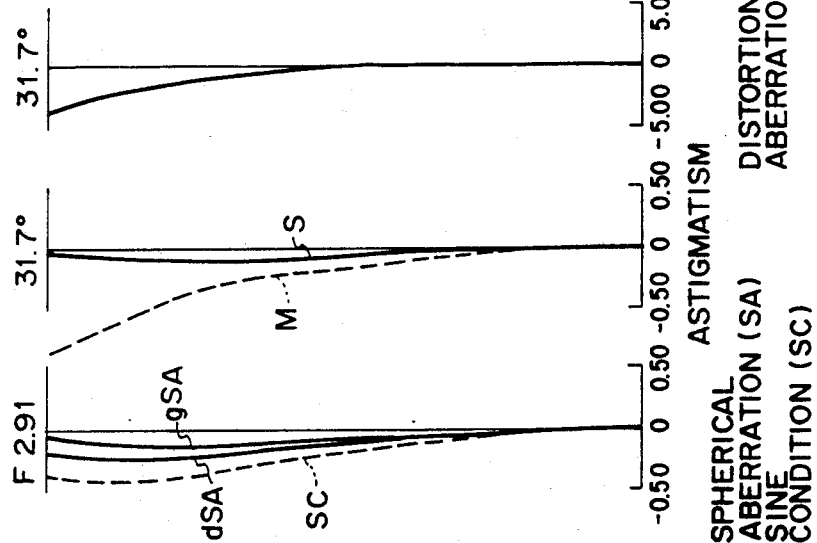
FIGS. 47a, 47b, 47c and 47d are aberration diagrams of the zoom lens at a telescopic end thereof in Embodiment 11 of the present invention.

FIG. 40 shows a lens arrangement in the Embodiment 11 at the wide angle end of the zoom lens. FIGS. 45, 46 and 47 respectively show aberration diagrams with respect to the Embodiment 11 at the wide angle end of the zoom lens, an intermediate focal length of the zoom lens and the telescopic end of the zoom lens.

Figures 48A, 48B, 48C, 48D:
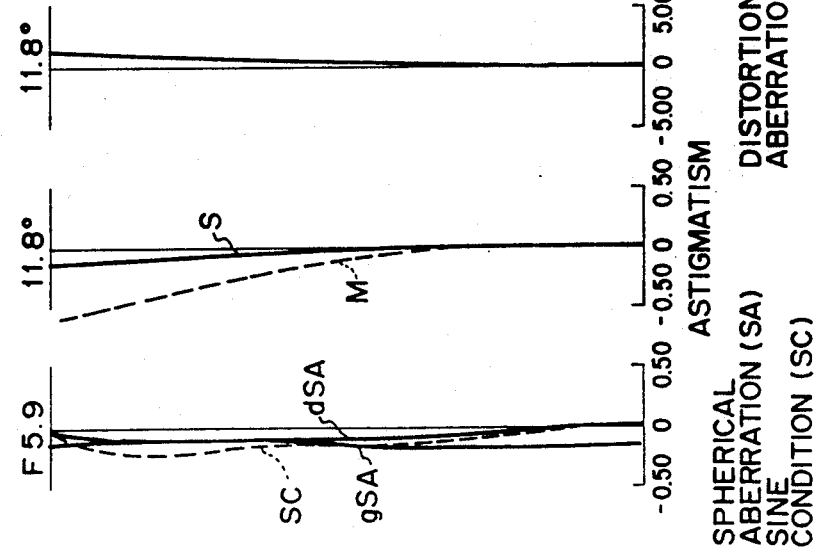
FIGS. 48a, 48b, 48c and 48d are aberration diagrams of the zoom lens at the wide angle end thereof in Embodiment 12 of the present invention.

FIG. 41 shows a lens arrangement in the Embodiment 12 at the wide angle end of the zoom lens. FIGS. 48, 49 and 50 respectively show aberration diagrams with respect to the Embodiment 12 at the wide angle end of the zoom lens, an intermediate focal length of the zoom lens and the telescopic end of the zoom lens.

In the respective Embodiments with respect to the above first to fifth lens structures of the present invention, a preferable performance of the zoom lens is provided by setting an upper limit of the ratio in the above-mentioned condition (III) to be equal to or less than 1.6.

Embodiment 13
$f = 36.5 \sim 102$, FNO. $= 2.88 \sim 5.9$, $\omega = 63.7 \sim 23.6$

| i | R i | D i | j | N j | ν j |
|---|---|---|---|---|---|
| 1 | −85.106 | 0.800 | 1 | 1.88300 | 40.80 |
| 2 | 31.315 | 1.255 | | | |
| 3 | 33.719 | 4.060 | 2 | 1.80518 | 25.46 |
| 4 | 330.722 | variable | | | |
| 5 | 16.825 | 6.246 | 3 | 1.51728 | 69.68 |
| 6 | −57.088 | 0.800 | 4 | 1.84666 | 23.83 |
| 7 | −157.964 | 2.681 | | | |
| 8 | ∞ (diaphragm) | 0.800 | | | |
| 9 | 27.315 | 11.821 | 5 | 1.48749 | 70.44 |
| 10 | −15.057 | 0.100 | | | |
| 11 | −14.726 | 0.800 | 6 | 1.88300 | 40.80 |
| 12 | 108.732 | 11.787 | | | |
| 13 | 88.523 | 2.853 | 7 | 1.80518 | 25.46 |
| 14 | −82.355 | 9.407 | | | |
| 15 | −12.998 | 0.800 | 8 | 1.49700 | 81.61 |
| 16 | −66.676 | | | | |

Aspherical surfaces
Ninth face
$K = -1.911422$, $A = -1.145100E-5$,
$B = -1.243300E-7$, $C = 3.365760E-10$,
$D = -8.579860E-12$
Fifteenth face
$K = -0.667695$, $A = -1.408860E-5$,
$B = -1.982460E-8$, $C = -1.122060E-10$,
$D = 3.423050E-13$
Variable amounts

| f | 36.502 | 61.005 | 102.011 |
|---|---|---|---|
| $D_4$ | 28.790 | 11.283 | 0.800 |

Values of conditional formulas
$[f_1 + f_2 \cdot \{2 - (f_1/f(W)) - (f(W)/f_1)\}]/f(T) = 0.476$
$[f_1 + f_2 \cdot \{2 - (f_1/f(T)) - (f(T)/f_1)\}]/f(T) = 0.469$
$|f_2(R)|/f_2(F) = 4.849$, $f_2(F)/f_2 = 1.305$, $|f_1|/\sqrt{[f(W) \cdot f(T)]} = 1.012$ Embodiment 14
$f = 36.5 \sim 102$, FNO. $= 2.86 \sim 5.89$, $\omega = 63.6 \sim 23.8$

| i | R i | D i | j | N j | ν j |
|---|---|---|---|---|---|
| 1 | −94.788 | 0.800 | 1 | 1.88300 | 40.80 |
| 2 | 32.720 | 1.478 | | | |
| 3 | 35.423 | 3.526 | 2 | 1.84666 | 23.83 |
| 4 | 161.893 | variable | | | |
| 5 | 17.416 | 6.092 | 3 | 1.51728 | 69.68 |
| 6 | −43.366 | 0.800 | 4 | 1.75520 | 27.53 |
| 7 | −103.785 | 3.408 | | | |
| 8 | ∞ (diaphragm) | 1.616 | | | |
| 9 | 29.419 | 4.939 | 5 | 1.48749 | 70.44 |
| 10 | −22.746 | 0.100 | | | |
| 11 | −23.002 | 0.800 | 6 | 1.88300 | 40.80 |
| 12 | 138.588 | 5.545 | | | |
| 13 | ∞ (diaphragm) | 14.545 | | | |
| 14 | 54.944 | 2.549 | 7 | 1.80518 | 25.46 |
| 15 | 530.380 | 7.382 | | | |
| 16 | −12.995 | 0.800 | 8 | 1.49700 | 81.61 |
| 17 | −82.993 | | | | |

Aspherical surfaces
Ninth face
$K = -2.826032$, $A = -1.592680E-5$,
$B = -2.022210E-7$, $C = 1.715790E-10$,
$D = -8.917560E-12$
Sixteenth face
$K = -0.682310$, $A = -1.026700E-5$,
$B = 3.801390E-8$, $C = -3.142820E-10$,
$D = 9.291290E-13$
Variable amounts

| f | 36.502 | 61.005 | 102.011 |
|---|---|---|---|
| $D_4$ | 27.494 | 10.798 | 0.800 |

Values of conditional formulas
$[f_1 + f_2 \cdot \{2 - (f_1/f(W)) - (f(W)/f_1)\}]/f(T) = 0.475$
$[f_1 + f_2 \cdot \{2 - (f_1/f(T)) - (f(T)/f_1)\}]/f(T) = 0.487$
$|f_2(R)|/f_2(F) = 1.974$, $f_2(F)/f_2 = 1.308$, $|f_1|/\sqrt{[f(W) \cdot f(T)]} = 1.977$ Embodiment 15
$f = 36.5 \sim 102$, FNO. $= 2.86 \sim 5.9$, $\omega = 63.6 \sim 23.7$

| i | R i | D i | j | N j | ν j |
|---|---|---|---|---|---|
| 1 | −93.737 | 0.800 | 1 | 1.91044 | 40.80 |
| 2 | 29.485 | 1.143 | | | |
| 3 | 31.487 | 4.299 | 2 | 1.84701 | 25.46 |
| 4 | 232.191 | variable | | | |
| 5 | 17.500 | 6.452 | 3 | 1.50451 | 81.61 |
| 6 | −40.845 | 0.800 | 4 | 1.88470 | 32.18 |
| 7 | −83.846 | 3.962 | | | |
| 8 | ∞ (diaphragm) | 0.889 | | | |
| 9 | 33.759 | 4.794 | 5 | 1.50764 | 65.13 |
| 10 | −23.442 | 0.100 | | | |
| 11 | −25.203 | 0.800 | 6 | 1.91044 | 40.80 |
| 12 | 267.878 | 6.040 | | | |
| 13 | ∞ (diaphragm) | 15.358 | | | |
| 14 | 170.032 | 2.257 | 7 | 1.89390 | 23.83 |
| 15 | −128.398 | 6.334 | | | |
| 16 | −12.593 | 0.800 | 8 | 1.50451 | 81.61 |
| 17 | −88.621 | | | | |

Aspherical surfaces
Ninth face
$K = -4.002919$, $A = -1.860060E-5$,
$B = -2.027060E-7$, $C = 1.822600E-10$,
$D = -7.148930E-12$
Sixteenth face
$K = -0.705350$, $A = -7.596980E-6$,
$B = 3.040990E-8$, $C = -3.140890E-10$,
$D = 3.980540E-13$
Variable amounts

| f | 36.499 | 60.998 | 101.997 |
|---|---|---|---|
| $D_4$ | 28.172 | 11.052 | 0.800 |

Values of conditional formulas
$[f_1 + f_2 \cdot \{2 - (f_1/f(W)) - (f(W)/f_1)\}]/f(T) = 0.470$
$[f_1 + f_2 \cdot \{2 - (f_1/f(T)) - (f(T)/f_1)\}]/f(T) = 0.471$
$|f_2(R)|/f_2(F) = 1.553$, $f_2(F)/f_2 = 1.289$, $|f_1|/\sqrt{[f(W) \cdot f(T)]} = 1.999$ The above Embodiments 13 to 15 relate to the sixth lens structure of the present invention.

Figure 51:
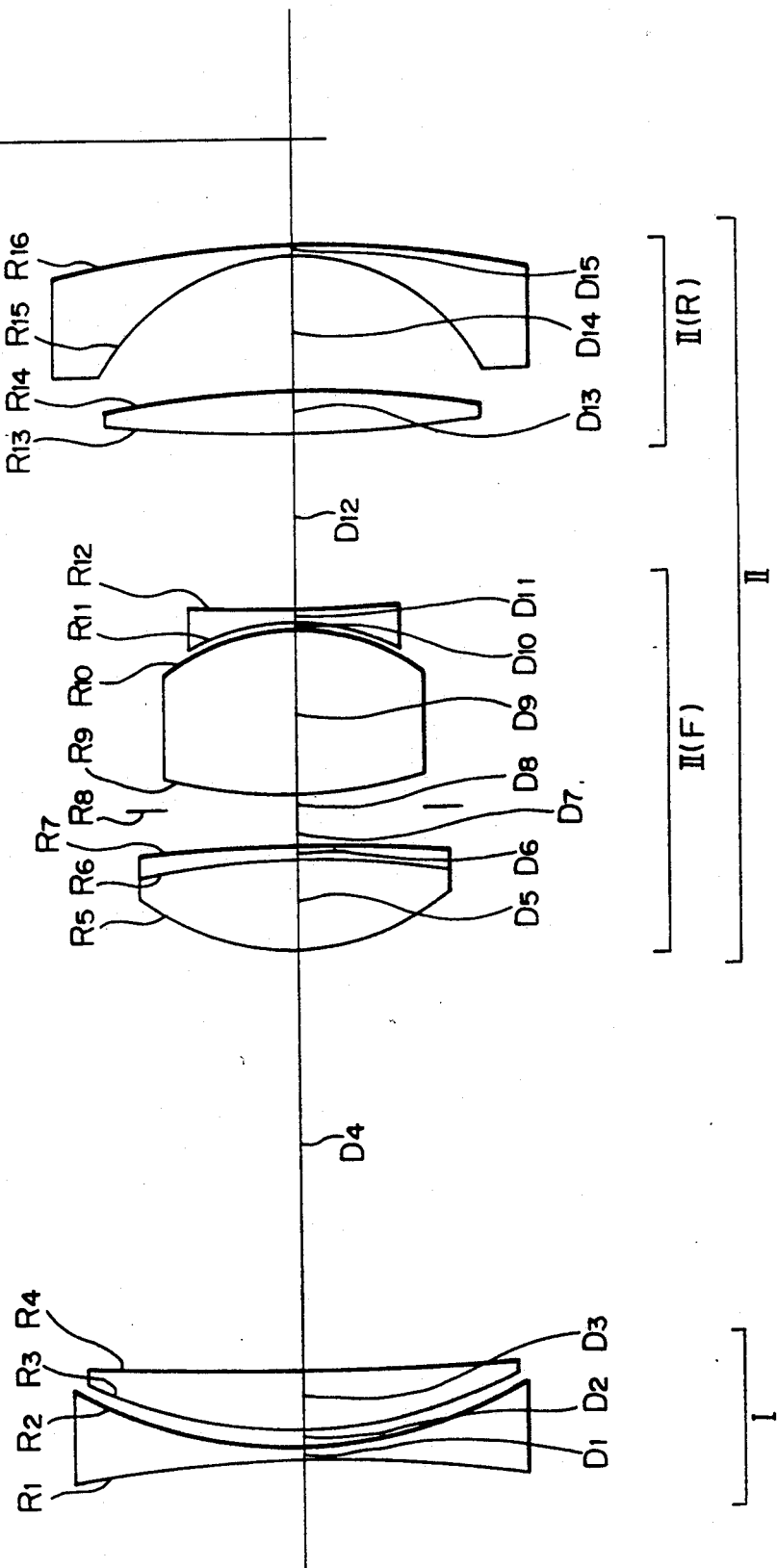
FIG. 51 is a view showing the arrangement of a zoom lens at a wide angle end thereof in accordance with Embodiment 13 of the present invention.

FIG. 51 shows a lens arrangement in the Embodiment 13 at the wide angle end of the zoom lens. FIGS. 54, 55 and 56 respectively show aberration diagrams with respect to the Embodiment 13 at the wide angle end of the zoom lens, an intermediate focal length of the zoom lens and the telescopic end of the zoom lens.

Figure 52:
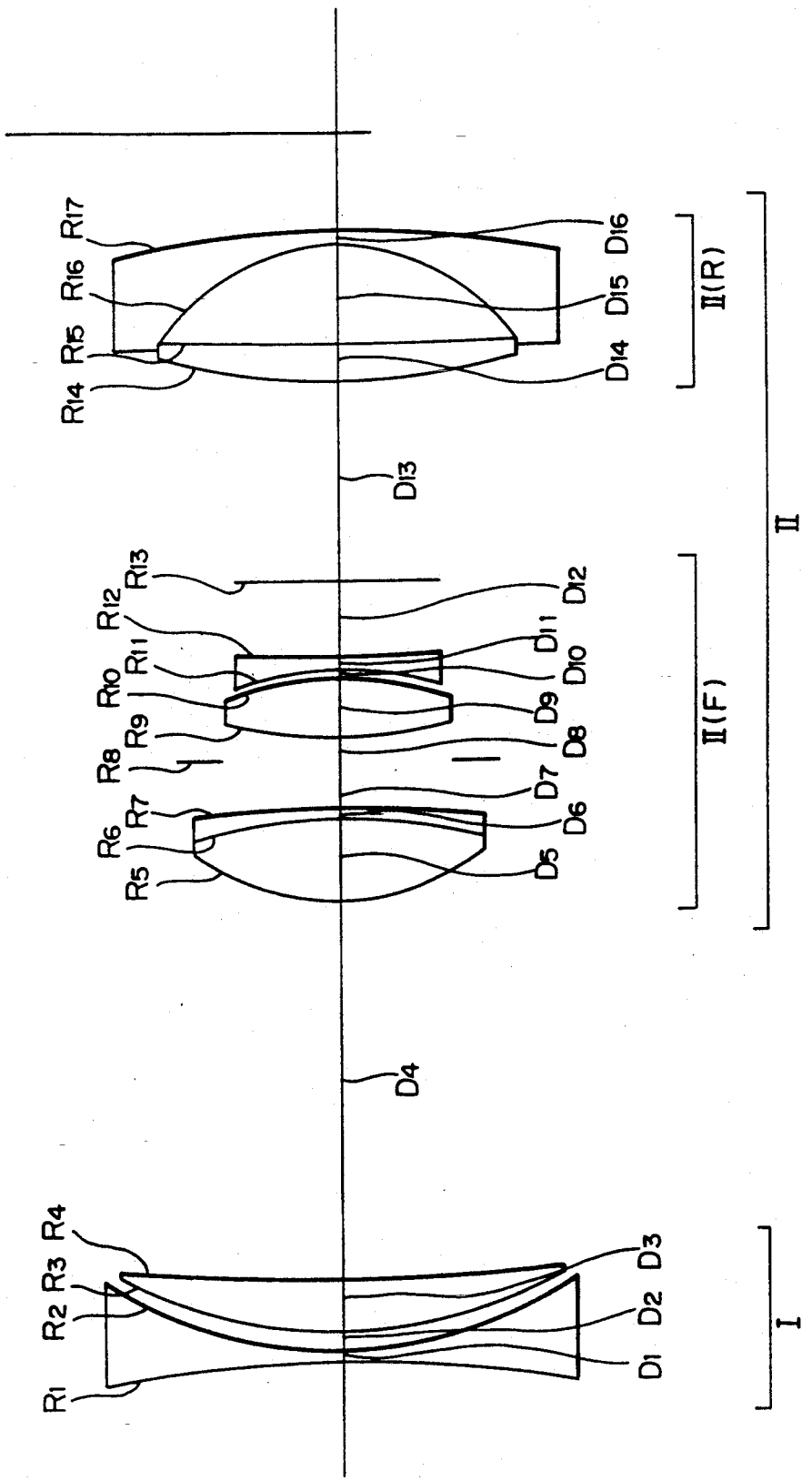
FIG. 52 is a view showing the arrangement of a zoom lens at a wide angle end thereof in accordance with Embodiment 14 of the present invention.

FIG. 52 shows a lens arrangement in the Embodiment 14 at the wide angle end of the zoom lens. FIGS. 57, 58 and 59 respectively show aberration diagrams with respect to the Embodiment 14 at the wide angle end of the zoom lens, an intermediate focal length of the zoom lens and the telescopic end of the zoom lens.

Figure 53:
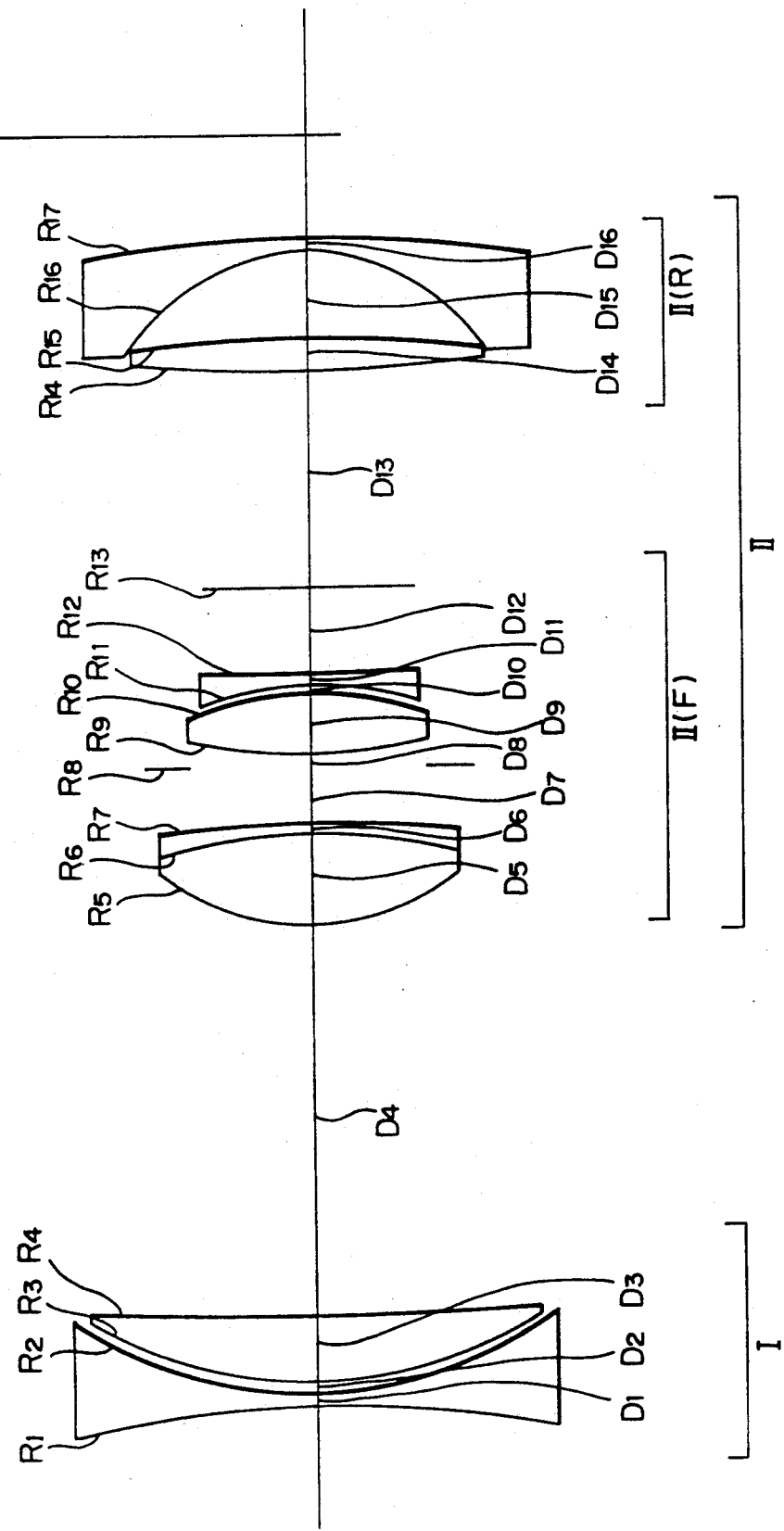
FIG. 53 is a view showing the arrangement of a zoom lens at a wide angle end thereof in accordance with Embodiment 15 of the present invention.

FIG. 53 shows a lens arrangement in the Embodiment 15 at the wide angle end of the zoom lens. FIGS. 60, 61 and 62 respectively show aberration diagrams with respect to the Embodiment 15 at the wide angle end of the zoom lens, an intermediate focal length of the zoom lens and the telescopic end of the zoom lens.

Embodiment 16
$f = 36.5 \sim 102$, FNO. $= 2.88 \sim 5.89$, $\omega = 63.7 \sim 23.5$

| i | Ri | Di | j | Nj | νj |
|---|---|---|---|---|---|
| 1 | −83.405 | 0.800 | 1 | 1.88300 | 40.80 |
| 2 | 32.250 | 1.214 | | | |
| 3 | 34.368 | 3.894 | 2 | 1.80518 | 25.46 |
| 4 | 364.341 | variable | | | |
| 5 | 15.709 | 6.746 | 3 | 1.48749 | 70.44 |
| 6 | −87.196 | 0.800 | 4 | 1.84666 | 23.83 |
| 7 | −567.432 | 0.800 | | | |
| 8 | ∞ (diaphragm) | 0.800 | | | |
| 9 | 25.807 | 13.495 | 5 | 1.48749 | 70.44 |
| 10 | −11.141 | 0.800 | 6 | 1.88300 | 40.80 |
| 11 | 1005.622 | 11.431 | | | |
| 12 | 96.113 | 3.513 | 7 | 1.74077 | 27.76 |
| 13 | −47.797 | 9.183 | | | |
| 14 | −12.686 | 0.800 | 8 | 1.49700 | 27.76 |
| 15 | −124.117 | | | | |

Aspherical surfaces
Ninth face
$K = -1.126719$, $A = -5.804560E-6$,
$B = -6.279070E-8$, $C = 4.121960E-10$,
$D = -2.314510E-12$
Fourteenth face
$K = -0.751233$, $A = -1.433140E-5$,
$B = -3.240980E-8$, $C = 5.046530E-11$,
$D = -7.384360E-14$
Variable amounts

| f | 36.500 | 61.000 | 102.002 |
|---|---|---|---|
| D$_4$ | 28.725 | 11.259 | 0.800 |

Values of conditional formulas
$[f_1 + f_2 \cdot \{2 - (f_1/f(W)) - (f(W)/f_1)\}]/f(T) = 0.445$
$[f_1 + f_2 \cdot \{2 - (f_1/f(T)) - (f(T)/f_1)\}]/f(T) = 0.427$
$|f_2(R)|/f_2(F) = 5.280$, $f_2(F)/f_2 = 1.359$, $|f_1|/\sqrt{[f(W) \cdot f(T)]} = 1.033$ Embodiment 17
$f = 36.5 \sim 102$, FNO. $= 2.86 \sim 5.9$, $\omega = 63.6 \sim 23.7$

| i | Ri | Di | j | Nj | νj |
|---|---|---|---|---|---|
| 1 | −96.368 | 0.800 | 1 | 1.88300 | 40.80 |
| 2 | 29.333 | 1.143 | | | |
| 3 | 31.271 | 4.290 | 2 | 1.80518 | 25.46 |
| 4 | 215.479 | variable | | | |
| 5 | 17.287 | 7.163 | 3 | 1.49700 | 81.61 |
| 6 | −49.128 | 0.800 | 4 | 1.75520 | 27.53 |
| 7 | −89.972 | 3.383 | | | |
| 8 | ∞ (diaphragm) | 0.800 | | | |
| 9 | 26.130 | 5.426 | 5 | 1.49831 | 65.13 |
| 10 | −22.379 | 0.800 | 6 | 1.88300 | 40.80 |
| 11 | 85.054 | 5.583 | | | |
| 12 | ∞ (diaphragm) | 14.000 | | | |
| 13 | 55.578 | 2.742 | 7 | 1.76182 | 26.55 |
| 14 | −1035.661 | 7.107 | | | |
| 15 | −12.689 | 0.800 | 8 | 1.49700 | 81.61 |
| 16 | −94.418 | | | | |

Aspherical surfaces
Ninth face
$K = -1.848904$, $A = -1.183250E-5$,
$B = -2.243620E-7$, $C = 1.018300E-9$,
$D = -1.612580E-11$
Fifteenth face
$K = -0.740928$, $A = -1.155710E-5$,
$B = 1.328490E-8$, $C = -1.084310E-10$,
$D = 3.918050E-13$
Variable amounts

| f | 36.499 | 60.998 | 101.998 |
|---|---|---|---|
| D$_4$ | 28.163 | 11.049 | 0.800 |

Values of conditional formulas
$[f_1 + f_2 \cdot \{2 - (f_1/f(W)) - (f(W)/f_1)\}]/f(T) = 0.470$
$[f_1 + f_2 \cdot \{2 - (f_1/f(T)) - (f(T)/f_1)\}]/f(T) = 0.471$
$|f_2(R)|/f_2(F) = 1.964$, $f_2(F)/f_2 = 1.311$, $|f_1|/\sqrt{[f(W) \cdot f(T)]} = 1.999$ Embodiment 18
$f = 36.5 \sim 102$, FNO. $= 2.87 \sim 5.9$, $\omega = 63.5 \sim 23.8$

| i | Ri | Di | j | Nj | νj |
|---|---|---|---|---|---|
| 1 | −89.691 | 0.800 | 1 | 1.88300 | 40.80 |
| 2 | 30.634 | 1.138 | | | |
| 3 | 32.793 | 4.196 | 2 | 1.80518 | 25.46 |
| 4 | 274.523 | variable | | | |
| 5 | 16.964 | 10.565 | 3 | 1.49700 | 81.61 |
| 6 | −26.742 | 0.800 | 4 | 1.88300 | 40.80 |
| 7 | −42.109 | 0.800 | | | |
| 8 | ∞ (diaphragm) | 0.800 | | | |
| 9 | 25.025 | 3.458 | 5 | 1.50378 | 66.89 |
| 10 | −28.988 | 0.800 | 6 | 1.88300 | 40.80 |
| 11 | 51.825 | 7.049 | | | |
| 12 | ∞ (diaphragm) | 14.911 | | | |
| 13 | −289.068 | 2.440 | 7 | 1.84666 | 23.83 |
| 14 | −51.411 | 5.860 | | | |
| 15 | −11.477 | 0.800 | 8 | 1.49700 | 81.61 |
| 16 | −68.109 | | | | |

Aspherical surfaces
Ninth face
$K = -1.876639$, $A = -1.354990E-5$,
$B = 2.795920E-7$, $C = 9.625400E-10$,
$D = 1.736270E-11$
Fifteenth face
$K = -0.831810$, $A = -1.301140E-5$,
$B = -1.115230E-8$, $C = -2.800040E-10$,
$D = -7.018640E-14$
Variable amounts

| f | 36.499 | 60.997 | 101.996 |
|---|---|---|---|
| D$_4$ | 28.523 | 11.184 | 0.800 |

Values of conditional formulas
$[f_1 + f_2 \cdot \{2 - (f_1/f(W)) - (f(W)/f_1)\}]/f(T) = 0.468$
$[f_1 + f_2 \cdot \{2 - (f_1/f(T)) - (f(T)/f_1)\}]/f(T) = 0.462$
$|f_2(R)|/f_2(F) = 1.570$, $f_2(F)/f_2 = 1.274$, $|f_1|/\sqrt{[f(W) \cdot f(T)]} = 1.011$ The above Embodiments 16 to 18 relate to the seventh lens structure of the present invention.

Figure 63:
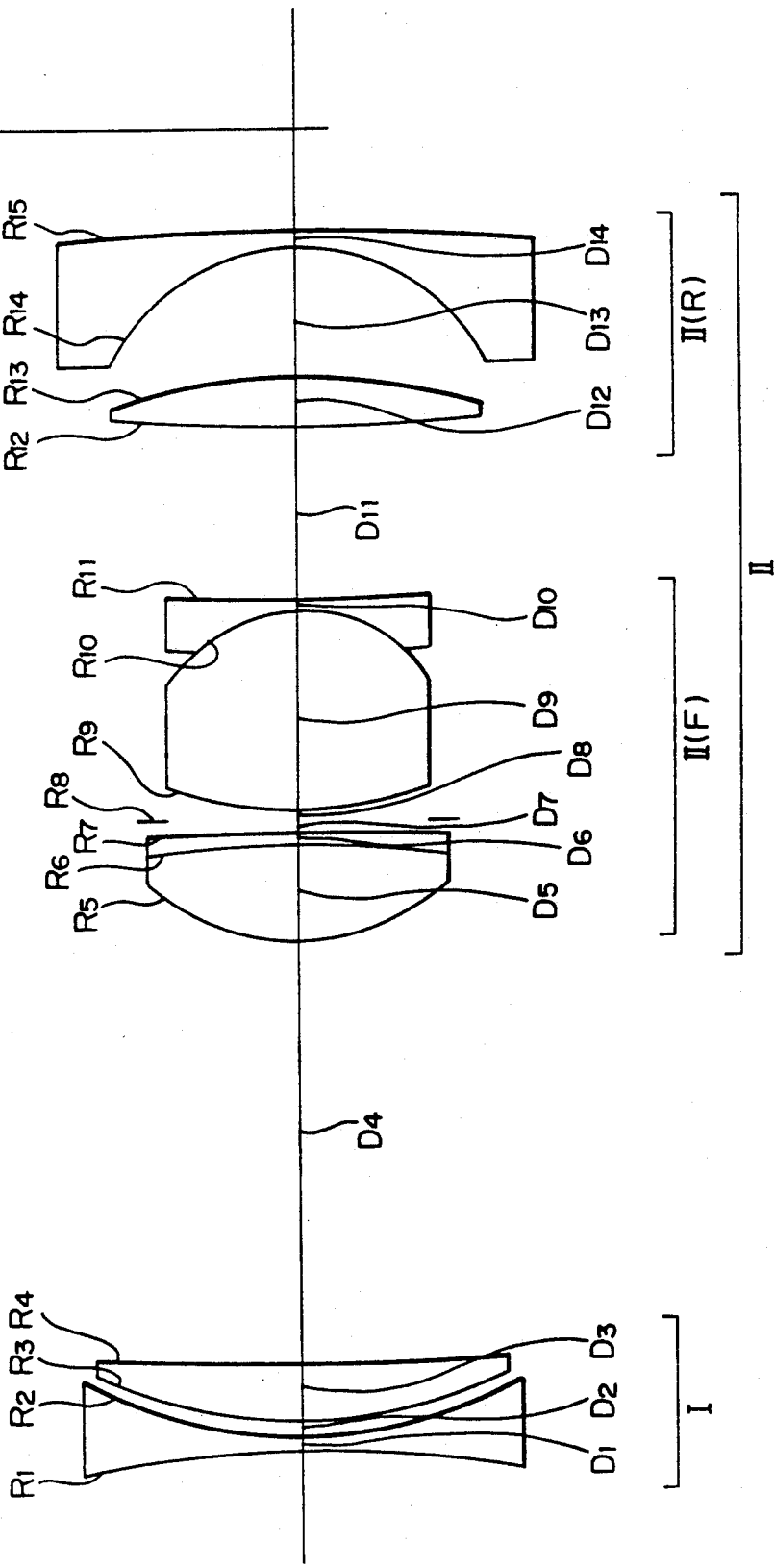
FIG. 63 is a view showing the arrangement of a zoom lens at a wide angle end thereof in accordance with Embodiment 16 of the present invention.

FIG. 63 shows a lens arrangement in the Embodiment 16 at the wide angle end of the zoom lens. FIGS. 66, 67 and 68 respectively show aberration diagrams with respect to the Embodiment 16 at the wide angle end of the zoom lens, an intermediate focal length of the zoom lens and the telescopic end of the zoom lens.

Figure 64:
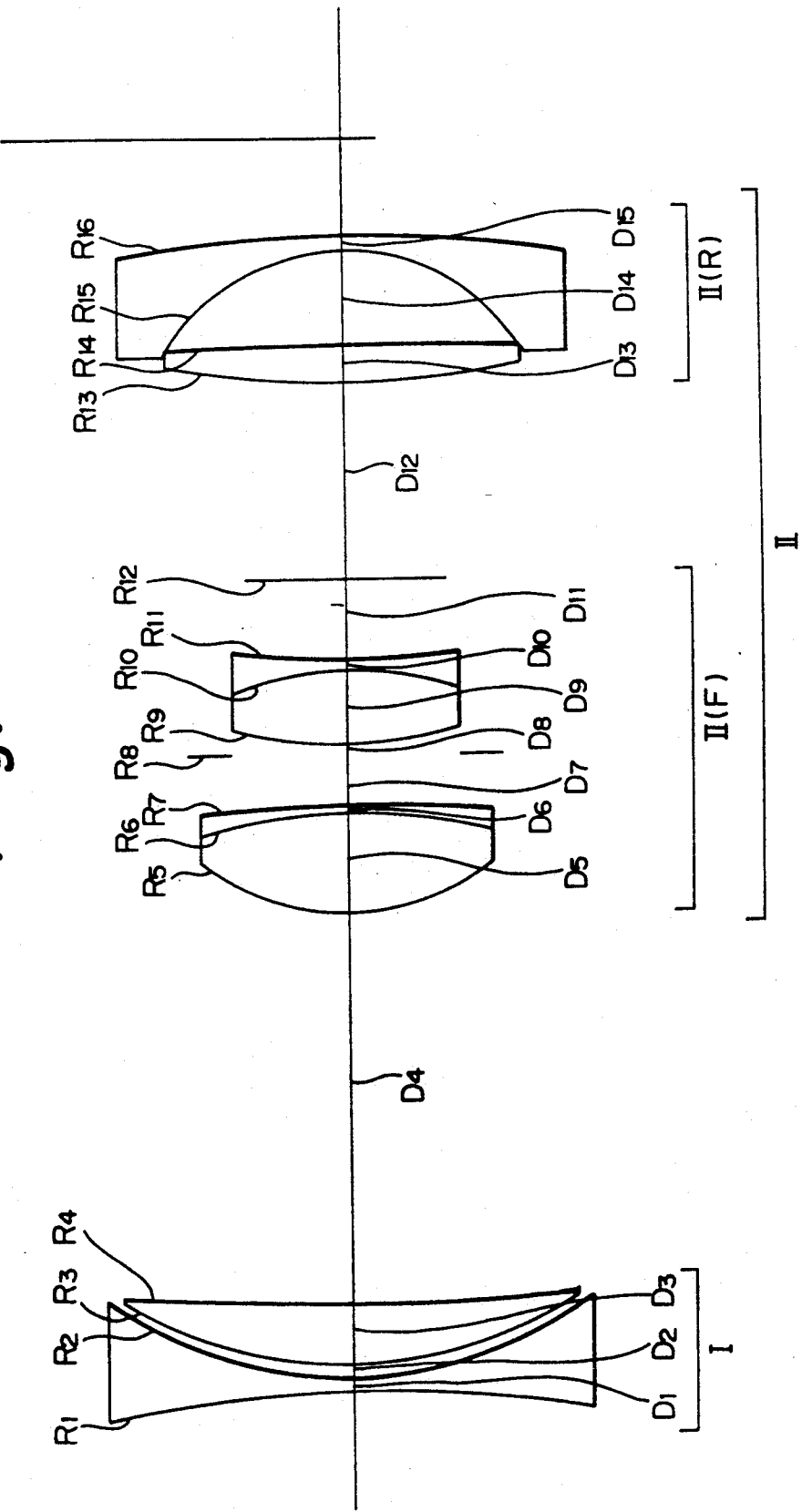
FIG. 64 is a view showing the arrangement of a zoom lens at a wide angle end thereof in accordance with Embodiment 17 of the present invention.

FIG. 64 shows a lens arrangement in the Embodiment 17 at the wide angle end of the zoom lens. FIGS. 69, 70 and 71 respectively show aberration diagrams with respect to the Embodiment 17 at the wide angle end of the zoom lens, an intermediate focal length of the zoom lens and the telescopic end of the zoom lens.

FIG. 65 shows a lens arrangement in the Embodiment 18 at the wide angle end of the zoom lens. FIGS. 72, 73 and 74 respectively show aberration diagrams with respect to the Embodiment 18 at the wide angle end of the zoom lens, an intermediate focal length of the zoom lens and the telescopic end of the zoom lens.

Embodiment 19
$f=36.5 \sim 102$, FNO.$=2.91 \sim 5.9$, $\omega=63.4 \sim 23.5$

| i | Ri | Di | j | Nj | νj |
|---|---|---|---|---|---|
| 1 | −91.278 | 0.800 | 1 | 1.88300 | 40.80 |
| 2 | 37.452 | 2.245 | | | |
| 3 | 42.209 | 3.274 | 2 | 1.84666 | 23.83 |
| 4 | 244.847 | variable | | | |
| 5 | 18.173 | 5.024 | 3 | 1.48749 | 70.44 |
| 6 | −128.963 | 1.079 | | | |
| 7 | ∞ (diaphragm) | 0.800 | | | |
| 8 | 20.967 | 3.407 | 4 | 1.53113 | 62.07 |

-continued

| | | | | | |
|---|---|---|---|---|---|
| 9 | −159.080 | 0.263 | | | |
| 10 | −78.430 | 3.364 | 5 | 1.88300 | 40.80 |
| 11 | 14.656 | 3.660 | 6 | 1.49700 | 81.61 |
| 12 | −93.568 | 16.343 | | | |
| 13 | 91.451 | 2.314 | 7 | 1.62536 | 35.58 |
| 14 | −144.274 | 5.281 | | | |
| 15 | −13.015 | 0.800 | 8 | 1.75500 | 52.32 |
| 16 | 146.204 | 4.091 | 9 | 1.84666 | 23.83 |
| 17 | −57.719 | | | | |

Aspherical surfaces

Eighth face
K = −0.645038, A = −8.079200E−6,
B = −7.314510E−8, C = 9.162360E−11,
D = −3.055630E−12

Fifteenth face
K = −0.578376, A = −1.276679E−5,
B = −4.989200E−8, C = 1.349340E−10,
D = −8.578690E−13

Variable amounts

| f | 36.505 | 61.000 | 102.021 |
|---|---|---|---|
| $D_4$ | 30.256 | 11.837 | 0.800 |

Values of conditional formulas
$[f_1 + f_2 \cdot \{2 − (f_1/f(W)) − (f(W)/f_1)\}]/f(T) = 0.471$
$[f_1 + f_2 \cdot \{2 − (f_1/f(T)) − (f(T)/f_1)\}]/f(T) = 0.441$
$|f_2(R)|/f_2(F) = 1.198, f_2(F)/f_2 = 1.191, |f_1|/\sqrt{[f(W) \cdot f(T)]} = 1.057$ Embodiment 20
$f = 36.5 \sim 102, FNO. = 2.89 \sim 5.9, \omega = 63.4 \sim 23.5$

| i | Ri | Di | j | Nj | vj |
|---|---|---|---|---|---|
| 1 | 93.133 | 0.800 | 1 | 1.86300 | 41.53 |
| 2 | 34.789 | 2.409 | | | |
| 3 | 39.783 | 3.158 | 2 | 1.84666 | 23.83 |
| 4 | 180.181 | variable | | | |
| 5 | 19.481 | 4.699 | 3 | 1.50378 | 66.89 |
| 6 | −141.457 | 1.778 | | | |
| 7 | ∞ (diaphragm) | 0.800 | | | |
| 8 | 21.745 | 3.282 | 4 | 1.51728 | 69.68 |
| 9 | −254.982 | 0.475 | | | |
| 10 | −64.863 | 1.947 | 5 | 1.88300 | 40.80 |
| 11 | 17.437 | 5.949 | 6 | 1.49700 | 81.61 |
| 12 | −42.406 | 16.689 | | | |
| 13 | 130.274 | 2.069 | 7 | 1.68893 | 31.16 |
| 14 | −264.196 | 5.273 | | | |
| 15 | −13.402 | 0.800 | 8 | 1.77250 | 49.62 |
| 16 | 121.430 | 4.311 | 9 | 1.84666 | 23.83 |
| 17 | −55.099 | | | | |

Aspherical surfaces

Eighth face
K = −0.613073, A = −8.173230E−6,
B = −4.294320E−8, C = −5.828660E−11,
D = −1.386860E−12

Fifteenth face
K = −0.458536, A = −8.571300E−6,
B = −3.912120E−8, C = 4.287360E−11,
D = −6.478640E−13

Variable amounts

| f | 36.500 | 61.000 | 102.001 |
|---|---|---|---|
| $D_4$ | 28.561 | 11.198 | 0.800 |

Values of conditional formulas
$[f_1 + f_2 \cdot \{2 − (f_1/f(W)) − (f(W)/f_1)\}]/f(T) = 0.472$
$[f_1 + f_2 \cdot \{2 − (f_1/f(T)) − (f(T)/f_1)\}]/f(T) = 0.467$
$|f_2(R)|/f_2(F) = 1.101, f_2(F)/f_2 = 1.190, |f_1|/\sqrt{[f(W) \cdot f(T)]} = 1.009$ Embodiment 21
$f = 36.5 \sim 102, FNO. = 2.85 \sim 5.8, \omega = 63.3 \sim 23.5$

| i | Ri | Di | j | Nj | vj |
|---|---|---|---|---|---|
| 1 | −103.619 | 0.800 | 1 | 1.88300 | 40.80 |
| 2 | 33.579 | 2.357 | | | |
| 3 | 38.362 | 3.228 | 2 | 1.84666 | 23.83 |
| 4 | 174.058 | variable | | | |
| 5 | 19.672 | 4.696 | 3 | 1.51728 | 69.68 |
| 6 | −125.873 | 1.601 | | | |
| 7 | ∞ (diaphragm) | 0.800 | | | |
| 8 | 21.454 | 3.536 | 4 | 1.52642 | 60.11 |
| 9 | −575.287 | 0.628 | | | |
| 10 | −70.835 | 1.618 | 5 | 1.87800 | 38.20 |
| 11 | 15.667 | 3.686 | 6 | 1.48749 | 70.44 |
| 12 | −77.586 | 13.073 | | | |
| 13 | 153.113 | 2.212 | 7 | 1.60342 | 38.01 |
| 14 | −83.410 | 11.591 | | | |
| 15 | −13.505 | 0.800 | 8 | 1.67790 | 55.52 |
| 16 | 208.947 | 3.663 | 9 | 1.84666 | 23.83 |
| 17 | −66.420 | | | | |

Aspherical surfaces

Eighth face
K = −0.487009, A = −6.415980E−6,
B = −3.717720E−8, C = −1.489470E−11,
D = −1.773150E−12

Fifteenth face
K = −0.473297, A = −9.275250E−6,
B = −2.924420E−8, C = −1.307130E−10,
D = 8.893610E−14

Variable amounts

| f | 36.501 | 61.000 | 102.002 |
|---|---|---|---|
| $D_4$ | 28.710 | 11.254 | 0.800 |

Values of conditional formulas
$[f_1 + f_2 \cdot \{2 − (f_1/f(W)) − (f(W)/f_1)\}]/f(T) = 0.484$
$[f_1 + f_2 \cdot \{2 − (f_1/f(T)) − (f(T)/f_1)\}]/f(T) = 0.482$
$|f_2(R)|/f_2(F) = 1.542, f_2(F)/f_2 = 1.280, |f_1|/\sqrt{[f(W) \cdot f(T)]} = 1.004$ The above Embodiments 19 to 21 relate to the eighth lens structure of the present invention.

Figure 75:
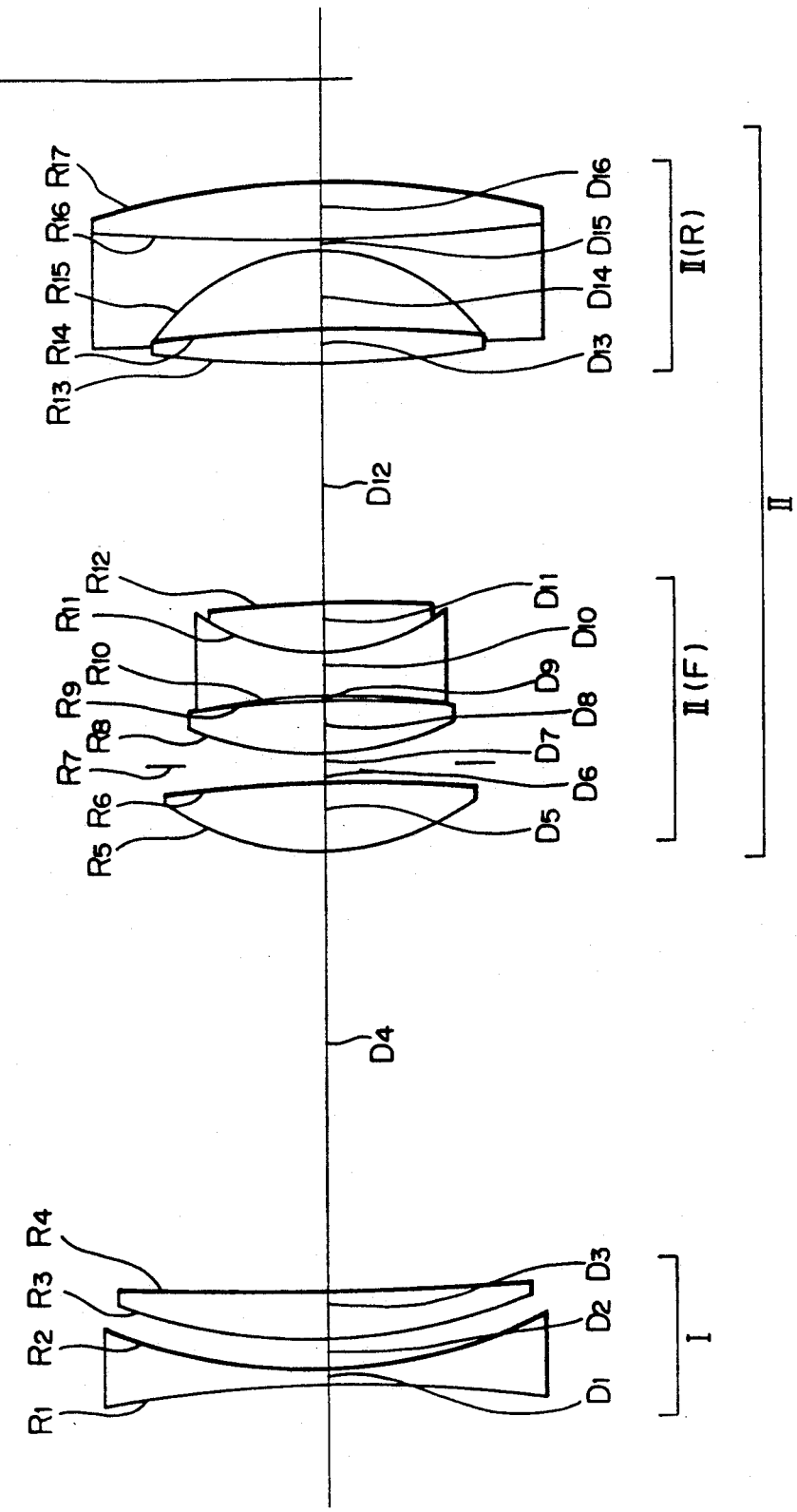
FIG. 75 is a view showing the arrangement of a zoom lens at a wide angle end thereof in accordance with Embodiment 19 of the present invention.

FIG. 75 shows a lens arrangement in the Embodiment 19 at the wide angle end of the zoom lens. FIGS. 78, 79 and 80 respectively show aberration diagrams with respect to the Embodiment 19 at the wide angle end of the zoom lens, an intermediate focal length of the zoom lens and the telescopic end of the zoom lens.

Figure 76:
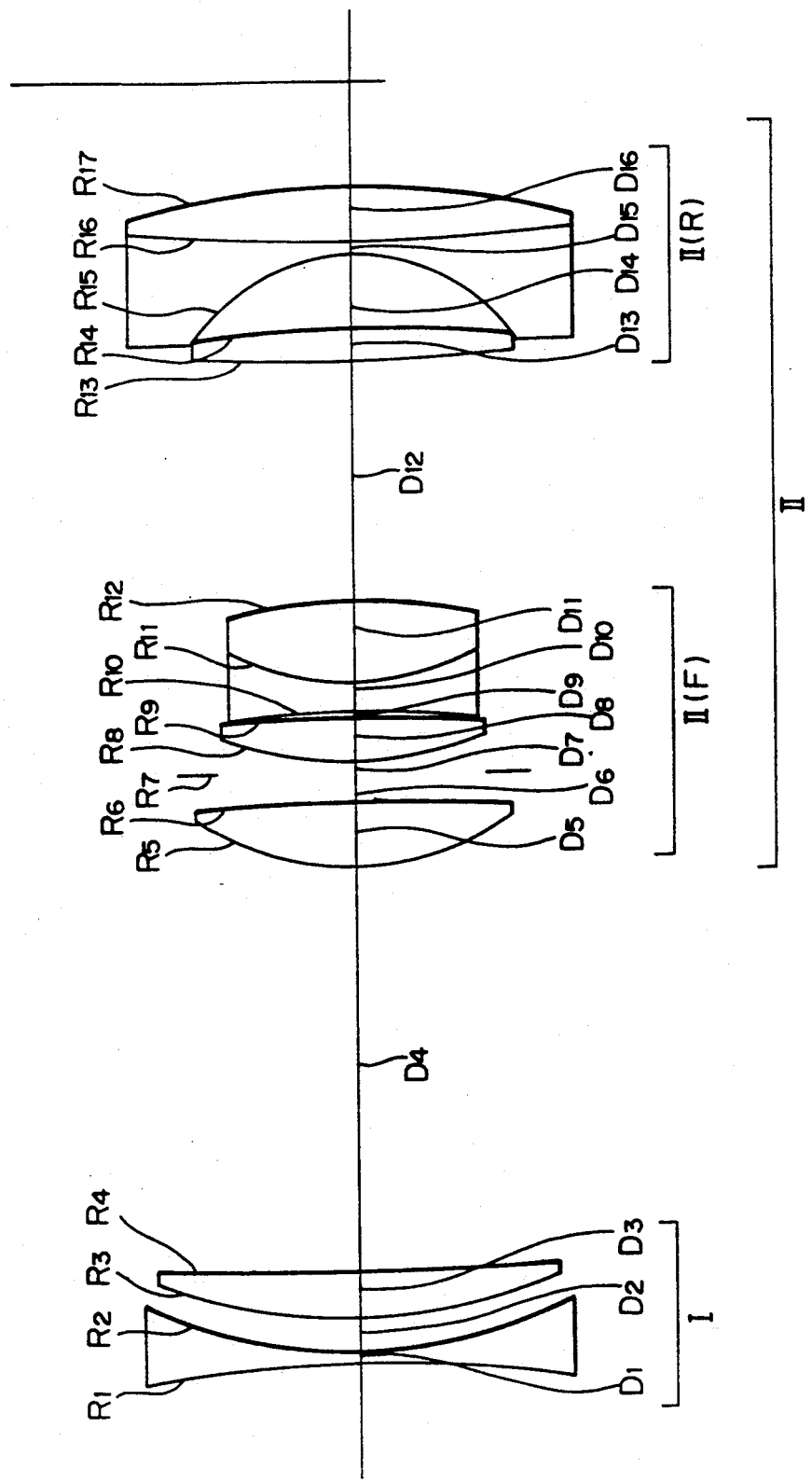
FIG. 76 is a view showing the arrangement of a zoom lens at a wide angle end thereof in accordance with Embodiment 20 of the present invention.

FIG. 76 shows a lens arrangement in the Embodiment 20 at the wide angle end of the zoom lens. FIGS. 81, 82 and 83 respectively show aberration diagrams with respect to the Embodiment 20 at the wide angle end of the zoom lens, an intermediate focal length of the zoom lens and the telescopic end of the zoom lens.

Figure 77:
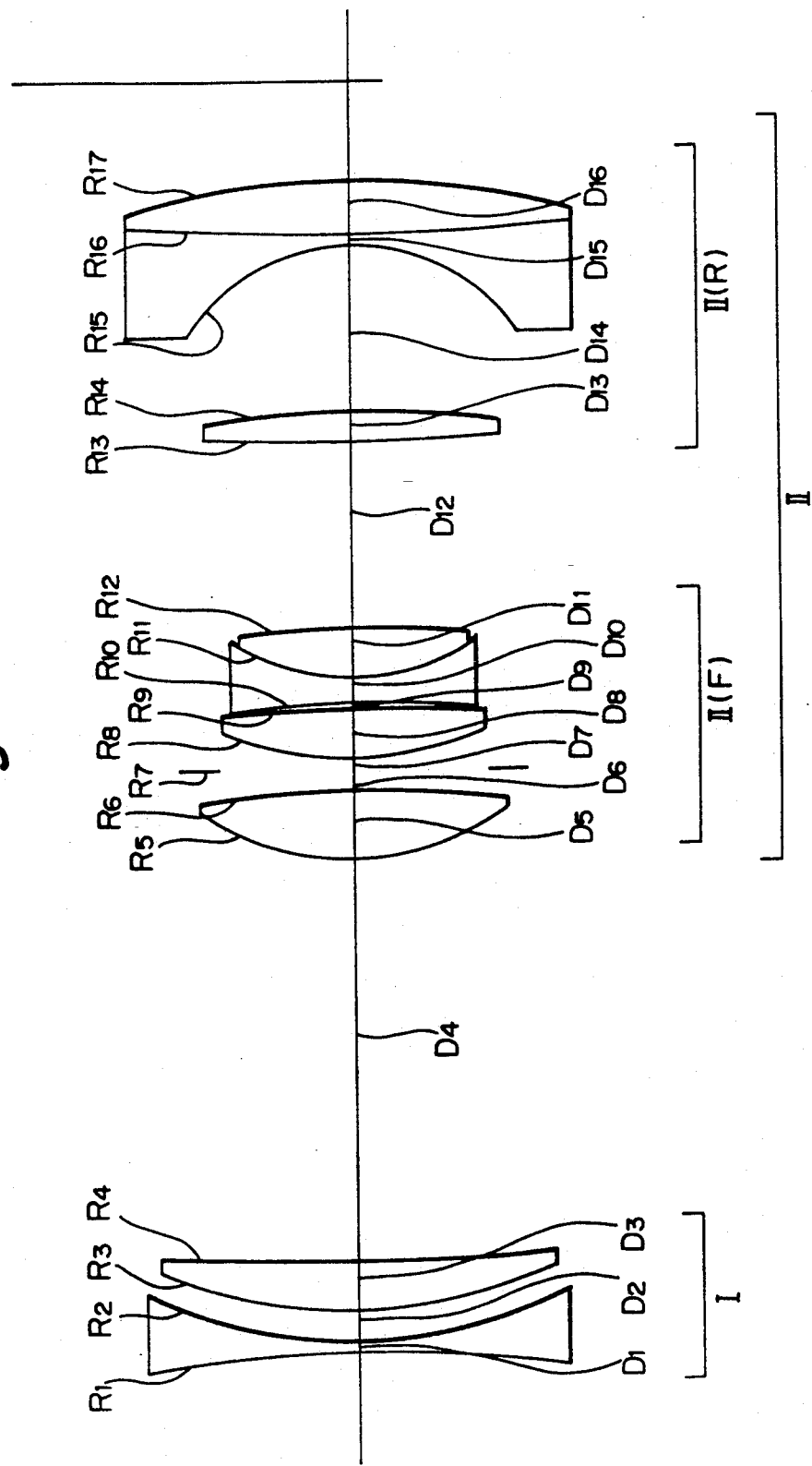
FIG. 77 is a view showing the arrangement of a zoom lens at a wide angle end thereof in accordance with Embodiment 21 of the present invention.

FIG. 77 shows a lens arrangement in the Embodiment 21 at the wide angle end of the zoom lens. FIGS. 84, 85 and 86 respectively show aberration diagrams with respect to the Embodiment 21 at the wide angle end of the zoom lens, an intermediate focal length of the zoom lens and the telescopic end of the zoom lens.

Embodiment 22
$f = 36.0 \sim 102, FNO. = 2.63 \sim 5.82, \omega = 64.1 \sim 23.5$

| i | Ri | Di | j | Nj | vj |
|---|---|---|---|---|---|
| 1 | −80.625 | 1.000 | 1 | 1.83500 | 42.98 |
| 2 | 36.529 | 2.131 | | | |
| 3 | 40.705 | 4.001 | 2 | 1.84666 | 23.83 |
| 4 | 167.080 | variable | | | |
| 5 | 19.892 | 7.009 | 3 | 1.56732 | 42.84 |
| 6 | 1438.270 | 0.800 | | | |
| 7 | 21.525 | 4.373 | 4 | 1.51680 | 64.20 |
| 8 | −91.736 | 0.296 | | | |
| 9 | −67.620 | 1.000 | 5 | 1.85030 | 32.18 |
| 10 | 14.686 | 4.968 | 6 | 1.48749 | 70.44 |
| 11 | −51.789 | 3.128 | | | |
| 12 | ∞ (diaphragm) | 13.525 | | | |
| 13 | 11325.127 | 5.607 | 7 | 1.76182 | 26.55 |
| 14 | −15.908 | 1.000 | 8 | 1.88300 | 40.80 |
| 15 | −89.201 | 5.803 | | | |
| 16 | −12.652 | 1.000 | 9 | 1.4879 | 70.44 |
| 17 | −71.740 | | | | |

Aspherical surfaces

Seventh face
K = −0.605240, A = −8.412010E−6,
B = −4.542690E−8, C = −6.760200E−11,
D = −4.710010E−14

Sixteenth face
K = −0.430238, A = 4.459480E−6,
B = 4.992070E−8, C = −2.998690E−10,
D = 6.455410E−13

Variable amounts

| f | 36.000 | 60.600 | 102.003 |

-continued

| | D$_4$ | 27.358 | 10.697 | | 0.800 | |

Values of conditional formulas $[f_1+f_2\cdot\{2-(f_1/f(W))-(f(W)/f_1)\}]/f(T)=0.430$
$[f_1+f_2\cdot\{2-(f_1/f(T))-(f(T)/f_1)\}]/f(T)=0.431$
$|f_2(R)|/f_2(F)=1.134, f_2(F)/f_2=1.251, |f_1|/\sqrt{[f(W)\cdot f(T)]}=0.999$ Embodiment 23

$f=36.0\sim102, FNO.=2.63\sim5.83, \omega=64.1\sim23.5$

| i | Ri | Di | j | Nj | νj |
|---|---|---|---|---|---|
| 1 | −75.610 | 1.000 | 1 | 1.83500 | 42.98 |
| 2 | 36.909 | 1.755 | | | |
| 3 | 40.442 | 4.041 | 2 | 1.84666 | 23.83 |
| 4 | 183.707 | variable | | | |
| 5 | 20.506 | 7.045 | 3 | 1.56138 | 45.23 |
| 6 | −250.205 | 0.800 | | | |
| 7 | 24.543 | 3.773 | 4 | 1.51680 | 64.20 |
| 8 | −116.994 | 0.551 | | | |
| 9 | −58.118 | 1.000 | 5 | 1.85030 | 32.18 |
| 10 | 18.648 | 8.695 | 6 | 1.49700 | 81.61 |
| 11 | −33.248 | 1.000 | | | |
| 12 | ∞ (diaphragm) | 12.713 | | | |
| 13 | −56.396 | 6.860 | 7 | 1.78470 | 26.06 |
| 14 | −11.814 | 1.000 | 8 | 1.88300 | 40.80 |
| 15 | −51.477 | 4.970 | | | |
| 16 | −12.778 | 1.000 | 9 | 1.62041 | 60.34 |
| 17 | −39.766 | | | | |

Aspherical surfaces

Seventh face $K=-0.806579, A=-1.114560E-5,$
$B=-5.087680E-8, C=-1.061220E-10,$
$D=1.804690E-13$ Sixteenth face $K=-0.551248, A=-7.168390E-6,$
$B=7.924650E-9, C=-3.134230E-10,$
$D=4.440330E-13$ Variable amounts

| f | 35.998 | 60.600 | 101.987 |
|---|---|---|---|
| D$_4$ | 26.796 | 10.485 | 0.800 |

Values of conditional formulas $[f_1+f_2\cdot\{2-(f_1/f(W))-(f(W)/f_1)\}]/f(T)=0.409$
$[f_1+f_2\cdot\{2-(f_1/f(T))-(f(T)/f_1)\}]/f(T)=0.409$
$|f_2(R)|/f_2(F)=0.884, f_2(F)/f_2=1.192, |f_1|/\sqrt{[f(W)\cdot f(T)]}=0.999$ Embodiment 24

$f=36.0\sim102, FNO.=2.63\sim5.72, \omega=64.2\sim23.5$

| i | Ri | Di | j | Nj | νj |
|---|---|---|---|---|---|
| 1 | −91.646 | 1.000 | 1 | 1.83500 | 42.98 |
| 2 | 34.451 | 1.962 | | | |
| 3 | 38.127 | 3.486 | 2 | 1.84666 | 23.83 |
| 4 | 135.124 | variable | | | |
| 5 | 19.380 | 6.651 | 3 | 1.56013 | 47.09 |
| 6 | −527.865 | 0.800 | | | |
| 7 | 20.824 | 4.502 | 4 | 1.52310 | 50.95 |
| 8 | −74.899 | 0.230 | | | |
| 9 | −61.063 | 1.000 | 5 | 1.85030 | 32.18 |
| 10 | 13.238 | 4.433 | 6 | 1.48749 | 70.44 |
| 11 | −102.437 | 1.646 | | | |
| 12 | ∞ (diaphragm) | 15.742 | | | |
| 13 | 83.028 | 4.838 | 7 | 1.74000 | 28.24 |
| 14 | −27.938 | 1.000 | 8 | 1.80420 | 46.50 |
| 15 | −408.800 | 6.688 | | | |
| 16 | −13.369 | 1.000 | 9 | 1.49700 | 81.61 |
| 17 | −114.746 | | | | |

Aspherical surfaces

Seventh face $K=-0.494716, A=-6.627180E-6,$
$B=-3.724730E-8, C=-1.363710E-10,$
$D=-2.083340E-13$ Sixteenth face $K=-0.191188, A=1.127990E-5,$
$B=2.229420E-7, C=-1.764820E-9$
$D=8.544660E-12$ Variable amounts

| f | 35.999 | 60.600 | 101.994 |
|---|---|---|---|
| D$_4$ | 27.671 | 10.812 | 0.800 |

Values of conditional formulas $[f_1+f_2\cdot\{2-(f_1/f(W))-(f(W)/f_1)\}]/f(T)=0.443$
$[f_1+f_2\cdot\{2-(f_1/f(T))-(f(T)/f_1)\}]/f(T)=0.443$ -continued $|f_2(R)|/f_2(F)=1.458, f_2(F)/f_2=1.299, |f_1|/\sqrt{[f(W)\cdot f(T)]}=0.998$ The above Embodiments 22 to 24 relate to the ninth lens structure of the present invention.

FIG. 87 shows a lens arrangement in the Embodiment 22 at the wide angle end of the zoom lens. FIGS. 90, 91 and 92 respectively show aberration diagrams with respect to the Embodiment 22 at the wide angle end of the zoom lens, an intermediate focal length of the zoom lens and the telescopic end of the zoom lens.

Figure 88:
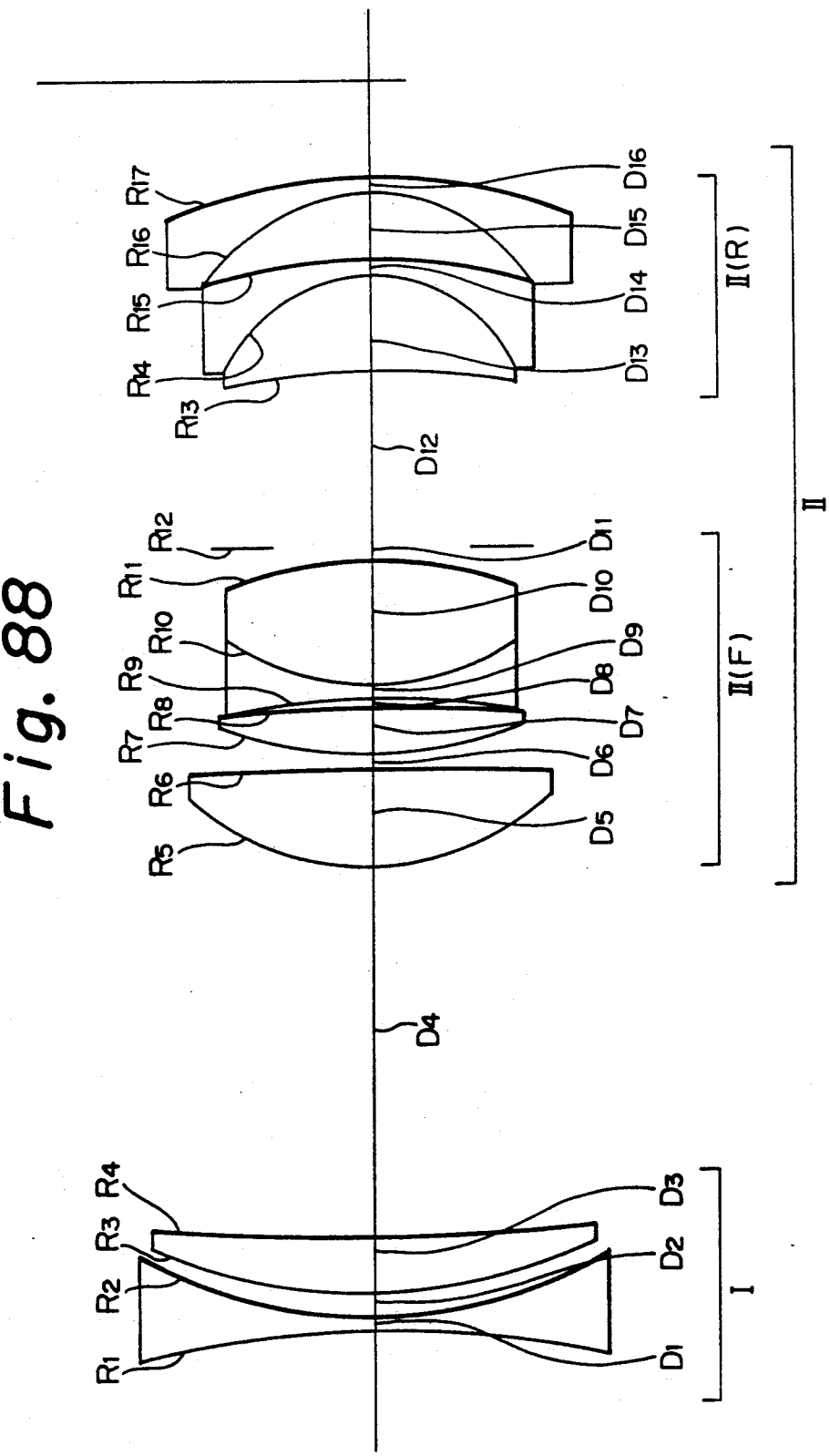
FIG. 88 is a view showing the arrangement of a zoom lens at a wide angle end thereof in accordance with Embodiment 23 of the present invention.

FIG. 88 shows a lens arrangement in the Embodiment 23 at the wide angle end of the zoom lens. FIGS. 93, 94 and 95 respectively show aberration diagrams with respect to the Embodiment 23 at the wide angle end of the zoom lens, an intermediate focal length of the zoom lens and the telescopic end of the zoom lens.

Figure 89:
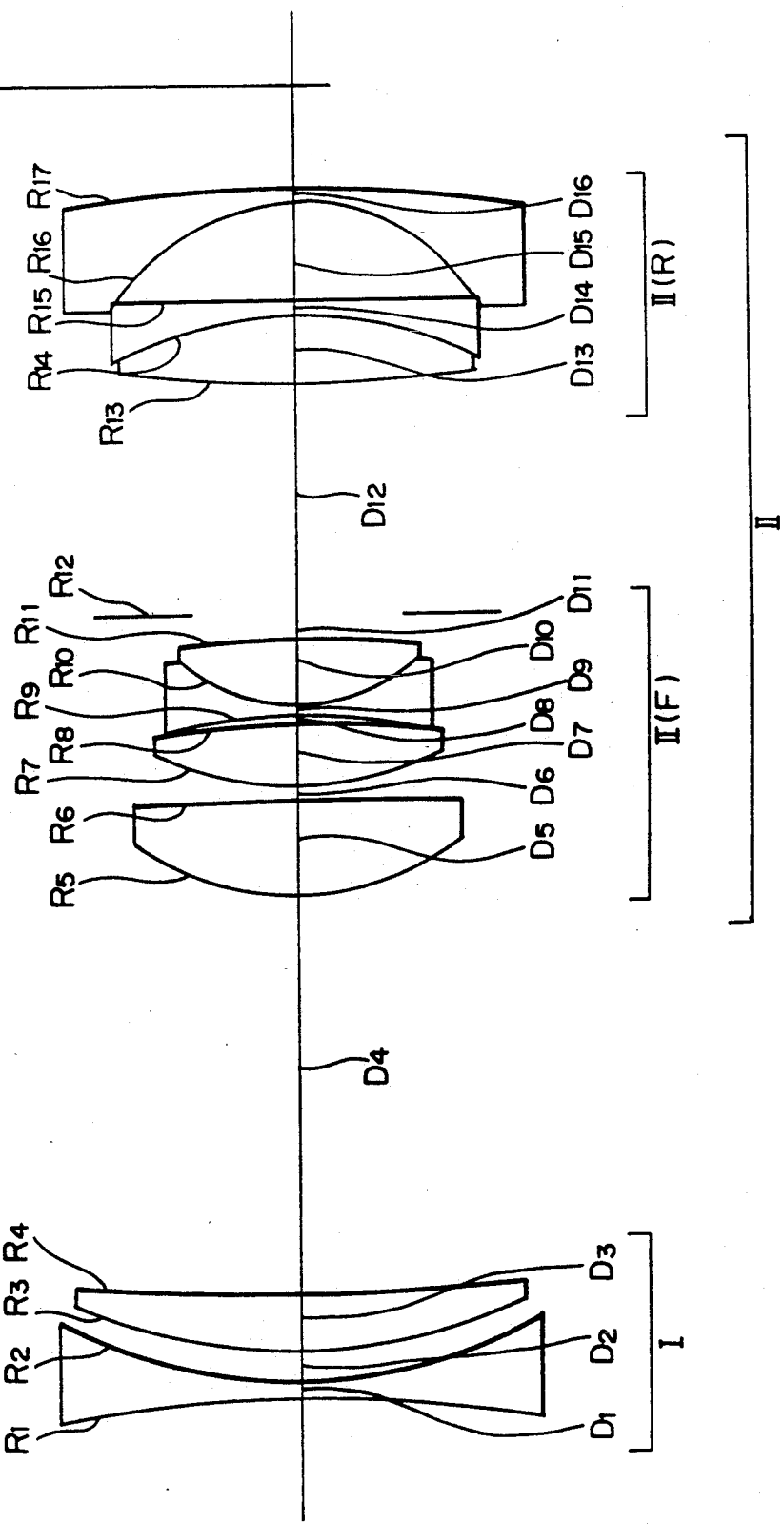
FIG. 89 is a view showing the arrangement of a zoom lens at a wide angle end thereof in accordance with Embodiment 24 of the present invention.

FIG. 89 shows a lens arrangement in the Embodiment 24 at the wide angle end of the zoom lens. FIGS. 96, 97 and 98 respectively show aberration diagrams with respect to the Embodiment 24 at the wide angle end of the zoom lens, an intermediate focal length of the zoom lens and the telescopic end of the zoom lens.

Embodiment 25

$f=36.0\sim102, FNO.=2.57\sim5.83, \omega=64.1\sim23.5$

| i | Ri | Di | j | Nj | νj |
|---|---|---|---|---|---|
| 1 | −61.418 | 1.000 | 1 | 1.83500 | 42.98 |
| 2 | 33.751 | 1.016 | | | |
| 3 | 35.790 | 3.918 | 2 | 1.84666 | 23.83 |
| 4 | 183.457 | variable | | | |
| 5 | 22.336 | 7.558 | 3 | 1.58144 | 40.89 |
| 6 | −46.965 | 0.800 | 4 | 1.81600 | 46.57 |
| 7 | −103.565 | 0.100 | | | |
| 8 | 25.009 | 6.610 | 5 | 1.58215 | 42.03 |
| 9 | −573.108 | 0.590 | | | |
| 10 | −74.148 | 1.000 | 6 | 1.84666 | 23.83 |
| 11 | 17.355 | 3.984 | 7 | 1.49700 | 81.61 |
| 12 | −50.013 | 1.083 | | | |
| 13 | ∞ (diaphragm) | 12.848 | | | |
| 14 | 150.426 | 7.784 | 8 | 1.80518 | 25.46 |
| 15 | −12.741 | 1.000 | 9 | 1.88300 | 40.80 |
| 16 | −120.777 | 5.285 | | | |
| 17 | −14.088 | 1.000 | 10 | 1.74100 | 52.60 |
| 18 | −49.932 | | | | |

Aspherical surfaces

Eighth face $K=-0.522658, A=-7.735500E-6,$
$B=-2.706230E-8, C=-5.887230E-11,$
$D=2.172690E-14$ Seventeenth face $K=-0.285776, A=7.434240E-6,$
$B=9.051810E-8, C=-5.574160E-10,$
$D=3.129480E-12$ Variable amounts

| f | 36.000 | 60.600 | 101.999 |
|---|---|---|---|
| D$_4$ | 21.469 | 8.502 | 0.800 |

Values of conditional formulas $[f_1+f_2\cdot\{2-(f_1/f(W))-(f(W)/f_1)\}]/f(T)=0.354$
$[f_1+f_2\cdot\{2-(f_1/f(T))-(f(T)/f_1)\}]/f(T)=0.412$
$|f_2(R)|/f_2(F)=1.221, f_2(F)/f_2=1.325, |f_1|/\sqrt{[f(W)\cdot f(T)]}=0.881$ Embodiment 26

$f=36.0\sim102, FNO.=2.55\sim5.83, \omega=64.1\sim23.5$

| i | Ri | Di | j | Nj | νj |
|---|---|---|---|---|---|
| 1 | −60.769 | 1.000 | 1 | 1.83500 | 42.98 |
| 2 | 34.347 | 0.903 | | | |
| 3 | 36.154 | 4.212 | 2 | 1.84666 | 23.83 |
| 4 | 196.627 | variable | | | |
| 5 | 21.286 | 8.775 | 3 | 1.59551 | 39.22 |
| 6 | −43.099 | 0.800 | 4 | 1.78800 | 47.49 |
| 7 | −121.542 | 0.100 | | | |
| 8 | 24.645 | 3.429 | 5 | 1.56732 | 42.84 |
| 9 | −457.413 | 0.680 | | | |

-continued

| | | | | | |
|---|---|---|---|---|---|
| 10 | −84.079 | 1.000 | 6 | 1.84666 | 23.83 |
| 11 | 18.556 | 8.919 | 7 | 1.49700 | 81.61 |
| 12 | −36.681 | 1.000 | | | |
| 13 | ∞ (diaphragm) | 11.791 | | | |
| 14 | −90.418 | 5.902 | 8 | 1.84666 | 23.83 |
| 15 | −12.365 | 1.000 | 9 | 1.88300 | 40.80 |
| 16 | −94.100 | 5.297 | | | |
| 17 | −12.796 | 1.000 | 10 | 1.75500 | 52.32 |
| 18 | −32.878 | | | | |

Aspherical surfaces

Eighth face $K = -0.852202$, $A = -1.070340E-5$,
$B = -5.050010E-8$, $C = -9.703920E-11$,
$D = 6.861860E-14$ Seventeenth face $K = -0.312935$, $A = 6.673730E-7$,
$B = 6.567600E-8$, $C = -6.453610E-10$,
$D = 1.999940E-12$ Variable amounts

| f | 36.000 | 60.600 | 102.000 |
|---|---|---|---|
| D$_4$ | 21.94 | 8.677 | 0.800 |

Values of conditional formulas $[f_1 + f_2 \cdot \{2 - (f_1/f(W)) - (f(W)/f_1)\}]/f(T) = 0.356$
$[f_1 + f_2 \cdot \{2 - (f_1/f(T)) - (f(T)/f_1)\}]/f(T) = 0.408$
$|f_2(R)|/f_2(F) = 0.926$, $f_2(F)/f_2 = 1.254$, $|f_1|/\sqrt{[f(W) \cdot f(T)]} = 0.894$ Embodiment 27

$f = 36.0 \sim 102$, FNO. $= 2.58 \sim 5.83$, $\omega = 64.1 \sim 23.5$

| i | Ri | Di | j | Nj | νj |
|---|---|---|---|---|---|
| 1 | −66.190 | 1.000 | 1 | 1.83500 | 42.98 |
| 2 | 36.171 | 1.068 | | | |
| 3 | 38.387 | 4.308 | 2 | 1.84666 | 23.83 |
| 4 | 200.503 | variable | | | |
| 5 | 23.013 | 8.716 | 3 | 1.60000 | 42.46 |
| 6 | −41.373 | 0.800 | 4 | 1.85030 | 32.18 |
| 7 | −92.635 | 0.100 | | | |
| 8 | 22.418 | 8.246 | 5 | 1.57309 | 42.59 |
| 9 | −757.015 | 0.614 | | | |
| 11 | −67.261 | 1.000 | 6 | 1.84666 | 23.83 |
| 11 | 15.437 | 3.273 | 7 | 1.49700 | 81.61 |
| 12 | −161.713 | 1.000 | | | |
| 13 | ∞ (diaphragm) | 9.884 | | | |
| 14 | 70.147 | 7.673 | 8 | 1.80518 | 25.46 |
| 15 | −12.469 | 1.000 | 9 | 1.88300 | 40.80 |
| 16 | −260.008 | 6.300 | | | |
| 17 | −13.884 | 1.000 | 10 | 1.75500 | 52.32 |
| 18 | −37.510 | | | | |

Aspherical surfaces

Eighth face $K = -0.304235$, $A = -4.712040E-6$,
$B = -1.801520E-8$, $C = -5.923790E-11$,
$D = 4.836310E-14$ Seventeenth face $K = -0.154324$, $A = 8.720100E-6$,
$B\ 1.506690E-7$, $C = -1.206140E-9$,
$D = 7.416100E-12$ Variable amounts

| f | 36.000 | 60.600 | 102.003 |
|---|---|---|---|
| D$_4$ | 24.537 | 9.646 | 0.800 |

Values of conditional formulas $[f_1 + f_2 \cdot \{2 - (f_1/f(W)) - (f(W)/f_1)\}]/f(T) = 0.384$
$[f_1 + f_2 \cdot \{2 - (f_1/f(T)) - (f(T)/f_1)\}]/f(T) = 0.408$
$|f_2(R)|/f_2(F) = 1.557$, $f_2(F)/f_2 = 1.312$, $|f_1|/\sqrt{[f(W) \cdot f(T)]} = 0.951$ The above Embodiments 25 to 27 relate to the tenth lens structure of the present invention.

Figure 99:
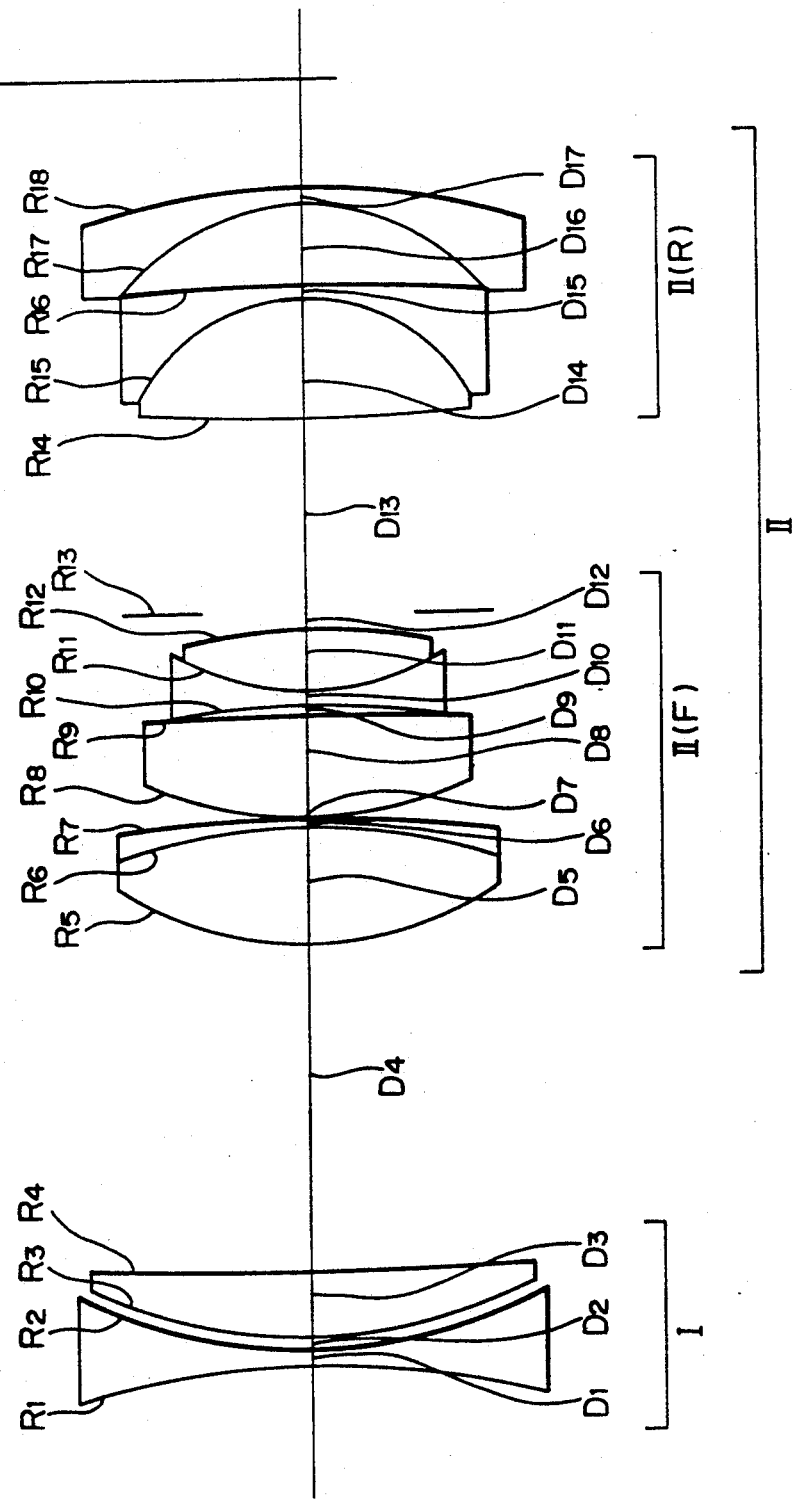
FIG. 99 is a view showing the arrangement of a zoom lens at a wide angle end thereof in accordance with Embodiment 25 of the present invention.

FIG. 99 shows a lens arrangement in the Embodiment 25 at the wide angle end of the zoom lens. FIGS. 102, 103 and 104 respectively show aberration diagrams with respect to the Embodiment 25 at the wide angle end of the zoom lens, an intermediate focal length of the zoom lens and the telescopic end of the zoom lens.

Figure 100:
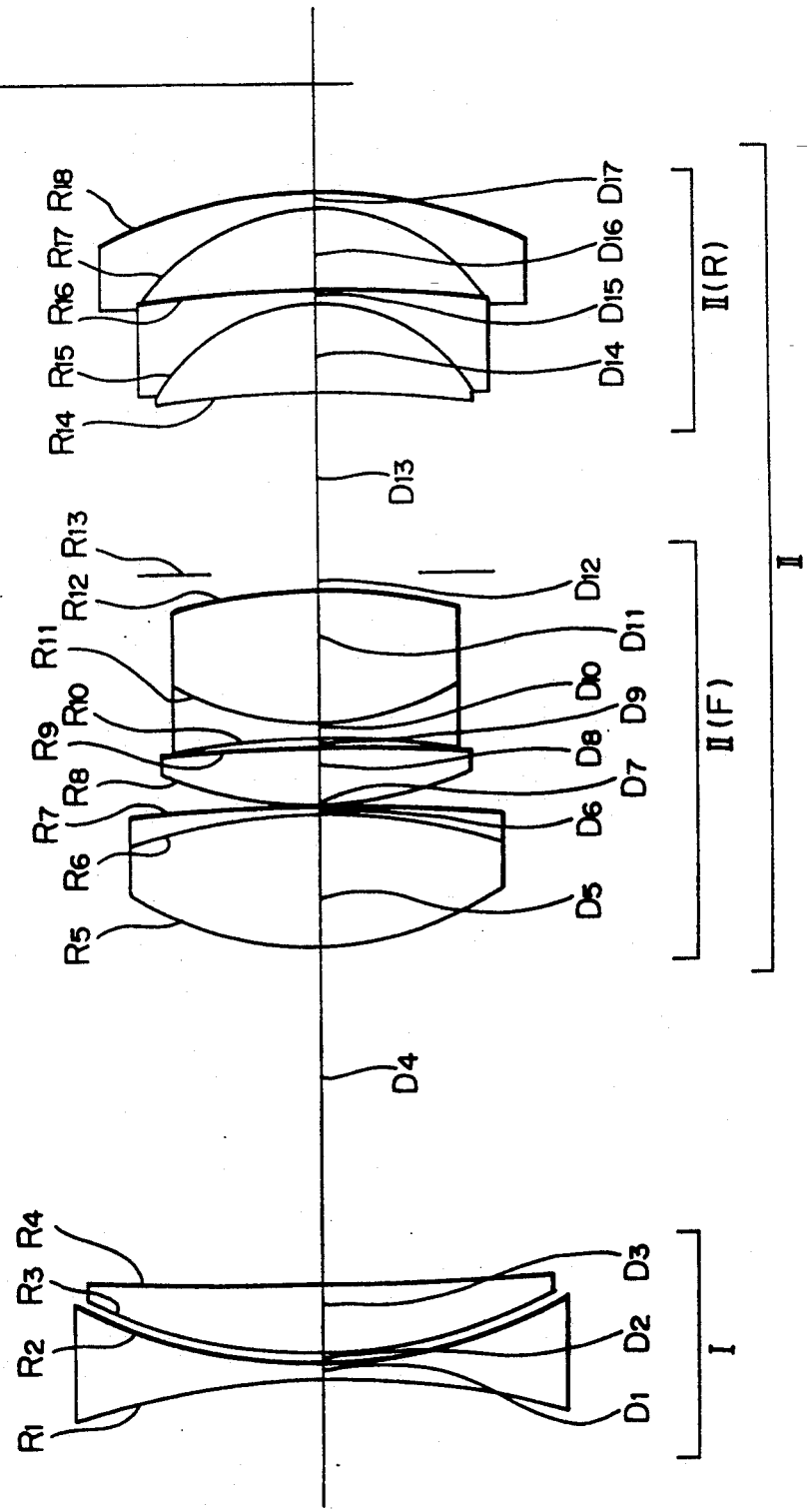
FIG. 100 is a view showing the arrangement of a zoom lens at a wide angle end thereof in accordance with Embodiment 26 of the present invention.

FIG. 100 shows a lens arrangement in the Embodiment 26 at the wide angle end of the zoom lens. FIGS. 105, 106 and 107 respectively show aberration diagrams with respect to the Embodiment 26 at the wide angle end of the zoom lens, an intermediate focal length of the zoom lens and the telescopic end of the zoom lens.

Figure 101:
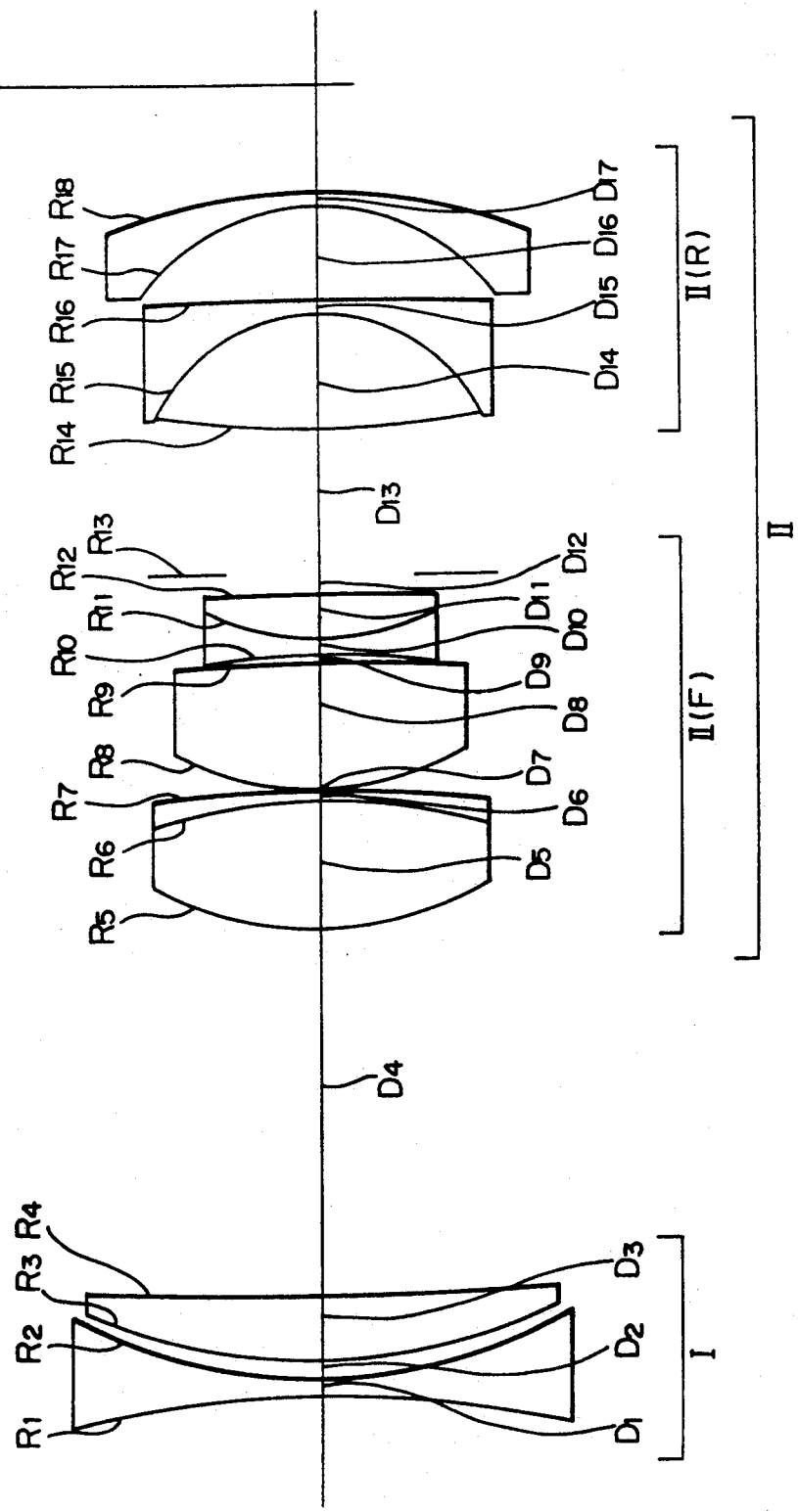
FIG. 101 is a view showing the arrangement of a zoom lens at a wide angle end thereof in accordance with Embodiment 27 of the present invention.

FIG. 101 shows a lens arrangement in the Embodiment 27 at the wide angle end of the zoom lens. FIGS. 108, 109 and 110 respectively show aberration diagrams with respect to the Embodiment 27 at the wide angle end of the zoom lens, an intermediate focal length of the zoom lens and the telescopic end of the zoom lens.

Embodiment 28

$f = 36.0 \sim 102$, FNO. $= 2.56 \sim 5.83$, $\omega = 64.1 \sim 23.5$

| i | Ri | Di | j | Nj | νj |
|---|---|---|---|---|---|
| 1 | −60.334 | 1.000 | 1 | 1.83500 | 42.98 |
| 2 | 33.780 | 0.925 | | | |
| 3 | 35.581 | 3.947 | 2 | 1.84666 | 23.83 |
| 4 | 185.325 | variable | | | |
| 5 | 23.093 | 8.677 | 3 | 1.60342 | 38.01 |
| 6 | −174.678 | 0.100 | | | |
| 7 | 24.442 | 6.488 | 4 | 1.60562 | 43.88 |
| 8 | −32.306 | 0.800 | 5 | 1.80740 | 35.54 |
| 9 | −235.039 | 0.321 | | | |
| 10 | −101.312 | 1.000 | 6 | 1.84666 | 23.83 |
| 11 | 16.974 | 3.759 | 7 | 1.49700 | 81.61 |
| 12 | −63.284 | 1.000 | | | |
| 13 | ∞(diaphragm) | 12.520 | | | |
| 14 | 124.161 | 7.988 | 8 | 1.80518 | 25.46 |
| 15 | −12.663 | 1.000 | 9 | 1.88300 | 40.80 |
| 16 | −105.217 | 5.187 | | | |
| 17 | −14.086 | 1.000 | 10 | 1.75500 | 52.32 |
| 18 | −52.578 | | | | |

Aspherical surfaces

Seventh face $K = -0.352659$, $A = -5.953150E-6$,
$B = -2.050360E-8$, $C = -2.901880E-11$,
$D = -2.548950E-14$ Seventeenth face $K = -0.288490$, $A = 8.654120E-6$,
$B = 8.796030E-8$, $C = -5.115910E-10$,
$D = 3.171100E-12$ Variable amounts

| f | 36.999 | 60.600 | 101.995 |
|---|---|---|---|
| D$_4$ | 21.172 | 8.391 | 0.800 |

Values of conditional formulas $[f_1 + f_2 \cdot \{2 - (f_1/f(W)) - (f(W)/f_1)\}]/f(T) = 0.348$
$[f_1 + f_2 \cdot \{2 - (f_1/f(T)) - (f(T)/f_1)\}]/f(T) = 0.408$
$|f_2(R)|/f_2(F) = 1.283$, $f_2(F)/f_2 = 1.337$,
$|f_1|/\sqrt{[f(W) \cdot f(T)]} = 0.877$ Embodiment 29

$f = 36.0 \sim 102$, FNO. $= 2.57 \sim 5.83$, $\omega = 64.1 \sim 23.5$

| i | Ri | Di | j | Nj | νj |
|---|---|---|---|---|---|
| 1 | −64.938 | 1.000 | 1 | 1.83500 | 42.98 |
| 2 | 34.765 | 1.129 | | | |
| 3 | 37.002 | 4.157 | 2 | 1.84666 | 23.83 |
| 4 | 185.059 | variable | | | |
| 5 | 21.633 | 7.653 | 3 | 1.57845 | 41.71 |
| 6 | −344.323 | 0.100 | | | |
| 7 | 26.543 | 5.563 | 4 | 1.60801 | 46.21 |
| 8 | −26.746 | 0.800 | 5 | 1.77250 | 49.62 |
| 9 | 610.086 | 0.374 | | | |
| 10 | −772.511 | 1.000 | 6 | 1.84666 | 23.83 |
| 11 | 16.700 | 7.858 | 7 | 1.51728 | 69.68 |
| 12 | −34.806 | 1.000 | | | |
| 13 | ∞(diaphragm) | 11.826 | | | |
| 14 | −56.799 | 6.510 | 8 | 1.84666 | 23.83 |
| 15 | −12.097 | 1.000 | 9 | 1.88300 | 40.80 |
| 16 | −58.249 | 4.840 | | | |
| 17 | −13.117 | 1.000 | 10 | 1.75500 | 52.32 |
| 18 | −34.901 | | | | |

Aspherical surfaces

Seventh face $K = -0.675311$, $A = -8.876040E-6$,
$B = -3.265620E-8$, $C = -3.699420E-12$,
$D = 1.365260E-13$ Seventeenth face $K = -0.354570$, $A = -6.799940E-7$,
$B = 6.194770E-8$, $C = -6.534670E-10$,
$D = 2.169570E-12$ -continued Variable amounts

| f | 36.001 | 60.600 | 102.007 |
|---|---|---|---|
| $D_4$ | 23.036 | 9.087 | 0.800 |

Values of conditional formulas $[f_1 + f_2 \cdot \{2 - (f_1/f(W)) - (f(W)/f_1)\}]/f(T) = 0.369$
$[f_1 + f_2 \cdot \{2 - (f_1/f(T)) - (f(T)/f_1)\}]/f(T) = 0.410$
$|f_2(R)|/f_2(F) = 0.927$,
$f_2(F)/f_2 = 1.223$, $|f_1|/\sqrt{[f(W) \cdot f(T)]} = 0.918$ Embodiment 30

$f = 36.0 \sim 102$, FNO. $= 2.63 \sim 5.8$, $\omega = 64.1 \sim 23.5$

| i | Ri | Di | j | Nj | νj |
|---|---|---|---|---|---|
| 1 | −77.426 | 1.000 | 1 | 1.83500 | 42.98 |
| 2 | 37.063 | 1.958 | | | |
| 3 | 40.831 | 3.925 | 2 | 1.84666 | 23.83 |
| 4 | 174.899 | variable | | | |
| 5 | 21.716 | 6.452 | 3 | 1.62004 | 36.30 |
| 6 | −328.224 | 0.270 | | | |
| 7 | 25.296 | 6.955 | 4 | 1.62000 | 62.19 |
| 8 | −36.867 | 0.800 | 5 | 1.76180 | 26.91 |
| 9 | 150.371 | 0.512 | | | |
| 10 | 533.144 | 1.000 | 6 | 1.85030 | 32.18 |
| 11 | 12.879 | 3.818 | 7 | 1.49700 | 81.61 |
| 12 | −212.922 | 1.127 | | | |
| 13 | ∞(diaphragm) | 13.649 | | | |
| 14 | 107.999 | 7.756 | 8 | 1.80518 | 25.46 |
| 15 | −14.599 | 1.000 | 9 | 1.88300 | 40.80 |
| 16 | −91.917 | 4.744 | | | |
| 17 | −16.046 | 1.000 | 10 | 1.80420 | 46.50 |
| 18 | −58.721 | | | | |

Aspherical surfaces

Seventh face $K = -0.412064$, $A = -6.363340E-6$,
$B = -3.188570E-8$, $C = 3.932880E-11$,
$D = -4.376580E-13$ Seventeenth face $K = -0.006337$, $A = 1.444680E-5$,
$B = 1.090300E-7$, $C = -4.686770E-10$,
$D = 2.955380E-12$ Variable amounts

| f | 36.000 | 60.600 | 102.001 |
|---|---|---|---|
| $D_4$ | 27.034 | 10.575 | 0.800 |

Values of conditional formulas $[f_1 + f_2 \cdot \{2 - (f_1/f(W)) - (f(W)/f_1)\}]/f(T) = 0.418$
$[f_1 + f_2 \cdot \{2 - (f_1/f(T)) - (f(T)/f_1)\}]/f(T) = 0.419$
$|f_2(R)|/f_2(F) = 1.504$,
$f_2(F)/f_2 = 1.290$, $|f_1|/\sqrt{[f(W) \cdot f(T)]} = 0.998$ The above Embodiments 28 to 30 relate to the eleventh lens structure of the present invention.

Figure 111:
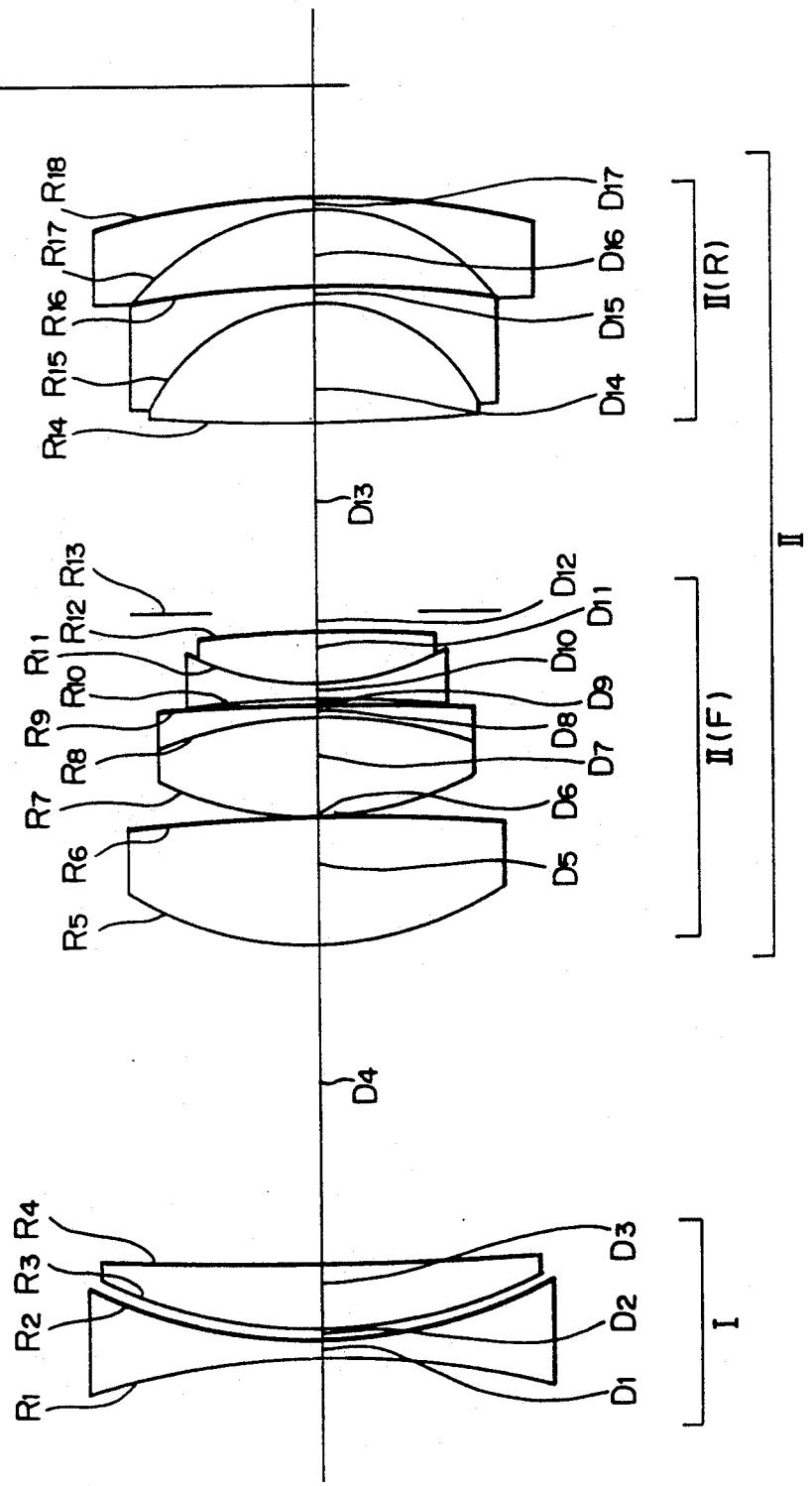
FIG. 111 is a view showing the arrangement of a zoom lens at a wide angle end thereof in accordance with Embodiment 28 of the present invention.

FIG. 111 shows a lens arrangement in the Embodiment 28 at the wide angle end of the zoom lens. FIGS. 114, 115 and 116 respectively show aberration diagrams with respect to the Embodiment 28 at the wide angle end of the zoom lens, an intermediate focal length of the zoom lens and the telescopic end of the zoom lens.

Figure 112:
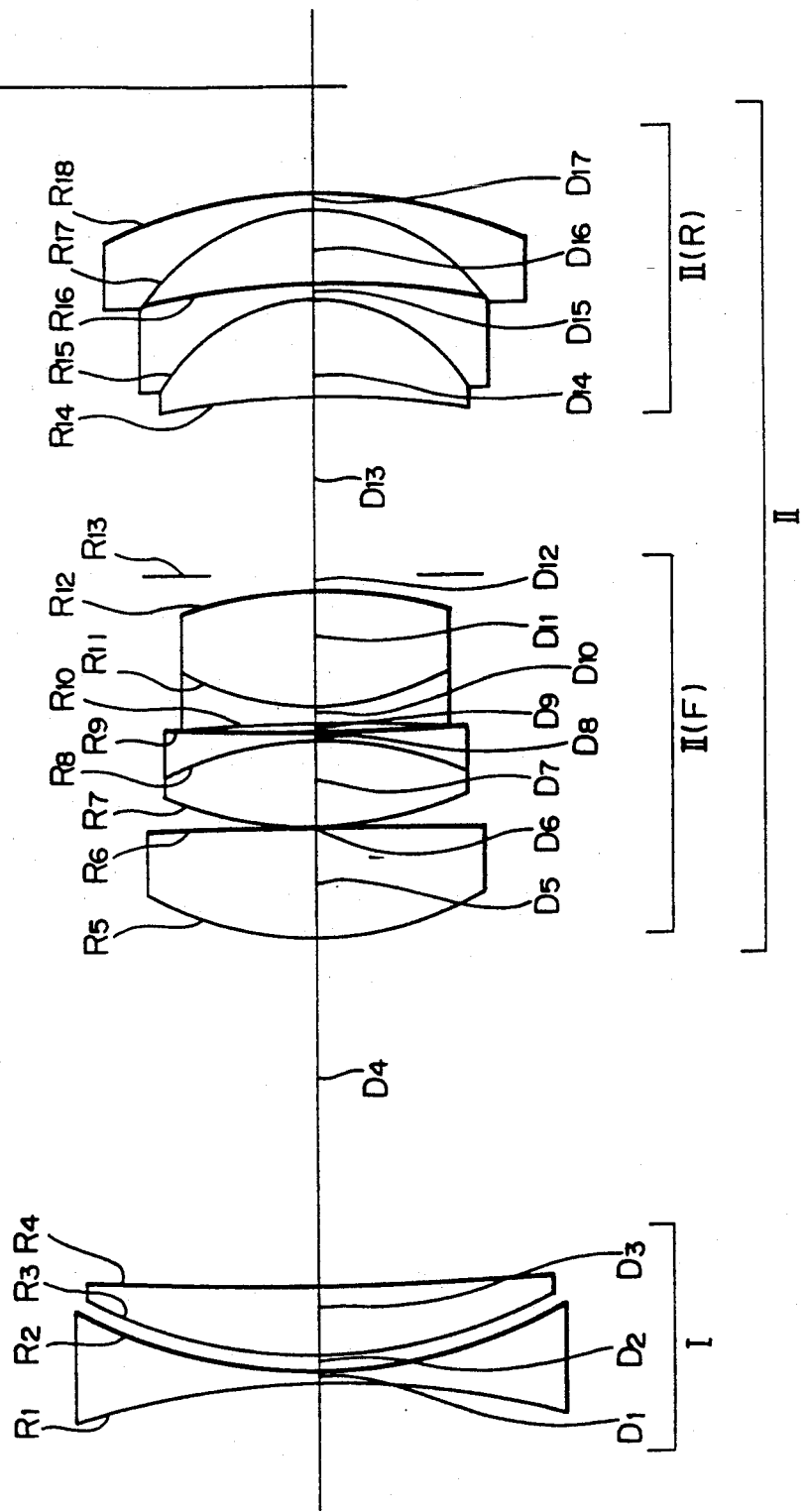
FIG. 112 is a view showing the arrangement of a zoom lens at a wide angle end thereof in accordance with Embodiment 29 of the present invention.

FIG. 112 shows a lens arrangement in the Embodiment 29 at the wide angle end of the zoom lens. FIGS. 117, 118 and 119 respectively show aberration diagrams with respect to the Embodiment 29 at the wide angle end of the zoom lens, an intermediate focal length of the zoom lens and the telescopic end of the zoom lens.

Figure 113:
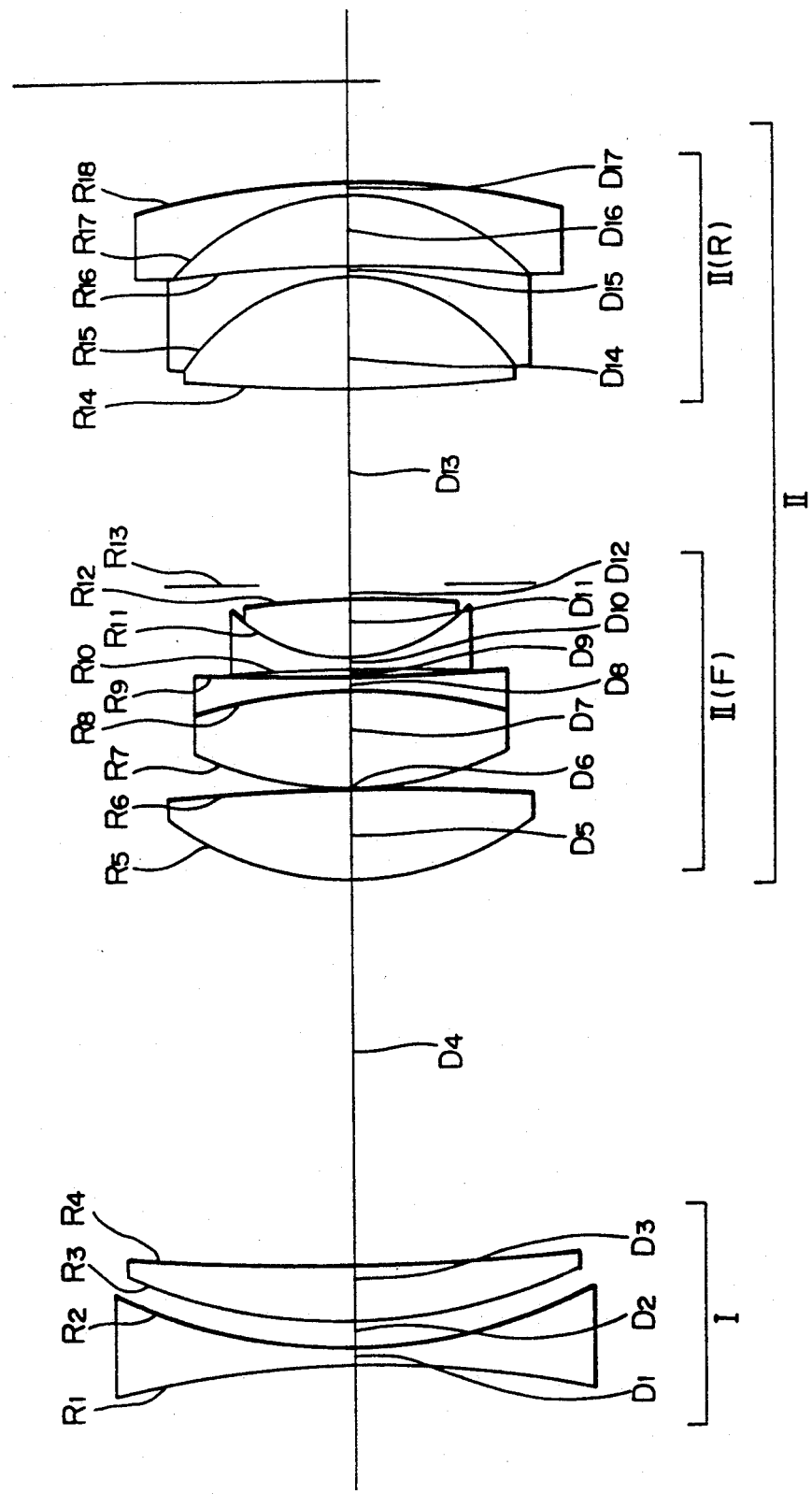
FIG. 113 is a view showing the arrangement of a zoom lens at a wide angle end thereof in accordance with Embodiment 30 of the present invention.

FIG. 113 shows a lens arrangement in the Embodiment 30 at the wide angle end of the zoom lens. FIGS. 120, 121 and 122 respectively show aberration diagrams with respect to the Embodiment 30 at the wide angle end of the zoom lens, an intermediate focal length of the zoom lens and the telescopic end of the zoom lens.

Embodiment 31

$f = 36.0 \sim 102$, FNO. $= 2.76 \sim 5.83$, $\omega = 64.1 \sim 23.6$

| i | Ri | Di | j | Nj | νj |
|---|---|---|---|---|---|
| 1 | −78.592 | 0.800 | 1 | 1.88300 | 40.80 |
| 2 | 34.145 | 1.303 | | | |
| 3 | 36.812 | 3.613 | 2 | 1.84666 | 23.83 |
| 4 | 266.720 | variable | | | |
| 5 | 20.099 | 7.890 | 3 | 1.56138 | 45.23 |
| 6 | −37.519 | 0.800 | 4 | 1.72342 | 37.99 |
| 7 | −86.115 | 2.210 | | | |
| 8 | ∞(diaphragm) | 1.000 | | | |
| 9 | 23.986 | 5.751 | 5 | 1.58904 | 52.93 |
| 10 | −22.289 | 1.000 | 6 | 1.84666 | 23.83 |
| 11 | 40.092 | 14.407 | | | |
| 12 | 58.823 | 8.368 | 7 | 1.75520 | 27.53 |
| 13 | −13.233 | 1.000 | 8 | 1.84750 | 43.03 |
| 14 | −175.759 | 5.956 | | | |
| 15 | −13.661 | 1.200 | 9 | 1.75500 | 52.32 |
| 16 | −36.621 | | | | |

Aspherical surfaces

Ninth face $K = -0.846599$, $A = -5.758720E-6$,
$B = -2.974170E-8$, $C = -2.931230E-10$,
$D = -6.230980E-13$ Fifteenth face $K = -0.709678$, $A = -1.724500E-5$,
$B = 2.211860E-8$, $C = -5.202740E-10$,
$D = 2.248820E-12$ Variable amounts

| f | 36.000 | 60.600 | 102.000 |
|---|---|---|---|
| $D_4$ | 25.9817 | 10.186 | 0.800 |

Values of conditional formulas $[f_1 + f_2 \cdot \{2 - (f_1/f(W)) - (f(W)/f_1)\}]/f(T) = 0.417$
$[f_1 + f_2 \cdot \{2 - (f_1/f(T)) - (f(T)/f_1)\}]/f(T) = 0.433$
$|f_2(R)|/f_2(F) = 1.679$,
$f_2(F)/f_2 = 1.325$, $|f_1|/\sqrt{[f(W) \cdot f(T)]} = 0.969$ Embodiment 32

$f = 36.0 \sim 102$, FNO. $= 2.79 \sim 5.83$, $\omega = 64.1 \sim 23.5$

| i | Ri | Di | j | Nj | νj |
|---|---|---|---|---|---|
| 1 | −75.718 | 0.800 | 1 | 1.88300 | 40.80 |
| 2 | 31.613 | 0.854 | | | |
| 3 | 33.068 | 4.443 | 2 | 1.78472 | 25.70 |
| 4 | 814.262 | variable | | | |
| 5 | 20.278 | 6.324 | 3 | 1.53256 | 45.94 |
| 6 | −39.688 | 3.415 | 4 | 1.78800 | 47.49 |
| 7 | −61.881 | 1.000 | | | |
| 8 | ∞(diaphragm) | 1.000 | | | |
| 9 | 24.360 | 4.096 | 5 | 1.55671 | 58.56 |
| 10 | −27.498 | 1.000 | 6 | 1.84666 | 23.83 |
| 11 | 53.547 | 16.539 | | | |
| 12 | 124.097 | 7.596 | 7 | 1.75520 | 27.53 |
| 13 | −12.399 | 1.000 | 8 | 1.88300 | 40.80 |
| 14 | −96.981 | 5.853 | | | |
| 15 | −12.455 | 1.200 | 9 | 1.65160 | 58.40 |
| 16 | −37.922 | | | | |

Aspherical surfaces

Ninth face $K = -0.726870$, $A = -4.710440E-6$,
$B = -1.879390E-8$, $C = -3.439890E-10$,
$D = -3.300030E-13$ Fifteenth face $K = -0.735749$, $A = -1.899560E-5$,
$B = 1.999390E-8$, $C = -7.556820E-10$,
$D = 3.136680E-12$ Variable amounts

| f | 36.000 | 60.600 | 101.998 |
|---|---|---|---|
| $D_4$ | 27.867 | 10.886 | 0.800 |

Values of conditional formulas $[f_1 + f_2 \cdot \{2 - (f_1/f(W)) - (f(W)/f_1)\}]/f(T) = 0.416$
$[f_1 + f_2 \cdot \{2 - (f_1/f(T)) - (f(T)/f_1)\}]/f(T) = 0.403$
$|f_2(R)|/f_2(F) = 1.167$,
$f_2(F)/f_2 = 1.272$, $|f_1|/\sqrt{[f(W) \cdot f(T)]} = 1.024$ Embodiment 33

$f = 36.0 \sim 102$, FNO. $= 2.76 \sim 5.83$, $\omega = 64.1 \sim 23.6$

| i | Ri | Di | j | Nj | νj |
|---|---|---|---|---|---|
| 1 | −78.808 | 0.800 | 1 | 1.88300 | 40.80 |
| 2 | 35.376 | 1.250 | | | |
| 3 | 37.789 | 3.752 | 2 | 1.84666 | 23.83 |
| 4 | 242.292 | variable | | | |
| 5 | 19.171 | 9.588 | 3 | 1.56138 | 45.23 |
| 6 | −29.928 | 0.800 | 4 | 1.76200 | 40.26 |
| 7 | −67.594 | 1.769 | | | |

-continued

| | | | | | |
|---|---|---|---|---|---|
| 8 | ∞(diaphragm) | 1.000 | | | |
| 9 | 20.660 | 5.356 | 5 | 1.56965 | 49.39 |
| 10 | −20.354 | 2.142 | 6 | 1.84666 | 23.83 |
| 11 | 28.493 | 12.776 | | | |
| 12 | 55.303 | 9.134 | 7 | 1.75520 | 27.53 |
| 13 | −12.964 | 1.000 | 8 | 1.80420 | 46.50 |
| 14 | −106.695 | 5.462 | | | |
| 15 | −14.359 | 1.200 | 9 | 1.81550 | 44.54 |
| 16 | −44.968 | | | | |

Aspherical surfaces
Ninth face
$K = -0.678334, A = -3.650590E-6,$
$B = -9.237590E-8, C = 6.933350E-10,$
$D = -7.909810E-12$
Fifteenth face
$K = -0.722949, A = -1.311790E-5,$
$B = 9.793000E-9, C = -2.770860E-10,$
$D = 1.465170E-12$
Variable amounts

| f | 36.000 | 60.600 | 101.997 |
|---|---|---|---|
| $D_4$ | 26.971 | 10.552 | 0.800 |

Values of conditional formulas
$[f_1 + f_2 \cdot \{2 - (f_1/f(W)) - (f(W)/f_1)\}]/f(T) = 0.415$
$[f_1 + f_2 \cdot \{2 - (f_1/f(T)) - (f(T)/f_1)\}]/f(T) = 0.415$
$|f_2(R)|/f_2(F) = 2.117,$
$f_2(F)/f_2 = 1.343, |f_1|/\sqrt{[f(W) \cdot f(T)]} = 0.999$ The above Embodiments 31 to 33 relate to the twelfth lens structure of the present invention.

Figure 123:
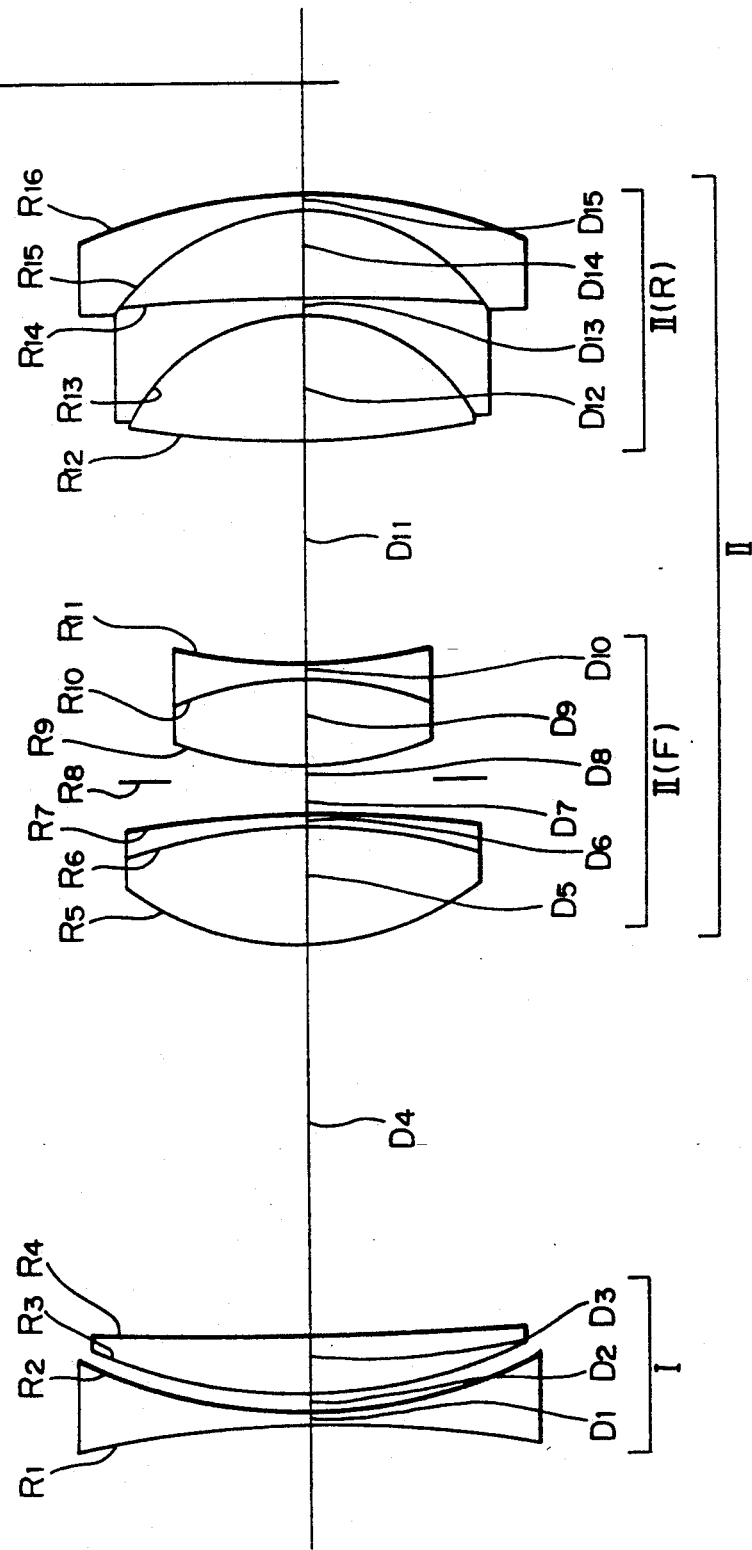

FIG. 123 shows a lens arrangement in the Embodiment 31 at the wide angle end of the zoom lens. FIGS. 126, 127 and 128 respectively show aberration diagrams with respect to the Embodiment 31 at the wide angle end of the zoom lens, an intermediate focal length of the zoom lens and the telescopic end of the zoom lens.

Figure 124:
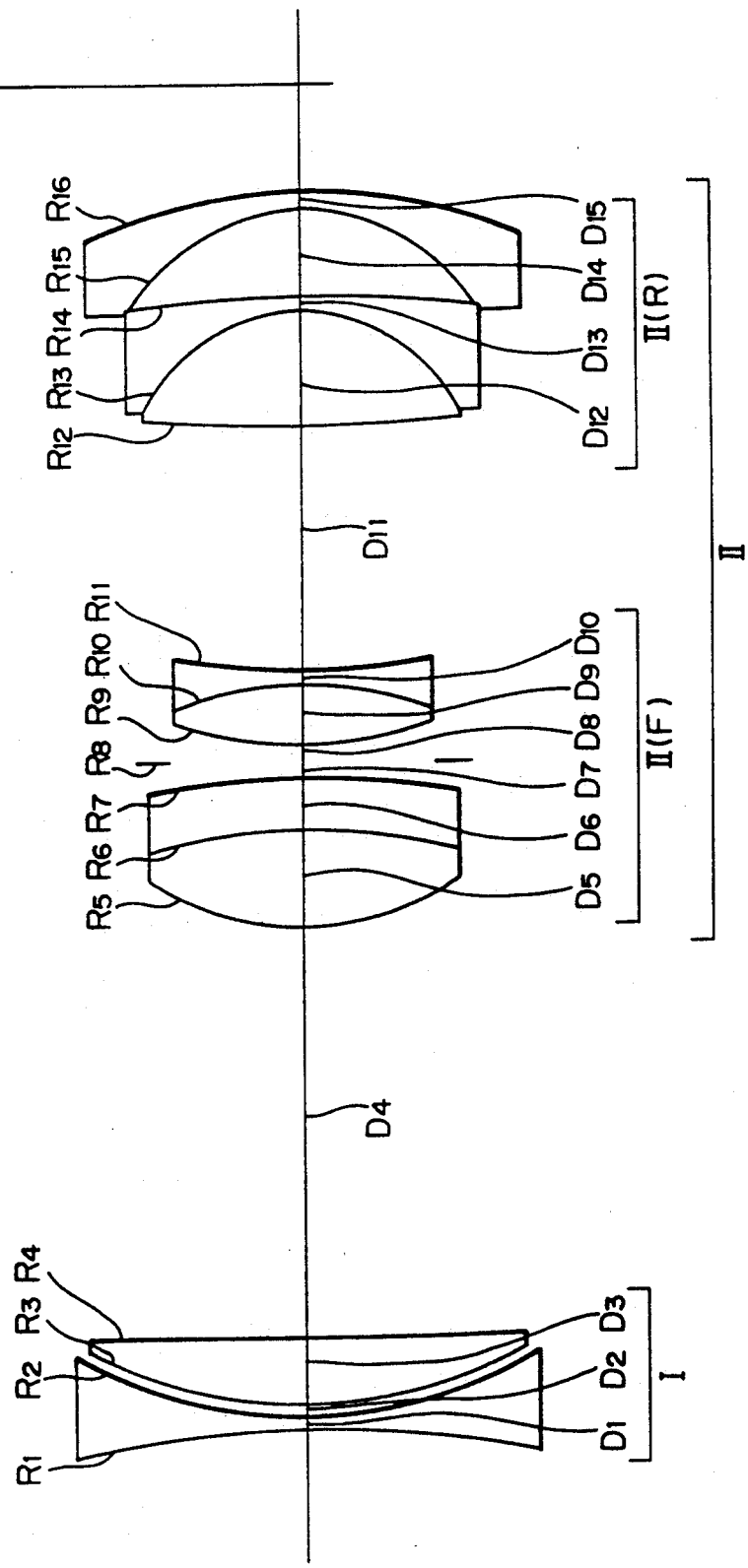

FIG. 124 shows a lens arrangement in the Embodiment 32 at the wide angle end of the zoom lens. FIGS. 129, 130 and 131 respectively show aberration diagrams with respect to the Embodiment 32 at the wide angle end of the zoom lens, an intermediate focal length of the zoom lens and the telescopic end of the zoom lens.

Figure 125:
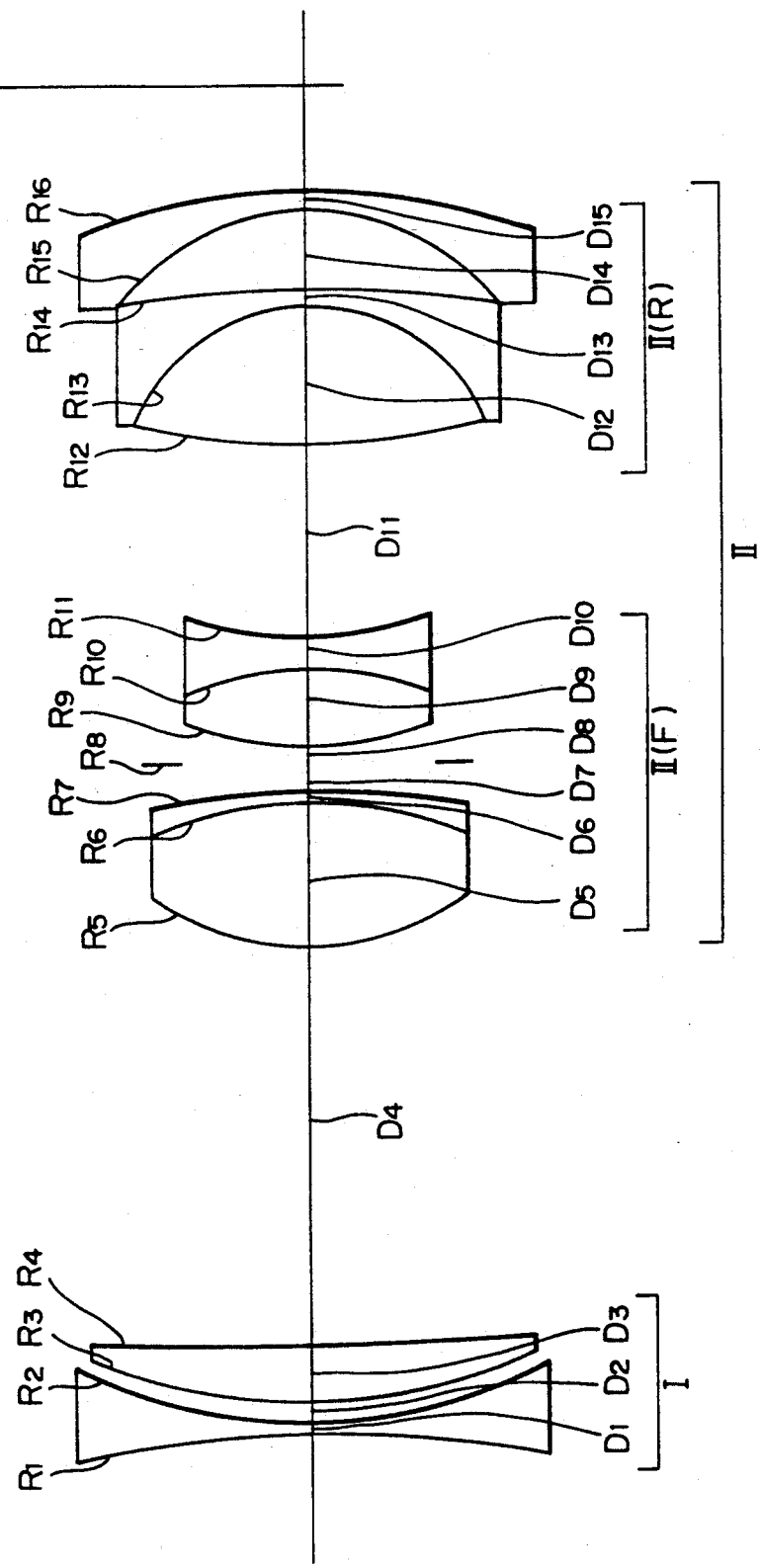
Figures 132A, 132B, 132C, 132D:
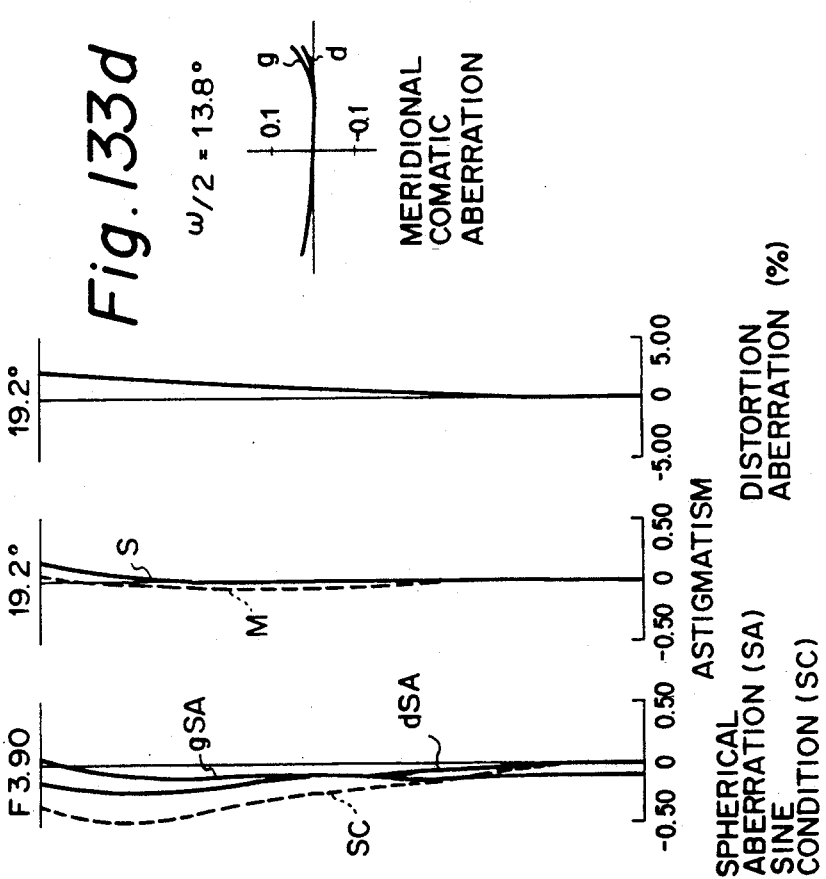
Figures 133A, 133B, 133C, 133D:
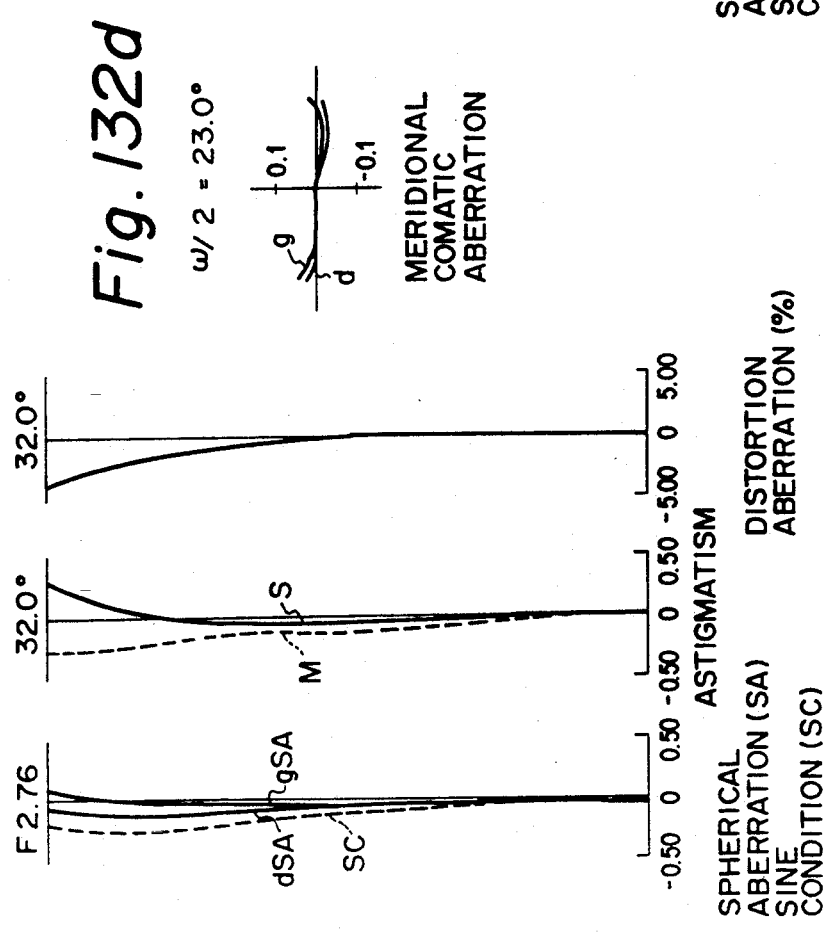

FIG. 125 shows a lens arrangement in the Embodiment 33 at the wide angle end of the zoom lens. FIGS. 132, 133 and 134 respectively show aberration diagrams with respect to the Embodiment 33 at the wide angle end of the zoom lens, an intermediate focal length of the zoom lens and the telescopic end of the zoom lens.

Embodiment 34
$f = 36.0 \sim 102, FNO. = 2.60 \sim 5.83, \omega = 64.1 \sim 23.5$

| i | Ri | Di | j | Nj | νj |
|---|---|---|---|---|---|
| 1 | −61.621 | 1.200 | 1 | 1.83500 | 42.98 |
| 2 | 31.535 | 0.917 | | | |
| 3 | 33.436 | 3.678 | 2 | 1.84666 | 23.83 |
| 4 | 157.237 | variable | | | |
| 5 | 20.207 | 6.041 | 3 | 1.60342 | 38.01 |
| 6 | −237.200 | 0.100 | | | |
| 7 | 23.182 | 5.082 | 4 | 1.56732 | 42.84 |
| 8 | −264.322 | 0.502 | | | |
| 9 | −77.694 | 0.800 | 5 | 1.84666 | 23.83 |
| 10 | 16.218 | 4.193 | 6 | 1.48749 | 70.44 |
| 11 | −56.061 | 1.000 | | | |
| 12 | ∞(diaphragm) | 11.415 | | | |
| 13 | 145.779 | 7.047 | 7 | 1.69895 | 30.05 |
| 14 | −11.730 | 1.000 | 8 | 1.83500 | 42.98 |
| 15 | −58.891 | 4.191 | | | |
| 16 | −13.297 | 1.200 | 9 | 1.75500 | 52.32 |
| 17 | −10497.704 | 3.051 | 10 | 1.84666 | 23.83 |
| 18 | −61.397 | | | | |

Aspherical surfaces
Seventh face
$K = -0.674250, A = -9.292730E-6,$
$B = -3.797490E-8, C = -1.787200E-10,$
$D = 2.988110E-13$
Sixteenth face
$K = -0.157338, A = -1.466430E-5,$
$B = 1.849020E-7, C = -1.543130E-9,$
$D = 1.043310E-11$
Variable amounts

| f | 36.000 | 50.811 | 102.003 |
|---|---|---|---|
| $D_4$ | 26.328 | 11.531 | 0.800 |

Values of conditional formulas
$[f_1 + f_2 \cdot \{2 - (f_1/f(W)) - (f(W)/f_1)\}]/f(T) = 0.358$
$[f_1 + f_2 \cdot \{2 - (f_1/f(T)) - (f(T)/f_1)\}]/f(T) = 0.436$
$|f_2(R)|/f_2(F) = 1.189,$
$f_2(F)/f_2 = 1.234, |f_1|/\sqrt{[f(W) \cdot f(T)]} = 0.844$ Embodiment 35
$f = 36.0 \sim 102, FNO. = 2.61 \sim 5.88, \omega = 64.1 \sim 23.5$

| i | Ri | Di | j | Nj | νj |
|---|---|---|---|---|---|
| 1 | −77.523 | 1.200 | 1 | 1.88300 | 40.80 |
| 2 | 31.489 | 1.047 | | | |
| 3 | 33.625 | 4.798 | 2 | 1.84666 | 23.83 |
| 4 | 190.541 | variable | | | |
| 5 | 19.146 | 7.762 | 3 | 1.61700 | 62.83 |
| 6 | −68285.929 | 0.100 | | | |
| 7 | 24.454 | 3.766 | 4 | 1.59181 | 58.31 |
| 8 | −185.395 | 1.029 | | | |
| 9 | −57.432 | 1.018 | 5 | 1.85030 | 32.18 |
| 10 | 23.155 | 8.052 | 6 | 1.51728 | 69.68 |
| 11 | −27.941 | 1.021 | | | |
| 12 | ∞(diaphragm) | 1.218 | | | |
| 13 | −51.024 | 9.554 | 7 | 1.63636 | 35.34 |
| 14 | −10.613 | 1.000 | 8 | 1.88300 | 40.80 |
| 15 | −47.608 | 7.405 | | | |
| 16 | −13.103 | 1.200 | 9 | 1.75500 | 52.32 |
| 17 | 248.312 | 4.152 | 10 | 1.84666 | 23.83 |
| 18 | −39.790 | | | | |

Aspherical surfaces
Seventh face
$K = -0.846484, A = -1.123220E-5,$
$B = -4.844920E-8, C = -2.694080E-10,$
$D = 2.512570E-13$
Sixteenth face
$K = 0.265859, A = 1.883870E-5,$
$B = 5.649070E-7, C = -7.339580E-9,$
$D = 5.526810E-11$
Variable amounts

| f | 36.001 | 60.600 | 102.003 |
|---|---|---|---|
| $D_4$ | 24.042 | 9.461 | 0.800 |

Values of conditional formulas
$[f_1 + f_2 \cdot \{2 - (f_1/f(W)) - (f(W)/f_1)\}]/f(T) = 0.415$
$[f_1 + f_2 \cdot \{2 - (f_1/f(T)) - (f(T)/f_1)\}]/f(T) = 0.459$
$|f_2(R)|/f_2(F) = 1.204,$
$f_2(F)/f_2 = 1.099, |f_1|/\sqrt{[f(W) \cdot f(T)]} = 0.915$ Embodiment 36
$f = 36.0 \sim 102, FNO. = 2.63 \sim 5.76, \omega = 64.1 \sim 23.5$

| i | Ri | Di | j | Nj | νj |
|---|---|---|---|---|---|
| 1 | −92.491 | 1.200 | 1 | 1.83500 | 42.98 |
| 2 | 32.780 | 2.229 | | | |
| 3 | 36.945 | 3.873 | 2 | 1.84666 | 23.83 |
| 4 | 125.708 | variable | | | |
| 5 | 20.837 | 6.449 | 3 | 1.60342 | 38.01 |
| 6 | −675.014 | 0.100 | | | |
| 7 | 20.323 | 5.929 | 4 | 1.56732 | 42.84 |
| 8 | −316.249 | 0.614 | | | |
| 9 | −77.437 | 0.800 | 5 | 1.84666 | 23.83 |
| 10 | 13.506 | 4.006 | 6 | 1.48749 | 70.44 |
| 11 | −257.928 | 1.640 | | | |
| 12 | ∞(diaphragm) | 7.487 | | | |
| 13 | 66.743 | 5.615 | 7 | 1.69895 | 30.05 |
| 14 | −12.854 | 1.000 | 8 | 1.83500 | 42.98 |
| 15 | −96.787 | 8.929 | | | |
| 16 | −14.214 | 1.200 | 9 | 1.75500 | 52.32 |
| 17 | −232.465 | 3.172 | 10 | 1.84666 | 23.83 |
| 18 | −47.177 | | | | |

Aspherical surfaces
Seventh face
$K = -0.275641, A = -4.139550E-6,$
$B = -9.532950E-9, C = -1.518280E-10,$
$D = 5.091090E-13$
Sixteenth face -continued K = 0.099137, A = 1.172160E-5,
B = 2.328820E-7, C = -2.178070E-9,
D = 1.493420E-11

Variable amounts

| f | 36.003 | 60.600 | 101.943 |
|---|---|---|---|
| $D_4$ | 26.289 | 10.295 | 0.800 |

Values of conditional formulas $[f_1 + f_2 \cdot \{2 - (f_1/f(W)) - (f(W)/f_1)\}]/f(T) = 0.448$
$[f_1 + f_2 \cdot \{2 - (f_1/f(T)) - (f(T)/f_1)\}]/f(T) = 0.472$
$|f_2(R)|/f_2(F) = 1.055$,
$f_2(F)/f_2 = 1.163, |f_1|/\sqrt{[f(W) \cdot f(T)]} = 0.956$ The above Embodiments 34 to 36 relate to the thirteenth lens structure of the present invention.

FIG. 135 shows a lens arrangement in the Embodiment 34 at the wide angle end of the zoom lens. FIGS. 138, 139 and 140 respectively show aberration diagrams with respect to the Embodiment 34 at the wide angle end of the zoom lens, an intermediate focal length of the zoom lens and the telescopic end of the zoom lens.

FIG. 136 shows a lens arrangement in the Embodiment 35 at the wide angle end of the zoom lens. FIGS. 141, 142 and 143 respectively show aberration diagrams with respect to the Embodiment 35 at the wide angle end of the zoom lens, an intermediate focal length of the zoom lens and the telescopic end of the zoom lens.

FIG. 137 shows a lens arrangement in the Embodiment 36 at the wide angle end of the zoom lens. FIGS. 144, 145 and 146 respectively show aberration diagrams with respect to the Embodiment 36 at the wide angle end of the zoom lens, an intermediate focal length of the zoom lens and the telescopic end of the zoom lens.

Embodiment 37

$f = 36.0 \sim 102$, FNO. = $3.92 \sim 5.83$, $\omega = 64.1 \sim 23.5$

| i | Ri | Di | j | Nj | νj |
|---|---|---|---|---|---|
| 1 | -75.610 | 1.000 | 1 | 1.83500 | 42.98 |
| 2 | 36.909 | 1.755 | | | |
| 3 | 40.442 | 4.041 | 2 | 1.84666 | 23.83 |
| 4 | 183.707 | variable | | | |
| 5 | 20.506 | 7.045 | 3 | 1.56138 | 45.23 |
| 6 | -250.205 | 0.800 | | | |
| 7 | 24.543 | 3.773 | 4 | 1.51680 | 64.20 |
| 8 | -116.994 | 0.551 | | | |
| 9 | -58.118 | 1.000 | 5 | 1.85030 | 32.18 |
| 10 | 18.648 | 8.695 | 6 | 1.49700 | 81.61 |
| 11 | -33.248 | variable | | | |
| 12 | ∞(diaphragm) | variable | | | |
| 13 | -56.396 | 6.860 | 7 | 1.78470 | 26.06 |
| 14 | -11.814 | 1.000 | 8 | 1.88300 | 40.80 |
| 15 | -51.477 | 4.970 | | | |
| 16 | -12.778 | 1.000 | 9 | 1.62041 | 60.34 |
| 17 | -39.766 | | | | |

Aspherical surfaces

Seventh face

K = -0.806579, A = -1.114560E-5,
B = -5.087680E-8, C = -1.061220E-10,
D = 1.804690E-13

Sixteenth face

K = -0.551248, A = -7.168390E-6,
B = 7.924650E-9, C = -3.134230E-10,
D = 4.440330E-13

Variable amounts

| f | 35.998 | 60.600 | 101.988 |
|---|---|---|---|
| $D_4$ | 26.796 | 10.485 | 0.800 |
| $D_{11}$ | 1.000 | 5.181 | 12.213 |
| $D_{12}$ | 12.713 | 8.533 | 1.500 |

Values of conditional formulas $[f_1 + f_2 \cdot \{2 - (f_1/f(W)) - (f(W)/f_1)\}]/f(T) = 0.409$
$[f_1 + f_2 \cdot \{2 - (f_1/f(T)) - (f(T)/f_1)\}]/f(T) = 0.409$
$|f_2(R)|/f_2(F) = 0.884$,
$f_2(F)/f_2 = 1.192, |f_1|/\sqrt{[f(W) \cdot f(T)]} = 0.999$ Embodiment 38

$f = 36.0 \sim 102$, FNO. = $3.16 \sim 5.83$, $\omega = 64.1 \sim 23.5$

| i | Ri | Di | j | Nj | νj |
|---|---|---|---|---|---|
| 1 | -66.190 | 1.000 | 1 | 1.83500 | 42.98 |
| 2 | 36.171 | 1.068 | | | |
| 3 | 38.387 | 4.308 | 2 | 1.84666 | 23.83 |
| 4 | 200.503 | variable | | | |
| 5 | 23.013 | 8.716 | 3 | 1.60000 | 42.46 |
| 6 | -41.373 | 0.800 | 4 | 1.85030 | 32.18 |
| 7 | -92.635 | 0.100 | | | |
| 8 | 22.418 | 8.246 | 5 | 1.57309 | 42.59 |
| 9 | -757.015 | 0.614 | | | |
| 10 | -67.261 | 1.000 | 6 | 1.84666 | 23.83 |
| 11 | 15.437 | 3.273 | 7 | 1.49700 | 81.61 |
| 12 | -161.713 | variable | | | |
| 13 | ∞(diaphragm) | variable | | | |
| 14 | 70.147 | 7.673 | 8 | 1.80518 | 25.46 |
| 15 | -12.469 | 1.000 | 9 | 1.88300 | 40.80 |
| 16 | -260.008 | 6.300 | | | |
| 17 | -13.884 | 1.000 | 10 | 1.75500 | 52.32 |
| 18 | -37.510 | | | | |

Aspherical surfaces

Eighth face

K = -0.304235, A = -4.712040E-6,
B = -1.801520E-8, C = -5.923790E-11,
D = 4.836310E-14

Seventeenth face

K = -0.154324, A = 8.720100E-6,
B = 1.506690E-7, C = -1.206140E-9,
D = 7.416100E-12

Variable amounts

| f | 36.000 | 60.600 | 102.003 |
|---|---|---|---|
| $D_4$ | 24.537 | 9.646 | 0.800 |
| $D_{12}$ | 1.000 | 4.125 | 9.384 |
| $D_{13}$ | 9.884 | 6.759 | 1.500 |

Values of conditional formulas $[f_1 + f_2 \cdot \{2 - (f_1/f(W)) - (f(W)/f_1)\}]/f(T) = 0.384$
$[f_1 + f_2 \cdot \{2 - (f_1/f(T)) - (f(T)/f_1)\}]/f(T) = 0.408$
$|f_2(R)|/f_2(F) = 1.557$,
$f_2(F)/f_2 = 1.312, |f_1|/\sqrt{[f(W) \cdot f(T)]} = 0.951$ Embodiment 39

$f = 36.0 \sim 102$, FNO. = $3.32 \sim 5.65$, $\omega = 64.1 \sim 23.5$

| i | Ri | Di | j | Nj | νj |
|---|---|---|---|---|---|
| 1 | -60.334 | 1.000 | 1 | 1.83500 | 42.98 |
| 2 | 33.780 | 0.925 | | | |
| 3 | 35.581 | 3.947 | 2 | 1.84666 | 23.83 |
| 4 | 185.325 | variable | | | |
| 5 | 23.093 | 8.677 | 3 | 1.60342 | 38.01 |
| 6 | -174.678 | 0.100 | | | |
| 7 | 24.442 | 6.488 | 4 | 1.60562 | 43.88 |
| 8 | -32.306 | 0.800 | 5 | 1.80740 | 35.54 |
| 9 | -235.039 | 0.321 | | | |
| 10 | -101.312 | 1.000 | 6 | 1.84666 | 23.83 |
| 11 | 16.974 | 3.759 | 7 | 1.49700 | 81.61 |
| 12 | -63.284 | variable | | | |
| 13 | ∞(diaphragm) | variable | | | |
| 14 | 124.161 | 7.988 | 8 | 1.80518 | 25.46 |
| 15 | -12.663 | 1.000 | 9 | 1.88300 | 40.80 |
| 16 | -105.217 | 5.187 | | | |
| 17 | -14.086 | 1.000 | 10 | 1.75500 | 52.32 |
| 18 | -52.578 | | | | |

Aspherical surfaces

Seventh face

K = -0.352659, A = -5.953150E-6,
B = -2.050360E-8, C = -2.901880E-11,
D = -2.548950E-14

Seventeenth face

K = -0.288490, A = 8.654120E-6,
B = 8.796030E-8, C = -5.115910E-10,
D = 3.171100E-12

Variable amounts

| f | 35.999 | 60.600 | 101.995 |
|---|---|---|---|
| $D_4$ | 21.172 | 8.391 | 0.800 |
| $D_{12}$ | 1.000 | 4.108 | 12.020 |
| $D_{13}$ | 12.520 | 9.412 | 1.500 |

Values of conditional formulas $[f_1 + f_2 \cdot \{2 - (f_1/f(W)) - (f(W)/f_1)\}]/f(T) = 0.348$
$[f_1 + f_2 \cdot \{2 - (f_1/f(T)) - (f(T)/f_1)\}]/f(T) = 0.408$ -continued

|f$_2$(R)|/f$_2$(F) = 1.283,
f$_2$(F)/f$_2$ = 1.337, |f$_1$|/ $\sqrt{}$ [f(W) · f(T)] = 0.877

Embodiment 40
f = 36.0~102, FNO. = 3.50~5.82, ω = 64.1~23.5

| i | Ri | Di | j | Nj | νj |
|---|---|---|---|---|---|
| 1 | −61.621 | 1.200 | 1 | 1.83500 | 42.98 |
| 2 | 31.535 | 0.917 | | | |
| 3 | 33.436 | 3.678 | 2 | 1.84666 | 23.83 |
| 4 | 157.237 | variable | | | |
| 5 | 20.207 | 6.041 | 3 | 1.60342 | 38.01 |
| 6 | −237.200 | 0.100 | | | |
| 7 | 23.182 | 5.082 | 4 | 1.56732 | 42.84 |
| 8 | −264.322 | 0.502 | | | |
| 9 | −77.694 | 0.800 | 5 | 1.84666 | 23.83 |
| 10 | 16.218 | 4.193 | 6 | 1.48749 | 70.44 |
| 11 | −56.061 | variable | | | |
| 12 | ∞(diaphragm) | variable | | | |
| 13 | 145.779 | 7.047 | 7 | 1.69895 | 30.05 |
| 14 | −11.730 | 1.000 | 8 | 1.83500 | 42.98 |
| 15 | −58.891 | 4.191 | | | |
| 16 | −13.297 | 1.200 | 9 | 1.75500 | 52.32 |
| 17 | −10497.704 | 3.051 | 10 | 1.84666 | 23.83 |
| 18 | −61.397 | | | | |

Aspherical surfaces
Seventh face
K = −0.674250, A = −9.292730E-6,
B = −3.797490E-8, C = −1.787200E-10,
D = 2.988110E-13
Sixteenth face
K = −0.157338, A = 1.466430E-5,
B = 1.849020E-7, C = −1.543130E-9,
D = 1.043310E-11

Variable amounts

| f | 36.000 | 50.811 | 102.003 |
|---|---|---|---|
| D$_4$ | 20.328 | 11.531 | 0.800 |
| D$_{11}$ | 1.000 | 2.225 | 10.915 |
| D$_{12}$ | 11.415 | 10.190 | 1.500 |

Values of conditional formulas
[f$_1$ + f$_2$ · {2 − (f$_1$/f(W)) − (f(W)/f$_1$)}]/f(T) = 0.358
[f$_1$ + f$_2$ · {2 − (f$_1$/f(T)) − (f(T)/f$_1$)}]/f(T) = 0.436
|f$_2$(R)|/f$_2$(F) = 1.189,
f$_2$(F)/f$_2$ = 1.234, |f$_1$|/ $\sqrt{}$ [f(W) · f(T)] = 0.844

The above Embodiments 37 to 40 relate to the fourteenth lens structure of the present invention.

FIG. 147 shows a lens arrangement in the Embodiment 37 at the wide angle end of the zoom lens. FIGS. 151, 152 and 153 respectively show aberration diagrams with respect to the Embodiment 37 at the wide angle end of the zoom lens, an intermediate focal length of the zoom lens and the telescopic end of the zoom lens. The above Embodiment 37 also relates to the fifteenth lens structure of the present invention.

FIG. 148 shows a lens arrangement in the Embodiment 38 at the wide angle end of the zoom lens. FIGS. 154, 155 and 156 respectively show aberration diagrams with respect to the Embodiment 38 at the wide angle end of the zoom lens, an intermediate focal length of the zoom lens and the telescopic end of the zoom lens. The above Embodiment 38 also relates to the sixteenth lens structure of the present invention.

FIG. 149 shows a lens arrangement in the Embodiment 39 at the wide angle end of the zoom lens. FIGS. 157, 158 and 159 respectively show aberration diagrams with respect to the Embodiment 39 at the wide angle end of the zoom lens, an intermediate focal length of the zoom lens and the telescopic end of the zoom lens. The above Embodiment 39 also relates to the seventeenth lens structure of the present invention.

FIG. 150 shows a lens arrangement in the Embodiment 40 at the wide angle end of the zoom lens. FIGS. 160, 161 and 162 respectively show aberration diagrams with respect to the Embodiment 40 at the wide angle end of the zoom lens, an intermediate focal length of the zoom lens and the telescopic end of the zoom lens. The above Embodiment 40 also relates to the eighteenth lens structure of the present invention.

Embodiment 41
f = 36.5~102, FNO. = 2.89~5.9, ω = 63.3~23.6

| i | Ri | Di | j | Nj | νj |
|---|---|---|---|---|---|
| 1 | −82.478 | 1.221 | 1 | 1.83400 | 37.34 |
| 2 | 28.647 | 0.871 | | | |
| 3 | 30.543 | 4.510 | 2 | 1.84666 | 23.83 |
| 4 | 181.540 | variable | | | |
| 5 | 19.466 | 7.648 | 3 | 1.51823 | 58.96 |
| 6 | −93.610 | 1.537 | | | |
| 7 | ∞(diaphragm) | 0.800 | | | |
| 8 | 26.409 | 4.253 | 4 | 1.54814 | 45.82 |
| 9 | −29.127 | 0.990 | 5 | 1.84666 | 23.83 |
| 10 | 56.893 | 3.949 | | | |
| 11 | ∞(diaphragm) | variable | | | |
| 12 | 75.006 | 7.593 | 6 | 1.69895 | 30.05 |
| 13 | −13.437 | 1.326 | 7 | 1.83300 | 40.80 |
| 14 | −163.240 | 6.368 | | | |
| 15 | −11.992 | 0.944 | 9 | 1.49700 | 81.61 |
| 16 | −35.711 | | | | |

Aspherical surfaces
Eighth face
K = −1.068895, A = −7.529721E-6,
B = −7.581887E-8, C = 1.848291E-10,
D = −4.184132E-12
Fifteenth face
K = −0.720314, A = −2.032129E-5,
B = 3.981674E-8, C = −1.029337E-9,
D = 3.613058E-12

Variable amounts

| f | 36.502 | 61.005 | 102.010 |
|---|---|---|---|
| D$_4$ | 29.183 | 11.321 | 0.624 |
| D$_{11}$ | 12.653 | 12.453 | 12.653 |

Values of conditional formulas
[f$_1$ + f$_2$ · {2 − (f$_1$/f(W)) − (f(W)/f$_1$)}]/f(T) = 0.440
[f$_1$ + f$_2$ · {2 − (f$_1$/f(T)) − (f(T)/f$_1$)}]/f(T) = 0.411
|f$_2$(R)|/f$_2$(F) = 1.290,
f$_2$(F)/f$_2$ = 1.255, |f$_1$|/ $\sqrt{}$ [f(W) · f(T)] = 1.055

Embodiment 42
f = 36.5~102, FNO. = 2.86~5.9, ω = 63.3~23.6

| i | Ri | Di | j | Nj | νj |
|---|---|---|---|---|---|
| 1 | −85.106 | 0.800 | 1 | 1.88300 | 40.80 |
| 2 | 35.156 | 1.538 | | | |
| 3 | 38.289 | 3.528 | 2 | 1.84666 | 23.83 |
| 4 | 218.963 | variable | | | |
| 5 | 19.131 | 8.962 | 3 | 1.51742 | 52.15 |
| 6 | −110.215 | 1.351 | | | |
| 7 | ∞(diaphragm) | 0.800 | | | |
| 8 | 25.705 | 5.581 | 4 | 1.56965 | 49.39 |
| 9 | −25.120 | 0.800 | 5 | 1.84666 | 23.83 |
| 10 | 47.428 | 3.919 | | | |
| 11 | ∞(diaphragm) | variable | | | |
| 12 | 56.689 | 7.728 | 6 | 1.72825 | 28.32 |
| 13 | −14.124 | 0.800 | 7 | 1.88300 | 40.80 |
| 14 | −545.329 | 6.809 | | | |
| 15 | −12.528 | 0.800 | 9 | 1.51728 | 69.68 |
| 16 | −35.185 | | | | |

Aspherical surfaces
Eighth face
K = −1.086781, A = −7.694750E-6,
B = −7.990350E-8, C = −1.269480E-10,
D = −3.567750E-12
Fifteenth face
K = −0.718346, A = −2.065820E-5,
B = 2.539640E-8, C = −7.606460E-10,
D = 2.968370E-12

Variable amounts

| f | 36.5 | 61.156 | 102.0 |
|---|---|---|---|
| D$_4$ | 27.651 | 10.857 | 0.800 |
| D$_{11}$ | 11.932 | 11.832 | 11.932 |

Values of conditional formulas
[f$_1$ + f$_2$ · {2 − (f$_1$/f(W)) − (f(W)/f$_1$)}]/f(T) = 0.447
[f$_1$ + f$_2$ · {2 − (f$_1$/f(T)) − (f(T)/f$_1$)}]/f(T) = 0.446
|f$_2$(R)|/f$_2$(F) = 1.553, -continued $f_2(F)/f_2 = 1.289, |f_1|/\sqrt{[f(W) \cdot f(T)]} = 1.001$

Embodiment 43

$f = 36.5 \sim 102, FNO. = 2.91 \sim 5.9, \omega = 63.3 \sim 23.5$

| i | Ri | Di | j | Nj | νj |
|---|---|---|---|---|---|
| 1 | −79.300 | 0.800 | 1 | 1.88300 | 40.80 |
| 2 | 30.882 | 0.804 | | | |
| 3 | 32.072 | 4.692 | 2 | 1.76182 | 26.55 |
| 4 | 8312.033 | variable | | | |
| 5 | 19.371 | 5.138 | 3 | 1.51823 | 58.96 |
| 6 | −110.256 | 1.657 | | | |
| 7 | ∞(diaphragm) | 0.800 | | | |
| 8 | 27.310 | 3.557 | 4 | 1.51602 | 56.77 |
| 9 | −38.223 | 0.800 | 5 | 1.84666 | 23.83 |
| 10 | 81.350 | 4.431 | | | |
| 11 | ∞(diaphragm) | variable | | | |
| 12 | 175.268 | 6.711 | 6 | 1.69895 | 30.05 |
| 13 | −11.845 | 0.800 | 7 | 1.88300 | 40.80 |
| 14 | −93.359 | 6.106 | | | |
| 15 | −10.865 | 0.800 | 9 | 1.49700 | 81.61 |
| 16 | −29.498 | | | | |

Aspherical surfaces

Eighth face $K = -1.100163, A = -7.715040E-6,$
$B = -7.482230E-8, C = 2.277150E-10,$
$D = -3.216280E-12$ Fifteenth face $K = -0.683131, A = -2.921990E-5,$
$B = 9.162650E-8, C = -2.548350E-9,$
$D = 8.628930E-12$ Variable amounts

| f | 36.501 | 61.30 | 102.009 |
|---|---|---|---|
| $D_4$ | 30.306 | 11.851 | 0.800 |
| $D_{11}$ | 12.226 | 12.126 | 12.226 |

Values of conditional formulas $[f_1 + f_2 \cdot \{2 - (f_1/f(W)) - (f(W)/f_1)\}]/f(T) = 0.457$
$[f_1 + f_2 \cdot \{2 - (f_1/f(T)) - (f(T)/f_1)\}]/f(T) = 0.421$
$|f_2(R)|/f_2(F) = 1.090,$
$f_2(F)/f_2 = 1.172, |f_1|/\sqrt{[f(W) \cdot f(T)]} = 1.069$

Embodiment 44

$f = 36.5 \sim 102, FNO. = 2.9 \sim 5.9, \omega = 63.5 \sim 23.6$

| i | Ri | Di | j | Nj | νj |
|---|---|---|---|---|---|
| 1 | −85.138 | 0.887 | 1 | 1.83400 | 37.34 |
| 2 | 28.026 | 0.853 | | | |
| 3 | 29.944 | 4.583 | 2 | 1.84666 | 23.83 |
| 4 | 169.050 | variable | | | |
| 5 | 18.918 | 6.622 | 3 | 1.48749 | 70.44 |
| 6 | −87.225 | 2.089 | | | |
| 7 | ∞(diaphragm) | 0.800 | | | |
| 8 | 25.961 | 3.318 | 4 | 1.54814 | 45.82 |
| 9 | −49.591 | 0.138 | | | |
| 10 | −41.883 | 0.800 | 5 | 1.84666 | 23.83 |
| 11 | 59.536 | 5.669 | | | |
| 12 | ∞(diaphragm) | variable | | | |
| 13 | 137.981 | 7.042 | 6 | 1.68893 | 31.16 |
| 14 | −13.085 | 2.279 | 7 | 1.88300 | 40.80 |
| 15 | −84.900 | 7.786 | | | |
| 16 | −12.568 | 0.800 | 9 | 1.49700 | 81.61 |
| 17 | −36.562 | | | | |

Aspherical surfaces

Eighth face $K = -1.182221, A = -7.870754E-6,$
$B = -7.371219E-8, C = 8.003773E-11,$
$D = -4.319129E-12$ Sixteenth face $K = -0.730490, A = -1.862161E-5,$
$B = 8.064080E-8, C = -1.216524E-9,$
$D = 3.255338E-12$ Variable amounts

| f | 36.499 | 61.424 | 101.996 |
|---|---|---|---|
| $D_4$ | 29.385 | 11.372 | 0.585 |
| $D_{12}$ | 10.795 | 10.595 | 10.795 |

Values of conditional formulas $[f_1 + f_2 \cdot \{2 - (f_1/f(W)) - (f(W)/f_1)\}]/f(T) = 0.460$
$[f_1 + f_2 \cdot \{2 - (f_1/f(T)) - (f(T)/f_1)\}]/f(T) = 0.435$
$|f_2(R)|/f_2(F) = 1.298,$
$f_2(F)/f_2 = 1.227, |f_1|/\sqrt{[f(W) \cdot f(T)]} = 1.047$

Embodiment 45

$f = 36.5 \sim 102, FNO. = 2.85 \sim 5.89, \omega = 63.4 \sim 23.6$

| i | Ri | Di | j | Nj | νj |
|---|---|---|---|---|---|
| 1 | −83.270 | 0.800 | 1 | 1.88300 | 40.80 |
| 2 | 35.360 | 1.583 | | | |
| 3 | 38.701 | 3.520 | 2 | 1.84666 | 23.83 |
| 4 | 238.279 | variable | | | |
| 5 | 19.134 | 8.212 | 3 | 1.50378 | 66.89 |
| 6 | −144.780 | 1.709 | | | |
| 7 | ∞(diaphragm) | 0.800 | | | |
| 8 | 27.612 | 5.993 | 4 | 1.54072 | 47.20 |
| 9 | −30.027 | 0.100 | | | |
| 10 | −29.479 | 0.800 | 5 | 1.84666 | 23.83 |
| 11 | 70.640 | 3.433 | | | |
| 12 | ∞(diaphragm) | variable | | | |
| 13 | 61.406 | 7.707 | 6 | 1.69895 | 30.05 |
| 14 | −14.007 | 0.800 | 7 | 1.88300 | 40.80 |
| 15 | −206.074 | 6.418 | | | |
| 16 | −12.759 | 0.800 | 9 | 1.49700 | 81.61 |
| 17 | −41.783 | | | | |

Aspherical surfaces

Eighth face $K = -1.403890, A = -9.278020E-6,$
$B = -8.577710E-8, C = 9.345540E-11,$
$D = -2.707970E-12$ Sixteenth face $K = -0.736120, A = -1.815330E-5,$
$B = 1.581560E-8, C = -5.265050E-10,$
$D = 2.489460E-12$ Variable amounts

| f | 36.5 | 61.356 | 101.996 |
|---|---|---|---|
| $D_4$ | 27.625 | 10.847 | 0.800 |
| $D_{12}$ | 12.701 | 12.501 | 12.701 |

Values of conditional formulas $[f_1 + f_2 \cdot \{2 - (f_1/f(W)) - (f(W)/f_1)\}]/f(T) = 0.443$
$[f_1 + f_2 \cdot \{2 - (f_1/f(T)) - (f(T)/f_1)\}]/f(T) = 0.441$
$|f_2(R)|/f_2(F) = 1.423,$
$f_2(F)/f_2 = 1.286, |f_1|/\sqrt{[f(W) \cdot f(T)]} = 1.004$

Embodiment 46

$f = 36.5 \sim 102, FNO. = 2.9 \sim 5.9, \omega = 63.4 \sim 23.5$

| i | Ri | Di | j | Nj | νj |
|---|---|---|---|---|---|
| 1 | −83.380 | 0.800 | 1 | 1.88300 | 40.80 |
| 2 | 33.027 | 1.073 | | | |
| 3 | 34.906 | 4.360 | 2 | 1.78472 | 25.70 |
| 4 | 647.228 | variable | | | |
| 5 | 19.178 | 6.721 | 3 | 1.51680 | 64.20 |
| 6 | −187.184 | 1.664 | | | |
| 7 | ∞(diaphragm) | 0.800 | | | |
| 8 | 30.373 | 3.563 | 4 | 1.51742 | 52.15 |
| 9 | −31.353 | 0.100 | | | |
| 10 | −32.321 | 0.800 | 5 | 1.84666 | 23.83 |
| 11 | 152.357 | 6.000 | | | |
| 12 | ∞(diaphragm) | variable | | | |
| 13 | 276.854 | 7.042 | 6 | 1.69895 | 30.05 |
| 14 | −11.945 | 0.800 | 7 | 1.88300 | 40.80 |
| 15 | −86.726 | 6.101 | | | |
| 16 | −11.369 | 0.800 | 9 | 1.49700 | 81.61 |
| 17 | −31.513 | | | | |

Aspherical surfaces

Eighth face $K = -1.601750, A = -9.927140E-6,$
$B = -8.102590E-8, C = 1.170720E-10,$
$D = -2.498730E-12$ Sixteenth face $K = -0.709399, A = -2.297340E-5,$
$B = 5.850550E-8, C = -1.521790E-9,$
$D = 6.285460E-12$ Variable amounts

| f | 36.504 | 61.617 | 107.032 |
|---|---|---|---|
| $D_4$ | 30.402 | 11.879 | 0.800 |
| $D_{12}$ | 11.287 | 11.087 | 11.287 |

Values of conditional formulas $[f_1 + f_2 \cdot \{2 - (f_1/f(W)) - (f(W)/f_1)\}]/f(T) = 0.454$
$[f_1 + f_2 \cdot \{2 - (f_1/f(T)) - (f(T)/f_1)\}]/f(T) = 0.416$
$|f_2(R)|/f_2(F) = 1.072,$
$f_2(F)/f_2 = 1.193, |f_1|/\sqrt{[f(W) \cdot f(T)]} = 1.073$ The above Embodiments 41 to 46 relate to the nineteenth lens structure of the present invention.

FIG. 163 shows a lens arrangement in the Embodiment 41 at the wide angle end of the zoom lens. FIGS. 169, 170 and 171 respectively show aberration diagrams with respect to the Embodiment 41 at the wide angle end of the zoom lens, an intermediate focal length of the zoom lens and the telescopic end of the zoom lens.

FIG. 164 shows a lens arrangement in the Embodiment 42 at the wide angle end of the zoom lens. FIGS. 172, 173 and 174 respectively show aberration diagrams with respect to the Embodiment 42 at the wide angle end of the zoom lens, an intermediate focal length of the zoom lens and the telescopic end of the zoom lens.

FIG. 165 shows a lens arrangement in the Embodiment 43 at the wide angle end of the zoom lens. FIGS. 175, 176 and 177 respectively show aberration diagrams with respect to the Embodiment 43 at the wide angle end of the zoom lens, an intermediate focal length of the zoom lens and the telescopic end of the zoom lens.

FIG. 166 shows a lens arrangement in the Embodiment 44 at the wide angle end of the zoom lens. FIGS. 178, 179 and 180 respectively show aberration diagrams with respect to the Embodiment 44 at the wide angle end of the zoom lens, an intermediate focal length of the zoom lens and the telescopic end of the zoom lens.

FIG. 167 shows a lens arrangement in the Embodiment 45 at the wide angle end of the zoom lens. FIGS. 181, 182 and 183 respectively show aberration diagrams with respect to the Embodiment 45 at the wide angle end of the zoom lens, an intermediate focal length of the zoom lens and the telescopic end of the zoom lens.

FIG. 168 shows a lens arrangement in the Embodiment 46 at the wide angle end of the zoom lens. FIGS. 184, 185 and 186 respectively show aberration diagrams with respect to the Embodiment 46 at the wide angle end of the zoom lens, an intermediate focal length of the zoom lens and the telescopic end of the zoom lens.

Embodiment 47

$f = 36.5 \sim 102$, FNO. $= 2.90 \sim 5.9$, $\omega = 63.4 \sim 23.5$

| i | Ri | Di | j | Nj | vj |
|---|---|---|---|---|---|
| 1 | −83.380 | 0.800 | 1 | 1.88300 | 40.80 |
| 2 | 33.027 | 1.073 | | | |
| 3 | 34.906 | 4.360 | 2 | 1.78472 | 25.70 |
| 4 | 647.228 | variable | | | |
| 5 | 19.178 | 6.721 | 3 | 1.51680 | 64.20 |
| 6 | −187.184 | 1.664 | | | |
| 7 | ∞(diaphragm) | 0.800 | | | |
| 8 | 30.373 | 3.563 | 4 | 1.51742 | 52.15 |
| 9 | −31.353 | 0.100 | | | |
| 10 | −32.321 | 0.800 | 5 | 1.84666 | 23.83 |
| 11 | 152.357 | variable | | | |
| 12 | ∞(diaphragm) | variable | | | |
| 13 | 276.854 | 7.042 | 6 | 1.69895 | 30.05 |
| 14 | −11.945 | 0.800 | 7 | 1.88300 | 40.80 |
| 15 | −86.726 | 6.101 | | | |
| 16 | −11.369 | 0.800 | 9 | 1.49700 | 81.61 |
| 17 | −31.513 | | | | |

Aspherical surfaces

Eighth face $K = -1.601750$, $A = -9.927140E-6$,
$B = -8.102590E-8$, $C = 1.170720E-10$,
$D = -2.498730E-12$ Sixteenth face $K = -0.709399$, $A = -2.297340E-5$,
$B = 5.850550E-8$, $C = -1.521790E-9$,
$D = 6.285460E-12$ Variable amounts

| f | 36.504 | 61.030 | 102.032 |
|---|---|---|---|
| $D_4$ | 30.402 | 11.879 | 0.800 |
| $D_{11}$ | 6.000 | 16.287 | 16.287 |
| $D_{12}$ | 11.287 | 1.000 | 1.000 |

Values of conditional formulas $[f_1 + f_2 \cdot \{2 - (f_1/f(W)) - (f(W)/f_1)\}]/f(T) = 0.454$
$[f_1 + f_2 \cdot \{2 - (f_1/f(T)) - (f(T)/f_1)\}]/f(T) = 0.416$
$|f_2(R)|/f_2(F) = 1.072$, $f_2(F)/f_2 = 1.193$,
$|f_1|/\sqrt{[f(W) \cdot f(T)]} = 1.073$

Embodiment 48

$f = 61.6$, FNO. $= 4.06$, $\omega = 37.8$

| i | Ri | Di | j | Nj | vj |
|---|---|---|---|---|---|
| 1 | −83.380 | 0.800 | 1 | 1.88300 | 40.80 |
| 2 | 33.027 | 1.073 | | | |
| 3 | 34.906 | 4.360 | 2 | 1.78472 | 25.70 |
| 4 | 647.228 | variable | | | |
| 5 | 19.178 | 6.721 | 3 | 1.51680 | 64.20 |
| 6 | −187.184 | 1.664 | | | |
| 7 | ∞(diaphragm) | 0.800 | | | |
| 8 | 30.373 | 3.563 | 4 | 1.51742 | 52.15 |
| 9 | −31.353 | 0.100 | | | |
| 10 | −32.321 | 0.800 | 5 | 1.84666 | 23.83 |
| 11 | 152.357 | variable | | | |
| 12 | ∞(diaphragm) | variable | | | |
| 13 | 276.854 | 7.042 | 6 | 1.69895 | 30.05 |
| 14 | −11.945 | 0.800 | 7 | 1.88300 | 40.80 |
| 15 | −86.726 | 6.101 | | | |
| 16 | −11.369 | 0.800 | 9 | 1.49700 | 81.61 |
| 17 | −31.513 | | | | |

Aspherical surfaces

Eighth face $K = -1.601750$, $A = -9.927140E-6$,
$B = -8.102590E-8$, $C = 1.170720E-10$,
$D = -2.498730E-12$ Sixteenth face $K = -0.709399$, $A = -2.297340E-5$,
$B = 5.850550E-8$, $C = -1.521790E-9$,
$D = 6.285460E-12$ Variable amounts

| f | 61.617 |
|---|---|
| $D_4$ | 11.879 |
| $D_{11}$ | 16.087 |
| $D_{12}$ | 1.000 |

Values of conditional formulas $[f_1 + f_2 \cdot \{2 - (f_1/f(W)) - (f(W)/f_1)\}]/f(T) = 0.454$
$[f_1 + f_2 \cdot \{2 - (f_1/f(T)) - (f(T)/f_1)\}]/f(T) = 0.416$
$|f_2(R)|/f_2(F) = 1.072$, $f_2(F)/f_2 = 1.193$,
$|f_1|/\sqrt{[f(W) \cdot f(T)]} = 1.073$ The above Embodiments 47 and 48 relate to the twentieth lens structure of the present invention. Concretely, in the Embodiment 47, the front and rear lens groups in the second lens group are fixedly disposed and a second diaphragm is moved in the lens structure of the above Embodiment 46. In the Embodiment 48, the second diaphragm is moved in the lens structure of the Embodiment 46.

FIG. 187 shows an aberration diagram at an intermediate focal length of the zoom lens in the Embodiment 47. FIG. 188 shows an aberration diagram at the telescopic end of the zoom lens in the Embodiment 47.

FIG. 189 shows an aberration diagram at an intermediate focal length of the zoom lens in the Embodiment 48.

FIGS. 190 to 195 respectively show comparative aberration diagrams with respect to the Embodiments 41 to 46. Namely, FIGS. 190 to 195 respectively correspond to the Embodiments 41 to 46. FIGS. 190 to 195 respectively show aberrations in the lens structures of the Embodiments 41 to 46 at an intermediate focal length of the zoom lens when the zooming operation is integrally performed by the front and rear lens groups in the second lens group. When FIGS. 190 to 195 are respectively compared with the corresponding aberration diagrams of FIGS. 41 to 46, it is clearly understood that the aberrations in the lens structures of the Embodiments 41 to 46 are improved in comparison with a case in which the front and rear lens groups are integrally displaced by changing the distance between the front and rear lens groups of the second lens group in the zooming operation of the zoom lens.

Embodiment 49
f = 36.0~102, FNO. = 2.61~5.83, ω = 64.1~23.5

| i | Ri | Di | j | Nj | νj |
|---|---|---|---|---|---|
| 1 | −79.579 | 1.000 | 1 | 1.83500 | 42.98 |
| 2 | 36.942 | 2.235 | | | |
| 3 | 41.644 | 4.062 | 2 | 1.84666 | 23.83 |
| 4 | 178.771 | variable | | | |
| 5 | 18.505 | 8.169 | 3 | 1.56873 | 63.10 |
| 6 | −3634.191 | 0.801 | | | |
| 7 | 21.171 | 3.948 | 4 | 1.51728 | 69.68 |
| 8 | −298.584 | 0.613 | | | |
| 9 | −72.611 | 1.764 | 5 | 1.87800 | 38.20 |
| 10 | 13.173 | 7.160 | 6 | 1.48749 | 70.44 |
| 11 | −13.964 | 1.000 | | | |
| 12 | ∞(diaphragm) | variable | | | |
| 13 | −36.430 | 3.510 | 7 | 1.84666 | 23.83 |
| 14 | −17.118 | 1.400 | | | |
| 15 | −16.109 | 1.000 | 8 | 1.75500 | 52.32 |
| 16 | −43.667 | 4.701 | | | |
| 17 | −14.418 | 1.000 | 9 | 1.75500 | 52.32 |
| 18 | −35.916 | | | | |

Aspherical surfaces
Seventh face
K = −0.841420, A = −1.144740E-5,
B = −7.672070E-8, C = −2.375020E-10,
D = 2.531780E-13
Seventeenth face
K = −0.553246, A = −6.534560E-6,
B = 8.005760E-9, C = −2.753670E-10,
D = 4.413500E-13
Variable amounts

| | f | 36.001 | 62.001 | 102.002 |
|---|---|---|---|---|
| | $D_4$ | 27.281 | 10.119 | 0.800 |
| ∞ | $D_{12}$ | 13.355 | 13.355 | 13.355 |
| 1.0m | $D_{12}$ | 15.834 | 16.092 | 16.738 |

Values of conditional formulas
$[f_1 + f_2 \cdot \{2 - (f_1/f(W)) - (f(W)/f_1)\}]/f(T) = 0.425$
$[f_1 + f_2 \cdot \{2 - (f_1/f(T)) - (f(T)/f_1)\}]/f(T) = 0.425$
$|f_2(R)|/f_2(F) = 1.030$, $f_2(F)/f_2 = 1.231$,
$|f_1|/\sqrt{[f(W) \cdot f(T)]} = 1.000$
$m_2(RW) = 1.281$ Embodiment 50
f = 36.0~102, FNO. = 3.82~5.83, ω = 64.1~23.5

| i | Ri | Di | j | Nj | νj |
|---|---|---|---|---|---|
| 1 | −76.723 | 1.000 | 1 | 1.83500 | 42.98 |
| 2 | 37.775 | 1.804 | | | |
| 3 | 41.790 | 3.982 | 2 | 1.84666 | 23.83 |
| 4 | 185.630 | variable | | | |
| 5 | 18.345 | 7.673 | 3 | 1.56883 | 56.04 |
| 6 | 699.823 | 0.800 | | | |
| 7 | 21.379 | 3.962 | 4 | 1.51728 | 69.68 |
| 8 | −126.917 | 0.446 | | | |
| 9 | −67.099 | 1.000 | 5 | 1.87800 | 38.20 |
| 10 | 13.329 | 7.307 | 6 | 1.48749 | 70.44 |
| 11 | −32.298 | variable | | | |
| 12 | ∞(diaphragm) | variable | | | |
| 13 | −35.181 | 5.687 | 7 | 1.78470 | 26.06 |
| 14 | −14.618 | 1.000 | 8 | 1.52300 | 60.40 |
| 15 | −29.093 | 4.796 | | | |
| 16 | −12.870 | 1.000 | 9 | 1.84750 | 43.03 |
| 17 | −51.522 | | | | |

Aspherical surfaces
Seventh face
K = −0.861691, A = −1.181800E-5,
B = −5.935980E-8, C = −3.334560E-10,
D = 1.052620E-12
Sixteenth face
K = −0.614002, A = −7.001330E-6,
B = −8.172220E-9, C = −2.511720E-10,
D = 3.695480E-13
Variable amounts

| | f | 36.001 | 62.001 | 102.003 |
|---|---|---|---|---|
| | $D_4$ | 26.728 | 9.924 | 0.800 |
| ∞ | $D_{12}$ | 14.360 | 7.916 | 2.000 |
| 1.0m | $D_{12}$ | 17.277 | 10.872 | 5.573 |

Values of conditional formulas
$[f_1 + f_2 \cdot \{2 - (f_1/f(W)) - (f(W)/f_1)\}]/f(T) = 0.404$
$[f_1 + f_2 \cdot \{2 - (f_1/f(T)) - (f(T)/f_1)\}]/f(T) = 0.404$
$|f_2(R)|/f_2(F) = 1.021$, $f_2(F)/f_2 = 1.263$,
$|f_1|/\sqrt{[f(W) \cdot f(T)]} = 1.000$
$m_2(RW) = 1.253$ Embodiment 51
f = 36.0~102, FNO. = 2.59~5.83, ω = 64.6~23.4

| i | Ri | Di | j | Nj | νj |
|---|---|---|---|---|---|
| 1 | −62.449 | 1.000 | 1 | 1.88300 | 40.80 |
| 2 | 39.714 | 0.844 | | | |
| 3 | 41.598 | 4.890 | 2 | 1.84666 | 23.83 |
| 4 | 1048.754 | variable | | | |
| 5 | 20.355 | 8.725 | 3 | 1.51728 | 69.68 |
| 6 | −131.935 | 0.800 | | | |
| 7 | 22.740 | 3.957 | 4 | 1.49700 | 81.61 |
| 8 | −74.614 | 0.632 | | | |
| 9 | −42.562 | 1.000 | 5 | 1.87800 | 38.20 |
| 10 | 18.870 | 10.282 | 6 | 1.48749 | 70.44 |
| 11 | −21.821 | variable | | | |
| 12 | ∞(diaphragm) | variable | | | |
| 13 | −129.987 | 3.496 | 7 | 1.84666 | 23.83 |
| 14 | −18.338 | 0.100 | | | |
| 15 | −21.509 | 1.000 | 8 | 1.88300 | 40.80 |
| 16 | −1737.540 | 6.969 | | | |
| 17 | −10.739 | 1.000 | 9 | 1.75500 | 52.30 |
| 18 | −31.080 | | | | |

Aspherical surfaces
Fifth face
K = 0.029427, A = 3.401320E-6,
B = 4.986230E-9, C = −1.303190E-11,
D = −1.927200E-15
Seventh face
K = −1.311644, A = −1.798800E-5,
B = −8.672390E-8, C = −6.906760E-10,
D = 2.391230E-12
Seventeenth face
K = −0.237038, A = 3.817170E-6,
B = 1.463820E-7, C = −1.666070E-9,
D = 8.337830E-12
Variable amounts

| | F | 36.000 | 61.999 | 101.997 |
|---|---|---|---|---|
| | $D_4$ | 26.716 | 9.920 | 0.800 |
| | $D_{11}$ | 1.000 | 7.000 | 8.816 |
| ∞ | $D_{12}$ | 8.816 | 2.816 | 1.000 |
| 1.0m | $D_{12}$ | 10.115 | 4.417 | 2.999 |

Values of conditional formulas
$[f_1 + f_2 \cdot \{2 - (f_1/f(W)) - (f(W)/f_1)\}]/f(T) = 0.385$
$[f_1 + f_2 \cdot \{2 - (f_1/f(T)) - (f(T)/f_1)\}]/f(T) = 0.378$
$|f_2(R)|/f_2(F) = 0.757$, $f_2(F)/f_2 = 1.215$,
$|f_1|/\sqrt{[f(W) \cdot f(T)]} = 1.014$
$m_2(RW) = 1.460$ The above Embodiments 49 to 51 relate to the twenty-first and twenty-second lens structures of the present invention.

FIG. 196 shows a lens arrangement in the Embodiment 49 at the wide angle end of the zoom lens. FIGS. 199, 200 and 201 respectively show aberration diagrams with respect to the Embodiment 49 at the wide angle end of the zoom lens, an intermediate focal length of the zoom lens and the telescopic end of the zoom lens when the distance from the zoom lens to a photographed object is infinite. FIGS. 202, 203 and 204 respectively show aberration diagrams with respect to the Embodiment 49 at the wide angle end of the zoom lens, an intermediate focal length of the zoom lens and the telescopic end of the zoom lens when the distance from the zoom lens to the photographed object is set to 1 m.

FIG. 197 shows a lens arrangement in the Embodiment 50 at the wide angle end of the zoom lens. FIGS. 205, 206 and 207 respectively show aberration diagrams with respect to the Embodiment 50 at the wide angle end of the zoom lens, an intermediate focal length of the zoom lens and the telescopic end of the zoom lens when the distance from the zoom lens to a photographed object is infinite. FIGS. 208, 209 and 210 respectively show aberration diagrams with respect to the Embodiment 50 at the wide angle end of the zoom lens, an intermediate focal length of the zoom lens and the telescopic end of the zoom lens when the distance from the zoom lens to the photographed object is set to 1 m.

FIG. 198 shows a lens arrangement in the Embodiment 51 at the wide angle end of the zoom lens. FIGS. 211, 212 and 213 respectively show aberration diagrams with respect to the Embodiment 51 at the wide angle end of the zoom lens, an intermediate focal length of the zoom lens and the telescopic end of the zoom lens when the distance from the zoom lens to a photographed object is infinite. FIGS. 214, 215 and 216 respectively show aberration diagrams with respect to the Embodiment 51 at the wide angle end of the zoom lens, an intermediate focal length of the zoom lens and the telescopic end of the zoom lens when the distance from the zoom lens to the photographed object is set to 1 m.

As mentioned above, in accordance with the present invention, it is possible to provide a novel zoom lens having a high variable magnification.

As mentioned above, with respect to this zoom lens, refracting power of the second lens group can be increased while the distance between the first and second lens groups is secured. Accordingly, the entire length of the zoom lens can be reduced and refracting power of the front lens group in the second lens group can be reduced so that an F-number of the zoom lens can be reduced.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens having a high variable magnification in which first and second lens groups respectively having negative and positive focal lengths are sequentially arranged from an object side of the zoom lens to an image side thereof and a combined focal length of an entire lens system is changed by changing a distance between the first and second lens groups while the position of an image surface is constantly held, said zoom lens being constructed such that the second lens group is constructed by front and rear lens groups respectively having positive and negative focal lengths, and the respective focal lengths $f_1$ and $f_2$ of the first and second lens groups, the respective focal lengths $f_2(F)$ and $f_2(R)$ of the front and rear lens groups in the second lens group, and combined focal lengths $f(W)$ and $f(T)$ of the entire lens system at wide angle and telescopic ends thereof satisfy the following conditions, $$[f_1 + f_2 \cdot \{2 - (f_1/f(W)) - (f(W)/f_1)\}]/f(T) < 0.6 \quad (I)$$

$$[f_1 + f_2 \cdot \{2 - (f_1/f(T)) - (f(T)/f_1)\}]/f(T) < 0.6 \quad (II)$$

$$0.6 < |f_2(R)|/f_2(F) < 6.0 \quad (III)$$

$$0.8 < f_2(F)/f_2 < 1.4 \quad (IV)$$

$$0.5 < |f_1|/\sqrt{[f(W) \cdot f(T)]} < 1.3 \quad (V)$$

where $\sqrt{[\ ]}$ means a square root of a value within bracket [ ].

2. A zoom lens as claimed in claim 1, wherein
the first lens group is constructed by negative and positive lenses sequentially arranged from the object side of the zoom lens to the image side thereof;
the front lens group of the second lens group is constructed by a joining positive lens composed of a combination of positive and negative lenses, a positive lens, a negative lens, and a joining positive lens composed of a combination of positive and negative lenses sequentially arranged from the object side of the zoom lens to the image side thereof; and
the rear lens group of the second lens group is constructed by a joining negative lens composed of a combination of negative and positive lenses.

3. A zoom lens as claimed in claim 1, wherein
the first lens group is constructed by negative and positive lenses sequentially arranged from the object side of the zoom lens to the image side thereof;
the front lens group of the second lens group is constructed by a joining positive lens composed of a combination of positive and negative lenses, a positive lens, a negative lens, and a positive lens sequentially arranged from the object side of the zoom lens to the image side thereof; and
the rear lens group of the second lens group is constructed by a joining negative lens composed of a combination of negative and positive lenses.

4. A zoom lens as claimed in claim 1, wherein
the first lens group is constructed by negative and positive lenses sequentially arranged from the object side of the zoom lens to the image side thereof;
the front lens group of the second lens group is constructed by a positive lens, a positive lens, and a negative lens sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

5. A zoom lens as claimed in claim 1, wherein
the first lens group is constructed by negative and positive lenses sequentially arranged from the object side of the zoom lens to the image side thereof;
the front lens group of the second lens group is constructed by a positive lens and a joining lens composed of a combination of positive and negative lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

6. A zoom lens as claimed in claim 1, wherein
the first lens group is constructed by negative and positive lenses sequentially arranged from the object side of the zoom lens to the image side thereof;
the front lens group of the second lens group is constructed by a joining lens composed of a combination of positive and negative lenses, a positive lens, and a negative lens sequentially arranged from the object side of the zoom lens to the image side thereof; and the rear lens group of the second lens group is constructed by a positive lens and a negative lens sequentially arranged from the object side of the zoom lens to the image side thereof.

7. A zoom lens as claimed in claim 1, wherein
the first lens group is constructed by negative and positive lenses sequentially arranged from the object side of the zoom lens to the image side thereof;
the front lens group of the second lens group is constructed by a joining lens composed of a combination of positive and negative lenses, and a joining lens composed of a combination of positive and negative lenses sequentially arranged from the object side of the zoom lens to the image side thereof; and
the rear lens group of the second lens group is constructed by a positive lens and a negative lens sequentially arranged from the object side of the zoom lens to the image side thereof.

8. A zoom lens as claimed in claim 1, wherein
the first lens group is constructed by negative and positive lenses sequentially arranged from the object side of the zoom lens to the image side thereof;
the front lens group of the second lens group is constructed by a positive lens, a positive lens, and a joining lens composed of a combination of negative and positive lenses sequentially arranged from the object side of the zoom lens to the image side thereof; and
the rear lens group of the second lens group is constructed by a positive lens and a joining lens composed of a combination of negative and positive lenses sequentially arranged from the object side of the zoom lens to the image side thereof.

9. A zoom lens as claimed in claim 1, wherein
the first lens group is constructed by negative and positive lenses sequentially arranged from the object side of the zoom lens to the image side thereof;
the front lens group of the second lens group is constructed by a positive lens, a positive lens, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

10. A zoom lens as claimed in claim 1, wherein
the first lens group is constructed by negative and positive lenses sequentially arranged from the object side of the zoom lens to the image side thereof;
the front lens group of the second lens group is constructed by a joining lens composed of a combination of positive and negative lenses, a positive lens, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

11. A zoom lens as claimed in claim 1, wherein
the first lens group is constructed by negative and positive lenses sequentially arranged from the object side of the zoom lens to the image side thereof;
the front lens group of the second lens group is constructed by a positive lens, a joining lens composed of a combination of positive and negative lenses, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

12. A zoom lens as claimed in claim 1, wherein
the first lens group is constructed by negative and positive lenses sequentially arranged from the object side of the zoom lens to the image side thereof;
the front lens group of the second lens group is constructed by a joining lens composed of a combination of positive and negative lenses, and a joining lens composed of a combination of positive and negative lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

13. A zoom lens as claimed in claim 1, wherein
the first lens group is constructed by negative and positive lenses sequentially arranged from the object side of the zoom lens to the image side thereof;
the front lens group of the second lens group is constructed by a positive lens, a positive lens, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a joining lens composed of a combination of negative and positive lenses sequentially arranged from the object side of the zoom lens to the image side thereof.

14. A zoom lens as claimed in claim 1, wherein
the second lens group has a diaphragm between the front and rear lens groups; and
the zoom lens is constructed such that a moving amount of said diaphragm is smaller than that of the second lens group when a zooming operation is performed from the wide angle end of the zoom lens to the telescopic end thereof.

15. A zoom lens as claimed in claim 14, wherein
the first lens group is constructed by negative and positive lenses sequentially arranged from the object side of the zoom lens to the image side thereof;
the front lens group of the second lens group is constructed by a positive lens, a positive lens, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a negative 16. A zoom lens as claimed in claim 14, wherein
the first lens group is constructed by negative and positive lenses sequentially arranged from the object side of the zoom lens to the image side thereof;
the front lens group of the second lens group is constructed by a joining lens composed of a combination of positive and negative lenses, a positive lens, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

17. A zoom lens as claimed in claim 14, wherein
the first lens group is constructed by negative and positive lenses sequentially arranged from the object side of the zoom lens to the image side thereof;
the front lens group of the second lens group is constructed by a positive lens, a joining lens composed of a combination of positive and negative lenses, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a negative lens sequentially arranged from the object side of the zoom lens to the image side thereof.

18. A zoom lens as claimed in claim 14, wherein
the first lens group is constructed by negative and positive lenses sequentially arranged from the object side of the zoom lens to the image side thereof;
the front lens group of the second lens group is constructed by a positive lens, a positive lens, and a joining lens composed of a combination of negative and positive lenses sequentially arranged from the object side of the zoom lens to the image side thereof; and
the rear lens group of the second lens group is constructed by a joining lens composed of a combination of positive and negative lenses, and a joining lens composed of a combination of negative and positive lenses sequentially arranged from the object side of the zoom lens to the image side thereof.

19. A zoom lens as claimed in claim 1, wherein a distance between the front and rear lens groups in the second lens group is reduced in an intermediate zooming region of the zoom lens.

20. A zoom lens as claimed in claim 1 or 19, wherein
a first diaphragm is disposed within the front lens group of the second lens group, or on an object side thereof, and a second diaphragm having a constant opening diameter is disposed between the front and rear lens groups of the second lens group; and
said second diaphragm is moved and separated from the front lens group of the second lens group when a zooming operation is performed from the wide angle end of the zoom lens to the telescopic end thereof.

21. A zoom lens as claimed in claim 1, wherein a focusing operation is performed by moving the rear lens group of the second lens group on the image side thereof; and
the rear lens group of the second lens group includes at least one positive lens, and a lateral magnification $m_2(RW)$ of the rear lens group in the second lens group at the wide angle end of the zoom lens and infinity with respect to a photographed object satisfies the following condition, $$1.1 < m_2(RW) < 2$$

22. A zoom lens as claimed in claim 21, wherein a diaphragm is disposed between the front and rear lens groups in the second lens group, and a moving amount of said diaphragm is set to be smaller than that of the second lens group when a zooming operation is performed from the wide angle end of the zoom lens to the telescopic end thereof.

* * * * *